(12) United States Patent
Aihara et al.

(10) Patent No.: US 11,866,101 B2
(45) Date of Patent: Jan. 9, 2024

(54) WORKING MACHINE

(71) Applicant: KUBOTA CORPORATION, Osaka (JP)

(72) Inventors: Masahiro Aihara, Sakai (JP); Hironobu Konishi, Sakai (JP); Shohei Tanaka, Sakai (JP); Yuta Yamada, Sakai (JP); Yoshiki Takizawa, Sakai (JP); Tokio Sakata, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 18 days.

(21) Appl. No.: 17/549,512

(22) Filed: Dec. 13, 2021

(65) Prior Publication Data

US 2022/0097585 A1 Mar. 31, 2022

Related U.S. Application Data

(63) Continuation of application No. 16/230,846, filed on Dec. 21, 2018, now Pat. No. 11,230,212, which is a
(Continued)

(30) Foreign Application Priority Data

Oct. 26, 2016 (JP) ................................. 2016-210070
Oct. 26, 2016 (JP) ................................. 2016-210071
(Continued)

(51) Int. Cl.
*B62D 33/063* (2006.01)
*E02F 9/00* (2006.01)
(Continued)

(52) U.S. Cl.
CPC .......... *B62D 33/0633* (2013.01); *B60K 15/03* (2013.01); *B60N 3/04* (2013.01);
(Continued)

(58) Field of Classification Search
CPC ............... B62D 33/06; B62D 33/0617; B62D 33/0633; E02F 3/32; E02F 3/325;
(Continued)

(56) References Cited

U.S. PATENT DOCUMENTS 3,120,897 A 2/1964 Auwelaer et al.
3,450,429 A 6/1969 Stata
(Continued)

FOREIGN PATENT DOCUMENTS

BE 837540 A * 7/1976 .............. E02F 9/121
EP 1659225 A1 * 5/2006 ............ E02F 9/0816
(Continued)

*Primary Examiner* — Jason S Daniels
(74) *Attorney, Agent, or Firm* — Birch, Stewart, Kolasch & Birch, LLP

(57) ABSTRACT

A floor mat arranged in a working machine includes a floor portion, a wall portion arranged on a circumferential portion of the floor portion, and an opening portion arranged on a part of a connecting portion of the wall portion, the connecting portion connecting to the floor portion. The floor mat includes a mat main body arranged on the floor portion, a covering portion configured to cover the opening portion, and an connecting portion configured to connect the covering portion flexibly to a circumferential portion of the mat main body.

5 Claims, 70 Drawing Sheets

Related U.S. Application Data continuation of application No. PCT/JP2017/037980, filed on Oct. 20, 2017.

(30) Foreign Application Priority Data

| Oct. 26, 2016 | (JP) | 2016-210072 |
|---|---|---|
| Oct. 26, 2016 | (JP) | 2016-210073 |
| Oct. 26, 2016 | (JP) | 2016-210074 |
| Oct. 26, 2016 | (JP) | 2016-210075 |

(51) Int. Cl.

| E02F 9/08 | (2006.01) |
|---|---|
| B60N 3/04 | (2006.01) |
| B60K 15/03 | (2006.01) |
| E02F 3/32 | (2006.01) |
| B62D 25/10 | (2006.01) |
| E02F 9/16 | (2006.01) |
| B62D 33/06 | (2006.01) |
| B60K 11/04 | (2006.01) |
| B60H 1/00 | (2006.01) |

(52) U.S. Cl.
CPC ............ *B60N 3/048* (2013.01); *B62D 25/10* (2013.01); *B62D 33/0617* (2013.01); *E02F 3/325* (2013.01); *E02F 9/006* (2013.01); *E02F 9/0858* (2013.01); *E02F 9/0883* (2013.01); *E02F 9/0891* (2013.01); *E02F 9/16* (2013.01); *B60H 1/00378* (2013.01); *B60K 11/04* (2013.01)

(58) Field of Classification Search
CPC ..... E02F 9/006; E02F 9/02; E02F 9/08; E02F 9/121; E02F 9/166

USPC .................................................. 296/190.04
See application file for complete search history.

(56) References Cited

U.S. PATENT DOCUMENTS

| 5,254,384 | A | 10/1993 | Gordon |
|---|---|---|---|
| 7,500,532 | B2 * | 3/2009 | Koga .................. E02F 9/121 |
| | | | 296/190.04 |
| 2004/0187409 | A1 | 9/2004 | Kojima et al. |
| 2010/0244422 | A1 * | 9/2010 | Sugimoto ............. E02F 9/02 |
| | | | 280/781 |
| 2014/0292034 | A1 | 10/2014 | Ueda et al. |
| 2015/0176248 | A1 | 6/2015 | Horikawa et al. |
| 2015/0217666 | A1 | 8/2015 | Garbarino |

FOREIGN PATENT DOCUMENTS

| EP | 3875694 A1 * | 9/2021 | ........... E02F 9/006 |
|---|---|---|---|
| JP | 61-35966 U | 3/1986 | |
| JP | 63-78929 A | 4/1988 | |
| JP | 2001-047924 A | 2/2001 | |
| JP | 2003-020687 A | 1/2003 | |
| JP | 2003-49452 A | 2/2003 | |
| JP | 2003-64724 A | 3/2003 | |
| JP | 2005-088799 A | 4/2005 | |
| JP | 2005-112049 A | 4/2005 | |
| JP | 2005-222330 A | 8/2005 | |
| JP | 2006-273055 A | 10/2006 | |
| JP | 2007-092283 A | 4/2007 | |
| JP | 2010-117046 A | 5/2010 | |
| JP | 2014-009506 A | 1/2014 | |
| JP | 2014-198935 A | 10/2014 | |
| JP | 2015-117489 A | 6/2015 | |
| JP | 2017066791 A * | 4/2017 | ............ E02F 9/08 |
| JP | 2017-115559 A | 6/2017 | |

\* cited by examiner

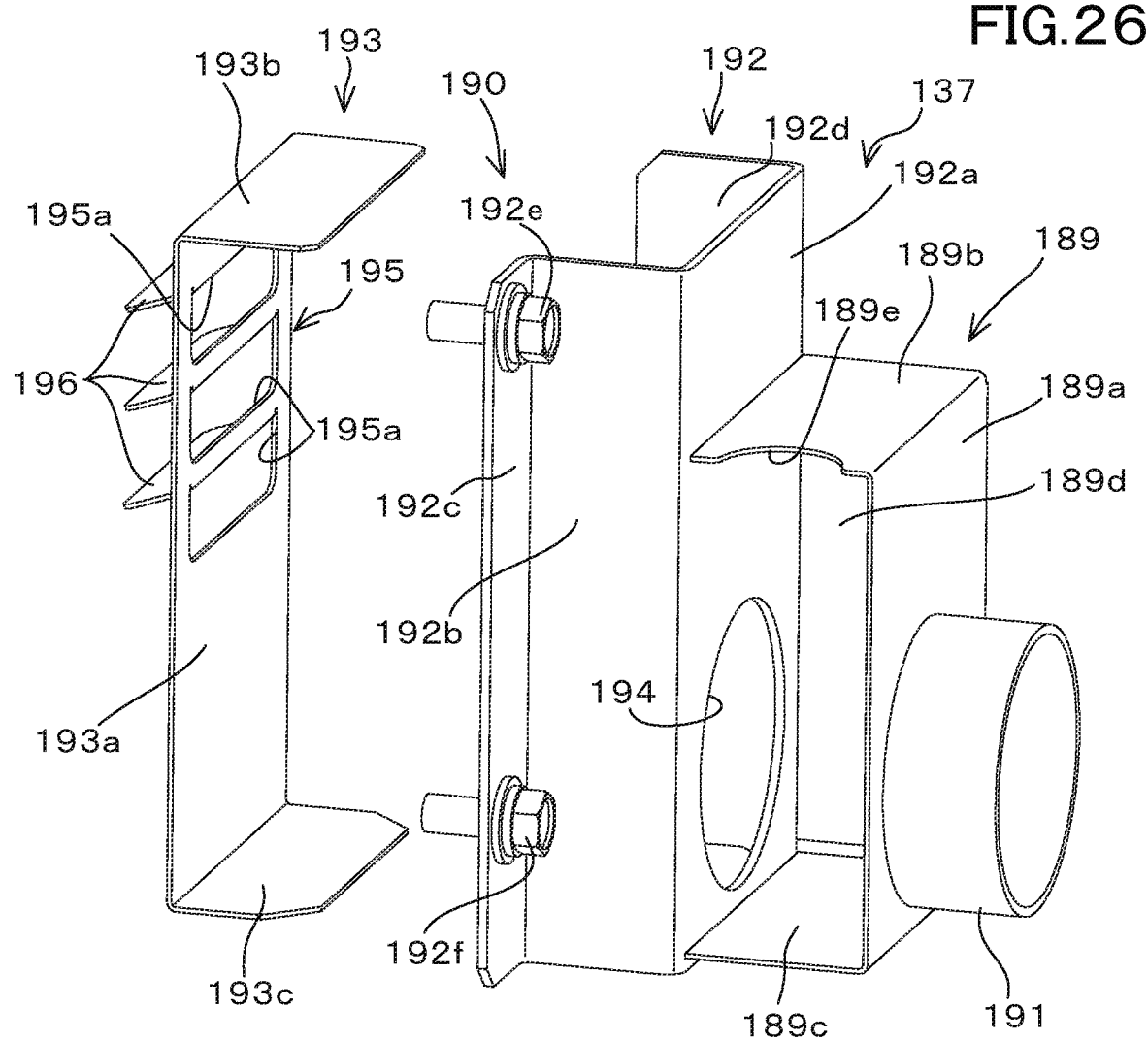
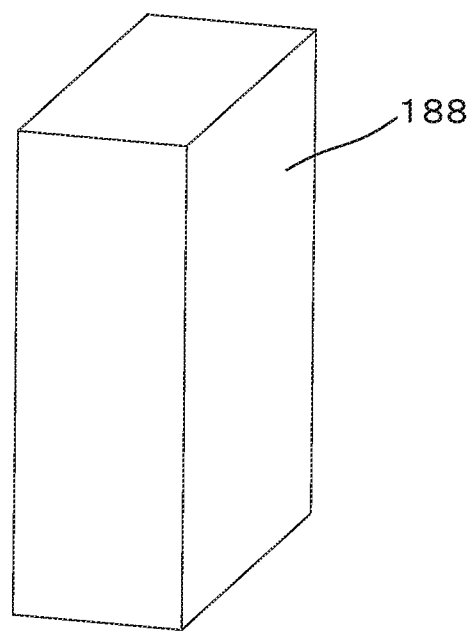
FIG.26

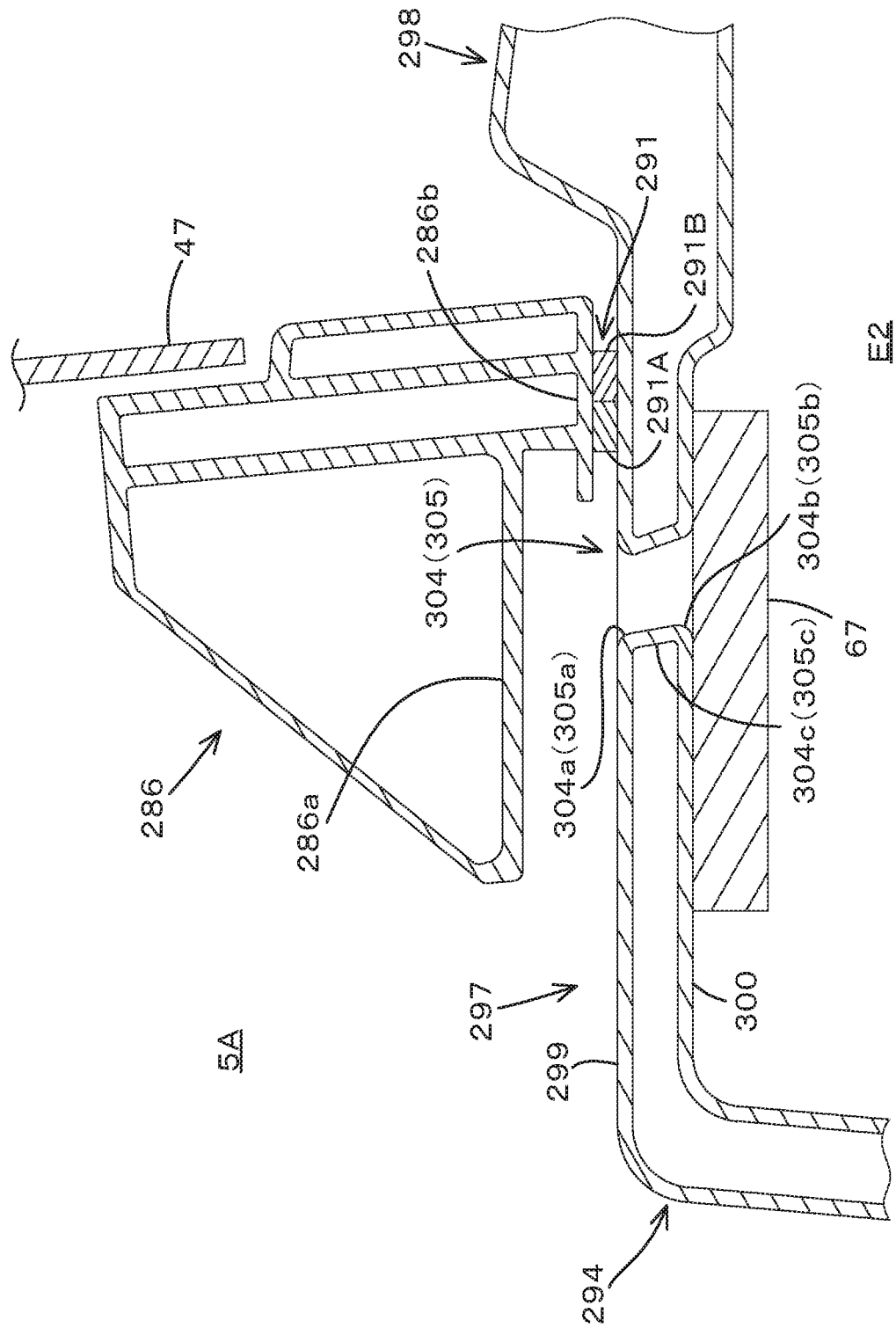

WORKING MACHINE

CROSS-REFERENCE TO RELATED APPLICATIONS

The present application is a continuation of co-pending application Ser. No. 16/230,846, filed on Dec. 21, 2018, which is a continuation application of International Application No. PCT/JP 2017/037980, filed Oct. 20, 2017, which claims priority to Japanese Patent Application No. 2016/210070, filed Oct. 26, 2016, to Japanese Patent Application No. 2016/210071, filed Oct. 26, 2016, to Japanese Patent Application No. 2016/210072, filed Oct. 26, 2016, to Japanese Patent Application No. 2016/210073, filed Oct. 26, 2016, to Japanese Patent Application No. 2016/210074, filed Oct. 26, 2016, and to Japanese Patent Application No. 2016/210075, filed Oct. 26, 2016. The contents of these applications are incorporated herein by reference in their entirety.

BACKGROUND OF THE INVENTION

Field of the Invention

The present invention relates to a floor mat provided to a working machine such as a backhoe and to the working machine having the floor mat.

Description of Related Art

A working machine disclosed in Japanese Unexamined Patent Application Publication No. 2005-222330 is previously known.

The working machine disclosed in Japanese Unexamined Patent Application Publication No. 2005-222330 includes a machine body on which a cabin is mounted, and a floor mat is installed on the boundaries between a floor surface of the cabin and the side wall surface and between the floor surface and the front wall surface.

SUMMARY OF THE INVENTION

In an aspect of the present invention, a floor mat arranged in a working machine including: a floor portion; a wall portion arranged on a circumferential portion of the floor portion; and an opening portion arranged on a part of a connecting portion of the wall portion, the connecting portion connecting to the floor portion, is characterized in that the floor mat includes: a mat main body arranged on the floor portion; a covering portion configured to cover the opening portion; and an connecting portion configured to connect the covering portion flexibly to a circumferential portion of the mat main body, wherein the covering portion includes: a first cover wall portion having: a side portion connected to the connecting portion; and a first opposite side portion and a second opposite side portion each extending from end portions of the side portion and being opposite to each other; a second cover wall portion extending downward from the first opposite side portion; and a third cover wall portion extending downward from the second opposite side portion, and wherein a length of the second cover wall portion from a portion connecting to the first opposite side portion to a lower end portion of the second cover wall portion is equal to or less than a thickness of the mat main body, and a length of the third cover wall portion from a portion connecting to the second opposite side portion to a lower end portion of the third cover wall portion is equal to or less than the thickness of the mat main body.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is a right side view illustrating arrangement of a fuel tank and the like;

FIG. 10 is a view illustrating a cross-section of the fuel tank and the like;

FIG. 26 is an exploded perspective view illustrating the outside air introducing device;

FIG. 40 is a side view illustrating a cross section of a placement portion;

DESCRIPTION OF THE EMBODIMENTS

Hereinafter, embodiments of the present invention will be described with reference to the drawings.

First, the overall configuration of the working machine 1 will be schematically described.

Figure 1:
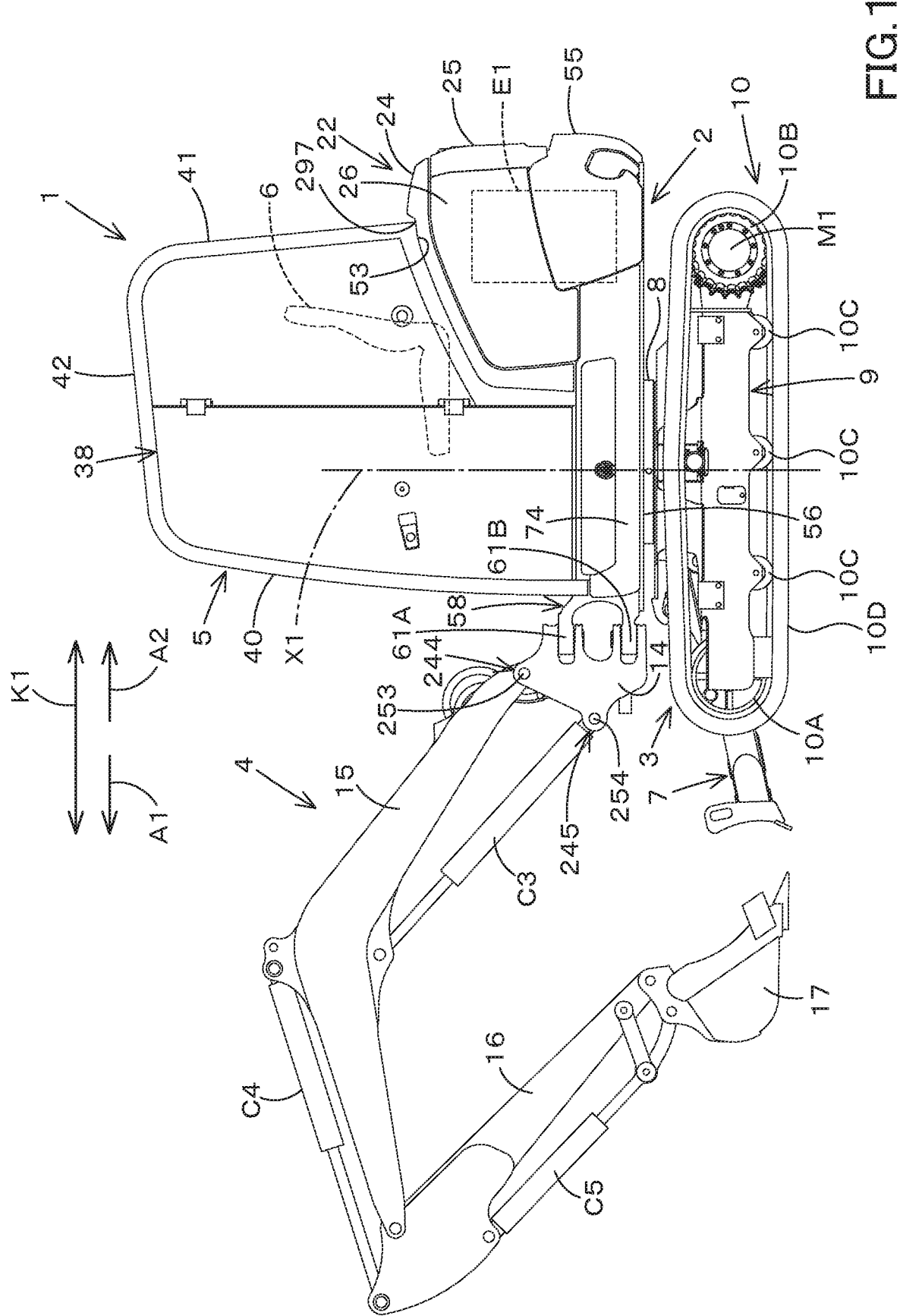
FIG. 1 is a schematic side view of a working machine.
Figure 2:
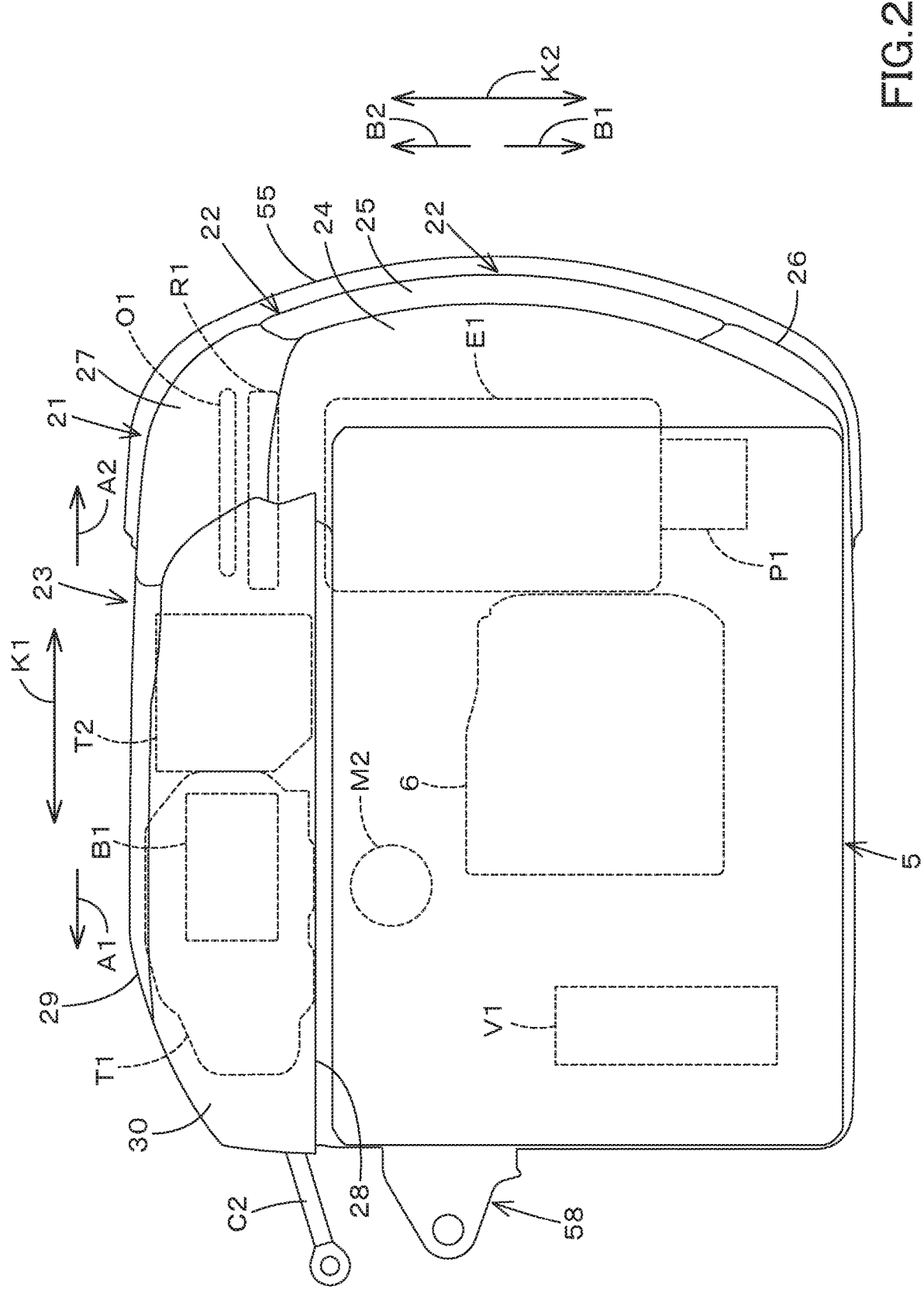
FIG. 2 is a schematic plan view illustrating a part of the working machine.

FIG. 1 is a schematic side view showing the overall configuration of the working machine 1 according to the present embodiment. FIG. 2 is a schematic plan view of a part of the working machine 1.

In the present embodiment, a backhoe which is a swiveling working machine is exemplified as the working machine 1.

As shown in FIG. 1, the work machine 1 includes a machine body (a turn table) 2, a traveling device 3, and a work device 4. A cabin 5 is mounted on the machine body 2. An operator seat 6 is provided in the interior of the cabin 5.

In the explanation of the present embodiment, the front side of the operator seated on the operator seat 6 of the working machine 1 (the direction indicated by the arrowed line A1 in FIG. 1 and FIG. 2) is the front, the rear side of the operator (the direction indicated by the arrowed line A2 in FIG. 1 and FIG. 2) is the rear, the left side of the operator (the front surface side of FIG. 1, the direction indicated by the arrowed line B1 in FIG. 2) is the left, the right side of the operator (the back surface side of FIG. 1, the direction indicated by the arrowed line B2 in FIG. 2) is the right.

Further, the horizontal direction which is a direction orthogonal to the front-rear direction K1 will be described as a machine width direction K2 (refer to FIG. 2). The direction from the center portion in the width direction of the machine body 2 to the right portion or the left portion will be described as a machine outward direction. In other words, the outer side of the machine body means a direction separating away from the center in the machine width direction K2 and in the width direction of the machine body 2. In the explanation, the direction opposite to the machine outward direction will be as a machine inward direction. In other words, the machine inward direction means a direction approaching the center in the machine width direction K2 and in the width direction of the machine body 2.

As shown in FIG. 1, the traveling device 3 includes a traveling frame 9 and a traveling mechanism 10. The traveling mechanism 10 is constituted of a crawler type traveling mechanism. In other words, the traveling device 3 is a crawler type traveling device. The traveling mechanism 10 is provided on the left side and the right side of the traveling frame 9. Further, the traveling mechanism 10 includes an idler 10A, a driving wheel 10B, a plurality of rolling wheels 10C, an endless crawler belt 10D, and a traveling motor M1 constituted of a hydraulic motor. The idler 10A is disposed at the front portion of the traveling frame 9, and the driving wheel 10B is disposed at the rear portion of the traveling frame 9. The plurality of rolling wheels 10C are provided between the idler 10A and the driving wheel 10B. The crawler belt 10D is wound around the idler 10A, the driving wheel 10B, and the rolling wheel 10C. The traveling motor M1 circulates the crawler belt 10D in the circumferential direction by driving the drive wheel 10B. A dozer device 7 is attached to the front portion of the traveling device 3.

The machine body 2 is turnably supported on a running frame 9 (is configured to be turned to the left and the right) about a longitudinal axis (an axis extending in the vertical direction) by a turning bearing 8. The center of the swing bearing 8 is the rotation center of the machine body 2, and the rotation center of this machine body 2 is referred to as a turn axis X1.

As shown in FIG. 2, the cabin 5 is mounted to the left of the machine body 2 and closer to the front portion. An engine E1 is mounted on the rear portion of the machine body 2. The engine E1 is disposed on the rear portion side of the cabin 5. On the left side of the engine E1, a hydraulic pump P1 is provided. The hydraulic pump P1 is driven by the driving force of the engine E1. The hydraulic pump P1 outputs the operation fluid (the hydraulic pressure) for driving a hydraulic actuator such as a hydraulic motor, a hydraulic cylinder, and the like mounted on the working machine 1. In addition, the hydraulic pump P1 discharges a pilot pressure for operating a hydraulic valve and a hydraulic pressure for a signal.

Figure 3:
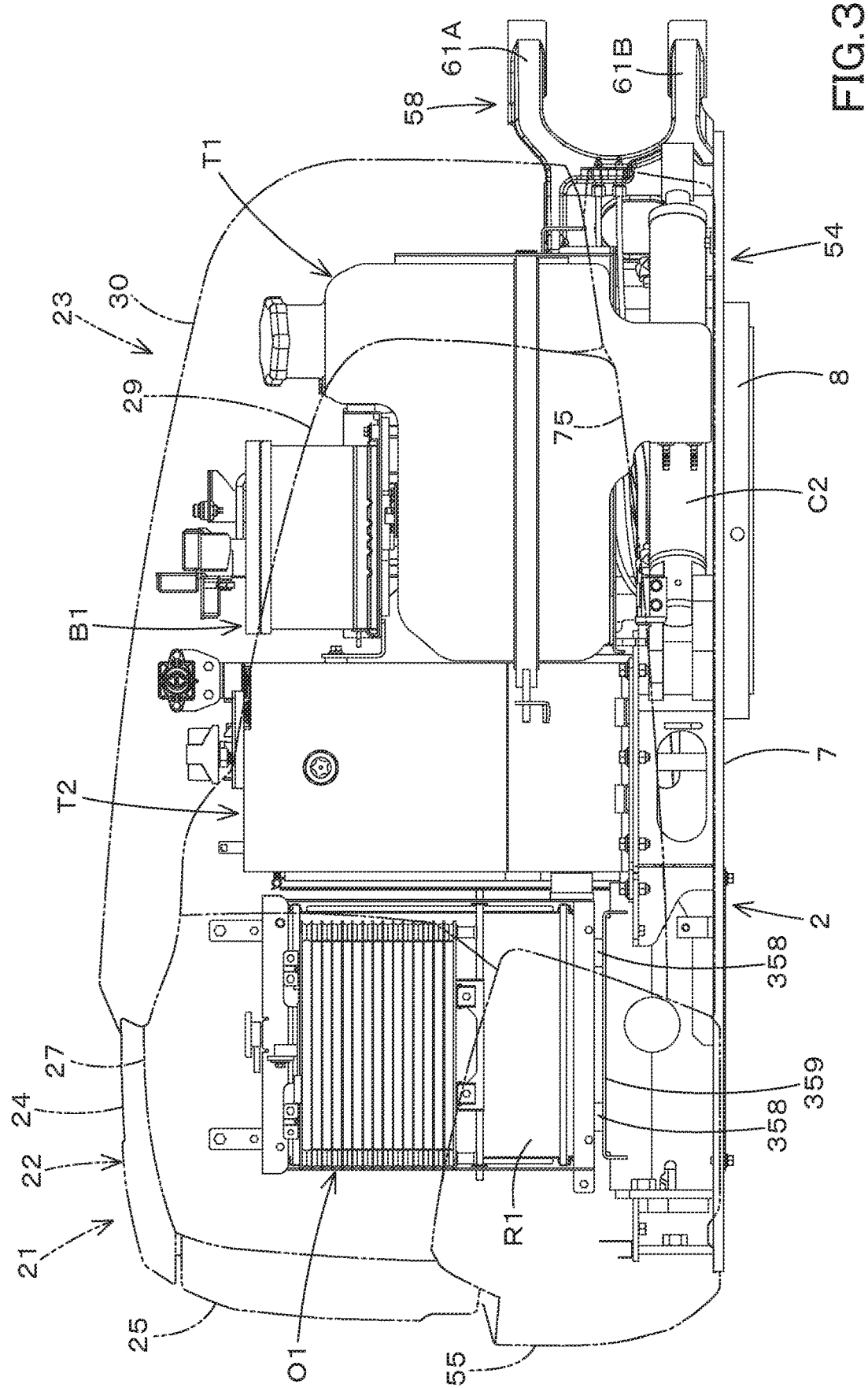
FIG. 3 is a right side view illustrating a part of the working machine.

As shown in FIG. 2 and FIG. 3, a fuel tank T1, a battery B1, an operation fluid tank T2, a radiator R1, and an oil cooler O1 (a heat exchanger) are mounted on the right side (a side) of the cabin 5, that is, on the right side (a side) of the machine body 2. The fuel tank T1 is a tank for storing fuel for the engine E1. The battery B1 is a storage battery that supplies power to the electrical components mounted on the working machine 1. The operation fluid tank T2 is a tank that stores the operation fluid to be supplied to the hydraulic pump P1. The radiator R1 cools the coolant of the engine E1. The oil cooler O1 cools the operation fluid returning to the operation fluid tank T2.

The fuel tank T1 is disposed at the front portion on the right side of the machine body 2. The battery B1 is disposed above the rear portion of the fuel tank T1. The operation fluid tank T2 is disposed behind the fuel tank T1 and the battery B1. The radiator R1 and the oil cooler O1 are disposed behind the operation fluid tank T2. Further, the radiator R1 and the oil cooler O1 are arranged side by side (to right side) of the engine E1 along the machine width direction K2. The radiator R1 is disposed closer to the engine E1 than the oil cooler O1. That is, the radiator R1 is disposed on the right side of the engine E1, and the oil cooler O1 is disposed on the right side of the radiator R1. The oil cooler O1 is arranged to face the radiator R1.

A cooling fan configured to be driven by the driving force of the engine E1 is provided between the radiator R1 and the engine E1. The cooling fan is a suction type fan that draws the air from the right side of the oil cooler O1 and supplies to the engine E1 side.

As shown in FIG. 2, a turning motor M2 constituted of a hydraulic motor is attached to the machine body 2. This turning motor M2 is a motor that drives the machine body 2 to rotate about the turn axis X 1. The turning motor M2 is provided below the cabin 5 and on the lower right side of the front portion of the operator seat 6. The turning motor M2 is attached to a turn base plate 56 to be described later. In addition, a control valve V1 is provided in the machine body 2. This control valve V1 is a valve unit that aggregates each of the control valves that control each of the hydraulic actuators equipped in the working machine 1.

As shown in FIG. 2, an exterior cover 21 that covers the engine E1, the hydraulic pump P1, the fuel tank T1, the battery B1, the operation fluid tank T2, the radiator R1, and the oil cooler O1 is mounted on the machine body 2. The exterior cover 21 has a bonnet 22 and a side cover 23.

Figure 4:
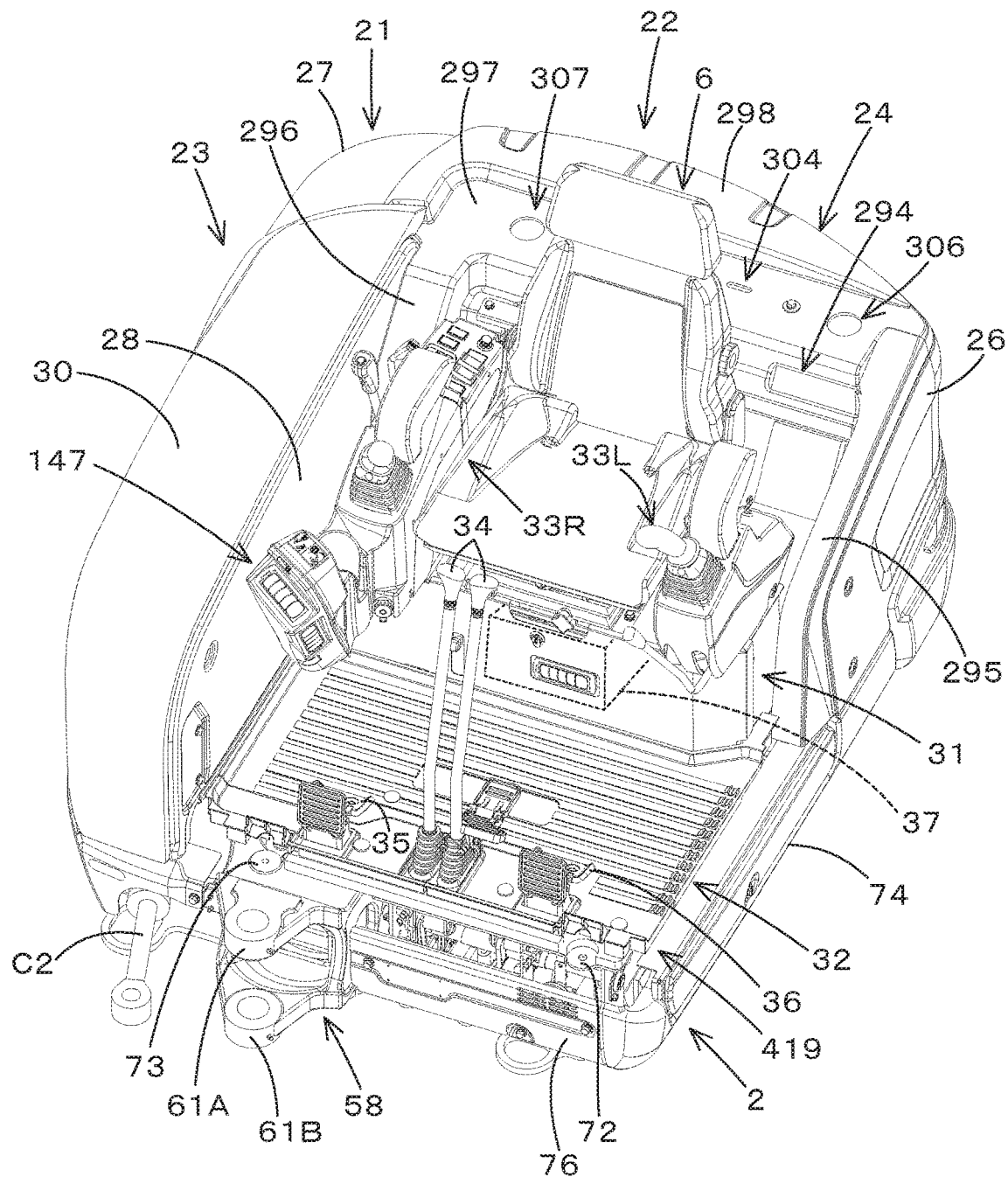
FIG. 4 is a perspective view illustrating a part of the working machine in view from a front side.
Figure 5:
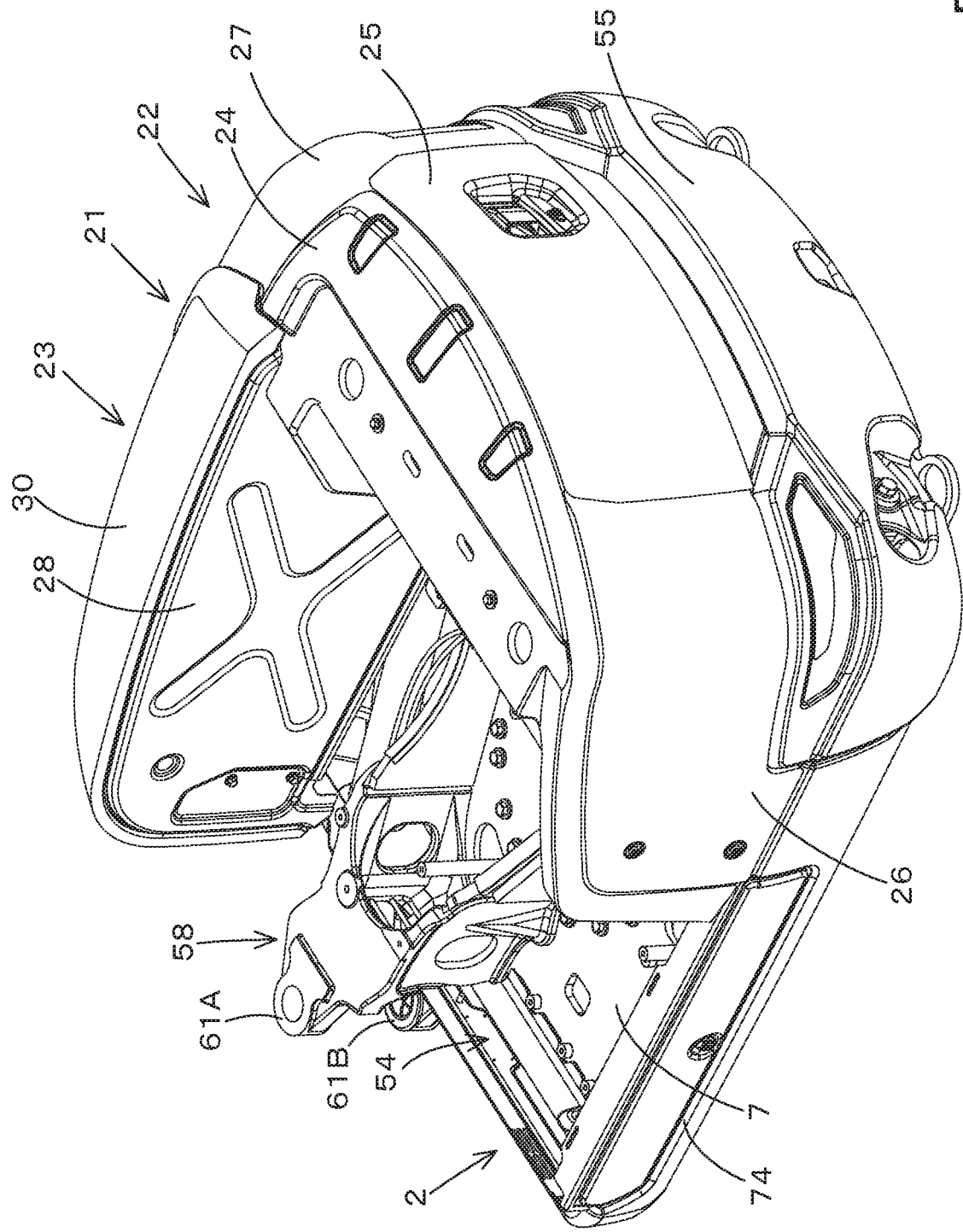
FIG. 5 is a perspective view illustrating a turn frame and a covering device in view from behind.

As shown in FIG. 1 and FIG. 2, the bonnet 22 is a cover mainly covering the engine E1. Thus, the bonnet 22 forms an engine room that houses the engine E1. As shown in FIG. 4 and FIG. 5, the bonnet 22 has a bonnet center 24 (a covering member), a rear bonnet 25, a first side bonnet 26, and a second side bonnet 27. The bonnet center 24 is a covering member that covers the upper side and the front side of the engine E1. In addition, the bonnet center 24 is a covering member for separating the interior of the cabin 5 from the engine room. The rear bonnet 25 is a covering member that covers the rear of the engine E1. The rear bonnet 25 is openable and closable. The first side bonnet 26 is a covering member that covers the engine E1 and the left side of the hydraulic pump. The second side bonnet 27 is a covering member that covers the right side of the engine E1, the radiator R1, and the oil cooler O1. In the second side bonnet 27, an opening for taking the air into the engine room (the bonnet 22) is formed.

As shown in FIG. 2, the side cover 23 is located on the right side of the cabin 5 and covers the fuel tank T1, the battery B1, and the operation fluid tank T2. As shown in FIG. 2, FIG. 3, and FIG. 5, the side cover 23 includes a first cover 28, a second cover 29, and a third cover 30. The first cover 28 is a covering member that covers the left sides of the fuel tank T1, the battery B1, and the operation fluid tank T2. The second cover 29 is a covering member that covers the right sides of the fuel tank T1, the battery B1, and the operation fluid tank T2. The third cover 30 is a covering member that covers the upper sides and the front sides of the fuel tank T1, the battery B1, and the operation fluid tank T2. The third cover 30 is openable and closable, and when the third cover 30 is opened, the upper portions of the fuel tank T1, the battery B1, and the operation fluid tank T2 are opened.

As shown in FIG. 4, the operator seat 6 is provided in front of the bonnet center 24. Below the operator seat 6, a seat base 31 for supporting the operator seat 6 is provided. A floor portion (a step) 419 is disposed in front of the seat base 31, and a floor mat 32 is laid on the floor portion 419. An air conditioning device 37 for adjusting the air in the room of the cabin 5 is provided inside the seat base 31. In this embodiment, the air conditioning device 37 is a heating device. Meanwhile, it should be noted that the air conditioning device may be a device having only a cooling function or may be a device having both the heating function and the cooling mechanism. On the left side of the operator seat 6, an operation device 33L is provided. On the right side of the operator seat 6, an operation device 33R is provided.

The operation devices 33L and 33R are devices for steering the working device 4, the dozer device 7, and the like. In front of the operator seat 6, there are provided a traveling lever 34 for operating the traveling device 3, a first operation pedal 35 for swinging the swing bracket 14, which will be described later, and a second operation pedal 36 for operation a working tool mounted instead of a bucket 17A.

Figure 6:
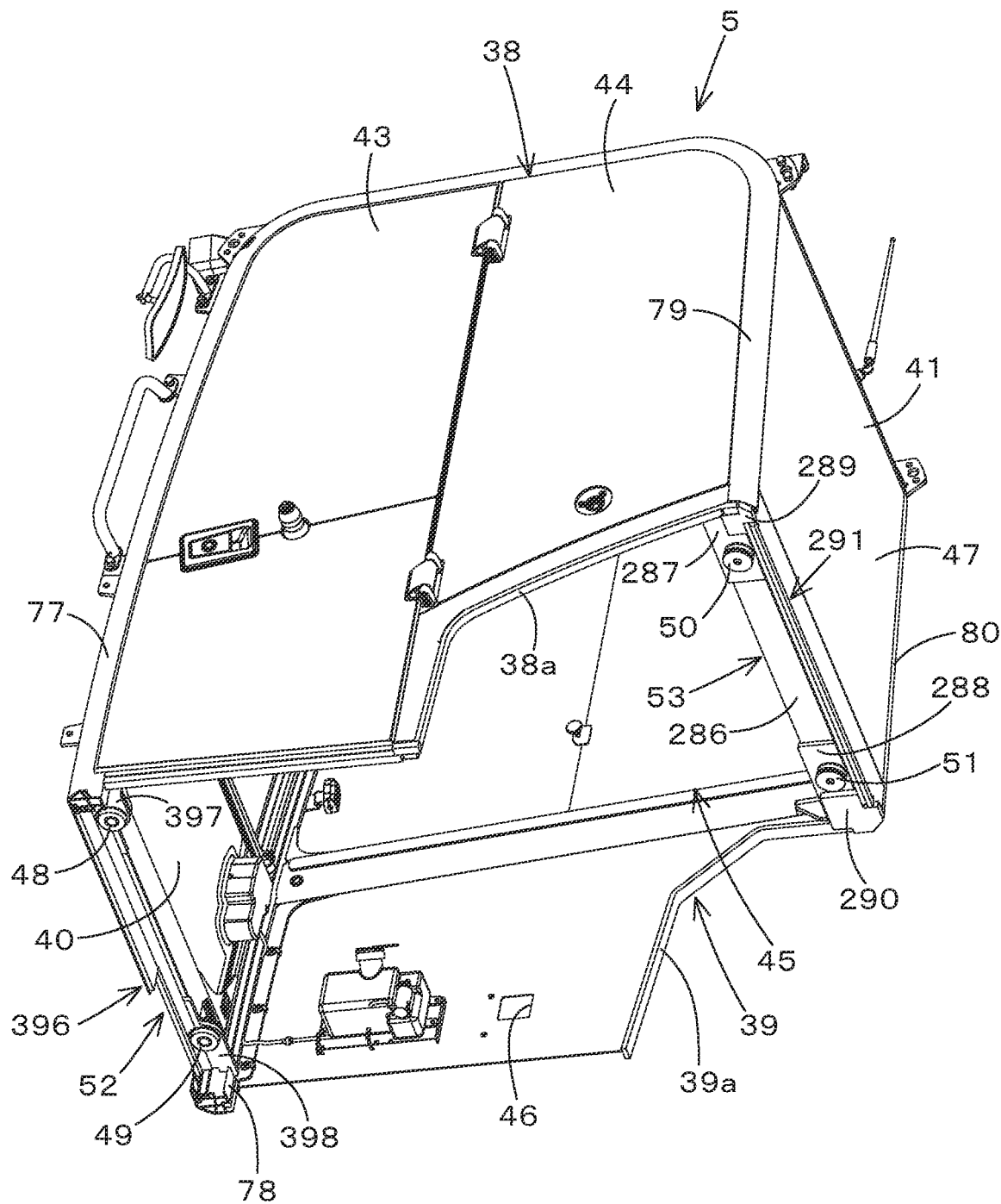
FIG. 6 is a perspective view illustrating a cabin in view from below.

As shown in FIG. 6, the cabin 5 includes a first side surface portion 38 on the left side, a second side surface portion 39 on the right side, a front surface portion 40 provided between the front ends of the first side surface portion 38 and the second side surface portion 39, a back surface portion 41 provided between the rear ends of the first side face portion 38 and the second side face portion 39, a roof 42 (refer to FIG. 1) provided between the upper ends of the first side face portion 38 and the second side face portion 39. The lower surface of the cabin 5 is opened downward. The cabin 5 is mounted on the machine body 2 so as to cover the operator seat 6, the control devices 33L and 33R, the floor mat 32, the travel lever 34, the first operation pedal 35, the second operation pedal 36, and the like.

A door 43 and a side window 44 are provided on the first side face portion 38. An opening/closing window 45 is provided on the upper portion of the second side face portion 39. An outside air introduction port 46 for introducing the outdoor air (referred to as the outside air) of the cabin 5 is provided in a lower portion of the second side face portion 39. In the following description, the air in the room of the cabin 5 is referred to as inside air.

The front surface portion 40 is provided with a front windshield, and the back surface portion 41 is provided with a rear windshield 47.

The first front pillar portion 77 is provided at a corner portion between the front surface portion 40 and the first side surface portion 38. At the corner portion between the front surface portion 40 and the second side surface portion 39, the second front pillar portion 78 is provided. The first front pillar portion 77 and the second front pillar portion 78 are provided being spaced apart from each other in the machine width direction K2. The first rear pillar portion 79 is provided at a corner portion between the back surface portion 41 and the first side surface portion 38. A second rear pillar portion 80 is provided at a corner portion between the back surface portion 41 and the second side surface portion 39. The first rear pillar portion 79 and the second rear pillar portion 80 are provided being spaced apart from each other in the machine width direction K2.

A front lower frame 52 is provided at the lower end portion of the front portion of the cabin 5. The front lower frame 52 is provided between the lower end portions of the first front pillar portion 77 and the second front pillar portion 78. A front mount member (a first front mount member 48, a second front mount member 49) is provided in the front lower frame 52. The first front mount 48 is assembled to the left end portion of the front lower frame 52. The second front mount 49 is assembled to the right end portion of the front lower frame 52. The first front mount 48 and the second front mount 49 have vibration proof rubbers, and support the front portion of the cabin 5 with respect to the machine body 2 so as to prevent the vibration.

A rear lower frame 53 is provided at the lower end portion of the rear portion of the cabin 5. The rear lower frame 53 is provided between the lower end portions of the first rear pillar portion 79 and the second rear pillar portion 80. In addition, the rear lower frame 53 is provided at a position higher than the front lower frame 52. A rear mount member (a first rear mount member 50, a second rear mount member 51) is provided in the rear lower frame 53. The first rear mount 50 is assembled to the left end portion of the rear lower frame 53. The second rear mount 51 is assembled to the right end portion of the rear lower frame 53. The first rear mount 50 and the second rear mount 51 have vibration proof rubbers, and are parts for supporting the rear portion of the cabin 5 with respect to the machine body 2 to prevent the vibration.

Figure 7:
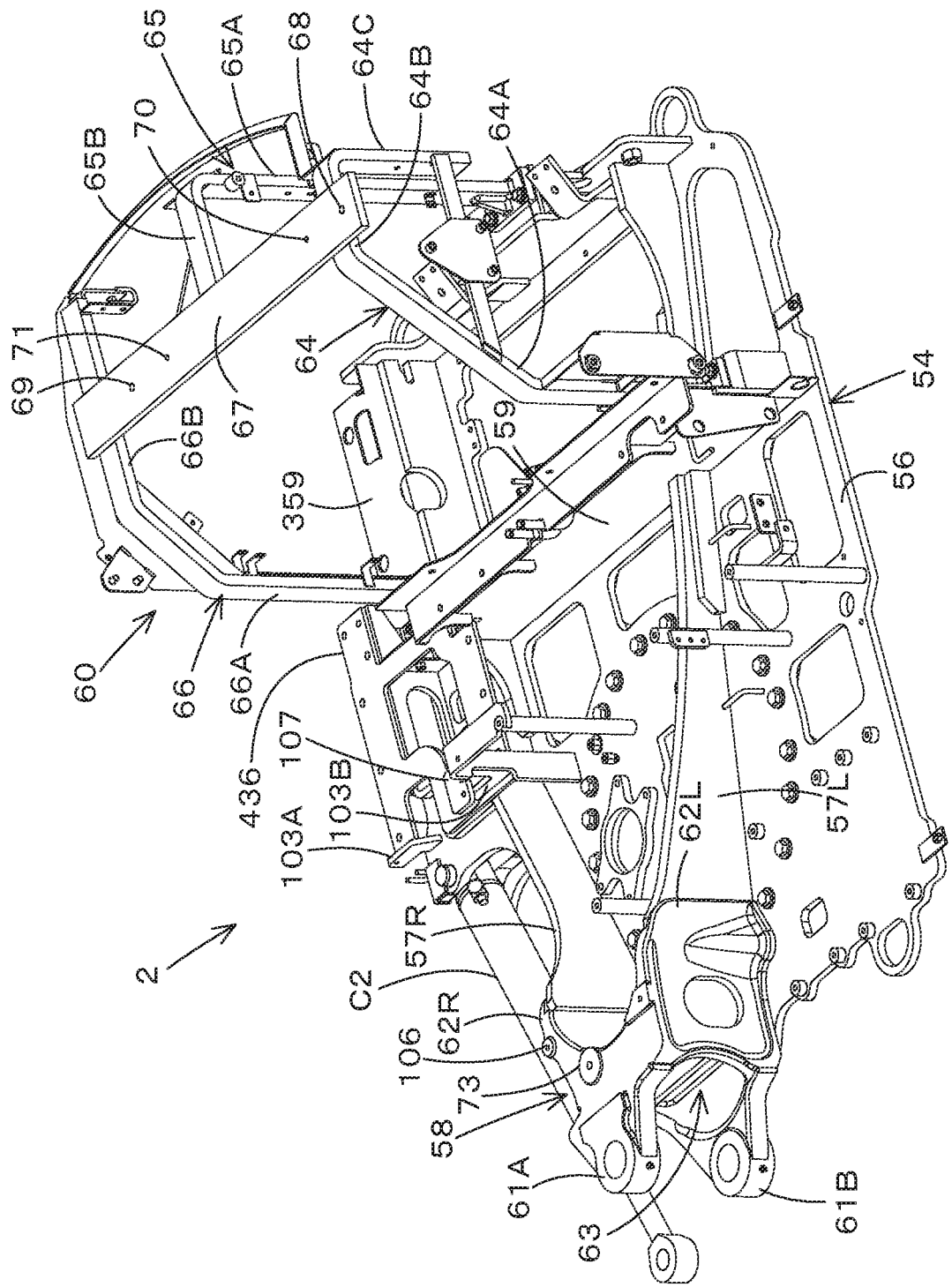
FIG. 7 is a perspective view illustrating the turn frame.

As shown in FIG. 3, FIG. 5, and FIG. 7, the machine body 2 has a turn frame 54 as a skeleton and a weight 55 attached to a rear portion of the turn frame 54.

The turn frame 54 has a turn base plate (a base plate) 56, a plurality of vertical ribs (a first vertical rib 57L, a second vertical rib 57R), a support bracket 58, a partition plate 59, and a support frame 60. In addition, the turn frame 54 is provided with a bracket, a stay, and the like for attaching equipment, tanks, other parts, and the like which are mounted on the machine body 2.

As shown in FIG. 7, the turn base plate 56 is formed of a thick steel plate or the like, and constitutes the bottom portion of the machine body 2. As shown in FIG. 1, the turn base plate 56 is supported on the traveling device 3 so as to be rotatable around the turn axis X1 via the turn bearing 8.

The first vertical rib 57L and the second vertical rib 57R are members that reinforce the turn base plate 56, and are provided extending from the front portion to the rear portion of the turn base plate 56. The first vertical ribs 57L and the second vertical ribs 57R are erected on the turn base plate 56, and juxtaposed at intervals in the machine width direction K2. The first vertical rib 57L is located to the left of the second vertical rib 57R.

The support bracket 58 is provided at the front portions of the first vertical rib 57L and the second vertical rib 57R. The support bracket 58 and the front portions of the first vertical rib 57L and the second vertical rib 57R are provided at positions deviated rightward from the center of the turn base plate 56 in the machine width direction K2. The support bracket 58 has a first support portion 61A and a second support portion 61B positioned below the first support portion 61A at the front portion. In addition, the support bracket 58 has, at the rear portion, a left coupling portion 62L and a right coupling portion 62R located on the right side of the left coupling portion 62L. The left coupling portion 62L is coupled to the front portion of the first vertical rib 57L. The right coupling portion 62R is coupled to the front portion of the second vertical rib 57R. The support bracket 58 is provided with a through hole 63 extending from a portion between the left coupling portion 62L and the right coupling portion 62R toward a portion between the first supporting portion 61A and the second supporting portion 61B. The through hole 63 is a passage formed penetrating through the members constituting the support bracket 58 in the front-rear direction. In the through hole 63, a hydraulic hose or the like is inserted from the machine body 2 side (a rear side) toward the front.

As shown in FIG. 1, a swing bracket 14 is attached to the support bracket 58 so as to be swingable around a vertical axis (an axis extending in the vertical direction). A working device 4 is attached to the swing bracket 14.

As shown in FIG. 7, the partition plate 59 is a member for partitioning the front lower portion of the engine room, and is provided along the machine width direction K2. In addition, the partition plate 59 is erected on the turn base plate 56. The lower part of the bonnet center 24 is attached to the upper part of this partition plate 59. In addition, the operator seat 6 is provided forward from the partition plate 59.

As shown in FIG. 7, the support frame 60 is erected on a rear portion of the turn base plate 56 behind the partition plate 59. The support frame 60 is arranged in the bonnet 22 (an engine room), and supports the bonnet 22 and the peripheral components of the engine E1. The support frame 60 includes a plurality of leg members (a first leg 64, a second leg 65, and a third leg 66) standing on the turn base plate 56, and beam members 67 (supporting portions) fixed to the upper portion of the plurality of leg members. Each of the first leg 64, the second leg 65, the third leg 66 and the beam member 67 is formed of a plate material.

The first leg 64 includes a first pillar portion 64A, a first horizontal portion 64B, and a hanging portion 64C. The first pillar portion 64A stands upright on the front left side of the engine room. The first horizontal portion 64B extends rearward from the upper end of the first pillar portion 64A. The hanging portion 64C extends downward from the rear end of the first horizontal portion 64B.

The second leg 65 has a second support post 65A and a second horizontal portion 65B. The second support post 65A stands upright on the center of rear portion of the engine room in the machine width direction K2. The second horizontal portion 65B extends forward from the upper end of the second support post 65A.

The third leg 66 has a third pillar portion 66A and a third horizontal section 66B. The third pillar portion 66A stands upright on the front right portion of the engine room. The third horizontal portion 66B extends rearward from the upper end of the third pillar portion 66A.

The beam member 67 is placed over the first horizontal portion 64B, the second horizontal portion 65B, and the third horizontal portion 66B so that the plate surface thereof faces upward and downward, and is fixed to these horizontal portions. A first thread hole 68 is formed in the left side portion of the beam member 67.

The threaded hole is a portion in which a female thread is cut on a columnar inner circumferential surface formed in a penetrated or bottomed shape in the beam member 67. This also applies to the following description.

In addition, a second thread hole 69 is formed in the right side portion of the beam member 67. A third threaded hole 70 is formed on the machine inward side of the first thread hole 68, and a fourth threaded hole 71 is formed on the machine inward side of the second threaded hole 69.

The first thread hole 68 is a thread hole for attaching the first rear mount 50. The second thread hole 69 is a thread hole for attaching the second rear mount 51. Thus, the lower end portion (the rear lower frame 53) of the rear portion of the cabin 5 is attached to the beam member 67 (the support frame 60) via the first rear mount 50 and the second rear mount 51. The beam member 67 is a support member for supporting the rear portion of the cabin 5.

The third thread hole 70 and the fourth thread hole 71 are thread holes for attaching the upper part of the bonnet center 24.

As shown in FIG. 4, on the left side of the front portion of the machine body 2, a first mount attachment portion 72 for attaching the first front mount 48 is provided. On the right side of the front portion of the machine body 2, a second mount attachment portion 73 for attaching the second front mount 49 is provided. Thus, the lower end portion (the front lower frame 52) of the front portion of the cabin 5 is attached to the first mount attachment portion 72 via the first front mount 48, and is attached to the second mount attachment portion 73 via the second front mount 49.

As shown in FIG. 3 and FIG. 5, the weight 55 forms the left side lower surface, the right side lower surface, and the rear side lower surface of the engine room. As shown in FIG. 1 and FIG. 5, the left side surface of the turn frame 54, that is, the front side of the weight 55 is covered with a left turning cover 74. As shown in FIG. 3, the right side surface of the turn frame 54, that is, the front side of the weight 55 is covered with the right turn cover 75. As shown in FIG. 4, the front side of the turn frame 54 is covered with the front turn cover 76. The front side of the seat base 31, that is, the upper side of the turn frame 54 is covered with a floor part (a step) that supports the floor mat 32.

As shown in FIG. 1, the working device 4 has a boom 15, an arm 16, and a bucket (work implement) 17. The base portion of the boom 15 is pivotally attached to the swing bracket 14 so as to be rotatable about a horizontal axis (an axis extending in the machine width direction K2). Thereby, the boom 15 is freely swingable in the vertical direction. The arm 16 is pivotally attached to the distal end side of the boom 15 so as to be rotatable about a transverse axis. As a result, the arm 16 can freely swing back and forth or up and down. The bucket 17 is provided on the distal end side of the arm 16 so as to perform a squeeze operation and a dump operation. Instead of or in addition to the bucket 17, it is possible for the working machine 1 to mount another working tool (hydraulic attachment) which can be driven by a hydraulic actuator. Examples of other work tools include a hydraulic breaker, a hydraulic crusher, an angle bloom, a ground auger, a pallet fork, a sweeper, a moor, and a snow blower.

The swing bracket 14 is swingable by expansion and contraction of a swing cylinder C2 (see FIG. 7) provided on the right side of the machine body 2. The boom 15 is swingable by expansion and contraction of the boom cylinder C3. The arm 16 is swingable by expansion and contraction of the arm cylinder C4. The bucket 17 is freely squeezable and dumpable by expansion and contraction of the bucket cylinder (work implement cylinder) C5. The swing cylinder C2, the boom cylinder C3, the arm cylinder C4, and the bucket cylinder C5 are constituted of hydraulic cylinders (hydraulic actuators).

Next, the supporting structure of the fuel tank T1 will be described.

Figure 8:
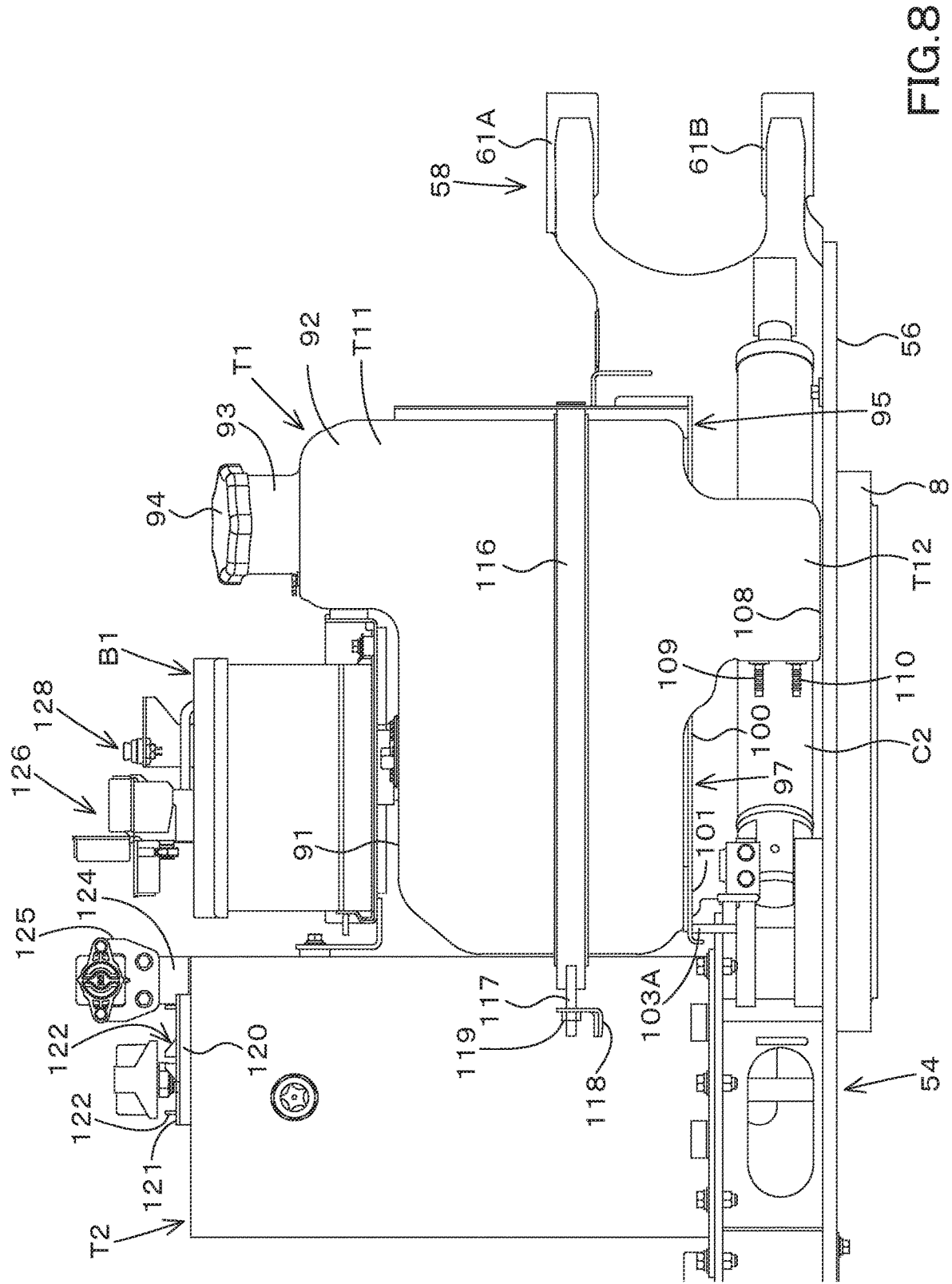

As shown in FIG. 8, the fuel tank T1 has a tank main body T11 and an extension portion T12. The fuel tank T1 is a resin product of a hollow structure formed by blow molding, rotational molding or the like. Thus, the tank main body T11 and the extension portion T12 communicate with each other, and the fuel is stored in the tank main body T11 and the extension portion T12.

On the rear side of the upper part of the tank main body T11, a recess 91 is provided. The recessed portion 91 is formed by recessing the rear side of the upper portion of the tank main body T11 downward with respect to the front portion. A battery B1 is arranged in the recess 91. On the contrary, the front part of the upper part of the tank main body T11 projects upward with respect to the rear part. A fuel filler opening 93 which is opened and closed by a fuel cap 94 is provided on the upper surface of the projecting portion 92 projecting upward.

Figure 9:
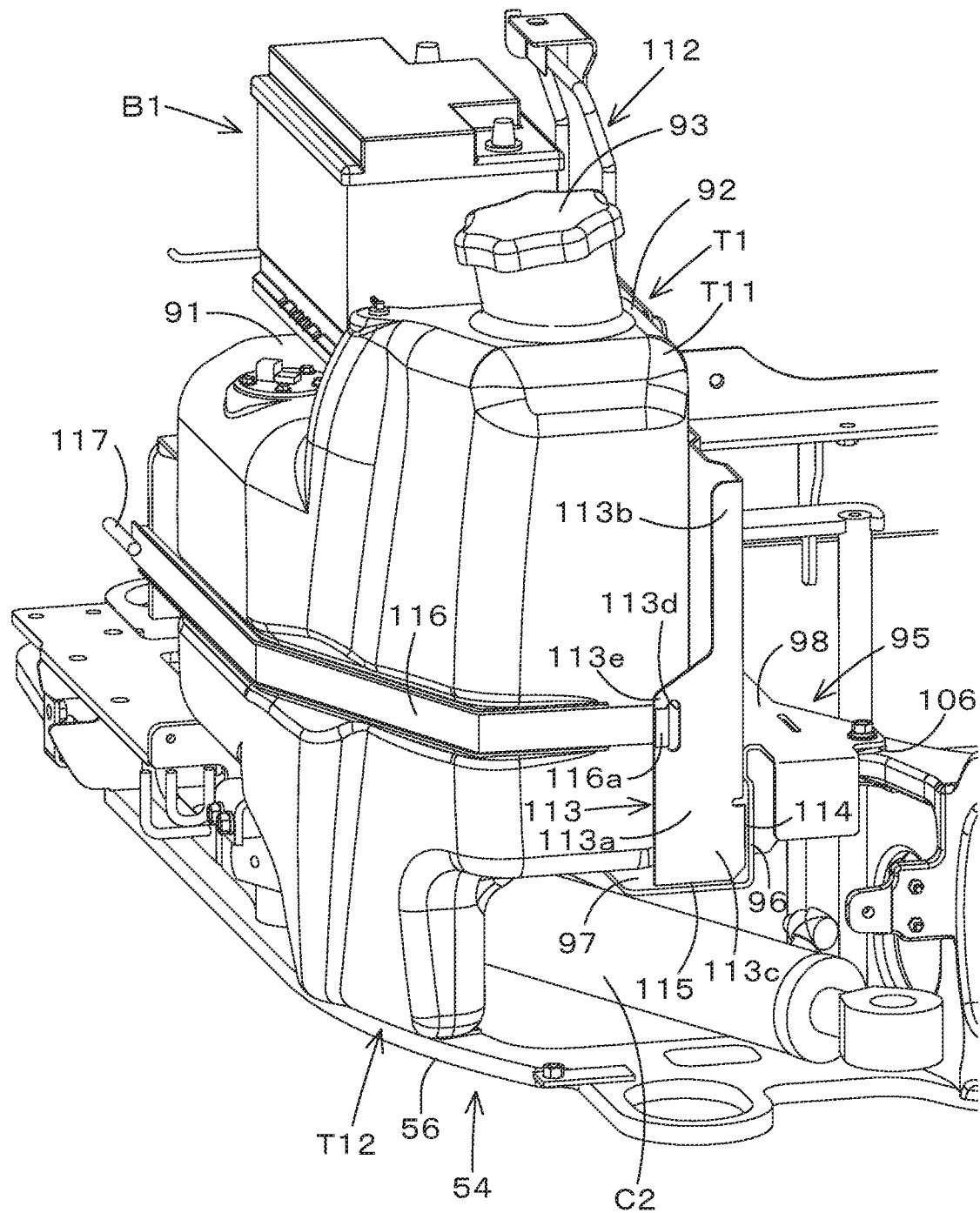
FIG. 9 is a perspective view illustrating the fuel tank and the like in view from a right front side.
Figure 10:
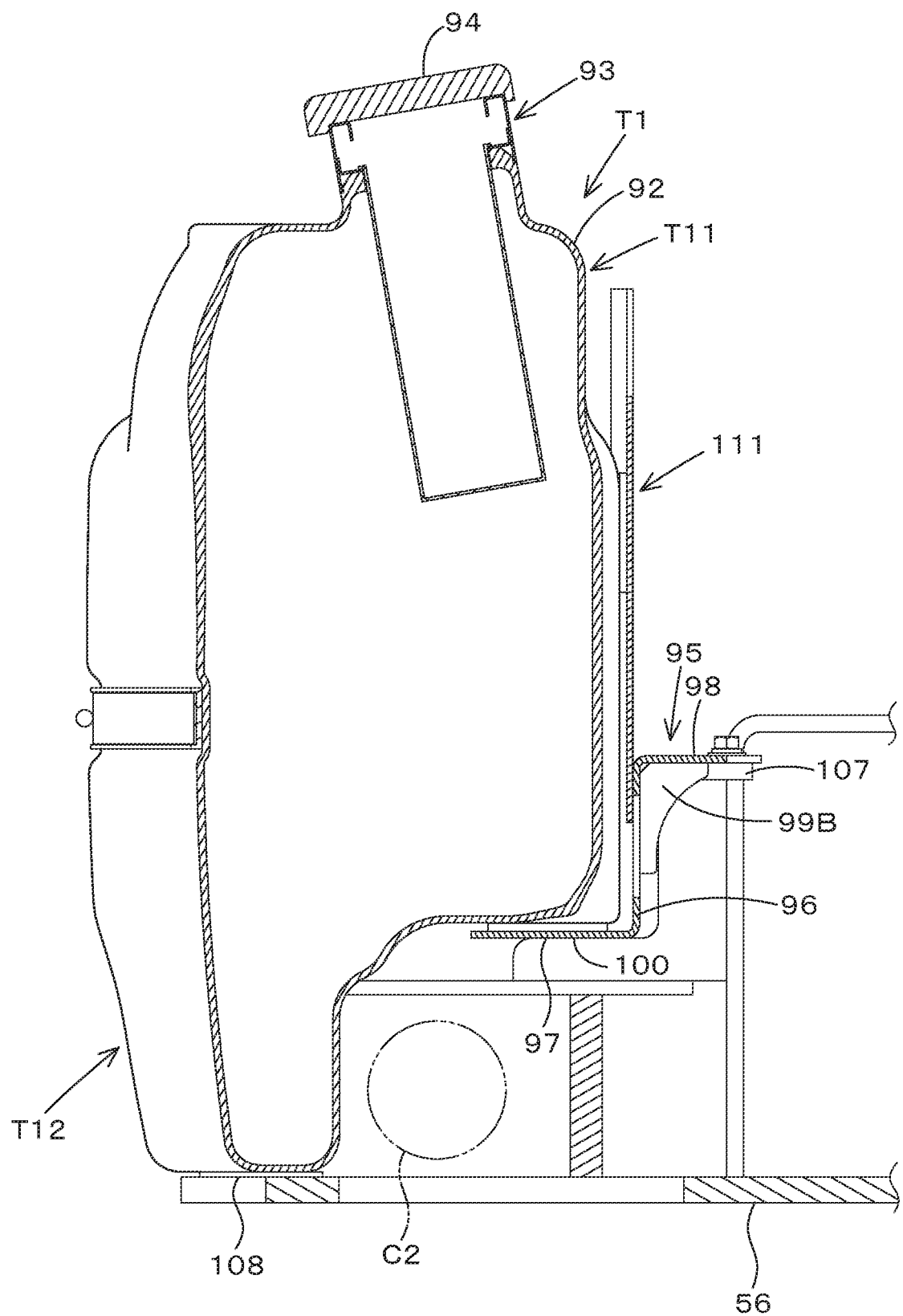
Figure 11:
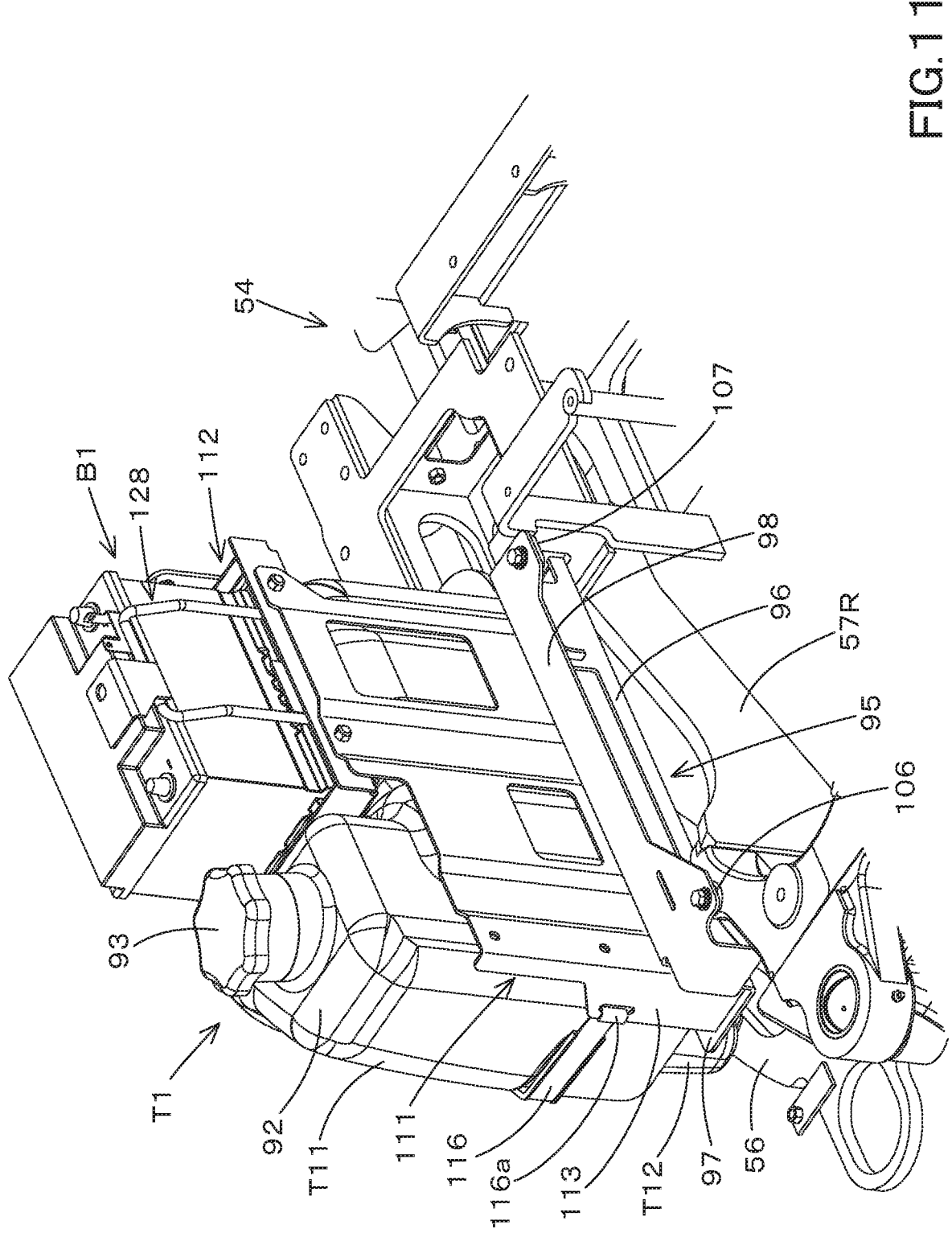
FIG. 11 is a perspective view illustrating the fuel tank and like in view from a left front side.

As shown in FIG. 9 to FIG. 11, the tank main body T11 is supported by a tank support plate 95 attached to the machine body 2. The tank support plate 95 is provided spaced apart upward from the turn base plate 56. That is, the tank main body T11 is supported on the tank support plate 95 in a state of being spaced upward from the machine body 2 (swivel board 56). A swing cylinder C2 is inserted through the space between the tank main body T11 and the turn base plate 56 (see FIG. 8). Further, the tank support plate 95 is disposed on one side (inside the airframe body) of the tank main body T11 (fuel tank T1). Specifically, the tank support plate 95 is disposed on the left side of the tank main body T11.

Figure 13:
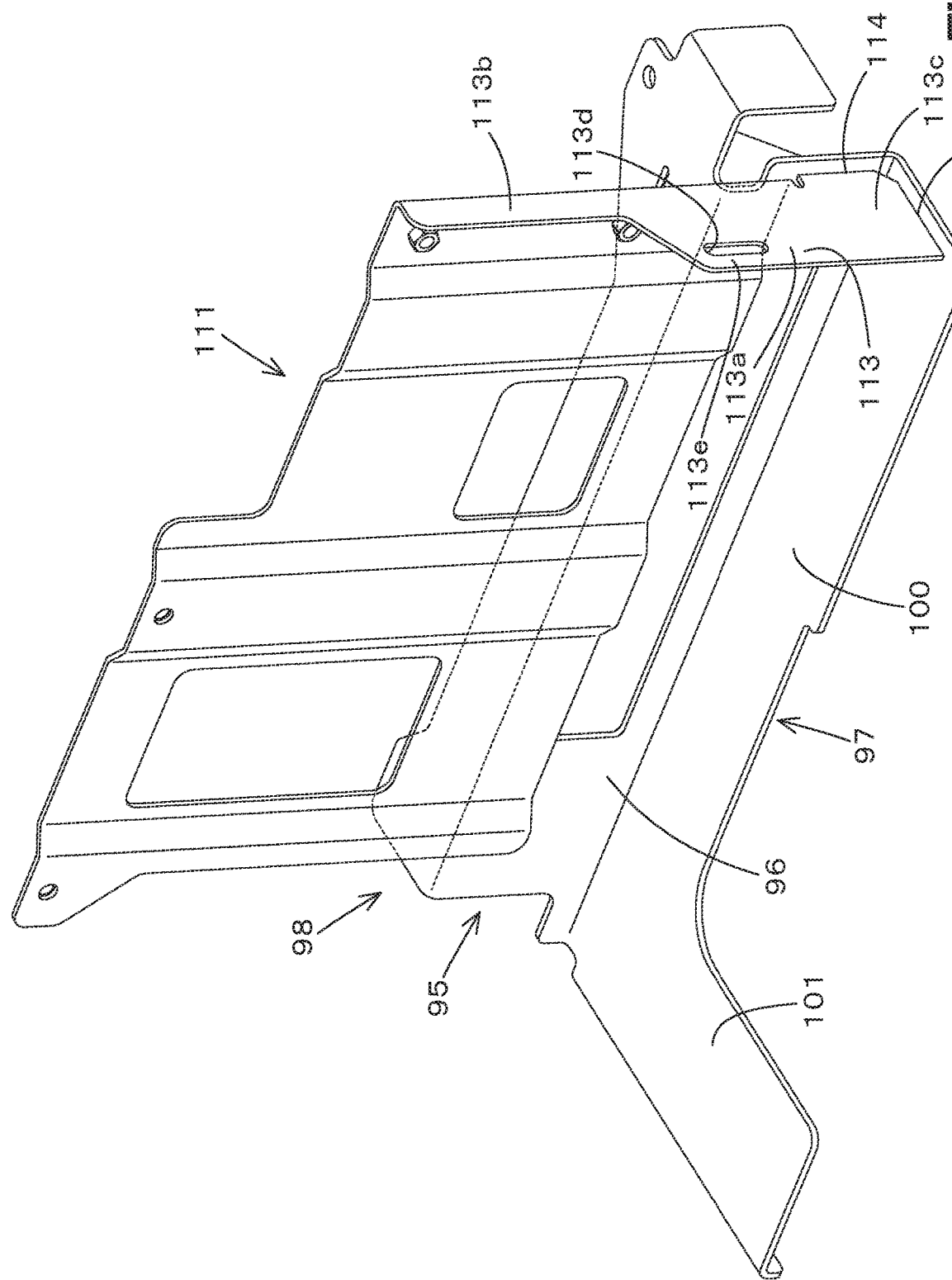
FIG. 13 is a right perspective view illustrating a tank supporting plate and a supporting plate.
Figure 14:
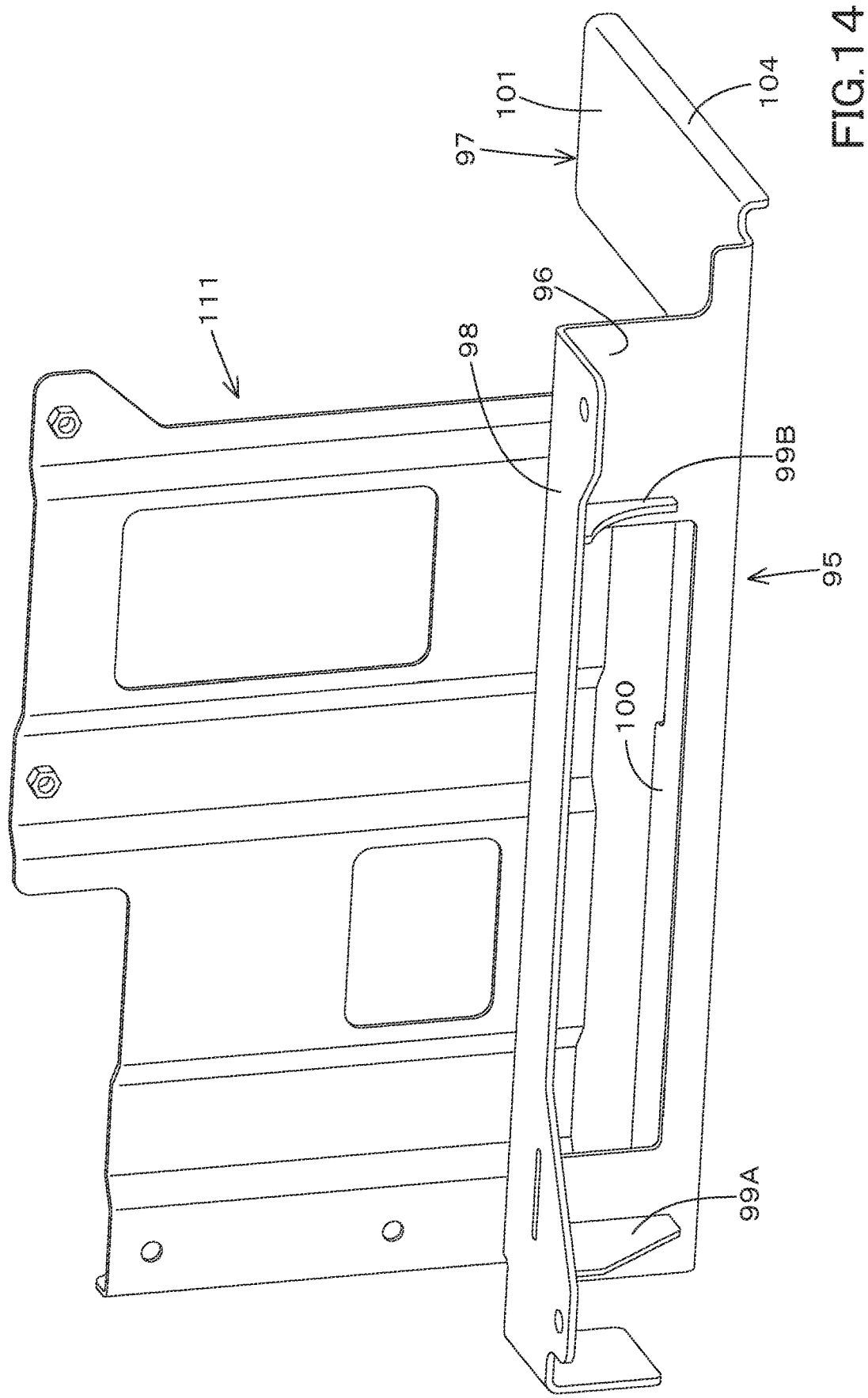
FIG. 14 is a left perspective view illustrating a tank supporting plate and a supporting plate.

As shown in FIG. 13 and FIG. 14, the tank support plate 95 includes a side plate portion 96, a bottom plate portion 97, a attaching plate portion 98, a plurality of reinforcing plates (a first reinforcing plate 99A, a second reinforcing plate 99B). The side plate portion 96, the bottom plate portion 97, and the attachment plate portion 98 are integrally formed by bending a sheet material. The side plate portion 96 is a long plate in the front-rear direction K1, and is provided in a vertical direction in which the plate surface faces the machine width direction K2. Further, the side plate portion 96 is formed to have a length extending from the front portion to the rear portion of the tank main body T11 (see FIG. 11). Further, the side plate portion 96 is disposed on the inner side of the body (one side) of the lower portion of the tank main body T11 (see FIG. 10).

As shown in FIG. 13 and FIG. 14, the bottom plate portion 97 extends from the lower end of the side plate portion 96 to the machine outward direction (the side of the tank main body T11) and receives one side portion (the left side portion) of the tank main body T11.

More specifically, the bottom plate portion 97 has a first receiving portion 100 and a second receiving portion 101. The first receiving portion 100 is a portion extending from the lower end of the side plate portion 96 and is provided from the front portion to the rear portion of the side plate portion 96. A bottom portion of one side portion (left side portion) of the tank main body T11 is placed on the first receiving portion 100 (see FIG. 10). That is, the first receiving portion 100 receives one side portion (the side portion on the inboard side of the body) of the tank main body T11 from the front portion to the rear portion.

Figure 12:
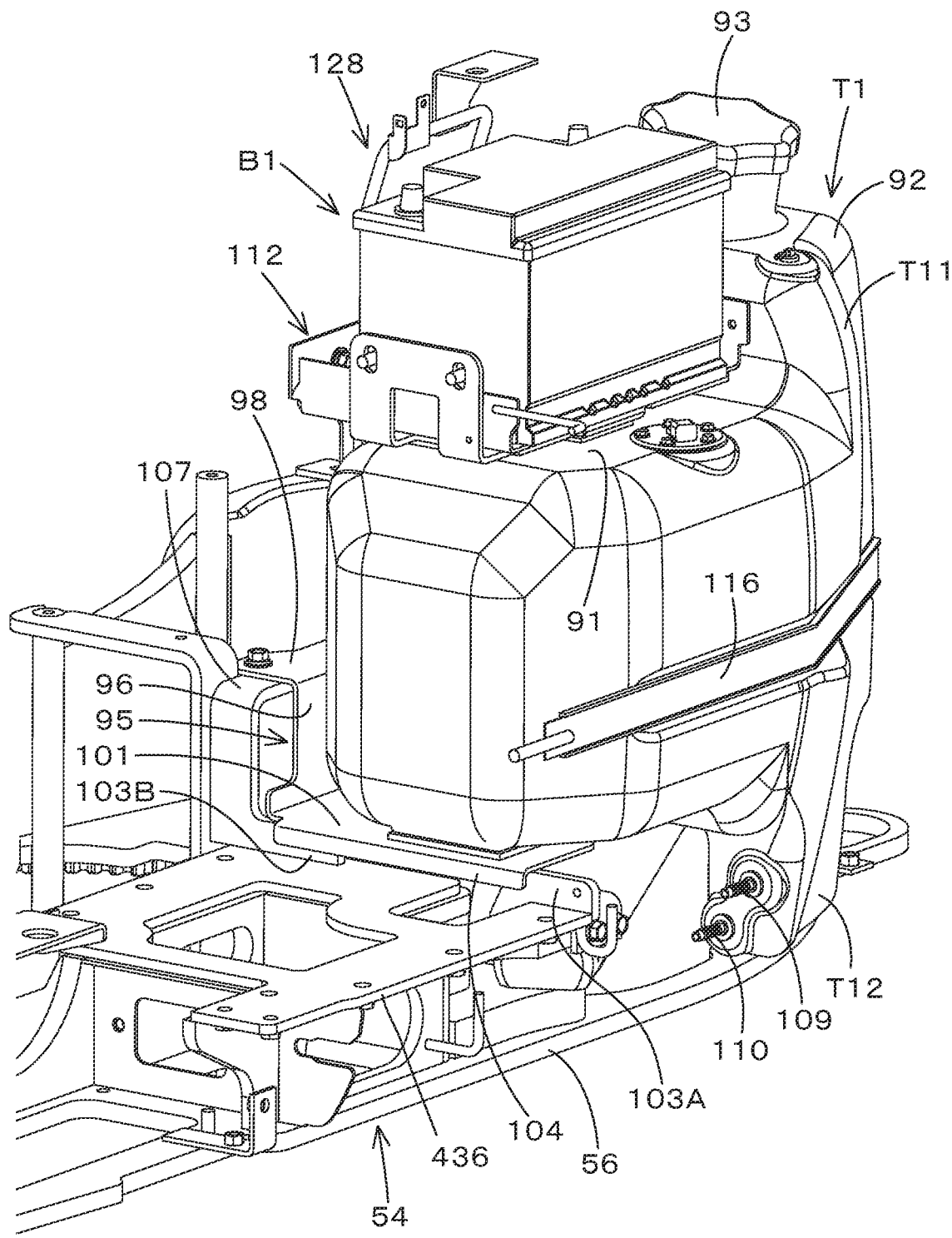
FIG. 12 is a perspective view illustrating the fuel tank and like in view from a right rear side.

The second receiving portion 101 extends from the rear portion of the first receiving portion 100 to the machine outward direction, and the rear portion of the bottom portion 102 of the tank main body T11 is placed on the second receiving portion 101. That is, the second receiving portion 101 receives the rear portion of the tank main body T11. As shown in FIG. 12, the second receiving portion 101 is placed on the placing brackets 103A and 103B (see FIG. 7 and FIG. 12) provided in the turn frame 54. As shown in FIG. 7 and FIG. 12, a support base 436 for supporting the operation fluid tank T2 is fixed on the turn base plate 56 by welding, and placing the brackets 103A and 103B are mounted on part of the support base 436. As shown in FIG. 14, a bent portion 104 extending downward is provided at the rear end portion of the bottom plate portion 97 by bending a plate material forming the tank support plate 95. Thereby, the strength of the bottom plate portion 97 is improved.

The bottom portion 102 of the tank main body T11 is placed on the first receiving portion 100 and the second receiving portion 101 via an elastic plate (rubber plate).

As shown in FIG. 13 and FIG. 14, the attaching plate portion 98 extends from the side plate portion 96 to the side opposite to the tank main body T11 side. More specifically, the attaching plate portion 98 extends from the upper end of the side plate portion 96 toward the machine inward direction. The attachment plate portion 98 is provided from the front portion to the rear portion of the side plate portion 96. As shown in FIG. 11, the front portion of the side plate portion 96 is fixed to a mounting boss 106 (see FIG. 7) provided on the right side of the upper surface of the support bracket 58 with bolts. The rear portion of the side plate portion 96 is fixed to a support stay 107 (see FIG. 7) provided on the turn frame 54 by bolts.

As shown in FIG. 7, the support stay 107 is fixed by welding to a part of a support stand 436 that supports the operation fluid tank T2.

As shown in FIG. 14, the first reinforcing plate 99A is provided at a front portion between the side plate portion 96 and the attaching plate portion 98 and welded to the side plate portion 96 and the attaching plate portion 98. The second reinforcing plate 99B is provided at a rear portion between the side plate portion 96 and the attaching plate portion 98 and is welded to the side plate portion 96 and the attaching plate portion 98.

As shown in FIG. 8, FIG. 9, and FIG. 10, the extended portion T12 extends downward from the tank main body T11 and is supported by the machine body 2. In the present embodiment, the extension part T12 is mounted on the turn base plate 56 via an elastic plate 108 (rubber plate), and is supported by the turn base plate 56. Note that the extended portion T12 may be in directly contact with the pivot substrate 56. Further, a placing bracket made of a plate material, a block material or the like may be fixed to the turn base plate 56, and the extension part T12 may be placed directly or via an elastic plate on the placing bracket.

The extension portion T12 extends downward from a side portion of the tank main body T11 on the outer side of the body. In other words, it extends from the other side which is the side opposite to the one side which is the side portion of the tank main body T11 on the side where the tank support plate 95 is arranged. Further, the extension portion T12 is provided in the front portion of the tank main body T11. Further, the extended portion T12 is located on the outer side of the swing cylinder C2 (on the right side). A suction pipe 109 and a drain pipe 110 positioned below the suction pipe 109 are provided on the lower part of the rear side of the extension part T12 (see FIG. 8). The suction pipe 109 is a pipe for discharging the fuel in the fuel tank T1 for sending fuel to the engine E1, and the drain pipe 110 is a pipe for discharging fluid when removing the fuel in the fuel tank T1.

As shown in FIG. 10 and FIG. 11, a support plate 111 is arranged on the outside of the body (one side) of the tank main body T11. The lower portion of the support plate 111 is disposed between the tank main body T11 and the side plate portion 96, and is fixed to the side plate portion 96. The tank main body T11 is brought into contact with the support plate 111 via the elastic plate. The support plate 111 is disposed inside the first cover 28 of the side cover 23. The front portion of the first cover 28 is fixed to the front portion of the support plate 111 by bolts. A battery bracket 112 for supporting the battery B1 is attached to an upper portion of the support plate 111. The battery bracket 112 is also attached to the operation fluid tank T2 (see FIG. 8).

As shown in FIG. 13, a band hanging plate 113 is provided at the front portion of the support plate 111. The band hanging plate 113 is formed integrally with the support plate 111 by bending a part of a plate material forming the support plate 111. Thus, the support plate 111 and the band hanging plate 113 are formed of a single plate material. The band hanging plate 113 includes a main body plate 113a, a reinforcing plate 113b, and an extension plate 113c. The main body plate 113a extends from the lower front end of the support plate 111 to the machine outward direction. The main body plate 113a has a long groove 113d and a hooking portion 113e on the outer side of the body. The elongated groove 113d is formed by a vertically elongated edge formed through the main body plate 113a, and the hooking portion 113e is a portion positioned on the outer side of the long groove 113d on the airframe body. Further, the upper end of the main body plate 113a is formed in an inclined shape which moves downward as going outward of the machine body.

The reinforcing plate 113b extends from the upper front end of the support plate 111 to the machine outward direction. The reinforcing plate 113b is formed narrower than the main body plate 113a.

The extension plate 113c extends downward from the main body plate 113a. That is, the extension plate 113c extends downward from the lower end of the support plate 111. The side plate portion 96 and the bottom plate portion 97 protrude forward from the extension plate 113c. The extension plate 113c has a first end portion 114 which is in contact with the side plate portion 96 and a second end portion 115 which is in contact with the bottom plate portion 97. The first end portion 114 is welded to the side plate portion 96. The second end portion 115 is welded to the bottom plate portion 97.

As shown in FIG. 8 and FIG. 9, the fuel tank T1 is pressed against the support plate 111 by the fixing band 116 and fixed thereto. At one end of the fixing band 116, a hook portion 116a is provided. The hook portion 116a is hooked on the hooking portion 113e of the band hanging plate 113. In other words, the fixing band 116 is hooked on the band hanging plate 113. At the other end of the fixing band 116, a fixing bolt 117 is provided. The fixing bolt 117 is fixed to the stay 118 fixed to the lower part of the right side surface of the operation fluid tank T2 via the nut 119.

Next, the peripheral structure of the upper part of the operation fluid tank T2 will be described.

Figure 15:
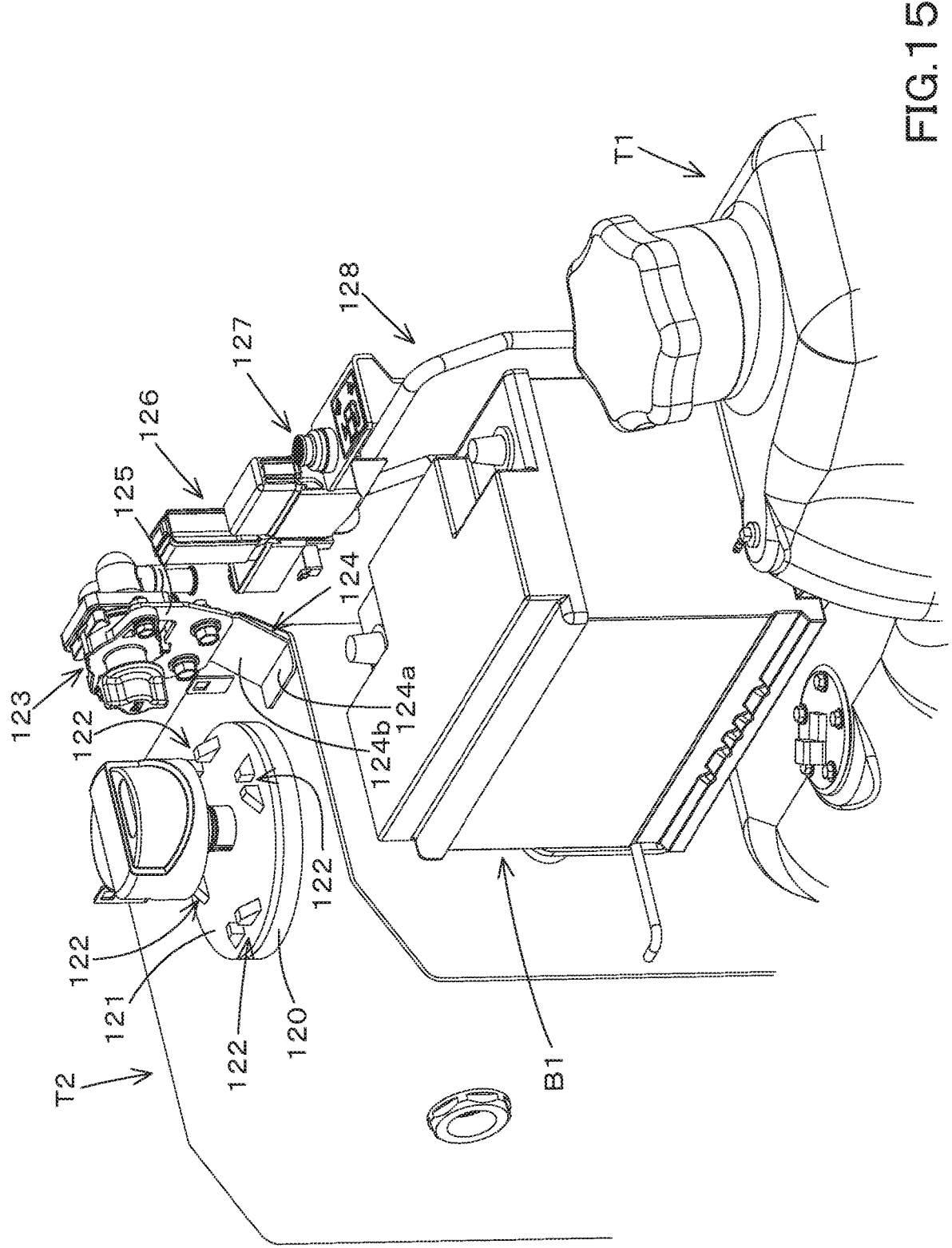
FIG. 15 is a perspective view illustrating a surrounding structure of an upper portion of an operation fluid tank.
Figure 16:
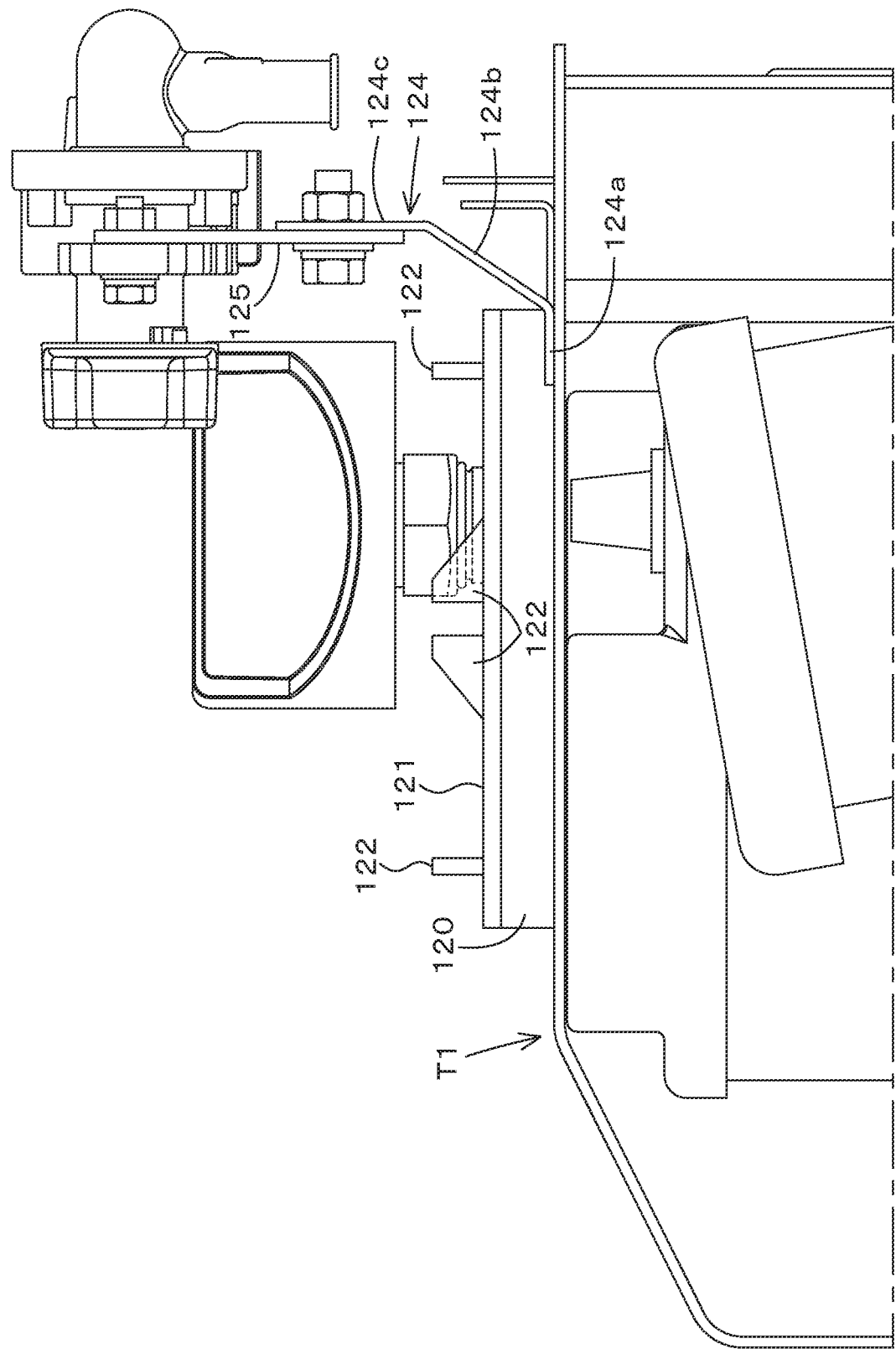
FIG. 16 is a front view illustrating an upper portion of the operation fluid tank.

As shown in FIG. 8, FIG. 15, and FIG. 16, the height of the upper surface of the operation fluid tank T2 is substantially the same height position as the upper surface of the battery B1 (a position slightly higher than the upper surface of the battery B1). On the upper surface of the operation fluid tank T2, an fuel supply cap 121 for closing the fuel supply port 120 and the fuel supply port 120 is provided. The fuel supply cap 121 is provided with a plurality of tool engaging portions 122. The plurality of tool engaging portions 122 are provided at four positions on the outer circumferential portion of the upper surface of the fueling cap 121 at intervals of 90° in the circumferential direction. Disconnector 123 (first electrical component) is provided at a position that does not obstruct insertion of a tool into at least one tool engaging portion 122 in front of this fueling cap 121 (a position not overlapping the tool engaging portion 122 when viewed from the front). The disconnector 123 is, for example, a battery disconnector switch for cutting off the supply current of the battery B1 at abnormal times, emergencies, maintenance, and the like.

As shown in FIG. 16, the disconnector 123 is fixed to a first attaching bracket (attaching bracket) 124 fixed to the upper surface of the operation fluid tank T2. The first attaching bracket 124 is formed of a thin plate material. The first attaching bracket 124 has a lower wall portion 124a, a vertical wall portion 124b, and a attaching wall portion 124c. The lower wall portion 124a, the vertical wall portion 124b, and the attachment wall portion 124c are formed by bending a sheet material. The lower wall portion 124a is disposed in front of a side portion on the inner side of the body of the fuel supply cap 121 and is fixed to the upper surface of the operation fluid tank T2 by welding. The vertical wall portion 124b extends upward from the end portion on the inner side of the body of the lower wall portion 124a. Further, the vertical wall portion 124b extends in an inclined direction that moves toward the inside of the body as it goes upward from the bottom wall portion 124a. The attaching wall portion 124c extends upward from the vertical wall portion 124b. The disconnector 123 is attached to the attaching wall portion 124c via the mounting plate 125. That is, the lower portion of the mounting plate 125 is fixed to the attaching wall portion 124c by bolts and nuts. The disconnector 123 is fixed to the upper portion of the mounting plate 125 by bolts and nuts. It should be noted that the disconnector 123 may be directly fixed to the attaching wall portion 124c with a bolt.

As shown in FIG. 15, the slow blow fuse 126 (second electrical component) and the fuel buzzer 127 (second electrical component) are provided on the front side of the fuel supply cap 121 and the disconnector 123 (the first electrical component) are arranged. The slow blow fuse 126 is a fuse having a property of breaking when a large current continuously flows without being cut off by an instantaneous current. The fuel buzzer 127 is a buzzer for informing that the fuel has become full when refueling the fuel tank T1.

According to the above configuration, since there are no obstructive parts, members, and the like. in front of the fuel supply cap 121, the fuel supply cap 121 can be accessed from the front side. That is, by engaging the tool from the front side with the tool engaging portion 122 of the fuel supply cap 121, the fuel supply cap 121 can be opened and closed by loosening or tightening the fuel supply cap 121 with respect to the fuel filler port 120.

As shown in FIG. 11 and FIG. 15, the slow blow fuse 126 and the fuel buzzer 127 are attached to the second attaching bracket (attaching bracket) 128 attached to the battery bracket 112. The second attaching bracket 128 is disposed on the inner side of the body of the battery B1, and the lower end side thereof is fixed to the inner side of the body of the battery bracket 112.

Figure 17:
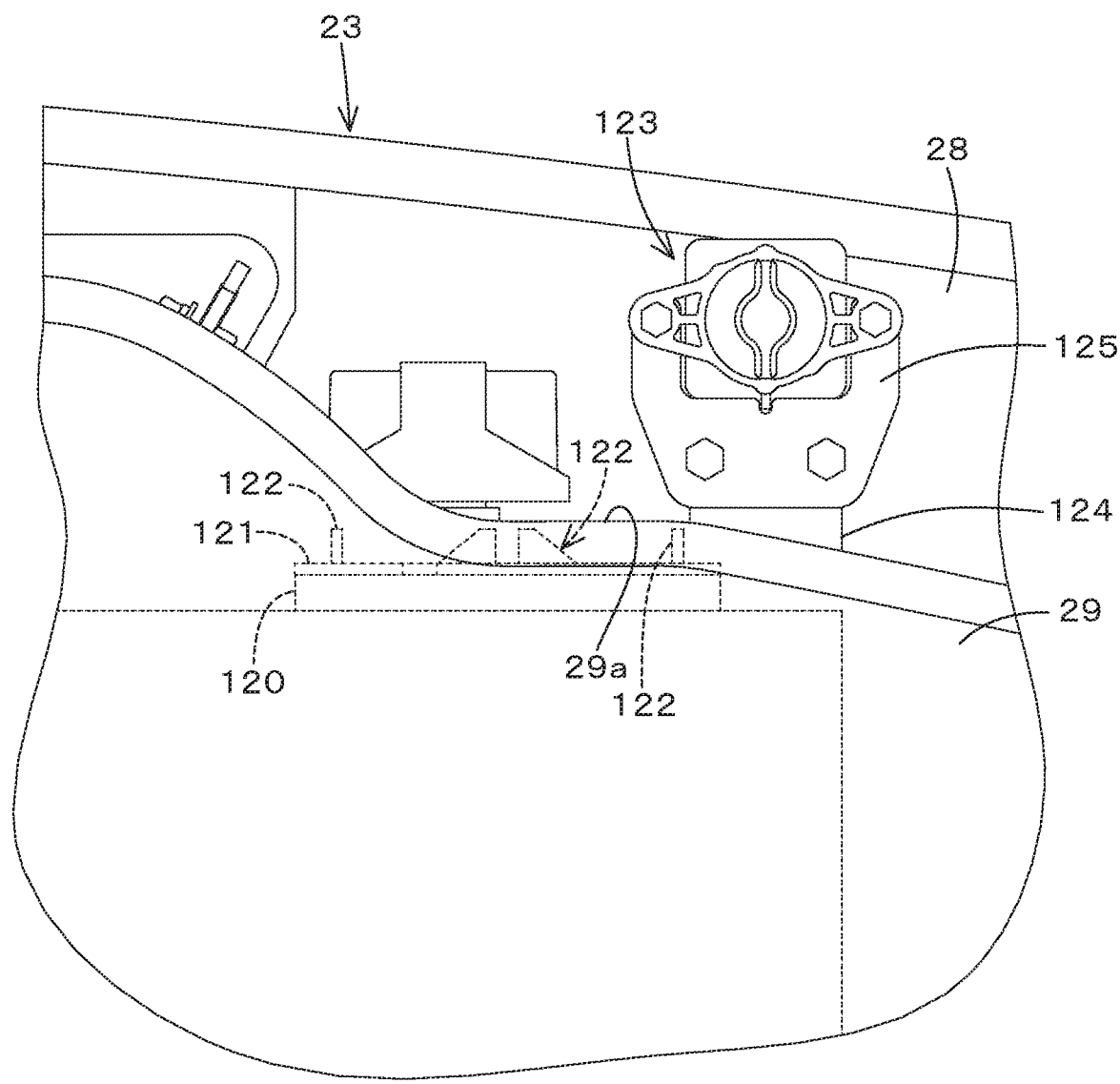
FIG. 17 is a side view illustrating a state in which a third cover is opened.

FIG. 17 is a side view of the second cover 29 viewed from the right side in a state where the third cover 30 is opened. As shown in FIG. 17, the tool engaging portion 122 is positioned lower than the edge portion 29a of the upper end of the second cover 29, and the fuel supply cap 121 and the oil supply port 120 from the upper surface of the operation fluid tank T2. The height is suppressed to a minimum height that can form a screw thread for attaching to the fuel filler cap 121 in the fuel filler port 120. Thereby, the manufacturing cost of the operation fluid tank T2 having the fuel filler port 120 can be suppressed.

In the present embodiment, the working machine 1 includes the machine body 2, the fuel tank T1, a tank support plate 95 that is disposed on one side of the fuel tank T1 and attached to the machine body 2, and the fuel tank T1 has a tank main body T11 supported on the tank support plate 95 in a state of being spaced apart upward from the machine body 2 and an extended portion T12 extending downward from the other side portion which is the side opposite to one side portion of the tank main body T11 and supported by the machine body 2. That is, the fuel tank T1 is supported by the tank support plate 95 with respect to the machine body 2 and also supported by the extended portion T12. As a result, a sufficient supporting force for supporting the fuel tank T1 can be secured. Further, since the supporting force of the fuel tank T1 can be sufficiently secured, even when the capacity of the fuel tank T1 and the self-weight of the tank increase, it is possible to prevent the tank support plate 95 from being deformed due to insufficient strength.

The tank support plate 95 includes a side plate portion 96 disposed on the side of one side of the tank main body T11, a bottom plate portion 97 extending from the lower portion of the side plate portion 96 toward the tank main body T11 and supporting one side portion of the tank main body T11, and a attaching plate portion 98 extending from the upper portion of the side plate portion 96 on the side opposite to the side of the tank main body T11 and attached to the machine body 2. That is, by supporting one side portion of the tank main body T11 via the side plate portion 96, the bottom plate portion 97 and the attaching plate portion 98 of the tank supporting plate 95 and supporting the other side portion of the tank main body T11 with the extension portion T12, it is possible to support the fuel tank T1 with support at both ends, and it is possible to sufficiently ensure the supporting force of the fuel tank T1.

The bottom plate portion 97 has a first receiving portion 100 for supporting one side portion of the tank main body T11 and a second receiving portion 100 extending from the rear portion of the first receiving portion 100 on the opposite side to the side plate portion 96, and a second receiving portion 101 for supporting the first receiving portion 101. Thereby, the tank main body T11 can be supported over a wide range.

Also, the support plate 111, which is arranged on one side of the tank main body T11 and the lower part thereof is fixed to the side plate part 96 of the tank support plate 95, and the tank main body T11 is pressed against and fixed to the support plate 111 and a band hanging plate 113 which is formed by bending a plate material forming the support plate 111 and to which one end portion of the fixing band 116 is latched. In this manner, by forming the band hanging plate 113 by folding a part of the plate material forming the support plate 111, the strength of the band hanging plate 113 can be secured. As a result, the strength of the band hanging plate 113 can be improved as compared with the case where the band hanging plate 113 is attached to the support plate 111 by welding or the like.

The band hanging plate 113 extends from the support plate 111 toward the other side portion of the tank main body T11 and has an extension plate 113c extending downward from the lower end of the support plate 111 at the lower portion, the extension plate 113c has a first end portion 114 welded to the side plate portion 96 and a second end portion 115 welded to the bottom plate portion 97. That is, by welding the first end portion 114 of the extension plate 113c of the band hanging plate 113 formed by bending the plate material to the side plate portion 96 and welding the second end portion 115 to the bottom plate portion 97, the strength of the tank support the plate 95 can be improved. In addition, the tank supporting force of the bottom plate portion 97 is improved. In addition, the strength of the band hanging plate 113 is improved. By increasing the strength of the tank supporting plate 95 and the band hanging plate 113, it is possible to cope with the increase in the capacity and weight of the fuel tank T1.

In addition, an operation fluid tank T2 to which the fuel supply cap 121 having the tool engagement portion 122 is detachably attached, an attaching bracket 124 (first attaching bracket) fixed to the upper surface of the operation fluid tank T2, and a first electrical component (disconnector 123) attached to the attaching bracket 124. The attaching bracket 124 has a lower wall portion 124a fixed to the upper surface of the operation fluid tank T2, a vertical wall portion 124b extending in the inclined direction to be shifted to the machine inward direction as going upward from the lower wall portion 124a, and a attaching wall portion 124c to which the first electrical component is attached, extending upward from the vertical wall portion 124b. The first electrical component and the attaching bracket 124 are disposed forward of the axial center of the fuel supply cap 121 and on the inner side in the machine width direction with respect to the tool engaging portion 122. That is, by arranging the first electrical component at a position that does not obstruct insertion of the tool into the tool engaging portion 122, an access route for accessing the fuel supply cap 121 from the front side can be secured. Conventionally, since the attaching bracket for supporting the first electrical component is suspended from the first electrical component and fixed to the upper surface of the operation fluid tank, the attaching bracket may interfere with the wiring of the harness or the like in some cases. On the other hand, in the present embodiment, the attaching bracket is provided with the vertical wall portion 124b that extends in the inclined direction that moves inward in the machine width direction as going upward from the lower wall portion 124a toward the attaching wall portion 124c. As a result, it is possible to secure a routing path (wiring path) of a distribution member (wiring member) such as a harness on the lower side of the first electrical component.

A battery B1 disposed in front of the operation fluid tank T2 and at a position where the height of the upper surface is lower than the tool engaging portion 122, a second attaching bracket disposed on the inner side in the machine width direction of the battery B1 which is attached to the second attaching bracket 128 and is disposed in front of the first electrical component (disconnector 123) and on the inner side in the machine width direction of the battery B1 (the slow blow fuse 126, a fuel buzzer 127). That is, by placing the second electrical component on the inner side of the body of the battery B1, it is possible to secure an access route for accessing the fuel supply cap 121 from the front side.

Conventionally, slow blow fuses and fuel buzzers are assembled on the attaching bracket at the front side of the oil supply cap, and the slow blow fuse, the fuel buzzer and the attaching bracket become obstructive for accessing the fuel supply cap from the front side. Thus, conventionally, it has been done from the right side to engage the tool to the tool engaging portion of the fuel filler cap. In order to relax or tighten the filler cap from the right, the tool engaging portion must protrude above the edge of the upper end of the second cover. Thus, it is necessary to increase the height of the fuel supply cap and the filler opening, which leads to weight increase and high cost.

In the present embodiment, since the fuel supply cap 121 can be accessed from the front, it is not necessary to adjust the heights of the fuel supply cap 121 and the fuel supply port 120 to the height of the second cover 29, so that the positions of the fuel supply cap 121 and the fuel supply port 120. It is possible to suppress the height to the minimum height. As a result, weight and cost can be reduced.

Further, in the present embodiment, since the slow blow fuse 126 and the fuel buzzer 127 are attached to the second attaching bracket 128 which is a mounting member different from the first attaching bracket 124, the shape of the first attaching bracket 124 is simplified. In addition, the dimension of the first attaching bracket 124 in the machine width direction K2 is also reduced. This makes it easy to arrange wiring members such as harnesses (wired) arranged (arranged) in the vicinity of the first bracket.

Next, the inside/outside air switching device 136 selectively introducing the inside air and the outside air into the air conditioning device 37 and the outside air introduction device 137 introducing the outside air into the inside/outside air switching device 136 will be described.

Figure 18:
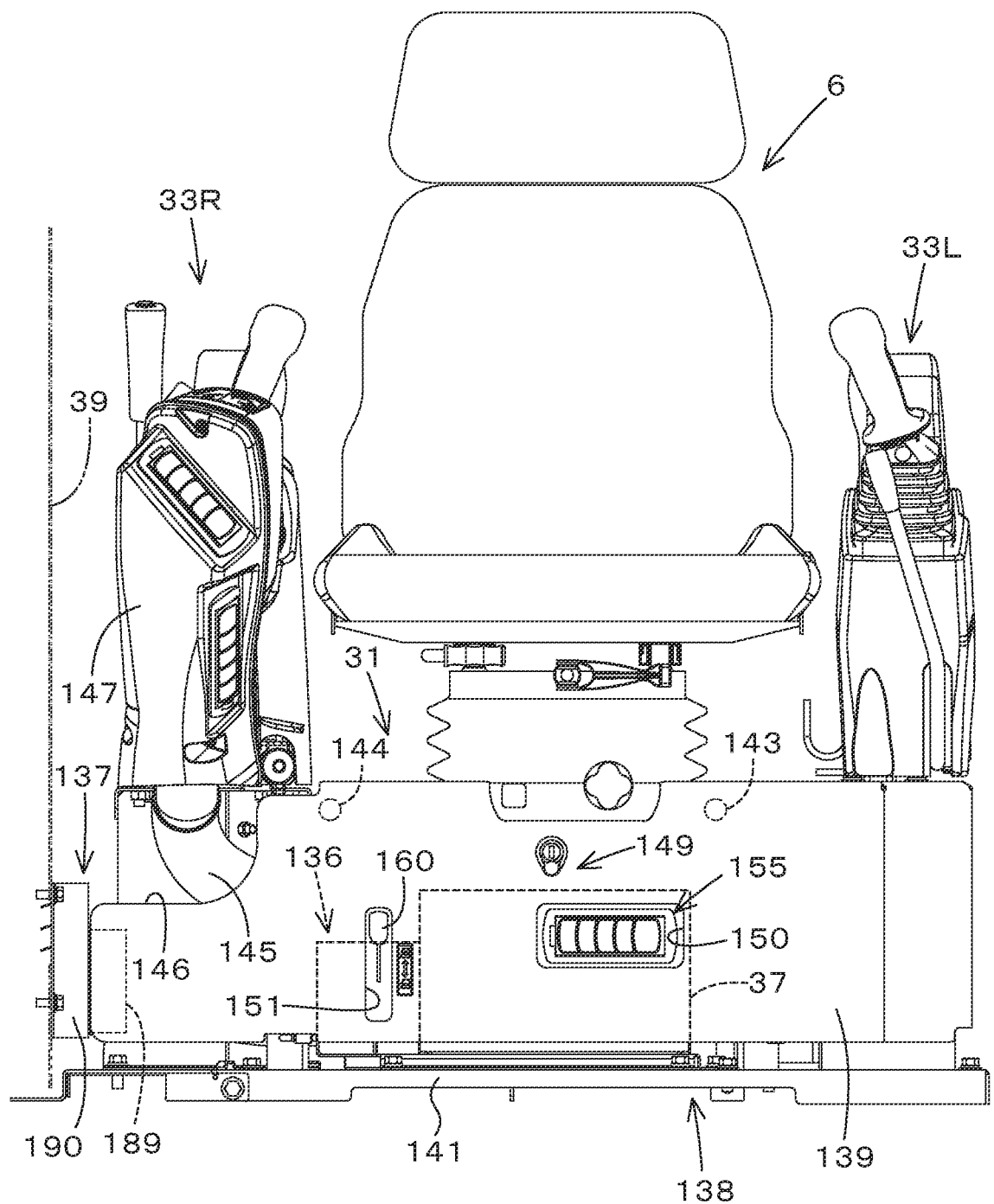
FIG. 18 is a front view illustrating a surrounding structure of an operator seat.
Figure 19:
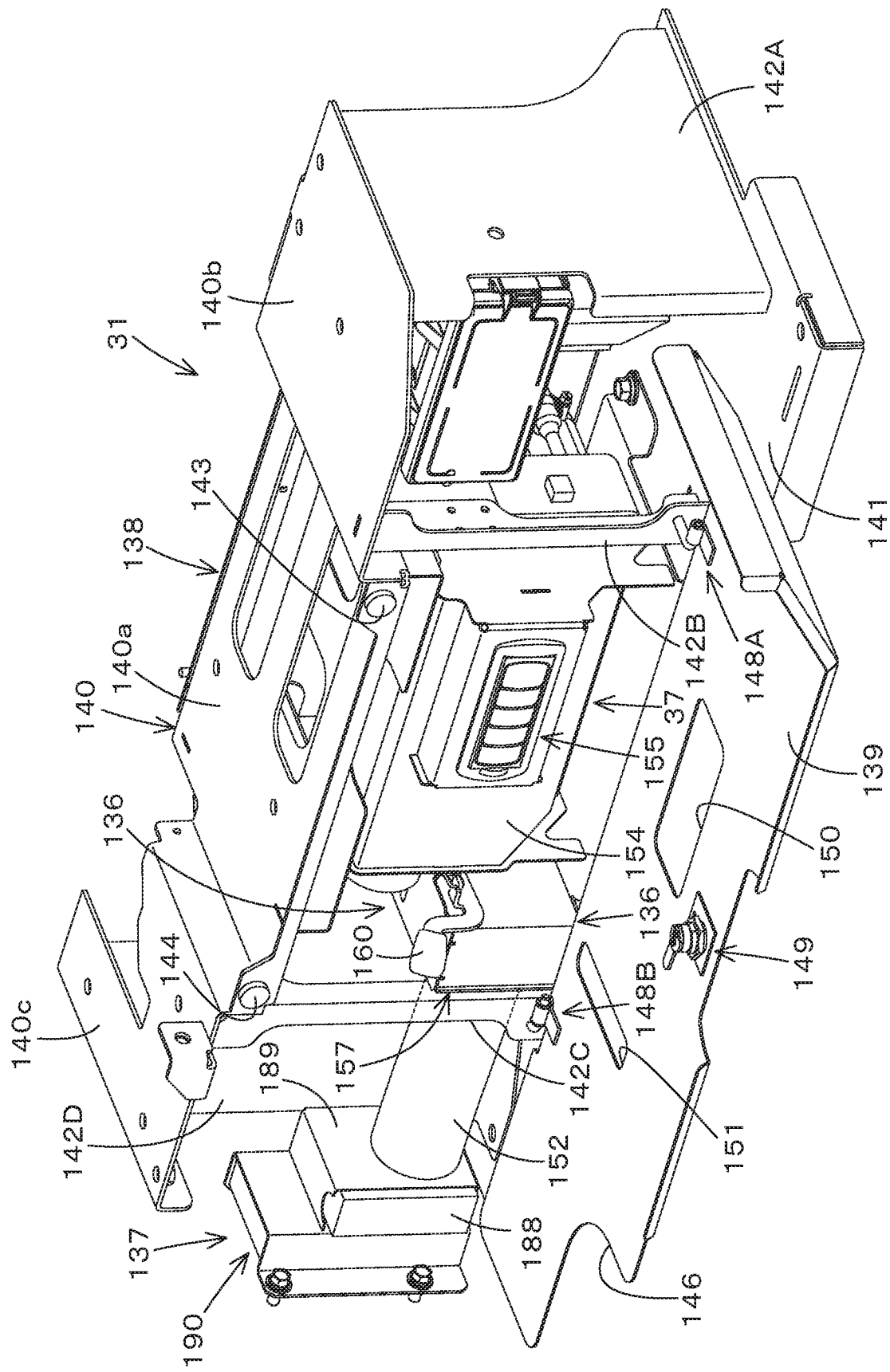
FIG. 19 is a perspective view illustrating a seat base, an inside air/outside air switching device, and an outside-air introducing device.

As shown in FIG. 18 and FIG. 19, the seat base 31 for supporting the operator seat 6 includes a seat supporting frame 138 and an opening/closing cover 139 for covering the front side (one side) of the seat supporting frame 138 so as to freely open and close. The sheet support frame 138 includes an upper plate 140, a lower plate 141 disposed below and spaced apart from the upper plate 140, a plurality of connecting frame members (first frame members 142A, a second frame member 142B, a third frame member 142C, a fourth frame member 142D). The seat supporting frame 138 has a space between the upper plate 140 and the lower plate 141 in which the air conditioning device 37, other equipment, parts, and the like can be placed. That is, the air conditioning device 37 and the like can be accommodated in the seat supporting frame 138.

The upper plate 140 has a seat attachment portion 140a to which the operator seat 6 is attached, a first attachment portion 140b to which the left-hand operation device 33L is attached, and a second attachment portion 140c to which the right-hand operation device 33R is attached. The seat attachment portion 140a is provided at the center portion of the upper plate 140 in the machine width direction K2. The first attachment portion 140b is provided on the left side portion of the upper plate 140. The second attachment portion 140c is provided on the right side portion of the upper plate 140. On the front surface of the upper plate 140, a first vibration isolating material 143 positioned on the left side of the seat attachment portion 140a and a second vibration isolating material 144 positioned on the right side of the seat attachment portion 140a are provided.

The first frame member 142A supports the left end portion and the rear end portion of the first attachment portion 140b. The second frame member 142B supports the right front portion of the first attachment portion 140b. The third frame member 142C supports the left front portion of the second attachment portion 140c. The fourth frame member 142D supports the left and right rear portions of the second attachment portion 140c and the front-rear middle portion of the second attachment portion 140c.

The opening and closing cover 139 is formed of a plate material and is formed to have a lateral width extending from one end to the other end in the body width direction K2 of the seat supporting frame 138. A cutout portion 146 for inserting the air supply duct 145 from the seat support frame 138 is formed on an upper right portion of the open/close cover 139. The air supply duct 145 is a duct for guiding conditioned air sent from the air conditioning device 37, and is connected to a blower 147 provided at the front of the right operation device 33R.

The opening and closing cover 139 is pivotally supported by a first hinge 148A and a second hinge 148B so as to be rotatable about a transverse axis. The first hinge 148A is provided at the lower end portion of the second frame member 142B. The second hinge 148B is provided at the lower end portion of the third frame member 142C. Thus, the opening and closing cover 139 is vertically swingably connected to the seat supporting frame 138 by the first hinge 148A and the second hinge 148B so as to freely open and close by rocking up and down.

Further, the open/close cover 139 has a lock member 149, a first opening groove 150, and a second opening groove 151. The locking member 149 is provided at the upper portion of the central portion of the opening/closing cover 139. The locking member 149 is a component operated by a key and locks in a state in which the opening and closing cover 139 is closed by engaging with an engaging groove (not shown) provided in the upper plate 140. Thus, when the lock of the lock member 149 is released by the key operation, the openable cover 139 can be opened without a tool.

The opening and closing cover 139 is pressed against the first vibration-proofing material 143 and the second vibration-proofing material 144 in a closed state, and vibration-proofed.

The first opening groove 150 is formed by a rectangular shaped laterally elongated groove formed through the opening and closing cover 139. The first opening groove 150 is provided in the upper and lower middle portions of the opening and closing cover 139 below the operator seat 6. The second opening groove 151 is formed by a rectangular shaped vertically elongated groove formed through the opening and closing cover 139. The second opening groove 151 is provided in a lower portion on the right side of the opening/closing cover 139.

An air conditioning device 37 is provided in the seat support frame 138 and on the left side between the seat attachment portion 140a and the lower plate 141. That is, the seat support frame 138 is a member that houses the air conditioning device 37.

Figure 20:
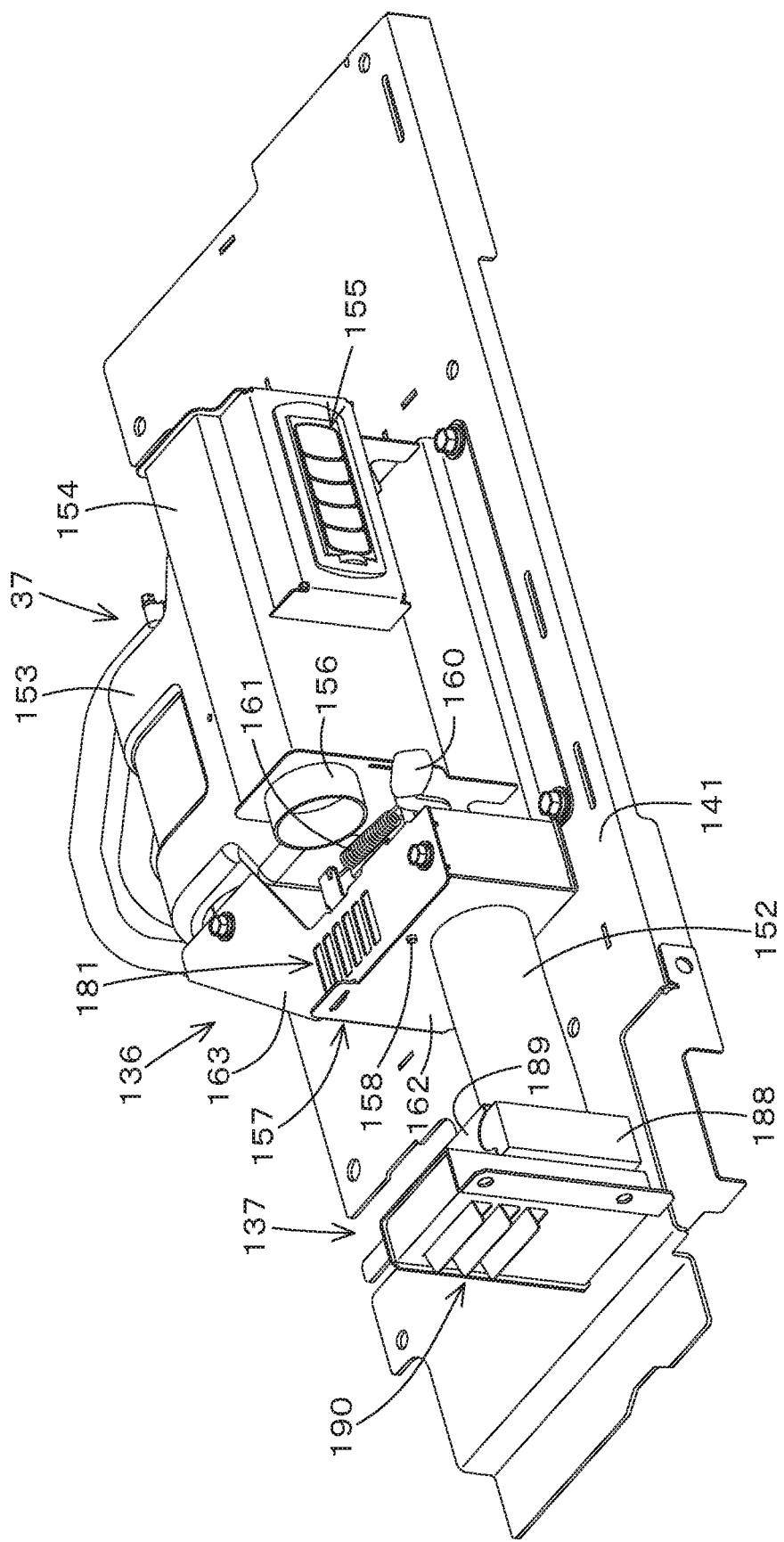
FIG. 20 is a perspective view illustrating an air conditioning device, the inside air/outside air switching device, and the outside-air introducing device.

As shown in FIG. 19 and FIG. 20, an inside/outside air switching device 136 is provided on the right side of the air conditioning device 37. The inside/outside air switching device 136 is provided in the seat support frame 138 and is located rightward between the seat attachment portion 140a and the bottom plate 141. On the right side of the seat base 31, an outside air introduction device 137 is provided. The outside air introduction device 137 and the inside/outside air switching device 136 are connected by a connection duct 152.

As shown in FIG. 20, a fan accommodating portion 153 accommodating a blower fan is provided at the rear portion of the air conditioning device 37. A device main body portion 154 in which a heat exchanger is accommodated is provided in the front portion of the air conditioning device 37. Air is sucked from the right side portion by the blower fan in the fan accommodating portion 153, and the sucked air is sent to the device main body portion 154 and warmed by the heat exchanger.

As shown in FIG. 20, a first blowing part 155 for blowing conditioned air is provided in the front part of the device main body part 154. The first blowing part 155 corresponds to the first opening groove 150 in a state in which the opening and closing cover 139 is closed (see FIG. 18). Thus, the conditioned air blown out from the first blowing part 155 is blown into the room of the cabin 5 through the first opening groove 150. In addition, a second blowing part 156 is provided on the upper part of the right side surface of the device main body part 154. An air supply duct 145 shown in FIG. 18 is connected to the second blowing part 156.

As shown in FIGS. 21 to 24, the inside/outside air switching device 136 has a switching box 157, an operating shaft 158, a switching member 159, an operating member 160, and a switching spring 161. The switching box 157 has a box body 162 and a cover plate 163.

Figure 23:
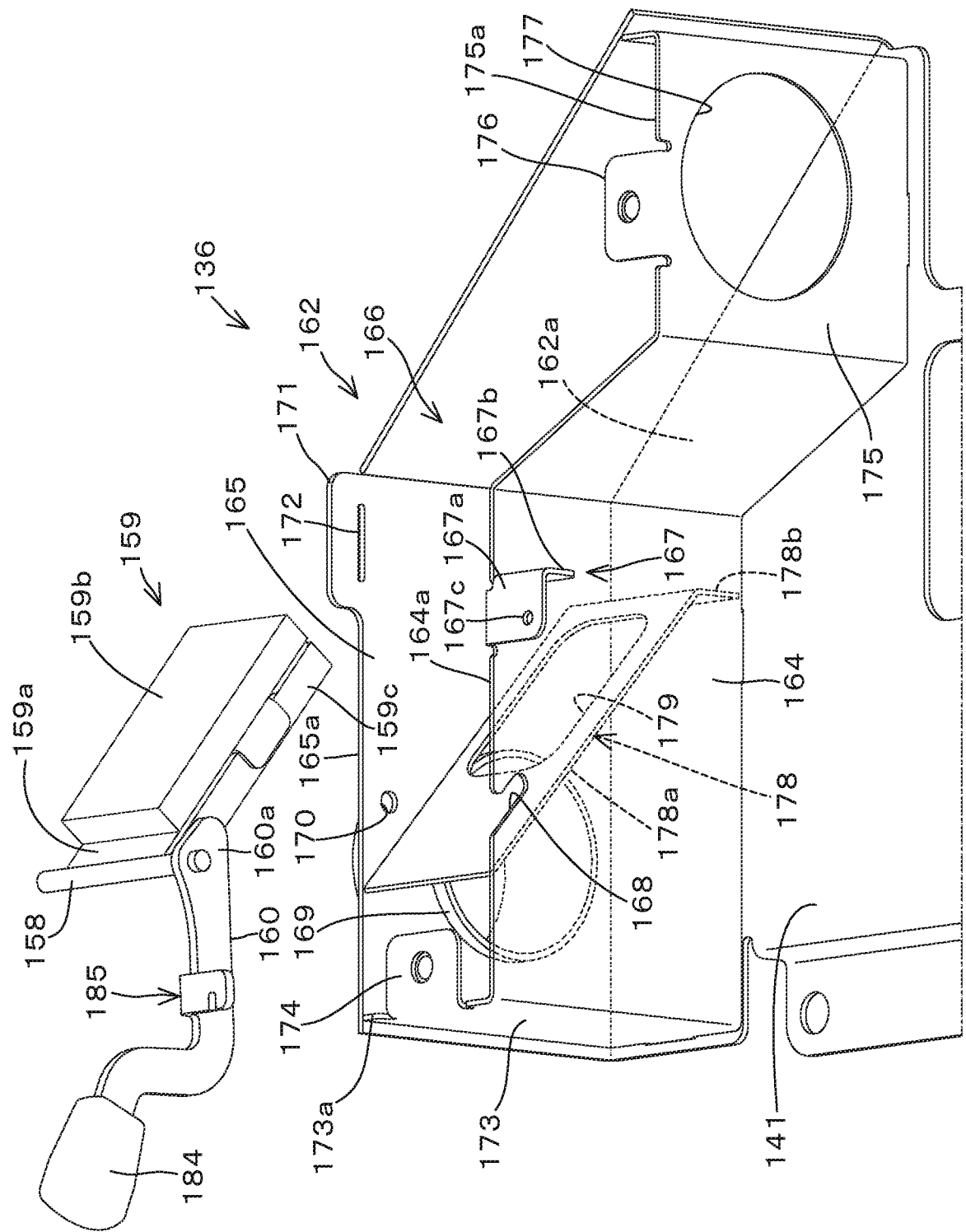
FIG. 23 is an exploded perspective view illustrating the inside air/outside air switching device.

As shown in FIG. 23, the box body 162 has a bottom portion 162a. In the present embodiment, the bottom portion 162 a is constituted of a part of the lower plate 141. Further, the box body 162 has a first vertical plate (first plate) 164 and a second vertical plate (second plate) 165 opposed to the first vertical plate 164. The first vertical plate 164 and the second vertical plate 165 are erected on the lower plate 141. The box main body 162 has an upper end opening (one end opening) 166 (one end opening) in which a space (one end portion) between the upper end portion (one end portion) 164a of the first vertical plate 164 and the upper end portion (one end portion) 165a of the second vertical plate 165. The first vertical plate 164 and the second vertical plate 165 (box main body 162) are formed such that the front region is formed along the front-rear direction K1 and the rear region is formed inside the airframe (on the air conditioning device 37 side) as going backward as shown in the drawings. In addition, the first vertical plate 164 and the second vertical plate 165 are opposed to each other with a front region thereof spaced apart from the body width direction K2 by a substantially constant distance, and the rear region thereof is wider toward the air conditioning device 37 side as shown in the drawings.

Figure 21:
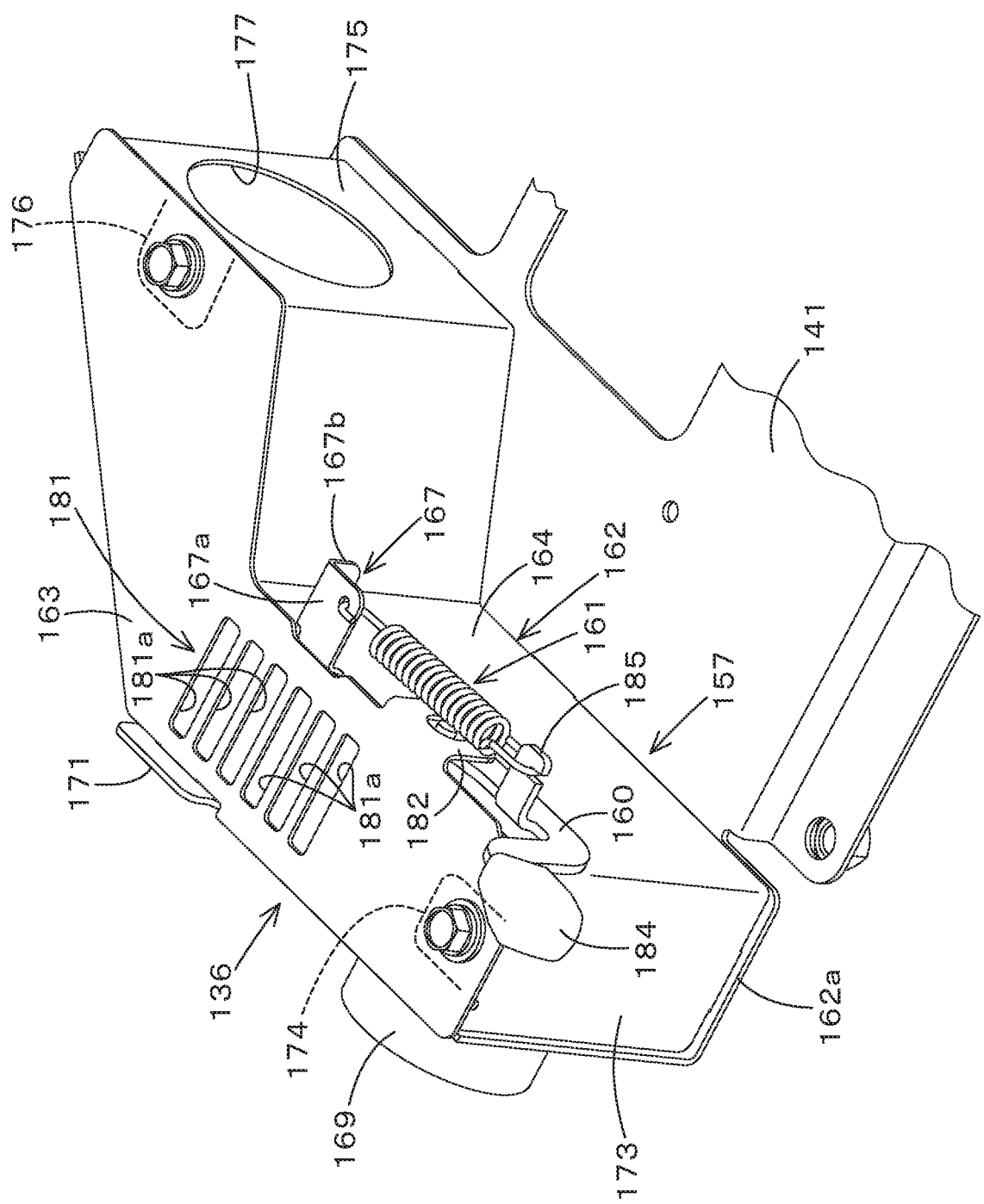
FIG. 21 is a perspective view illustrating the inside air/outside air switching device.

As shown in FIG. 21 and FIG. 23, a first spring hook portion 167 is provided on the upper portion (the upper end portion 164*a* side) of the first vertical plate 164. The first spring hooking portion 167 is provided on the rear region side of the front region of the first vertical plate 164. One end (rear end) of the switching spring 161 is hooked on the first spring hooking portion 167. The switching spring 161 is constituted of a coil spring. The first spring hooking portion 167 has an upper wall 167*a* extending from the upper end of the first vertical plate 164 toward the inside of the airframe and a rear wall 167*b* extending downward from the rear end of the upper wall 167*a*. On the left side of the front portion of the upper wall 167*a*, a spring hooking hole 167*c* through which one end of the switching spring 161 is inserted is formed. The spring hooking hole 167*c* is constituted of an annular edge portion formed through the upper wall 167*a*. The other end (front end) of the switching spring 161 is hooked on the second spring hooking portion 185 formed on the operating member 160.

Figure 25:
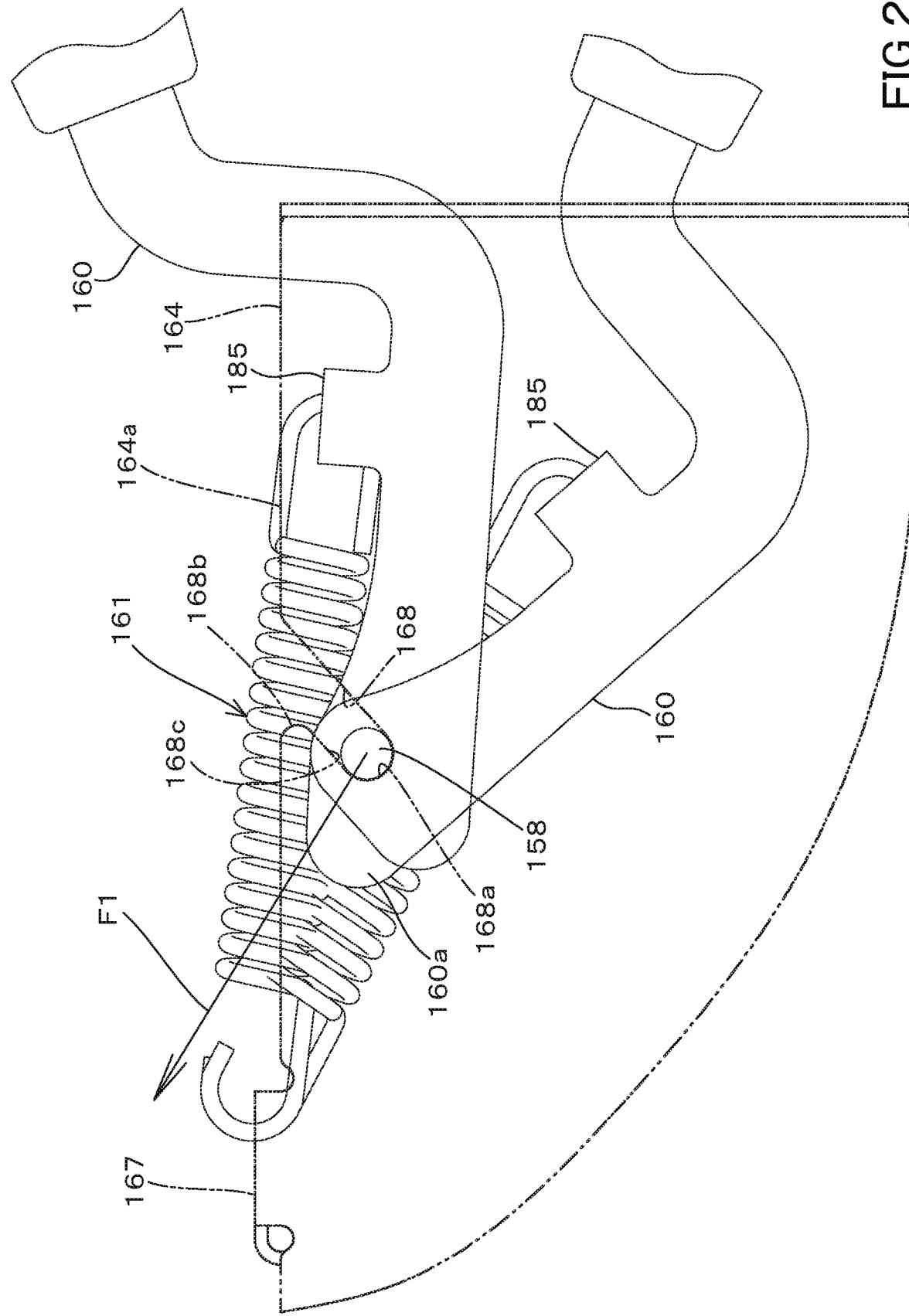
FIG. 25 is a right side view illustrating a state in which an operation member of the inside air/outside air switching device is switched.

As shown in FIG. 23 and FIG. 25, a support groove 168 is formed on the upper portion (one end portion side) of the first vertical plate 164. The upper end (one end) side of the first vertical plate 164 is open in the support groove 168, and is formed from the upper end (one end) of the first vertical plate 164 toward the lower side. Further, the support groove 168 is provided in front of the first spring hooking portion 167. One end side (left end side) of the operating shaft 158 is inserted into the supporting groove 168 from above (opening at the upper end side of the first vertical plate 164). The groove bottom 168*a* of the support groove 168 is formed in a circular arc shape, and one end side of the operation shaft 158 is supported (pivoted) to the groove bottom 168*a*. Thus, the groove bottom 168*a* of the support groove 168 is a pivotally supporting portion pivotally supporting one end side of the operation shaft 158. The support groove 168 is an oblong long groove that moves in a direction away from the first spring hooking portion 167 as going from the groove bottom 168*a* to the groove opening edge 168*b* (toward the upper side). The groove edge portion 168*c* on the upper side of the support groove 168 is a receiving surface that is a portion that receives an urging force acting on the operation shaft 158. The groove edge portion 168*c* is formed in an inclined shape to shift from the groove bottom 168*a* to the groove opening edge 168*b* (toward the upper side) in a direction away from the first spring hooking portion 167.

Figure 24:
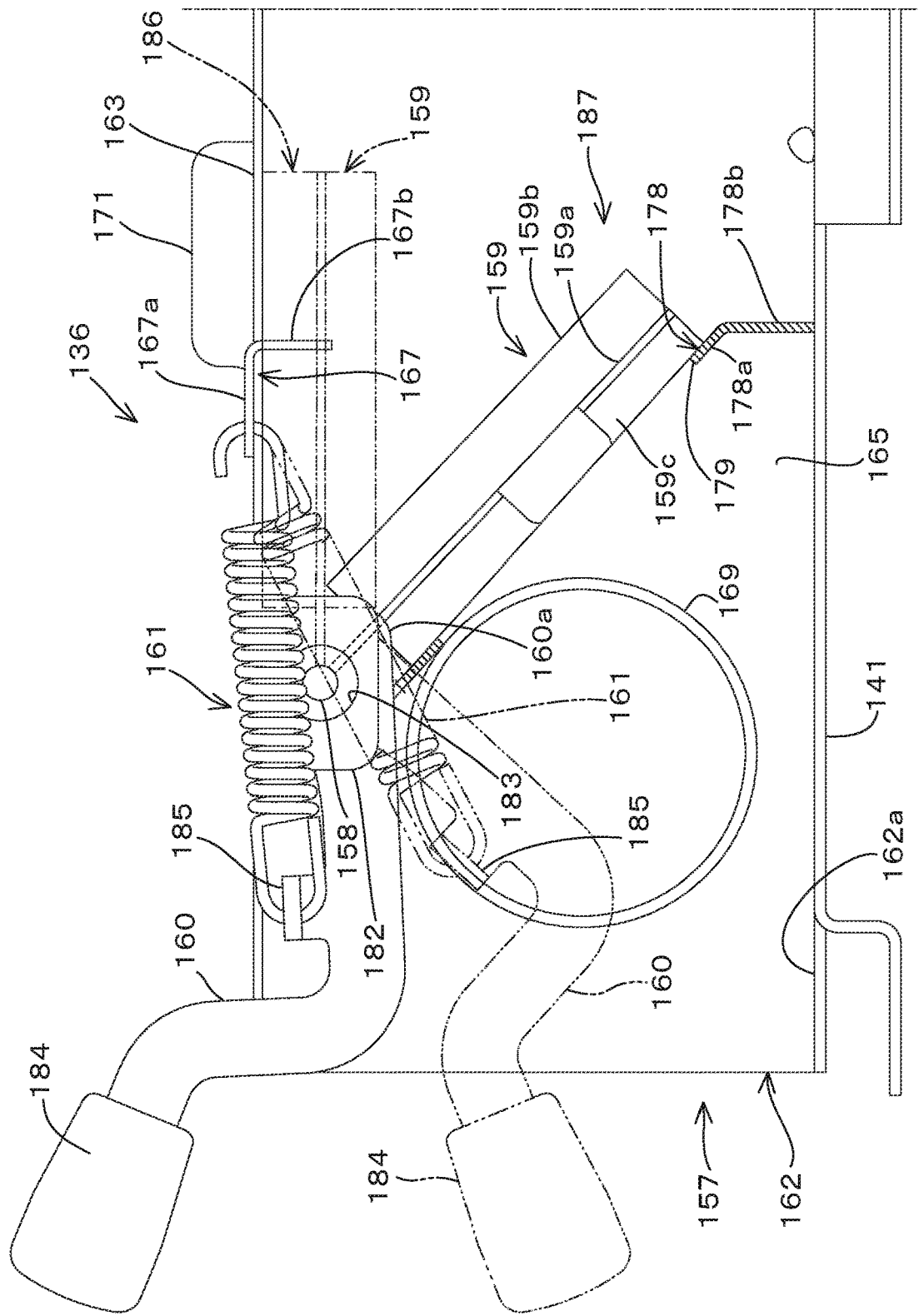
FIG. 24 is a left side view illustrating a state in which a switching member is switched.

As shown in FIG. 23 and FIG. 24, an outside air intake port 169 for introducing outside air into the switching box 157 is provided in the front portion of the second vertical plate 165. The outside air intake 169 is formed by a cylindrical body, and one end side thereof is inserted into the box main body 162 through the second vertical plate 165. The inside airframe side (one end side) of the connection duct 152 shown in FIG. 20 is connected to the outside air intake 169. The front portion of the second vertical plate 165 has a shaft support portion 170 that passes through and supports the other end side (right end side) of the operation shaft 158. The pivot support portion 170 is constituted of an annular edge portion formed through the second vertical plate 165. The pivot support portion 170 is formed corresponding to the groove bottom 168*a* (pivot support portion) of the support groove 168 in the machine width direction K2. In other words, the pivot support portion 170 and the groove bottom 168*a* of the support groove 168 are coaxial centered. By pivotally supporting one end side of the operation shaft 158 in the support groove 168 and pivotally supporting the other end side to the pivot support part 170, the operation shaft 158 is disposed between the upper portions of the first vertical plate 164 and the second vertical plate 165.

At the upper end of the front region of the second vertical plate 165, an engaging piece 171 extending upward is provided. A locking groove 172 is formed in the locking piece 171. The locking piece 171 is provided behind the pivot support portion 170.

As shown in FIG. 21 and FIG. 23, the box main body 162 has a front vertical plate 173 that closes between the front end portions of the first vertical plate 164 and the second vertical plate 165. On the upper end of the front vertical plate 173, a first fixing piece 174 extending rearward is provided. As shown in FIG. 21 and FIG. 23, the box main body 162 has a rear vertical plate 175 which closes between the rear end portions of the first vertical plate 164 and the second vertical plate 165. In the rear longitudinal plate 175, the plate surface faces the machine inward direction (the side of the fan accommodating portion 153 shown in FIG. 20). The rear vertical plate 175 is formed with a communication port 177 (an annular edge portion penetrating the rear vertical plate 175) communicating with the fan accommodating portion 153. The box body 162 communicates with the air conditioning device 37 via the communication port 177. A second fixing piece 176 extending outward of the machine body is provided at the upper end of the rear vertical plate 175.

As shown in FIG. 23 and FIG. 24, the box main body 162 has a partition plate 178 in the front region. The partition plate 178 is disposed between the first vertical plate 164 and the second vertical plate 165 and divides the interior of the box body 162 into a room on the side of the outside air intake port 169 and a room on the side of the communication port 177. The partition plate 178 has an inclined wall 178*a* and a lower wall 178*b*. The inclined wall 178*a* extends in an inclined direction that moves downward as it goes backward from between the upper ends of the first vertical plate 164 and the second vertical plate 165. The lower wall 178*b* extends downward from the lower end of the inclined wall 178*a* and is connected to the lower plate 141 (the bottom portion 162*a* of the box body 162). An outside air intake port 179 is formed on the lower side of the inclined wall 178*a*. The outside air intake port 179 is constituted of an annular opening edge portion formed through the inclined wall 178*a*. The outside air introduced into the box body 162 passes through the outside air intake 179 and flows to the communication port 177 and is taken into the air conditioning device 37. That is, the outside air intake port 179 is an opening for introducing the outside air introduced into the box body 162 into the air conditioning device 37.

As shown in FIG. 23, the upper end portion 164*a* of the first vertical plate 164, the upper end portion 165*a* of the second vertical plate 165, the upper end portion 173*a* of the front vertical plate 173, and the upper end portion 175*a* of the rear vertical plate 175 form the upper end opening 166 of the box body 162.

Figure 22:
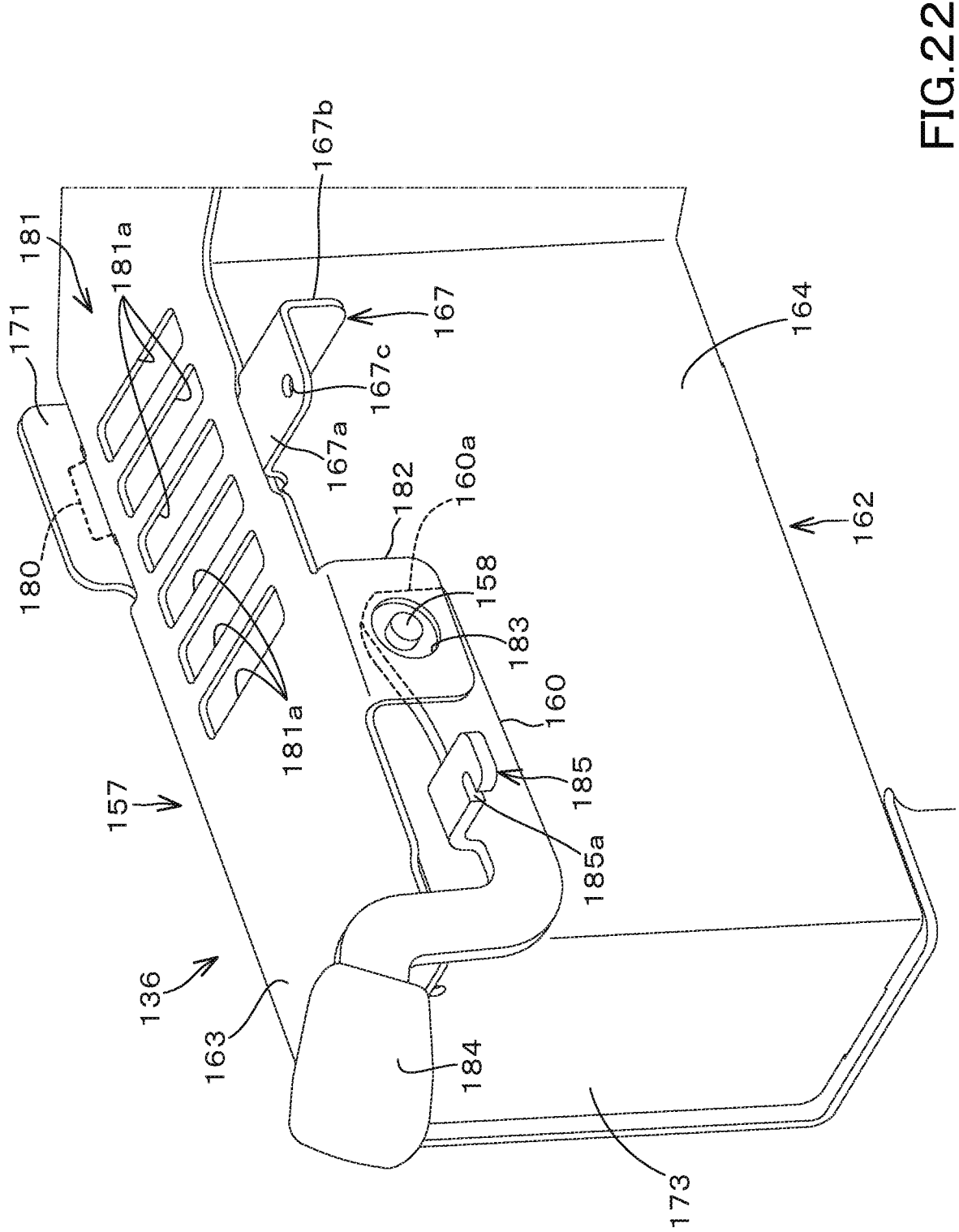
FIG. 22 is a perspective view illustrating a front portion of the inside air/outside air switching device.

As shown in FIG. 21 and FIG. 22, the cover plate 163 is a lid member that closes the upper end opening 166 of the box main body 162. The cover plate 163 is bolted to the first fixing piece 174 and the second fixing piece 176 in a state of closing the upper end opening 166 of the box main body 162. An engaging portion 180 inserted from the left side into the engaging groove 172 and engaged with the engaging piece 171 is provided in the middle portion of the cover plate 163.

An inside air inlet 181 for taking inside air through the box main body 162 and into the air conditioning device 37 is formed in the cover plate 163. The inside air inlet 181 is constituted of a plurality of long grooves (opening edge portions) 181*a*. The elongated groove 181*a* is constituted of an elongated hole-shaped edge formed through the cover plate 163, and is formed in a rectangular shape elongated in the machine width direction K2. In the present embodiment, the inside air inlet 181 is formed by arranging six long grooves 181*a* in parallel in the front-rear direction. The inside air inlet 181 is not limited to being constituted of a plurality of long grooves 181*a*. That is, it may be constituted of a single opening edge portion.

Further, the inside air intake 181 is located in the middle part (the rear side of the front region) of the cover plate 163. Further, the inside air intake 181 is located behind the partition plate 178 in a state where the cover plate 163 is closed. Thus, the inside air intake 181 introduces the inside air to the rear side of the partition plate 178 in the box main body 162. The inside air taken into the box body 162 is taken into the air conditioning device 37 via the communication port 177.

As shown in FIG. 22, the cover plate 163 has a retaining portion 182 on the inner side (left side) of the body. The retaining portion 182 prevents the member for preventing the operation shaft 158 from falling off, that is, the movement of the operating shaft 158 in the axial direction to prevent the operating shaft 158 from falling off from the pivot portion 170 of the second vertical plate 165. The retaining portion 182 is formed by bending a part of the plate material constituting the cover plate 163 downward. That is, the retaining portion 182 extends downward from the left side edge portion of the cover plate 163. Further, the retaining portion 182 is positioned on the front side of the inside air inlet 181. Further, the retaining portion 182 is positioned in front of the first spring hooking portion 167 in a state where the cover plate 163 is closed. An escape hole 183 for allowing one end side of the operation shaft 158 to escape is formed in the retaining portion 182. The relief hole 183 is constituted of an annular edge portion formed through the retaining portion 182.

In the present embodiment, the box main body 162 has the upper end opening 166, and the cover plate 163 is a member for closing the upper end opening 166, but this is not a limitation. For example, the opening (one end opening) of the box main body 162 closed by the cover plate 163 may open forward, backward, or downward, and even if it is open to the left or right.

As shown in FIG. 23, the operation member 160 is constituted of a lever member, and one end side of the operation shaft 158 is fixed to one end portion (the base portion 160*a*) of the operation member 160. Thus, the operation member 160 can rotate the operation shaft 158 around its axis. One end side of the operating shaft 158 passes through the operating member 160 and protrudes to the left. A grip 184 is provided at the other end portion (distal end portion) of the operation member 160. A second spring hooking portion 185 to which the other end (front end) of the switching spring 161 is hooked is integrally formed at an intermediate portion of the upper portion of the operating member 160. A U-shaped groove 185*a* for hooking the other end of the switching spring 161 is formed in the second spring hooking portion 185 (see FIG. 22).

As shown in FIG. 23, the switching member 159 is fixed to the operating shaft 158. The switching member 159 selectively closes the inside air intake 181 and the outside air intake 179. The switching member 159 has a plate member 159*a*, a first abutting member 159 *b*, and a second abutting member 159*c*. The plate member 159*a* constitutes the core body of the switching member 159, and is made of a rectangular plate material. One end of the plate member 159*a* in the plate surface direction is fixed to the operation shaft 158 along the axial center direction. The first abutting member 159*b* and the second abutting member 159*c* are formed of an elastic plate material such as a rubber plate. The first abutting member 159*b* is superimposed and fixed to a plate surface on one side (upper side) of the plate member 159*a*. The second abutting member 159*c* is superimposed and fixed to the plate surface of the other side (lower side) of the plate member 159*a*.

The operating shaft 158 is pivotally supported on the box body 162 in a state where the operating member 160 and the switching member 159 are fixed. To attach the operating shaft 158, the operating member 160 and the switching member 159 to the box main body 162, the switching member 159 is disposed at the rear side of the partition plate 178 in the box main body 162. Next, the other end side of the operation shaft 158 is inserted into the pivot support portion 170 from the inside of the box main body 162. Thereafter, one end side of the operation shaft 158 is inserted into the support groove 168 from above. At this time, the operation member 160 is positioned on the outer surface side of the box body 162 (the outer surface side of the first vertical plate 164). Thus, the operating shaft 158, the operating member 160, and the switching member 159 are easily attached to the box main body 162. The switching member 159 is positioned between the inside air intake 181 and the outside air intake 179 in a state in which the operation shaft 158, the operation member 160, and the switching member 159 are attached to the box main body 162.

The cover plate 163 is assembled to the box body 162 in a state in which the operation shaft 158, the operation member 160, and the switching member 159 are attached to the box main body 162. When assembling the cover plate 163, the retaining portion 182 is positioned laterally (left side) on the side opposite to the first vertical plate 164 with respect to the base portion 160*a* of the operating member 160 (see FIG. 22). That is, the retaining portion 182 is arranged to face the first vertical plate 164 via the base portion 160*a* of the operating member 160. As a result, the movement of the operating member 160 and the operating shaft 158 in the axial direction is restricted by the retaining portion 182, and the operating shaft 158 is prevented from coming off. Thereafter, the switching spring 161 is hooked on the first spring hooking portion 167 and the second spring hooking portion 185.

As shown in FIG. 24, the switching member 159 is switched between the first switching position 186 indicated by an imaginary line and the second switching position 187 indicated by a solid line by rotating the operating shaft 158 about its axis. The first switching position 186 is a position for closing the inside air intake 181. That is, at the first switching position 186, the switching member 159 (first abutting member 159*b*) abuts against the lower surface of the cover plate 163 so as to close the inside air intake 181. As a result, outside air introduced into the box body 162 from the outside air intake 169 passes through the outside air intake 179 and is taken into the air conditioning device 37. That is, the first switching position 186 is a position where outside air is taken into the air conditioning device 37.

The second switching position is a position for closing the outside air intake port 179. That is, at the second switching position 187, the switching member 159 (the second abutting member 159*c*) abuts against the upper surface of the partition plate 178 so as to close the outside air intake port 179. As a result, the inside air passes through the inside air intake 181 and is taken into the air conditioning device 37. That is, the second switching position 187 is a position where the inside air is taken into the air conditioning device 37.

As shown in FIG. 24, when the switching member 159 is positioned at the first switching position 186, the operating member 160 is depressed as indicated by an imaginary line. In this state, the axis of the switching spring 161 is positioned below the axis of the operating shaft 158. Thus, the urging force of the switching spring 161 acts in the direction of pulling down the operating member 160 (the direction of holding the switching member 159 at the first switching position 186). Due to this urging force, the switching member 159 is held at the first switching position 186.

In a state where the switching member 159 is located at the second switching position 187, the operating member 160 is pulled up as indicated by the solid line. In this state, the axis of the switching spring 161 is located above the axis of the operating shaft 158. Thus, the urging force of the switching spring 161 acts in a direction in which the operating member 160 is pulled up (a direction in which the switching member 159 is held at the second switching position 187). Due to this urging force, the switching member 159 is held at the second switching position 187.

As described above, by operating the operation shaft 158, the switching spring 161 urges the switching member 159 toward the first switching position 186 and biases the switching member 159 toward the second switching position 187, and the urging force are switched. That is, by operating the operation member 160, when the axis line of the switching spring 161 reaches a position lower than the axis center of the operation shaft 158, the urging force of the switching spring 161 moves in the direction of pulling down the operation member 160 (a direction of biasing the switching member 159 to the first switching position 186 side). Also, by operating the operating member 160, when the axis line of the switching spring 161 reaches a position higher than the axis center of the operating shaft 158, the urging force of the switching spring 161 moves in the direction of pulling up the operating member 160 (a direction of biasing the switching member 159 to the second switching position 186 side).

Next, the outside air introduction device 137 will be described.

As shown in FIG. 19, FIG. 20, and FIG. 26, the outside air introduction device 137 has a filter 188, a filter insertion portion 189 into which the filter 188 is detachably inserted, and an outside air introduction duct 190 into which outside air is introduced.

The filter 188 is a filter 188 for removing dust from outside air. The outside air from which the dust is removed by the filter 188 is sent to the inside/outside air switching device 136. Thus, the filter 188 is a filter 188 that removes dust of the outside air before being taken into the box main body 162. The filter 188 is formed in a rectangular parallelepiped and is elastically deformable.

As shown in FIG. 19 and FIG. 20, the filter inserting portion 189 is disposed on the right end side in the seat supporting frame 138. As shown in FIG. 26, the filter inserting portion 189 includes a side wall 189*a*, an upper wall 189*b* extending outward from the upper end of the side wall 189*a*, a lower wall 189*c* extending downward from the lower end of the side wall 189*a*, and a rear wall 189*d* extending downward from the rear end of the side wall 189*a*. The space between the front end portions of the upper wall 189*b* and the lower wall 189*c* is open toward the front. An opening portion between the front end portions of the upper wall 189*b* and the lower wall 189*c* is covered with the opening/closing cover 139 from the front. From this opening portion, the filter 188 can be inserted into the filter insertion portion 189. Thus, the filter 188 is attached to the sheet insertion portion 189 provided in the seat supporting frame 138 so as to be removable from the front side (one side) of the seat supporting frame 138.

Figure 27A:
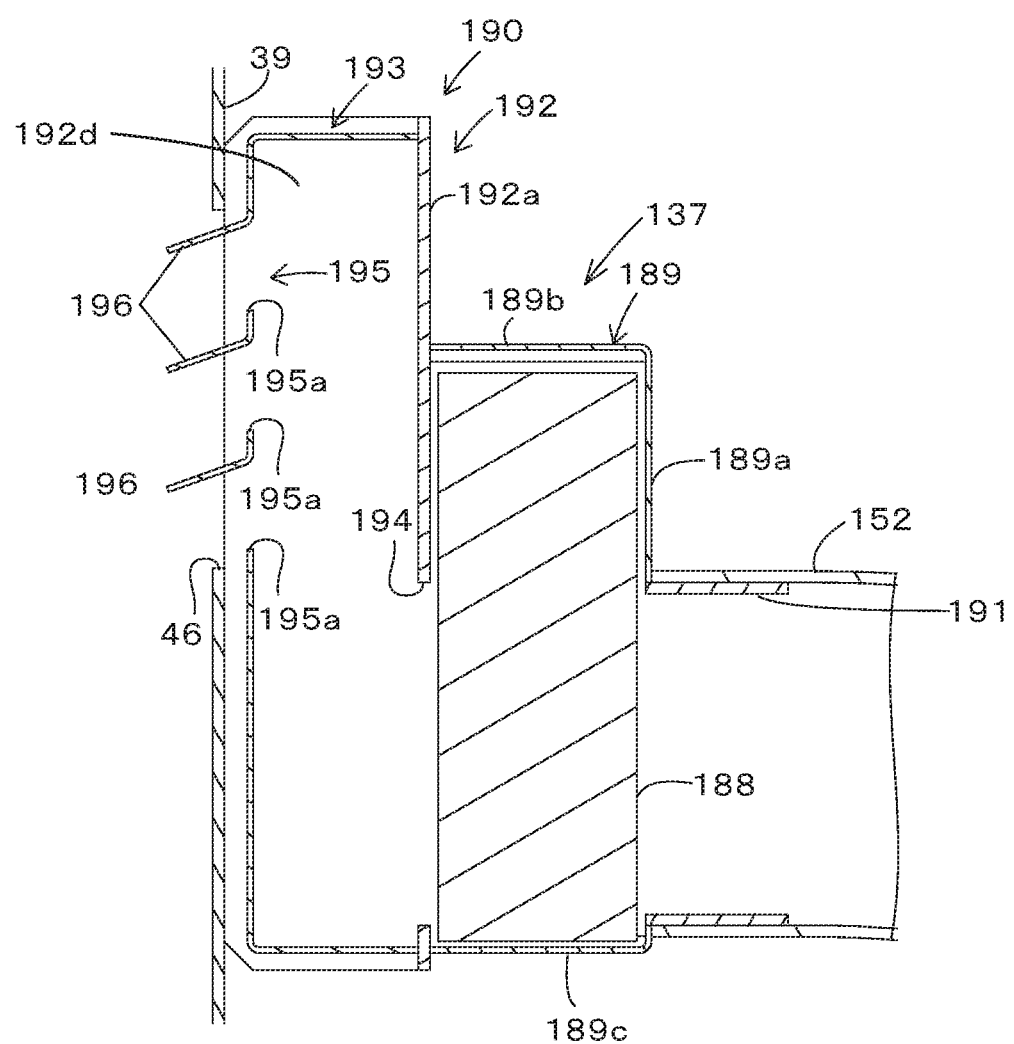
FIG. 27A is a front view illustrating a cross section of the outside air introducing device.
Figure 27B:
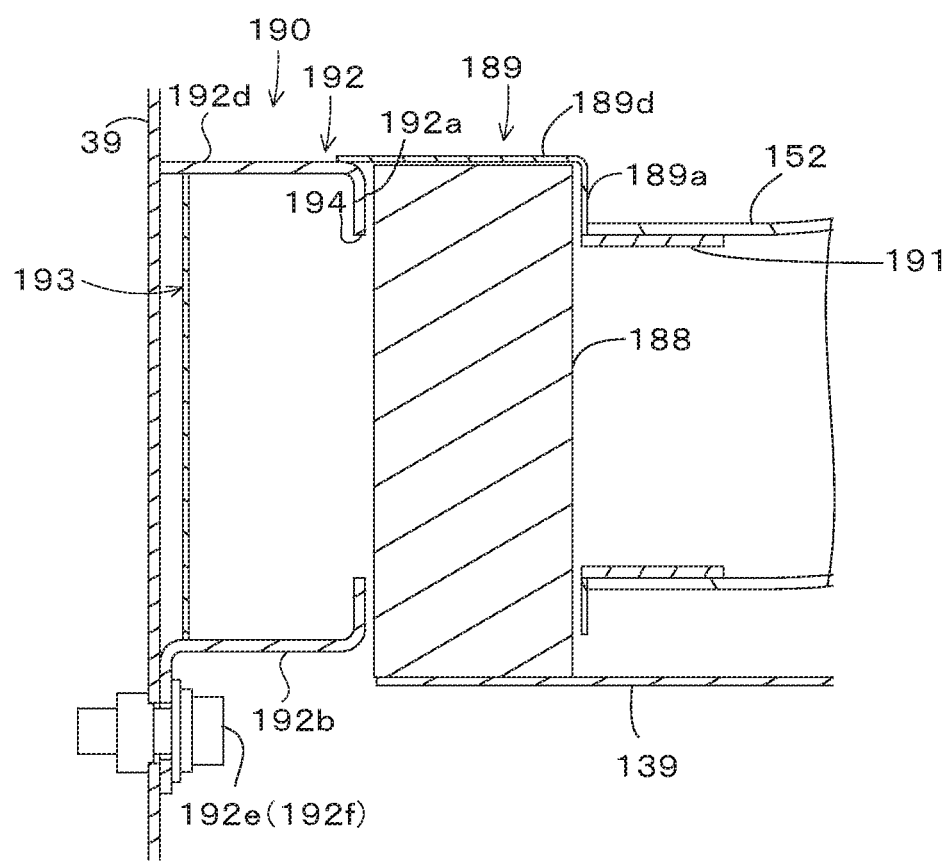
FIG. 27B is a plan view illustrating a cross section of the outside air introducing device.

As shown in FIG. 27B, in a state of being inserted into the filter insertion portion 189 of the filter 188 to the back, the front end side of the filter 188 is protruded toward the filter insertion portion 189 to cover 139 side (forward). Then, in a closed state, the opening and closing cover 139 presses the filter 188 in a direction to insert it into the filter insertion portion 189.

As shown in FIG. 26, the upper wall 189*b* forms an arcuate cutout 189*e* which is recessed from the front toward the rear. With this cutout 189*e*, it is easy to apply a finger or the like to the filter 188 when taking out the filter 188 from the filter insertion portion 189. A cylindrical connecting portion 191 communicating with the inside of the filter inserting portion 189 is provided under the side wall 189*a*. As shown in FIG. 27A and FIG. 27B, the connecting portion 191 is connected to the outside of the body of the connecting duct 152 (the other end side).

As shown in FIG. 18, the outside air introduction duct 190 is disposed between the filter 188 (filter insertion portion 189) and the second side face portion 39 of the cabin 5.

As shown in FIG. 26, the outside air introduction duct 190 includes a duct body 192 and a duct cover 193. The duct main body 192 includes a first side wall 192*a*, a front wall 192*b* extending outward from the front end of the first side wall 192*a*, a front wall 192*b* extending forward from an end portion (right end) of the front wall 192*b* on the outer side of the body and a rear wall 192*d* extending outward from the rear end of the first side wall 192*a*. The right end of the upper wall 189*b* of the filter insertion portion 189 and the right end of the lower wall 189*c* are joined to the first side wall 192*a*. A communicating portion 194 for communicating the inside of the outside air introduction duct 190 and the inside of the filter inserting portion 189 is formed under the first side wall 192*a*. The communicating portion 194 is formed by an annular edge penetrating the first side wall 192*a*. The attaching wall 192*c* is attached to the lower portion of the second side surface portion 39 by bolts 192*e* and 192*f* (see FIG. 27B).

As shown in FIG. 26, FIG. 27A and FIG. 27B, the duct lid 193 has a second side wall 193*a* opposed to the first side wall 192*a* in the machine width direction K2, and a second side wall 193*b* extending inward from the upper end of the second side wall 193*a*, an upper wall 193*b*, and a lower wall 193*c* extending inward from the lower end of the second side wall 193*a*. The upper wall 193*b* covers between the upper end portions of the front wall 192*b* and the rear wall 192*d*. The lower wall 193*c* covers between the upper end portions of the front wall 192*b* and the rear wall 192*d*. A communication port 195 communicating with the outside air introduction port 46 formed in the second side face portion 39 is provided on the upper portion of the second side wall 193*a*. The communication port 195 is formed by a plurality of elongated grooves 195a formed to extend through the second side wall 193a and elongated in the front-to-rear direction. The second side wall 193a is provided with a plurality of eaves 196 extending in an inclined direction that moves downward from the upper edge of each long groove 195a toward the outside of the airframe.

In the outside air introduction device 137, the outside air flows into the outside air introduction duct 190 through the outside air introduction port 46 and the communication port 195. The outside air flowing into the outside air introduction duct 190 flows into the filter insertion portion 189 via the communication portion 194. The outside air flowing into the filter insertion portion 189 passes through the filter 188 and is introduced into the switching box 157 through the connection portion 191 and the connection duct 152.

In this embodiment, the working machine 1 includes a cabin 5, an air conditioning device 37 for air conditioning inside the cabin 5, a box body 162 communicating with the air conditioning device 37, having a first board (first vertical board) 164, a second board (second vertical board) 165 facing the first board 164, and having one end opening (upper end opening 166) opened between one end portion (upper end portion 164a) of the first plate 164 and one end portion (upper end portion 165a) of the second plate 165, a cover plate 163 for closing one end opening (upper end opening 166) of the box main body 162, an operating shaft 158 rotatably supported by the first plate 164 and the second plate 165, a switching member 159 arranged in the box main body 162 and fixed to the operating shaft 158, which rotates the operating shaft 158 to be switched between a first switching position 186 to introduce the outside air of the cabin 5 to the air conditioning device 37 and a second switching position 187 to introduce the inside air of the cabin 5 to the air conditioning device 37, and an operating member 160 fixed to one end side of the operating shaft 158 for rotating operation of the operating shaft 158; the cover plate 163 has a retaining portion 182 which opposes via at least a part of the operation member 160 and regulates the movement of the operation member 160 and the operation shaft 158 in the axial direction so as to prevent the operation shaft 158 from coming off.

According to the above configuration, since the cover plate 163 has the retaining portion 182 for preventing the operation shaft 158 from coming off, it is not necessary to separately provide the bracket for pivotally supporting the operating shaft and a retaining member for retaining the operation shaft as in the above-described prior art, thus the number of parts can be reduced. Further, by attaching the cover plate 163 to the box main body 162, it is possible to prevent the operation shaft 158 from being withdrawn, it is not necessary to perform an operation to attach the bracket for pivotally supporting the operating shaft and a retaining member for retaining the operation shaft as in the above-described prior art, thus the manufacturing process can be simplified. This makes it possible to reduce the manufacturing cost of the working machine provided with the inside/outside air switching mechanism.

Further, the retaining portion 182 is formed by bending a part of a plate material forming the cover plate 163. Thus, the retaining portion 182 can be easily formed.

The first plate (first vertical plate) 164 has a support groove 168 that opens to one end (upper end portion 164a) side of the first plate 164 and pivotally supports one end side of the operation shaft 158, the second plate (second vertical plate) 165 has a pivot support portion 170 that penetrates the second plate 165 and pivotally supports the other end side of the operation shaft 158.

According to the above configuration, with the switching member 159 fixed to the operation shaft 158, the other end side of the operation shaft 158 is inserted into the pivot support portion 170 and one end side of the operation shaft 158 is inserted into the support groove 168, the operating shaft 158 and the switching member 159 can be mounted. This makes it easy to mount the operation shaft 158 and the switching member 159.

In addition, a first spring hooking portion 167 provided at one end portion (upper end portion 164a) of the first plate (first vertical plate) 164, a second spring hooking portion 185 provided on the operating member 160, a first spring and a switching spring 161 hooked on the hooking portion 167 and the second spring hooking portion 185. The supporting groove 168 is located between the first spring hooking portion 167 and the second spring hooking portion 185 and the groove bottom 168a (groove edge portion 168c) formed to be inclined so as to move in a direction away from the first spring hooking portion 167 toward the groove opening edge 168b and the operating shaft 158 abuts against the operating member 160. When the operating member 160 is operated, the supporting groove 168 is switched between the state in which the switching member 159 is biased toward the first switching position 186 by the switching spring 161 and the state in which the switching member 159 is biased toward the second switching position 187 by the switching spring 161. In this manner, the biasing force F1 of the switching spring 161 (see FIG. 25) can be applied in a direction (right angle or close to right angle) intersecting the receiving surface (the groove edge portion 168c) regardless of the operating angle of the operating member 160, thus it is possible to prevent the operating shaft 158 from coming out of the supporting groove 168.

When the switching member 159 is disposed at the first switching position 186, the urging force of the switching spring 161 acts in a direction to hold the switching member 159 at the first switching position 186, so that the switching member 159 moves to the second switching position 187 side, the urging force of the switching spring 161 acts in a direction to hold the switching member 159 at the second cutting position 187. Accordingly, it is possible to prevent the operating shaft 158 from coming out of the support groove 168 against the intention by an external force such as vibration.

Further, the outdoor air of the cabin 5, which is disposed between the first plate (first vertical plate) 164 and the second plate (second vertical plate) 165 and introduced into the box body 162, is supplied to the air conditioning device 37A partition plate 178 formed with an outside air intake 169 for taking in the inside of the cabin 5, the cover plate 163 has an inside air intake 181 for taking air inside the cabin 5 into the air conditioning device 37 through the interior of the box main body 162, the member 159 opens the outside air intake port 169 to close the inside air intake port 181 at the first switching position 186 and opens the inside air intake port 181 at the second switching position 187 to close the outside air intake port 169. Thus, it is possible to appropriately switch to the first switching position 186 and the second switching position 187.

A cabin 5, the operator seat 6 disposed in the cabin 5, a seat supporting frame 138 which is provided on the machine body 2 and supports the operator seat 6 and accommodates the air conditioning device 37, an opening and closing cover 139 for covering one side of the seat supporting frame 138 in an openable and closable manner, a filter 188 for removing dusts of the air outside the cabin 5 before being taken into the box main body 162, provided in the seat supporting frame 138, and a filter insertion portion 189 to which the filter 188 is detachably attached from one side of the seat supporting frame 138. When the opening and closing cover 139 is opened, a part of the filter 188 moves from the filter inserting portion 189 when the opening and closing cover 139 is closed, the opening and closing cover 139 comes into contact with the filter 188 and is pressed in the direction to insert the filter 188 into the filter inserting portion 189. As a result, the cover for closing the take-out port for taking out the filter 188 can be used also as the opening/closing cover 139, whereby it is possible to reduce the number of members and to reduce the number of assembling steps.

Further, since the filter 188 can function as a vibration isolating member for suppressing the vibration of the opening/closing cover 139 due to vibrations of the machine body 2 or the like, the vibration proof material for vibration proof at one end side of the open/close cover 139 can be omitted. Thus, it is possible to reduce the number of parts and to reduce the manufacturing cost.

Next, the running frame 9 will be described.

Figure 28:
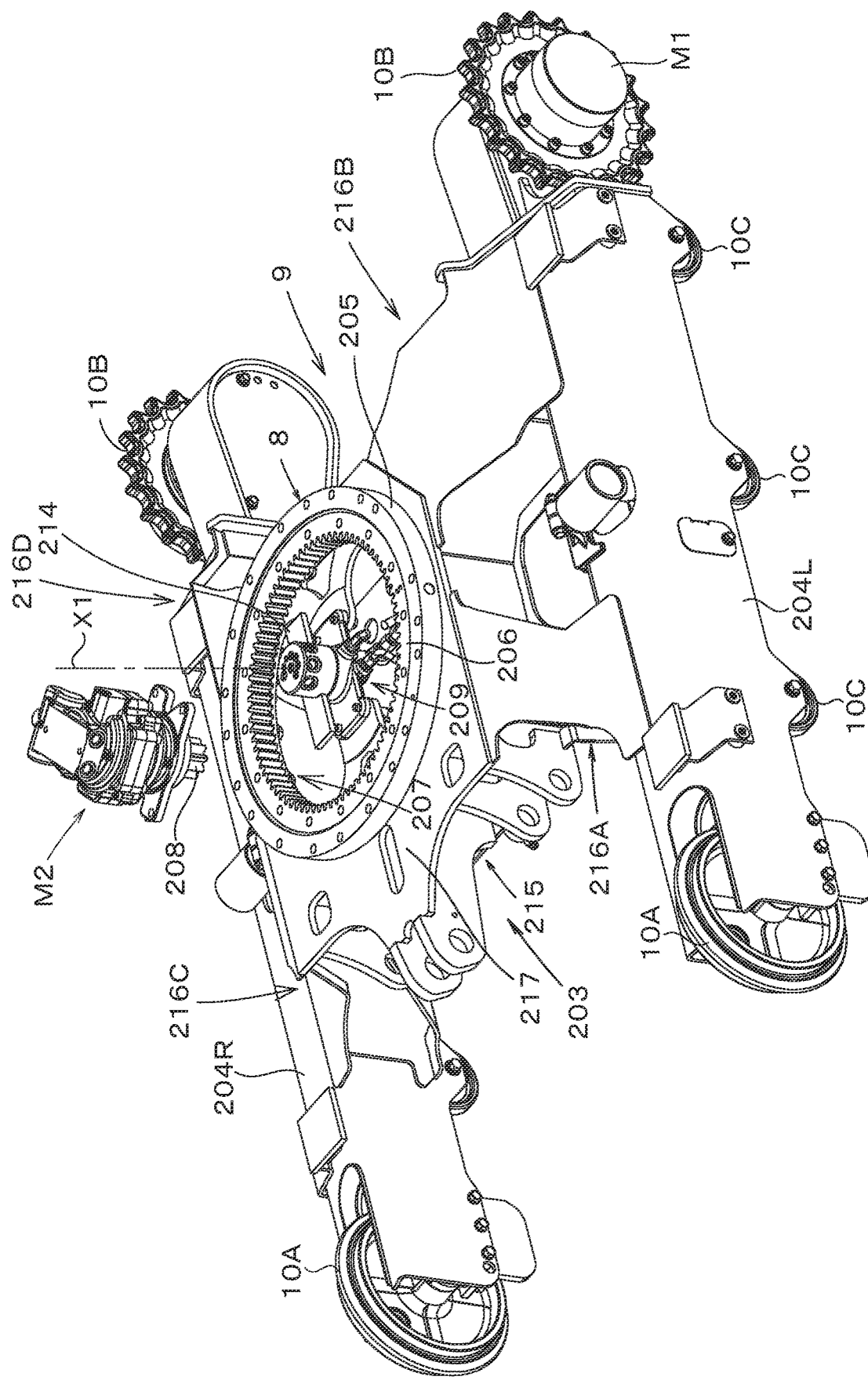
FIG. 28 is a perspective view illustrating a traveling frame.

As shown in FIG. 28, the traveling frame 9 has a center frame 203, a first side frame 204L provided on the left side of the center frame 203, and a second side frame 204R provided on the right side of the center frame 203. And the machine body 2 is rotatably supported by the center frame 203 via the orbiting bearing 8. The traveling mechanism 10 shown in FIG. 1 is mounted on the first side frame 204L and the second side frame 204R.

Figure 31:
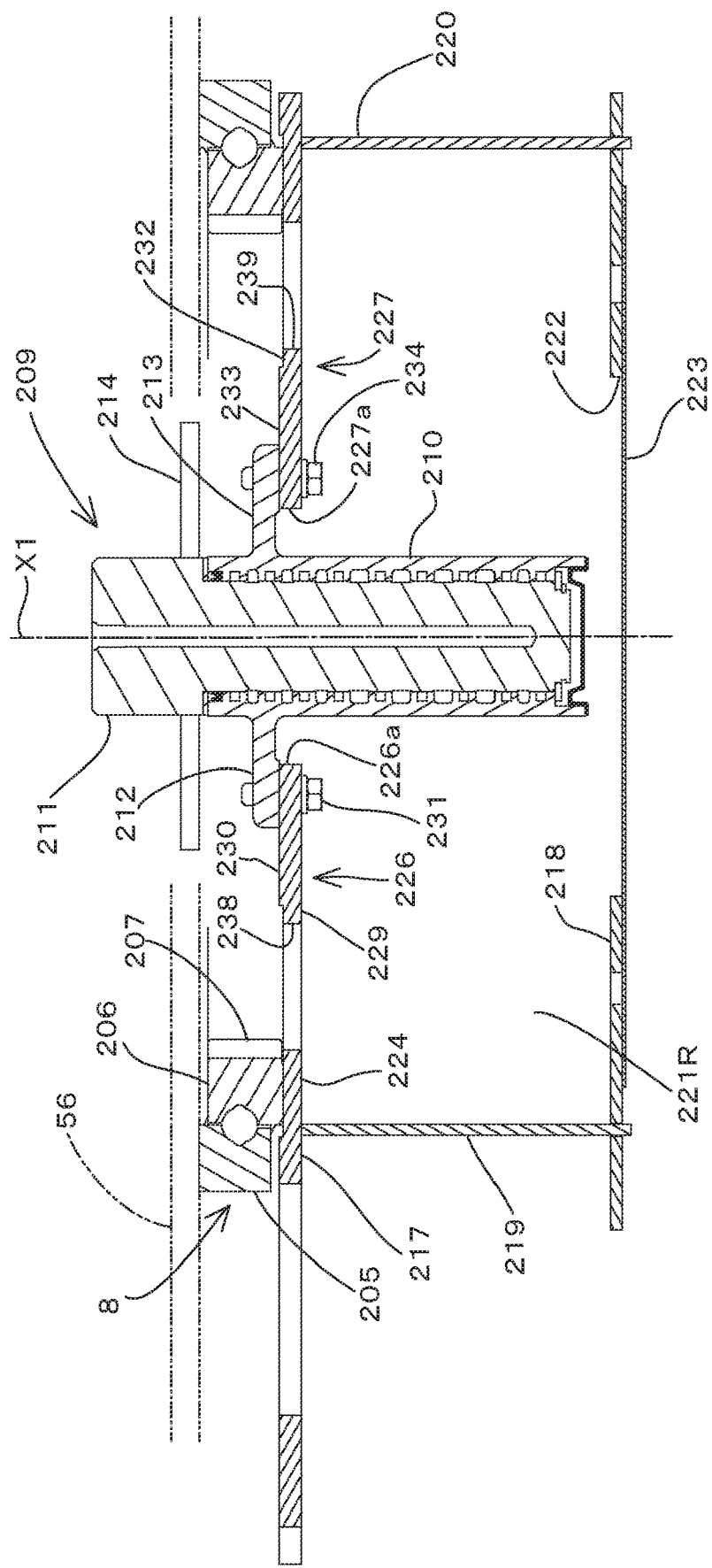
FIG. 31 is a side view illustrating a cross section of the center portion of the center frame.

The turn bearing 8 has an outer ring 205, an inner ring 206 provided on the inner peripheral side of the outer ring 205 so as to be rotatable around the turn axis, and an inner peripheral gear portion 207 formed on the inner peripheral side of the inner ring 206. As shown in FIG. 31, the outer ring 205 is bolted to the turn base plate 56. That is, the outer ring 205 is attached to the machine body 2. The inner ring 206 is bolted to the center frame 203.

As shown in FIG. 28, a pinion 208 is attached to the turning motor M2. The pinion 208 is driven by the turning motor M2 and rotates about its axis. The pinion 208 meshes with the inner peripheral gear portion 207. Thus, when the pinion 208 is driven by the turning motor M2, the pinion 208 meshes with the inner peripheral gear portion 207 and moves in the circumferential direction of the swing bearing 8. As a result, the machine body 2 rotates around the turn axis X1. A swivel joint 209 is disposed at the center side of the swing bearing 8, that is, at the position of the turn axis X1. The swivel joint 209 is a swivel joint that enables operation fluid to be supplied and discharged between the hydraulic actuator on the traveling device 3 side and the control valve V1 on the machine body 2 side.

As shown in FIG. 31, the swivel joint 209 has an outer sleeve 210 and an inner shaft 211. The inner shaft 211 is inserted into the outer sleeve 210 so as to be rotatable around the longitudinal axis. The axis of rotation of the inner shaft 211 and the axis of rotation X1 coincide with each other. The outer sleeve 210 has a first fixing portion 212 and a second fixing portion 213 in an upper portion thereof. The first fixing portion 212 protrudes in one of the horizontal directions (frontward). The second fixing portion 213 protrudes to the other (rear) which is a horizontal direction opposite to the one direction. An engagement plate 214 that engages with the turn base plate 56 and rotates together with the turn base plate 56 is fixed to the inner shaft 211.

Figure 29:
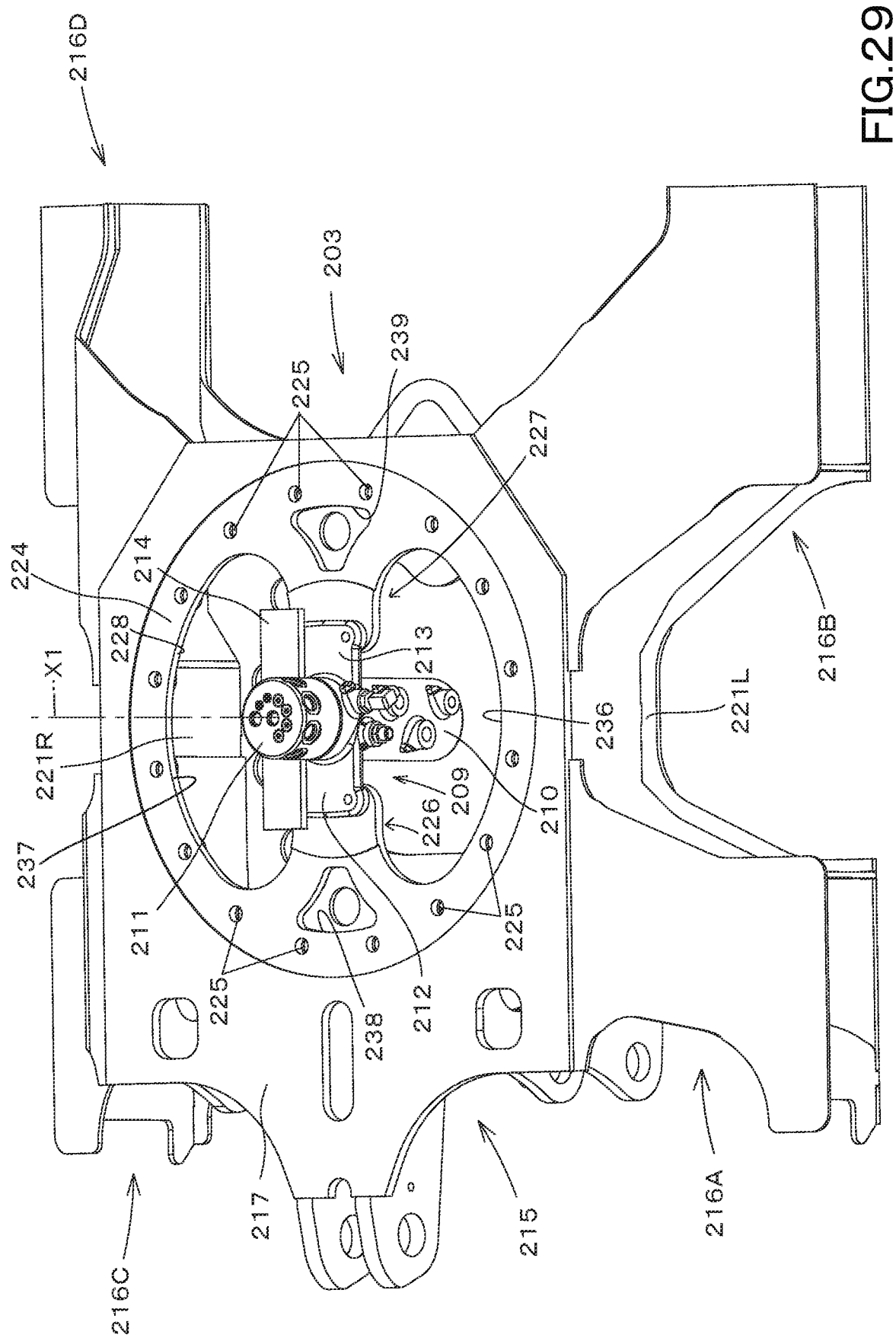
FIG. 29 is a perspective view illustrating a center frame.

As shown in FIG. 28, FIG. 29, and FIG. 31, the center frame 203 has a central frame portion 215 and four support legs 216A to 216D extending from the central frame portion 215. The center frame portion 215 has a top plate 217, a bottom plate 218, a front plate 219, a rear plate 220, a left side plate 221L, and a right side plate 221R. The top plate 217 is positioned above the bottom plate 218. In other words, the bottom plate 218 is provided below the top plate 217 with a space therebetween. The bottom plate 218 has an opening 222 formed by an edge penetrating the bottom plate 218. The opening 222 is closed by the cover plate 223. The swivel joint 209 can be inserted into the center frame 203 (between the top plate 217 and the bottom plate 218) through the opening 222. The front plate 219 is disposed between the top plate 217 and the front end portion of the bottom plate 218 and connects the top plate 217 and the bottom plate 218. The rear plate 220 is disposed between the top plate 217 and the rear end portion of the bottom plate 218 and connects the top plate 217 and the bottom plate 218. The left side plate 221 L is disposed between the top plate 217 and the left end portion of the bottom plate 218 and connects the top plate 217 and the bottom plate 218. The right side plate 221R is disposed between the top plate 217 and the right end portion of the bottom plate 218 and connects the top plate 217 and the bottom plate 218.

The support legs 216A and 216B connect the center frame portion 215 and the first side frame 204L. The support legs 216C and 216D connect the central frame portion 215 and the second side frame 204R.

As shown in FIG. 28, the inner race 206 of the swing bearing 8 is attached to the top surface of the top plate 217. Thus, the machine body 2 is disposed above the top plate 217.

Figure 30A:
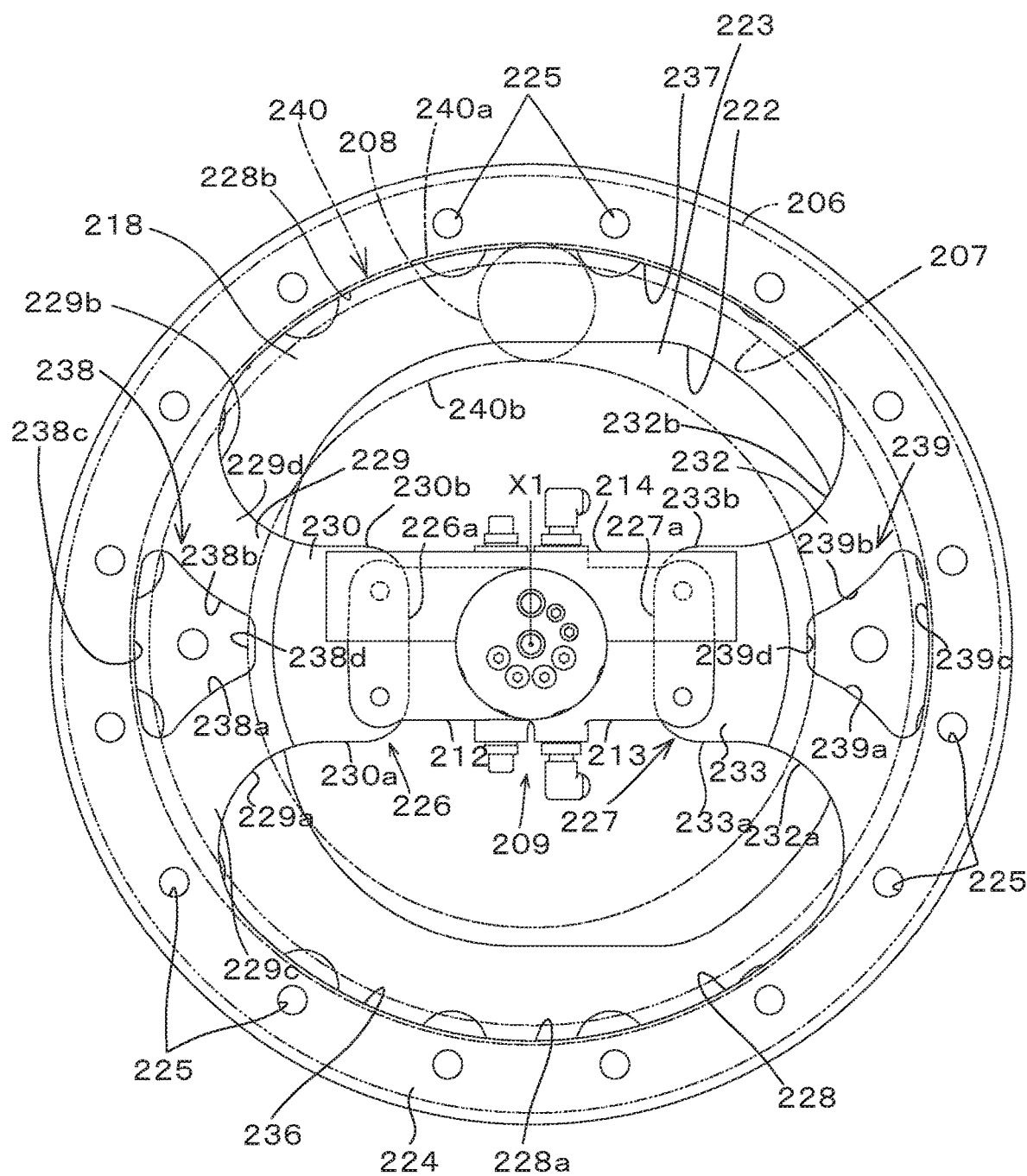
FIG. 30A is a plan view illustrating a center portion of the center frame.

As shown in FIG. 29 and FIG. 30A, on the upper surface of the top plate 217, an inner ring attachment portion 224 to which the inner ring 206 is attached is provided. A plurality of bolt insertion holes 225 for inserting bolts for fixing the inner race 206 are formed in the inner ring attachment portion 224 so as to be spaced from each other in the circumferential direction. The bolt insertion hole 225 is constituted of an annular edge portion formed through the top plate 217.

The top plate 217 has a first joint support portion 226 for supporting the first fixing portion 212 and a second joint support portion 227 for supporting the second fixing portion 213. The first joint support portion 226 protrudes from the inner ring attachment portion 224 toward the swivel joint 209. In the present embodiment, the first joint support portion 226 extends rearward from the front portion of the inner circumferential edge 228 of the inner ring attachment portion 224 toward the swivel joint 209. The second joint support portion 227 is provided on the side opposite to the first joint support portion 226 and protrudes from the inner ring attachment portion 224 toward the swivel joint 209. In the present embodiment, the second joint support portion 227 extends forward from the rear portion of the inner circumferential edge 228 of the inner ring attachment portion 224 toward the swivel joint 209. An interval is provided between the front end portion (rear end portion) 226a which is the protruding side end portion of the first joint support portion 226 in the protruding direction and the front end portion (front end portion) 227a which is the end portion of the second joint support portion 227 in the protruding direction. A swivel joint 209 is disposed between the distal end portion 226a and the distal end portion 227a.

Figure 30B:
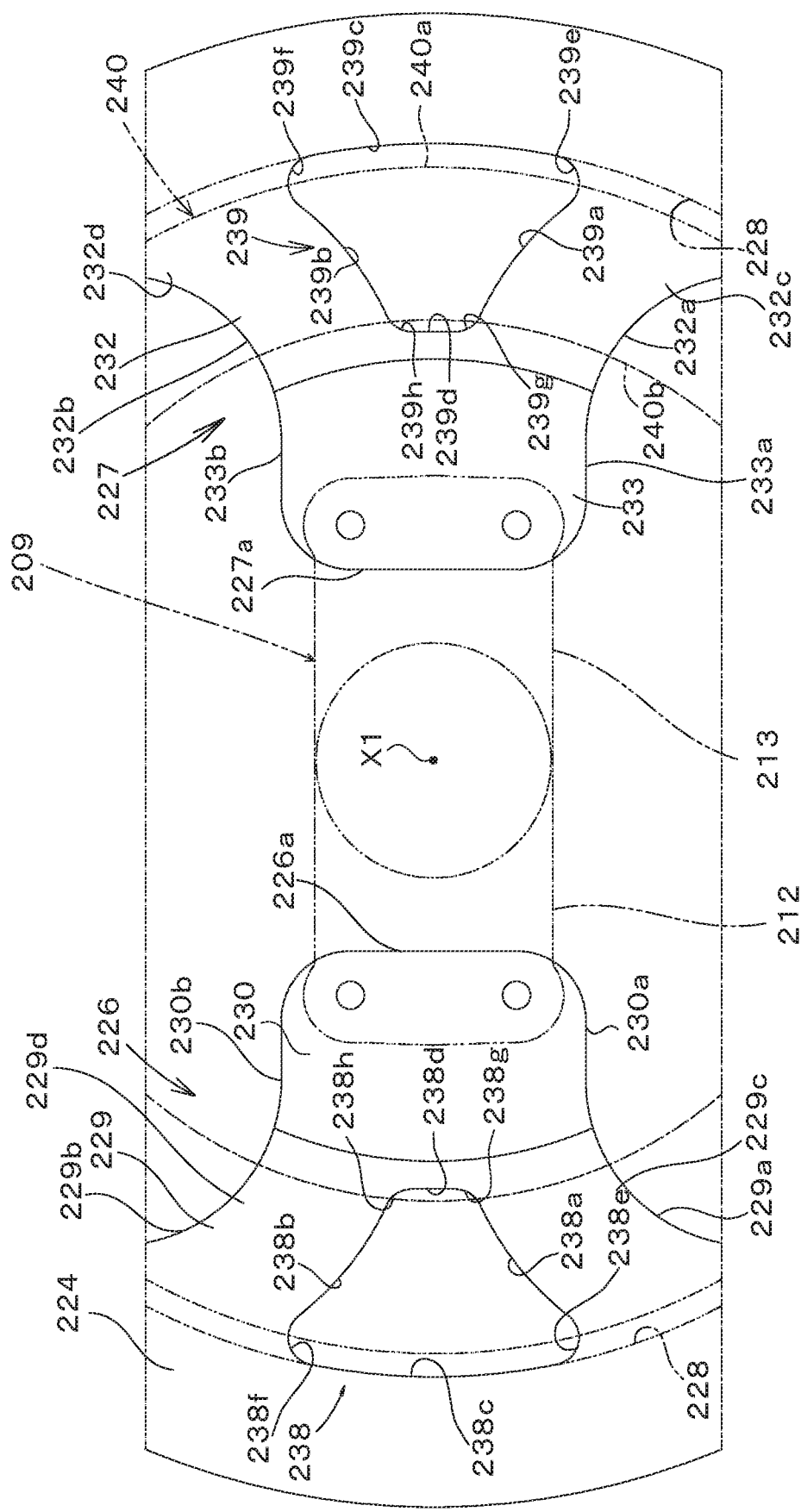
FIG. 30B is an enlarged plan view illustrating the center portion of the center frame.

As shown in FIG. 30A and FIG. 30B, the first joint support portion 226 includes a first base portion 229 and a first attachment portion 230. The first base portion 229 is a portion extending from the inner ring attachment portion 224 and reaching a midway portion in the projecting direction of the first joint support portion 226. The first attachment portion 230 is a portion extending from the first base portion 229 to the distal end portion 226a of the first joint support portion 226. The first fixing portion 212 is mounted on the first attachment portion 230 and is attached by a bolt 231 (see FIG. 31). The bolt 231 is screwed into the first fixing portion 212 by passing through the first attachment portion 230 from below the first attachment portion 230.

The first base portion 229 is gradually widened in a direction from the first attachment portion 230 to the inner ring attachment portion 224, and has a substantially fan shape in plan view. The first base portion 229 has a first end edge 229a which is an edge portion on one side in the width direction (left side) and a second edge portion 229b on the other side in the width direction (right side) which is the opposite side edge portion of the first end edge 229a.

The first edge 229a is a concavely curved edge. The first end edge 229a is continuous with the first inner circumferential edge 228a which is a part of the inner circumferential edge 228 of the inner ring attachment portion 224. The first inner circumferential edge 228a is one (left side) portion of the inner circumferential edge 228 in the machine width direction K2. Further, the first end edge 229a is continuous with the first side edge 230a which is an edge portion on one side (left side) in the width direction of the first attachment portion 230.

The second edge 229b is a concavely curved edge. Further, the second end edge 229b is continuous with the second inner circumferential edge 228b which is a part of the inner circumferential edge 228 of the inner ring attachment portion 224. The second inner circumferential edge 228b is the other (right side) portion of the inner circumferential edge 228 in the machine width direction K2. Further, the second end edge 229b is contiguous to the second side edge 230b which is an edge portion on the other side (right side) in the width direction of the first attachment portion 230.

As shown in FIG. 30A and FIG. 30B, the second joint support portion 227 includes a second base portion 232 and a second attachment portion 233. The second base portion 232 is a portion extending from the inner ring attachment portion 224 and reaching a midway portion in the projecting direction of the second joint support portion 227. The second attachment portion 233 is a portion extending from the second base portion 232 to the distal end portion 227a of the second joint support portion 227. The second fixing portion 213 is placed on the second mounting portion 233 and attached by a bolt 234 (see FIG. 31). The bolt 234 is screwed into the second fixing portion 213 by inserting the second attaching portion 233 from below the second attaching portion 233.

The second base portion 232 is gradually widened in a direction from the second attachment portion 233 to the inner ring attachment portion 224, and has a substantially fan shape in plan view. The second base portion 232 has a third edge 232a which is an edge portion on one side (left side) in the width direction and a third edge 232a which is a fourth edge 232b on the other side (right side) in the width direction which is the opposite edge portion of the third edge 232a.

The third edge 232a is a concavely curved edge. Further, the third edge 232a is continuous with the first inner circumferential edge 228a. Further, the third edge 232a is contiguous to the third side edge 233a which is an edge portion on one side (left side) in the width direction of the second attachment portion 233.

The fourth edge 232 b is a concavely curved edge. Also, the fourth edge 232b is continuous with the second inner circumferential edge 228b. Further, the fourth edge 232b is contiguous to the fourth side edge 233b, which is an edge on the other side (right side) in the width direction of the second attachment portion 233.

As shown in FIG. 30A, the top plate 217 has a first edge portion 236 constituting an opening, a second edge portion 237 constituting an opening, a third edge portion 238 constituting an opening, and a fourth edge portion 238 constituting an opening.

The first edge portion 236 constitutes an opening surrounded by the first inner circumferential edge 228a, the first end edge 229a, the first side edge 230a, the third edge 232a, and the third side edge 233a. The second edge portion 237 constitutes an opening surrounded by the second inner circumferential edge 228b, the second edge 229b, the second side edge 230b, the fourth edge 232b, and the fourth side edge 233b. The first edge portion 236 and the second edge portion 237 communicate with each other between the front end portion 226a of the first joint support portion 226 and the front end portion 227a of the second joint support portion 227.

As described above, the top plate 217 has an opening composed of a first edge portion 236, a second edge portion 237, and a communicating portion between the first edge portion 236 and the second edge portion 237. A swivel joint 209 is arranged at the center of this opening. A first joint support portion 226 protrudes toward the center portion of the opening, and a second support portion 227 protrudes from a position opposite to the first joint support portion 226 across the center portion of the opening toward the center portion side.

To remove the swivel joint 209 from the traveling frame 9, the fixing of the swivel joint 209 to the first joint support portion 226 and the second joint support portion 227 is removed, and the swivel joint 209 is moved to the lower side of the top plate 217. In order to move the swivel joint 209 downwardly of the top plate 217, the swivel joint 209 can be moved to the lower side of the top plate 217 via the first edge portion 236 by translating the swivel joint 209 to the left. Alternatively, by translating the swivel joint 209 to the right, it is possible to move the swivel joint 209 downward of the top plate 217 via the second edge portion 237.

Further, in order to move the swivel joint 209 downwardly of the top plate 217, the swivel joint 209 may be rotated about the turn axis X1. That is, by rotating the swivel joint 209 such that the first fixing portion 212 is disengaged from above the first attachment portion 230 and the second fixing portion 213 is disengaged from above the second mounting portion 233, the swivel joint 209 can be moved to the lower side of the top plate 217 via the first edge portion 236 and the second edge portion 237.

In the case of attaching the swivel joint 209 to the traveling frame 9, the procedure is performed in the reverse order of the removal.

As shown in FIG. 30B, the third edge portion 238 constitutes an opening (first opening portion) penetrating the first base portion 229 from the upper surface to the lower surface. The third edge portion 238 is gradually widened in a direction from the first attachment portion 230 to the first base portion 229, and has a substantially fan shape in a plan view. The third edge portion 238 has a first side portion 238a, a second side portion 238 b, a third side portion 238c, and a fourth side portion 238d.

The first side portion 238a is an edge portion on one side (left side) of the machine width direction K2. The first side portion 238a is formed as a convex curved edge curved in substantially the same direction as the first end edge 229a. The second side portion 238b is a side portion facing the first side portion 238a and an edge portion on the other side (the right side) of the machine width direction K2. The second side portion 238b is formed as a convex curved edge curved in substantially the same direction as the second end edge 229b. The third side portion 238c is a side portion located between the first side portion 238a and the second side portion 238b and on the outer side in the radial direction of the swing bearing 8. The third side portion 238c is formed in a concave curved edge centered on the turn axis X1. The fourth side portion 238d is a side portion located between the first side portion 238a and the second side portion 238b and on the inner side in the radial direction of the swing bearing 8. The fourth side portion 238d is formed in a straight line extending in the machine width direction K2. The corner portion 238e between the first side portion 238a and the third side portion 238c is formed of a concave curved edge. The corner portion 238f between the second side portion 238b and the third side portion 238c is formed of a concave curved edge. The corner portion 238g between the first side portion 238a and the fourth side portion 238d is constituted of a concave curved edge. The corner portion 238h between the second side portion 238b and the fourth side portion 238d is constituted of a concave curved edge.

By forming the third edge portion 238 on the first base portion 229, a curved first arm portion 229c and a curved second arm portion 229d are formed. The first arm portion 229c has a curved shape that moves to the left (outside the body) as it goes forward. The second arm portion 229d has a curved shape that moves to the right (toward the outside of the body) as it goes forward.

As shown in FIG. 30B, the fourth edge portion 239 constitutes an opening (second opening portion) penetrating the second base portion 232 from the upper face to the lower face. The third edge portion 238 is gradually widened in a direction from the second attachment portion 233 to the second base portion 232, and has a substantially fan shape in a plan view. The third edge portion 238 has a fifth side portion 239a, a sixth side portion 239b, a seventh side portion 239c, and an eighth side portion 239d.

The fifth side portion 239a is an edge portion on one side (left side) of the machine width direction K2. The fifth side portion 239a is formed by a convex curved edge curved in substantially the same direction as the third edge 232a. The sixth side portion 239b is a side portion opposed to the fifth side portion 239a and is an edge portion on the other side (right side) of the machine width direction K2. The sixth side portion 239b is formed by a convex curved edge curved in substantially the same direction as the fourth edge 232b. The seventh side portion 239c is a side portion located between the fifth side portion 239a and the sixth side portion 239b and on the outer side in the radial direction of the swing bearing 8. The seventh side portion 239c is formed by a concave curved edge centered on the turn axis X1. The eighth side portion 239d is a side portion located between the fifth side portion 239a and the sixth side portion 239b and on the inner side in the radial direction of the swing bearing 8. The eighth side portion 239d is formed in a linear shape extending in the machine width direction K2. The corner portion 239e of the fifth side portion 239a and the seventh side portion 239c is constituted of a concave curved edge. The corner portion 239f between the sixth side portion 239b and the seventh side portion 239c is constituted of a concave curved edge. The corner portion 239g between the fifth side portion 239a and the eighth side portion 239d is constituted of a concave curved edge. The corner portion 239h between the sixth side portion 239b and the eighth side portion 239d is constituted of a concave curved edge.

By forming the fourth edge portion 239 on the second base portion 232, a curved third arm portion 232c and a curved fourth arm portion 232d are formed. The third arm portion 232c is curved so as to move leftward (outward of the body) as going backward. The fourth arm portion 232d is in a curved shape that moves to the right (toward the outside of the body) as going backward.

As shown in FIG. 30A, the third edge portion 238 and the fourth edge portion 239 are provided below the movement trajectory 240 of the pinion 208. In FIG. 30A, reference numeral 240a indicates the outer peripheral side of the moving tracK240, and reference numeral 240b indicates the inner peripheral side of the moving tracK240.

Next, the hose guide 202 that holds the hydraulic hose 201 disposed through the swing bracket 14 will be described.

Figure 32:
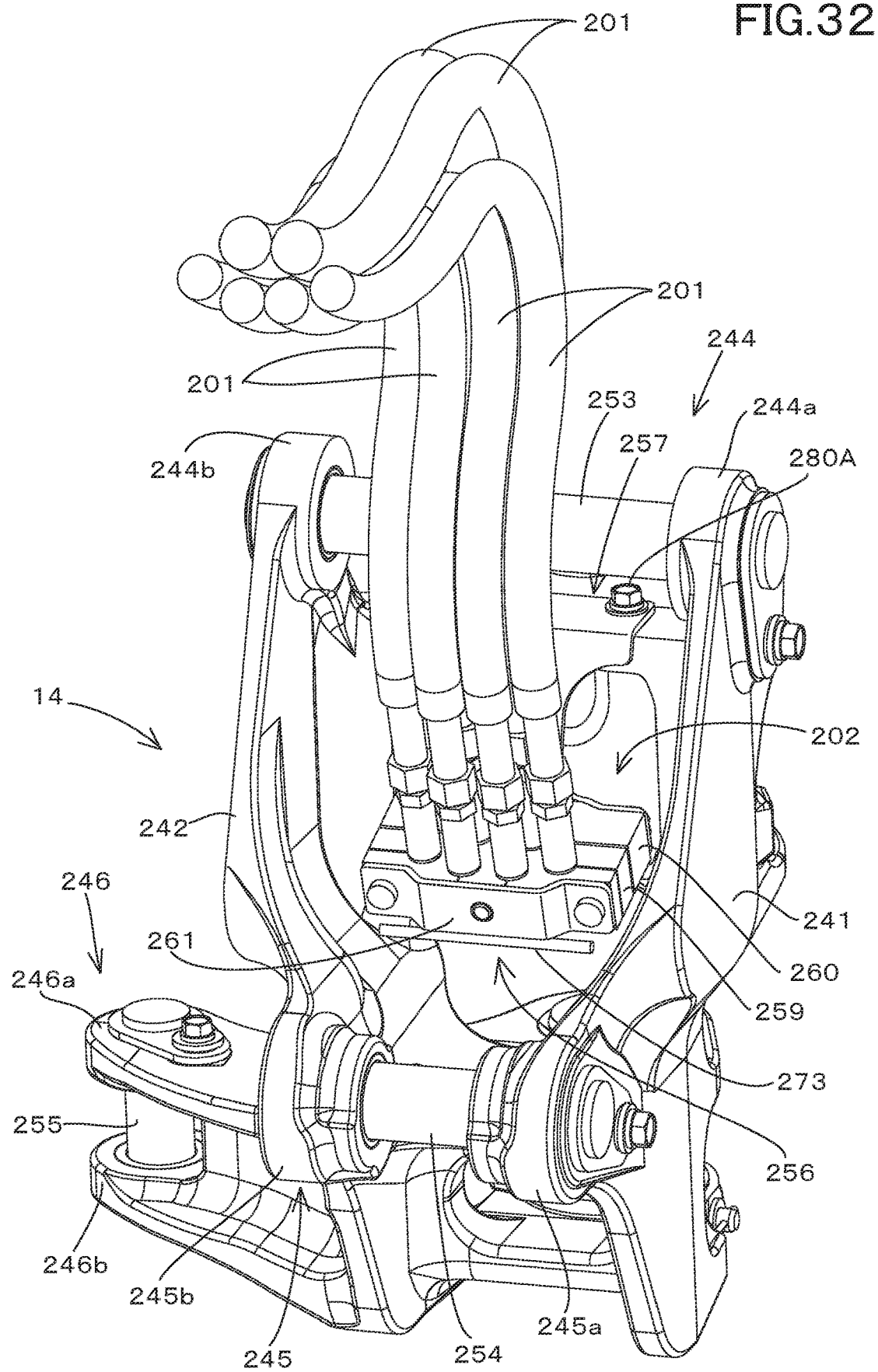
FIG. 32 is a front perspective view illustrating a swing bracket.
Figure 33:
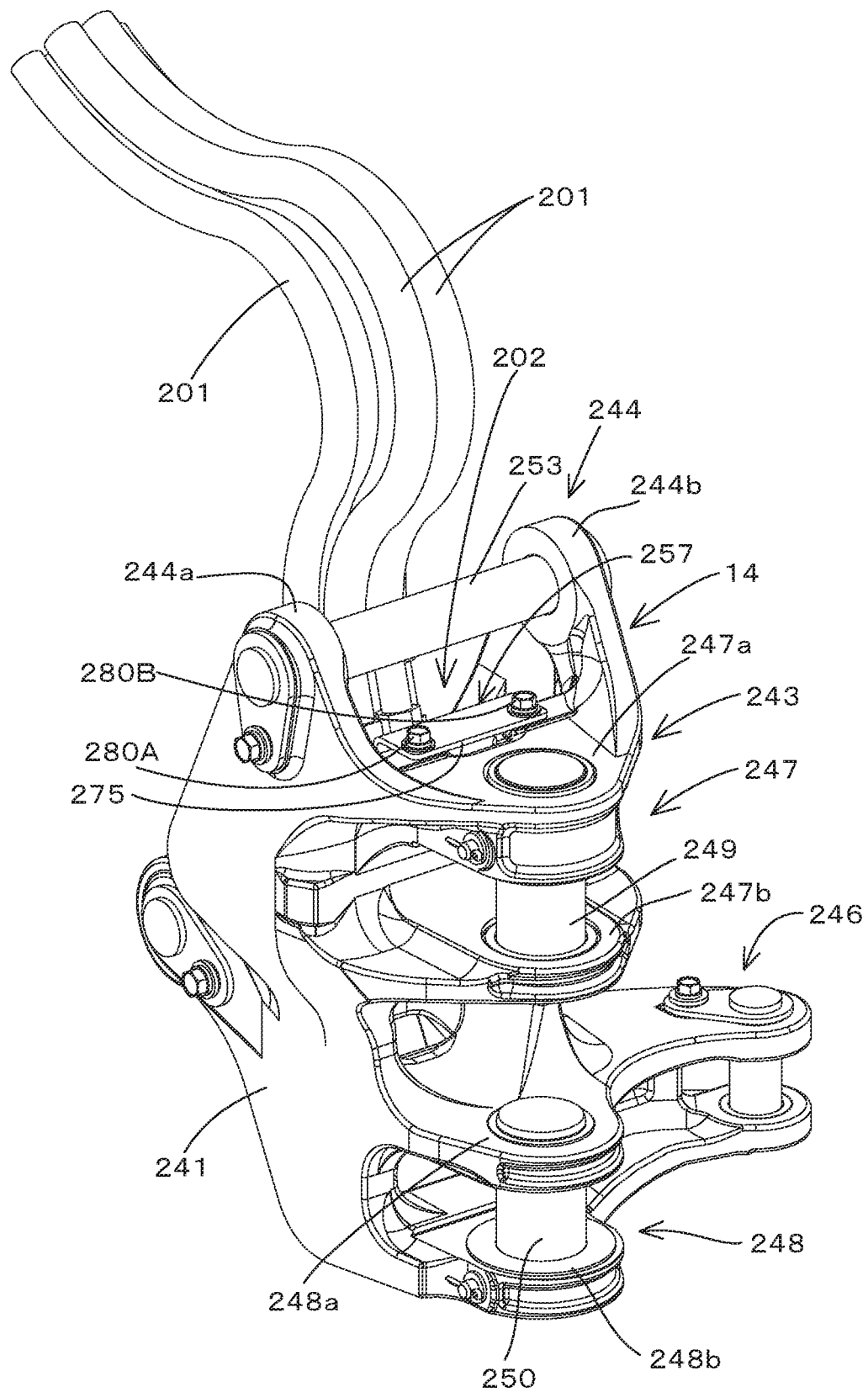
FIG. 33 is a rear perspective view illustrating the swing bracket.
Figure 34:
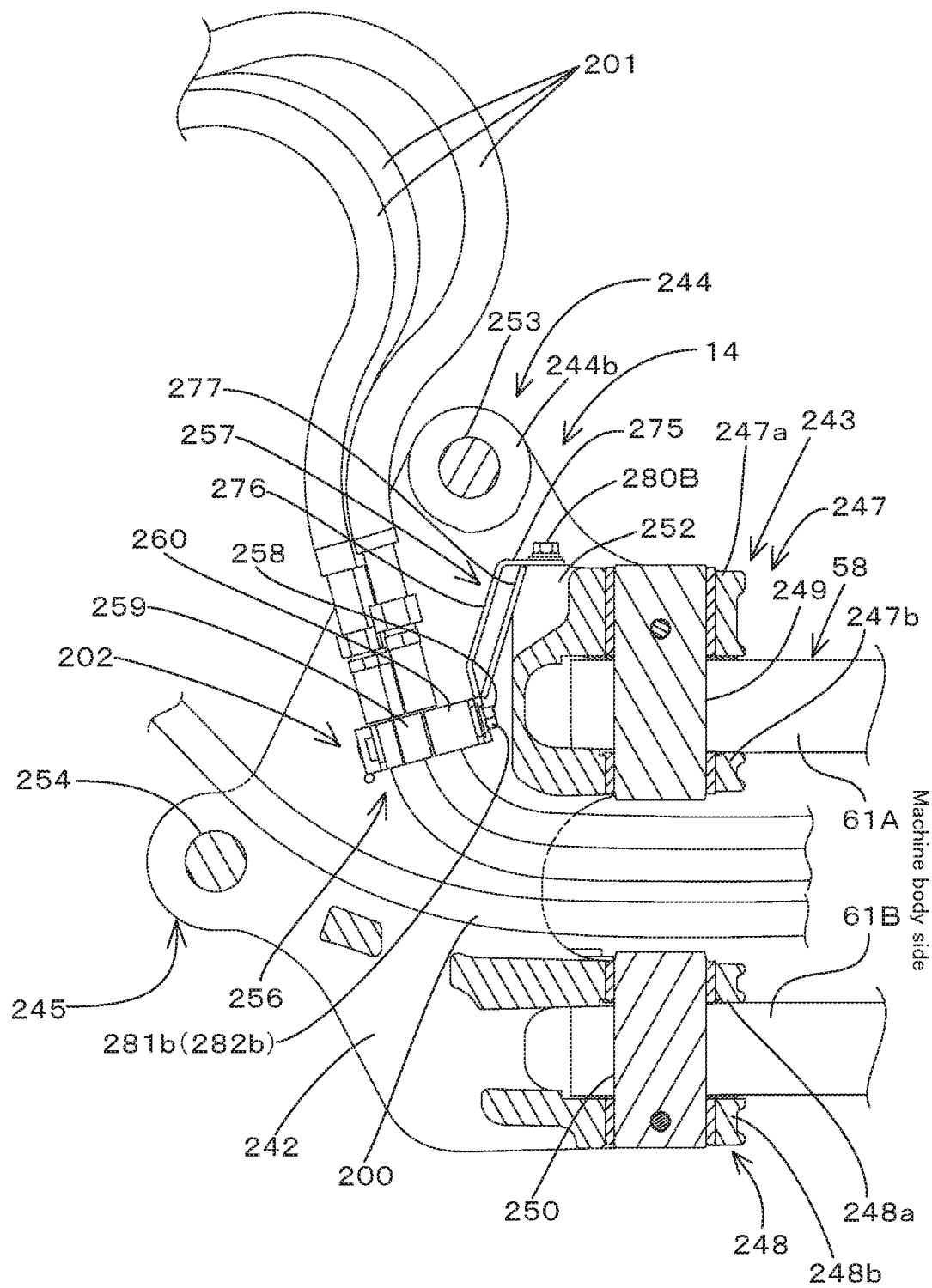
FIG. 34 is a side view illustrating a cross section of the swing bracket.

FIG. 32, FIG. 33, and FIG. 34, the swing bracket 14 includes a first side wall portion 241, a second side wall portion 242, a rotation support portion 243, a boom connection portion 244, a first cylinder coupling portion 245, and a second cylinder connecting portion 246. The first side wall portion 241 is provided on the left side of the second side wall portion 242 with a certain distance. The rotation support portion 243 is a portion which is supported by the support bracket 58 so as to be rotatable about the vertical axis. That is, the swing bracket 14 has a rotation support portion 243 which is supported on the machine body 2 so as to be rotatable around the vertical axis.

The rotation support portion 243 is positioned on the rear side of the first side wall portion 241 and the second side wall portion 242. The rotation support portion 243 has a first bracket coupling portion 247 and a second bracket coupling portion 248 positioned below the first bracket coupling portion 247. The first bracket coupling portion 247 connects upper portions of rear portions of the first side wall portion 241 and the second side wall portion 242. The second bracket coupling portion 248 connects the lower portion of the rear portion of the first side wall portion 241 and the second side wall portion 242.

The first bracket coupling portion 247 has an upper side wall portion 247a and a lower side wall portion 247b positioned below the upper side wall portion 247a. A first connecting pin 249 is provided over the upper side wall portion 247a and the lower side wall portion 247b. The first bracket coupling portion 247 is connected to the first supporting portion 61A via the first connecting pin 249 so as to be rotatable around the longitudinal axis.

The second bracket coupling portion 248 has an upper side wall portion 248a and a lower side wall portion 248b positioned below the upper side wall portion 248a. A second connecting pin 250 is provided over the upper side wall portion 248a and the lower side wall portion 248b. The second bracket coupling portion 248 is connected to the second supporting portion 61B via the second connecting pin 250 so as to be rotatable around the longitudinal axis.

Figure 35:
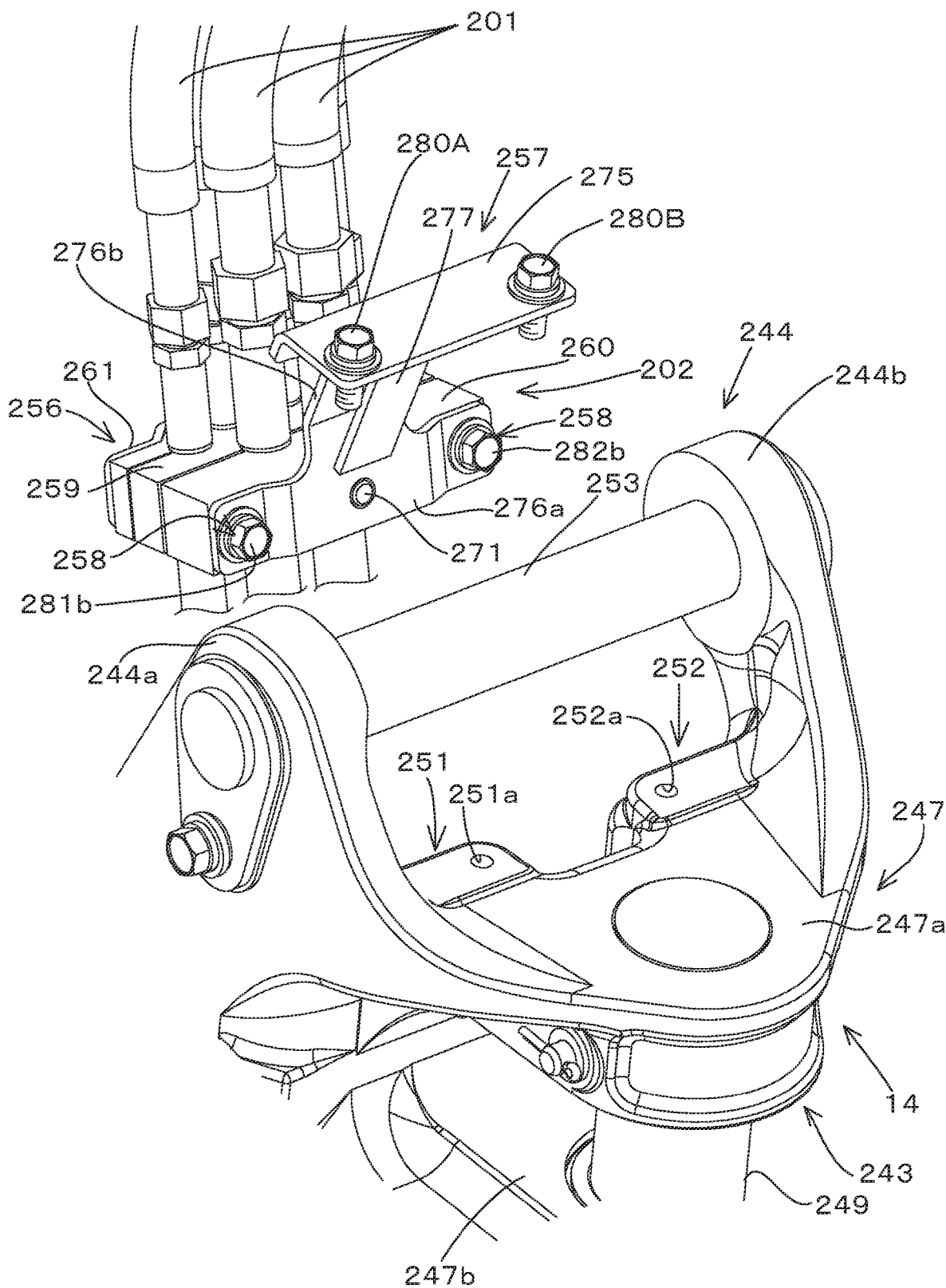
FIG. 35 is a perspective view illustrating a state where a hose guide is detached from the swing bracket.

As shown in FIG. 35, a first hose guide attachment portion 251 and a second hose guide attachment portion 252 are provided at the front portion (rotation support portion 243) of the upper side wall portion 247a of the first bracket coupling portion 247. The first hose guide attachment portion 251 is located at the left portion of the swing bracket 14 and the second hose guide attachment portion 252 is located at the right portion of the swing bracket 14. The upper surface of the first hose guide attachment portion 251 and the second hose guide attachment portion 252 are formed to be flat. A thread hole 251a is formed in the first hose guide attachment portion 251. A thread hole 252a is formed in the second hose guide attachment portion 252.

As shown in FIG. 32 and FIG. 33, the boom connecting portion 244 has a first portion 244a provided on the upper portion of the first side wall portion 241 and a second portion 244b provided on the upper portion of the second side wall portion 242. A base portion of the boom 15 is pivotally supported by the boom connecting portion 244 via a third connecting pin 253 provided between the first portion 244a and the second portion 244b (see FIG. 1). The first cylinder coupling portion 245 has a first portion 245a provided at the front portion of the first side wall portion 241 and a second portion 245b provided at the front portion of the second side wall portion 242. One end side of the boom cylinder C3 is pivotally supported by the first cylinder connecting portion 245 via a fourth connecting pin 254 provided across the first portion 245a and the second portion 245b (see FIG. 1). The second cylinder coupling portion 246 has a first portion 246a projecting rightward from the lower portion of the second side wall portion 242 and a second portion 246b located below the first portion 246a and protruding rightward from the lower portion of the second side wall portion 242. A fifth connecting pin 255 is provided in the second cylinder connecting portion 246 over the first portion 246a and the second portion 246b. One end side of the swing cylinder C2 is pivotally supported by the second cylinder connecting portion 246 via a fifth connecting pin 255.

As shown in FIG. 34, the hydraulic hoses 200 and 201 are routed from the machine body 2 side (control valve V1) through the swing bracket 14 to the working device 4 side. The hydraulic hoses 200 and 201 are arranged to pass between the first bracket coupling portion 247 and the second bracket coupling portion 248 and between the first side wall portion 241 and the second side wall portion 242. The hydraulic hose 200 is a hose for sending and returning operation fluid to and from the boom cylinder C3. The hydraulic hose 201 is a hose for sending and returning operation fluid to a hydraulic actuator (mounting actuator) that drives the arm cylinder C4, the bucket cylinder C5, and a work implement separately mounted on the working device 4.

As shown in FIG. 32 and FIG. 34, the swing bracket 14 is provided with a hose guide 202 for holding the hydraulic hose 201 arranged through the swing bracket 14.

Figure 36:
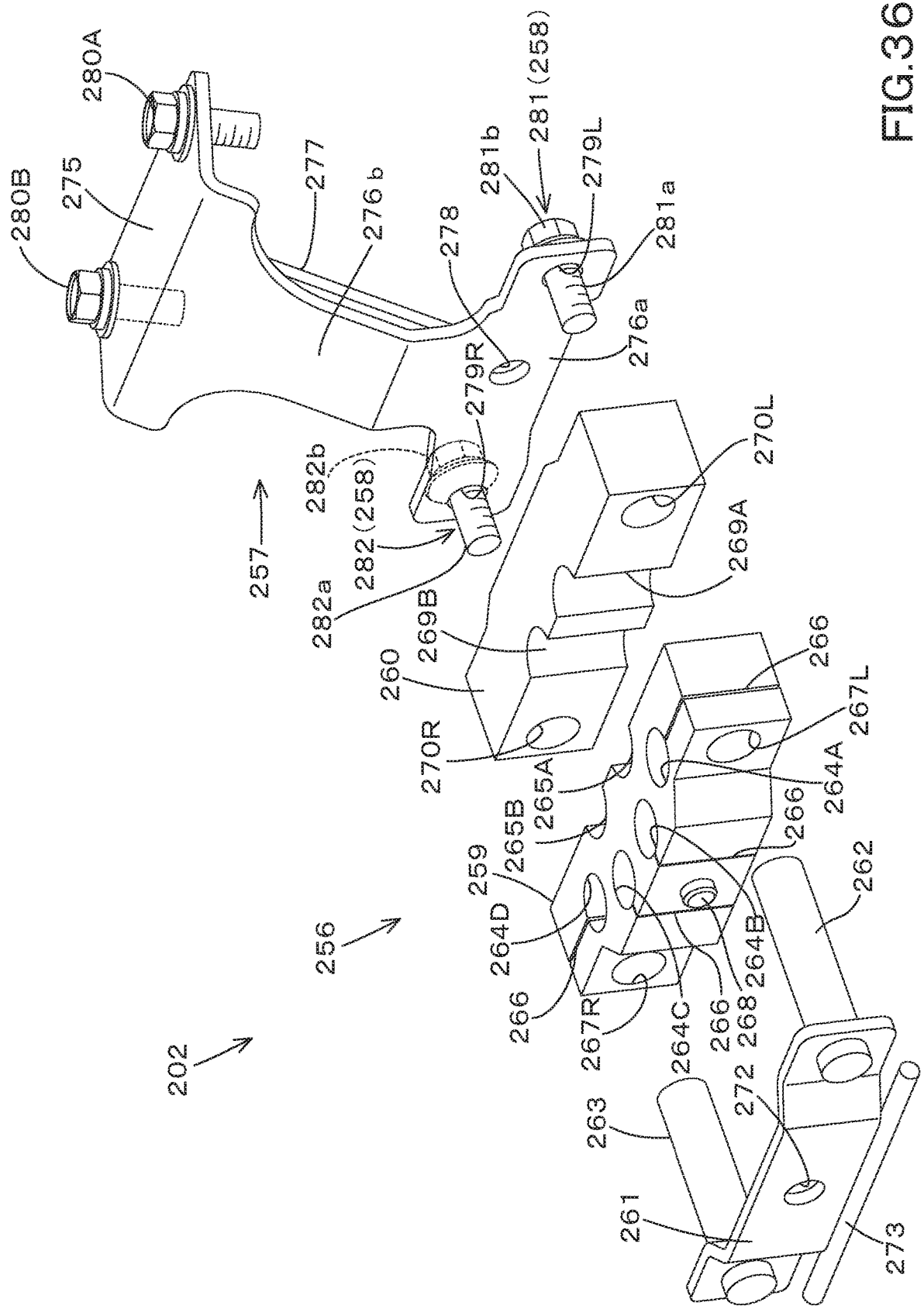
FIG. 36 is an exploded perspective view illustrating the hose guide.

As shown in FIG. 35 and FIG. 36, the hose guide 202 includes a hose retainer 256, a holder bracket 257, and a fastener 258. The hose retainer 256 is a member that holds the hydraulic hose 201. That is, the hose guide 202 is a member for holding the hydraulic hose 201 for the arm cylinder C4, the bucket cylinder C5 and the attached actuator.

As shown in FIG. 34, the hose retainer 256 is positioned in front of the first bracket coupling portion 247. As shown in FIG. 36, the hose retainer 256 has a first block member 259, a second block member 260, a holding member 261, a first sleeve 262, and a second sleeve 263. The first block member 259 and the second block member 260 are formed of an elastic member such as rubber. In the first block member 259, four hose passing holes 264A to 264D and two recessed portions 265A and 265B are formed.

The hose through-holes 264A to 264D are holes through which the hydraulic hose 201 is passed, and are formed by columnar edges formed through the first block member 259 in the longitudinal direction. In the first block member 259, slits 266 communicating with the respective hose passing holes 264A to 264D are formed corresponding to the respective hose passing holes 264A to 264D. By elastically deforming the first block member 259 to open the slit 266, it is possible to pass the hydraulic hose 201 through the hose through holes 264A to 264D.

The recesses 265A and 265B are portions for forming through holes for allowing passage of the hydraulic hose 201. The recesses 265A and 265B are formed in a semicircular column shape having a longitudinal axis in the rear part of the first block member 259. In addition, an insertion hole 267L is formed in the left portion of the first block member 259. An insertion hole 267R is also formed in the right portion of the first block member 259. Each of the insertion holes 267L and 267R is formed by a columnar edge portion formed to penetrate through the first block member 259 in the front-rear direction. A positioning member 268 is provided at the center of the front portion of the first block member 259.

The second block member 260 is positioned behind the first block member 259. In the second block member 260, two recesses 269A and 269B are formed. The recesses 269A and 269B are portions for forming a through hole for allowing the hydraulic hose 201 to pass through. The recesses 269A and 269B are formed in a semicircular column shape having a longitudinal axis in the front portion of the second block member 260. When the front surface of the second block member 260 is superimposed on the rear surface of the first block member 259, through holes are formed for the passage of one hydraulic hose 201 by the recess 265A and the recess 269A, and the other recesses 265B and 269B, a through hole through which one hydraulic hose 201 passes is formed. An insertion hole 270L is formed in the left portion of the second block member 260. An insertion hole 270R is also formed in the right portion of the second block member 260. Each of the insertion holes 270L and 270R is formed by a columnar edge portion formed to pass through the second block member 260 in the front-rear direction. When the front surface of the second block member 260 is overlapped with the rear surface of the first block member 259, the insertion hole 267L and the insertion hole 270L communicate with each other, and the insertion hole 267R and the insertion hole 270R communicate with each other. A positioning member 271 is provided at the center of the rear surface of the second block member 260 (see FIG. 35).

The pressing member 261 is a member that is superimposed on the front surface of the first block member 259 and presses the first block member 259 and the second block member 260 in cooperation with the holder bracket 257. The pressing member 261 is formed of a plate material. A positioning hole 272 through which the positioning member 268 is inserted is formed in the central portion of the pressing member 261. The positioning hole 272 is constituted of an annular edge portion formed through the pressing member 261. At the lower end of the holding member 261, a bar 273 is provided. This rod member 273 is a member for protecting the hydraulic hose 200 when the hydraulic hose 200 for the boom cylinder C3 arranged under the hose guide 202 hits the hose retainer 256, and has a cylindrical shape as shown in the drawings.

The front end of the first sleeve 262 is fixed to the left part of the pressing member 261 and protrudes rearward from the pressing member 261. Female threads are cut in the inner peripheral surface of the first sleeve 262. That is, the inner peripheral surface of the first sleeve 262 is formed as a thread hole. The first sleeve 262 is inserted through the insertion hole 267L and the insertion hole 270L. The front end of the second sleeve 263 is fixed to the right part of the pressing member 261 and protrudes rearward from the pressing member 261. Female threads are cut in the inner peripheral surface of the second sleeve 263. That is, the inner peripheral surface of the second sleeve 263 is formed as a thread hole. The second sleeve 263 is inserted through the insertion hole 267R and the insertion hole 270R.

The holder bracket 257 is formed of a plate material and includes a holding portion 276 a, a mounting stay portion 275, a connecting portion 276b, and a reinforcing plate 277. The holding portion 276a holds the first block member 259 and the second block member 260 therebetween (in cooperation with the holding member 261) with the holding member 261. A positioning hole 278 through which the positioning member 271 is inserted is formed in the central portion of the holding portion 276a. The positioning hole 278 is constituted of an annular edge portion formed through the pressing member 261. A first bolt insertion hole 279L is formed in the left portion of the holding portion 276a. A second bolt insertion hole 279R is formed in the right portion of the holding portion 276a. The first bolt insertion hole 279L and the second bolt insertion hole 279R are formed by an annular edge part formed to pass through the holding part 276a.

The attachment stay portion 275 is a portion that is attached to the rotation support portion 243 from above. That is, the holder bracket 257 has an attachment stay portion 275 attached to the rotation support portion 243 from above. The left portion of the attachment stay portion 275 is superimposed on the first hose guide attachment portion 251, and the right portion of the attachment stay portion 275 is superimposed on the second hose guide attachment portion 252. The mounting stay portion 275 is attached to the rotation support portion 243 (the upper side wall portion 247a of the first bracket coupling portion 247) by the two bolts 280A and 280B. That is, the bolt 280A passes through the mounting stay portion 275 from above and is screwed into the thread hole 251a. Further, the bolts 280A and 280B pass through the mounting stay portion 275 from above and are screwed into the thread hole 252a.

The connecting portion 276b extends downward from the front portion of the mounting stay portion 275 and is connected to the upper portion of the holding portion 276a. The reinforcing plate 277 is provided from the lower surface of the mounting stay portion 275 to the upper part of the rear surface of the holding portion 276a.

The fastener 258 is a component for attaching the hose retainer 256 to the holder bracket 257, and is constituted of bolts. The fastener 258 includes a first mounting bolt 281 and a second mounting bolt 282. The first mounting bolt 281 has a screw shaft portion 281a and a head portion (tightening operation portion) 281b. The second mounting bolt 282 also has a screw shaft portion 282a and a head portion (tightening operation portion) 282b. The threaded shaft portions 281a and 282a are portions formed by cutting a male thread on the outer periphery of the columnar member. The head portions 281b and 282b are portions engaging with tools for rotating the screw shaft portions 281a and 282a, and are formed in a hexagonal prism shape. The screw shaft portion 281a of the first mounting bolt 281 is screwed into the first sleeve 262 by inserting the first bolt insertion hole 279L from the rear. The screw shaft portion 282a of the second mounting bolt 282 is screwed into the second sleeve 263 by inserting the second bolt insertion hole 279R from the rear.

As shown in FIG. 34, in a state in which the holder bracket 257 is attached to the swing bracket 14 and the fastener 258 is attached to the holder bracket 257, the first attachment bolt 281 (fastener 258) and the second attachment bolt 282 (fastening The head portions 281b and 282b of the tool 258) face the rotation support portion 243 side. That is, the hose guide 202 is a fastener 258 for attaching the hose retainer 256 to the holder bracket 257, and is fastened with the fastening operation portions 281b and 282b facing the rotation support portion 243 side in a state of being attached to the holder bracket 257 and a fastener 258.

The hydraulic hose 201 is attached to the hose guide 202 in a state in which the hose guide 202 is removed from the swing bracket 14 and the hydraulic hose 201 is not connected to the hydraulic actuator. The procedure for attaching the hydraulic hose 201 to the hose guide 202 will be described below.

First, the hydraulic hose 201 arranged through the swing bracket 14 is passed through the hose passing holes 264A to 264D of the first block member 259, and the recesses 265A and 265B of the first block member 259 and the recess 265A of the second block member 260. Next, with the second block member 260 overlapped with the first block member 259, the first sleeve 262 is inserted through the insertion hole 267L and the insertion hole 270L and the second sleeve 263 is inserted into the insertion hole 267R and the insertion hole 270R and the pressing member 261 is superimposed on the front surface of the first block member 259. In this state, the first mounting bolt 281 is screwed into the first sleeve 262 through the first bolt insertion hole 279L from behind the holding portion 276a, and the second mounting bolt 282 is screwed from the rear of the holding portion 276a to the second bolt insertion hole 279R into the second sleeve 263.

As described above, the hydraulic hose 201 is attached to the hose guide 202.

After attaching the hydraulic hose 201 to the hose guide 202, the holder bracket 257 (hose guide 202) is attached to the swing bracket 14.

In the present embodiment, the working machine 1 includes a traveling frame 9 having a top plate 217 having an opening, a swivel base (machine body 2) disposed on the traveling frame 9 so as to be able to turn about the center of the opening as a turn axis, and a swivel joint 209 arranged at the center of the opening. The top plate 217 has a first joint support portion 226 projecting toward the center portion side and supporting the swivel joint 209, a first joint support portion 226 and a second joint support portion 227 which protrudes toward the center from the position opposite to the support portion 226 and supports the swivel joint 209. The first joint support portion 226 has a first opening penetrating from the upper surface to the lower surface and a second opening penetrating from the upper surface to the lower surface is formed in the second joint support portion 227.

As a result, it is possible to reduce the area on which the foreign matter rides on the first joint support portion 226 and the second joint support portion 227. Further, foreign matter on the first joint support portion 226 and the second joint support portion 227 can be dropped downward from the first opening portion and the second opening portion. Thus, foreign matters can be prevented from accumulating on the first joint support portion 226 and the second joint support portion 227.

In addition, a turning motor M2 attached to the swivel base (machine body 2), an outer ring 205 attached to the swivel base (machine body 2), and an outer ring 205 provided on the inner periphery side of the outer ring 205 so as to be rotatable about the turn axis, and an inner ring 206 having an inner peripheral gear portion 207 formed on the inner peripheral side thereof, a swing bearing 8 meshing with the inner peripheral gear portion 207 and driven to rotate by the turning motor M2, And a moving pinion 208. The running frame 9 has an inner ring attachment portion 224 shaped annularly to which the inner ring 206 is attached, and the first joint supporting portion 226 and the second joint supporting portion 227 extend from the inner ring attachment portion 224 to the center portion and the first opening portion and the second opening portion are provided below the movement locus of the pinion 208.

Thereby, it is possible to suppress accumulation of foreign matter on the movement trajectory 240 of the pinion 208, and to make it difficult for the pinion 208 to be damaged due to contact with foreign matter.

In addition, the swivel joint 209 has a first fixing portion 212 projecting in one direction in the horizontal direction and a second fixing portion 213 projecting in the other horizontal direction opposite to the one direction, and the first joint support portion 226 has a first attachment portion 230 on which the first fixing portion 212 is mounted and a first base portion 229 which gradually widens in a direction away from the first attachment portion 230 and the second joint support portion 227 has a second mounting portion 233 on which the second fixing portion 213 is mounted and a second base portion 232 which gradually widens in a direction away from the second mounting portion 233, and the first opening portion (third edge portion 238) is provided on the first base portion 229 and gradually widened in a direction away from the first attachment portion 230 and the second opening portion (fourth edge portion 239) is provided in the second base portion 232. It is gradually widely formed in the direction away from the part 233.

Thereby, it is possible to suppress the accumulation of foreign matter on the first joint support portion 226 and the second joint support portion 227 while ensuring the rigidity of the first joint support portion 226 and the second joint support portion 227.

Further, a swing bracket 14 having a rotation support portion 243 rotatably supported on a swivel base (machine body 2) about a vertical axis, a hydraulic hose 201 disposed through the swing bracket 14, a hydraulic hose 201, a holder bracket 257 attached to the swing bracket 14, and a fastener 258 for attaching the hose retainer 256 to the holder bracket 257. In a state where the fastener 258 is attached to the holder bracket 257, the rotation support portion And a fastener 258 having fastening operation portions 281b and 282b facing the side 243.

In the above configuration, in a state of being attached to the holder bracket 257, the tightening operation portion of the fastener 258 faces the rotation support portion 243 side. As a result, the operation of fastening the fastener 258 and attaching the hose retainer 256 to the holder bracket 257 can be performed from above the hydraulic hose 201. That is, the tightening direction of the fastener 258 can be a direction from above to below the hydraulic hose 201. This makes it easy to mount the hydraulic hose 201 (tightening operation of the fastener 258).

Further, the holder bracket 257 has an attachment stay portion 275 attached to the rotation support portion 243 from above. Since there is no member or the like which is an obstacle to mounting above the rotation support portion 243, attachment stay portion 275 can be attached easily. Further, since the attachment stay portion 275 can be attached to the rotation support portion 243 from above, the attachment work of the attachment stay portion 275 is a work from the top in a standing state, so that the attachment work can be carried out easily.

Next, the structure of the bonnet center 24 will be described.

First, the configuration of the rear lower part of the cabin 5 placed on the bonnet center 24 will be described.

Figure 37:
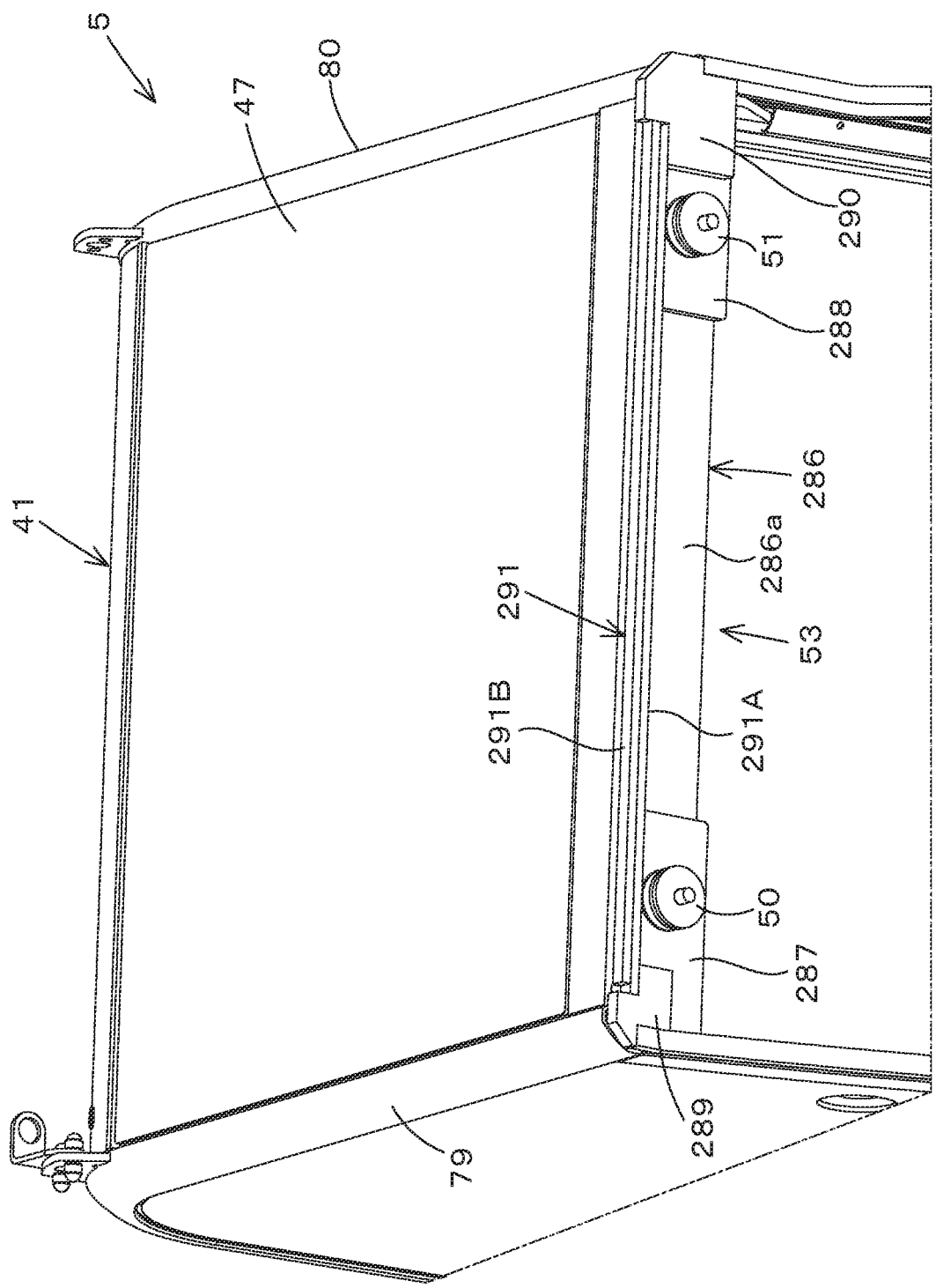
FIG. 37 is a perspective view illustrating a rear lower portion of a cabin in view from below.

As shown in FIG. 37, the rear lower frame 53 of the cabin 5 includes a rear horizontal member (horizontal member) 286, a first rear assembled portion 287, a second rear assembled portion 288, a plurality of sealing members (a first seal 289, a second seal 290, a third seal 291). The rear cross member 286 is formed as a modified cylindrical body by the extruded steel (see FIG. 39A) and is provided between the lower end portions of the first rear pillar portion 79 and the second rear pillar portion 80. As shown in FIG. 40, the rear cross member 286 has a front lower wall 286a forming the lower surface of the front portion and a rear lower wall 286b forming the lower surface of the rear portion. The front lower wall 286a is formed to have a wider front-rear width than the rear lower wall 286b. Further, the front lower wall 286a is formed at a position higher than the rear lower wall 286b.

Figure 42:
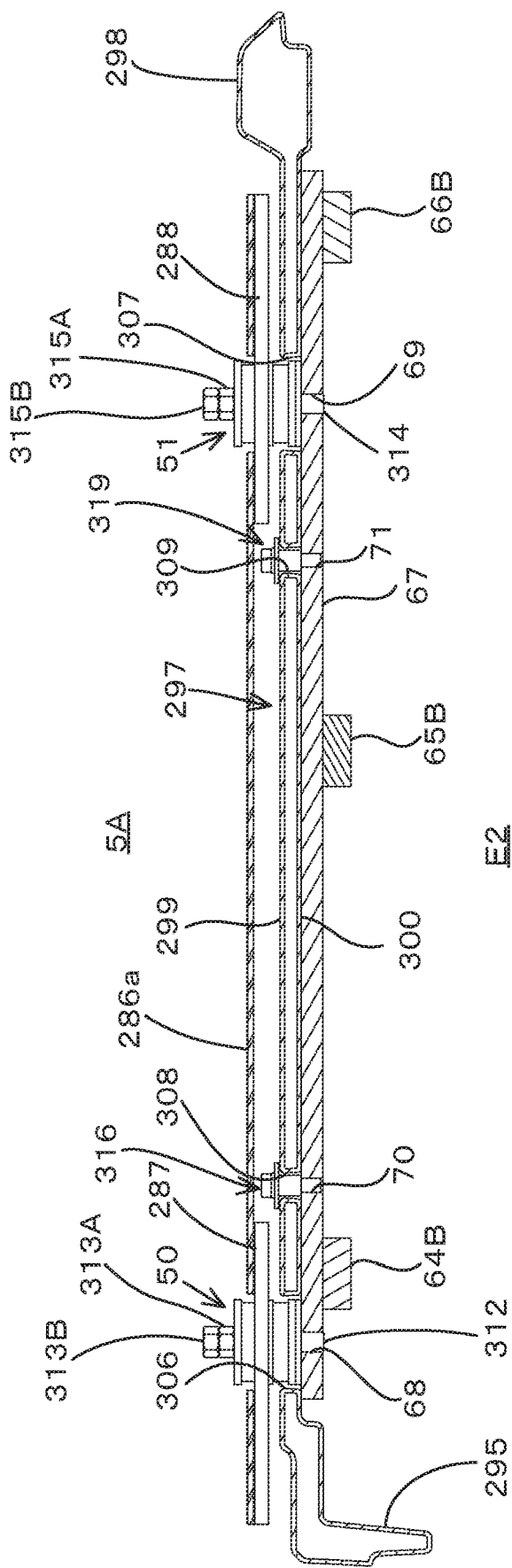
FIG. 42 is a rear view illustrating a cross section of the placement portion cut at a position of an installing portion and a screw insertion portion.
Figure 43:
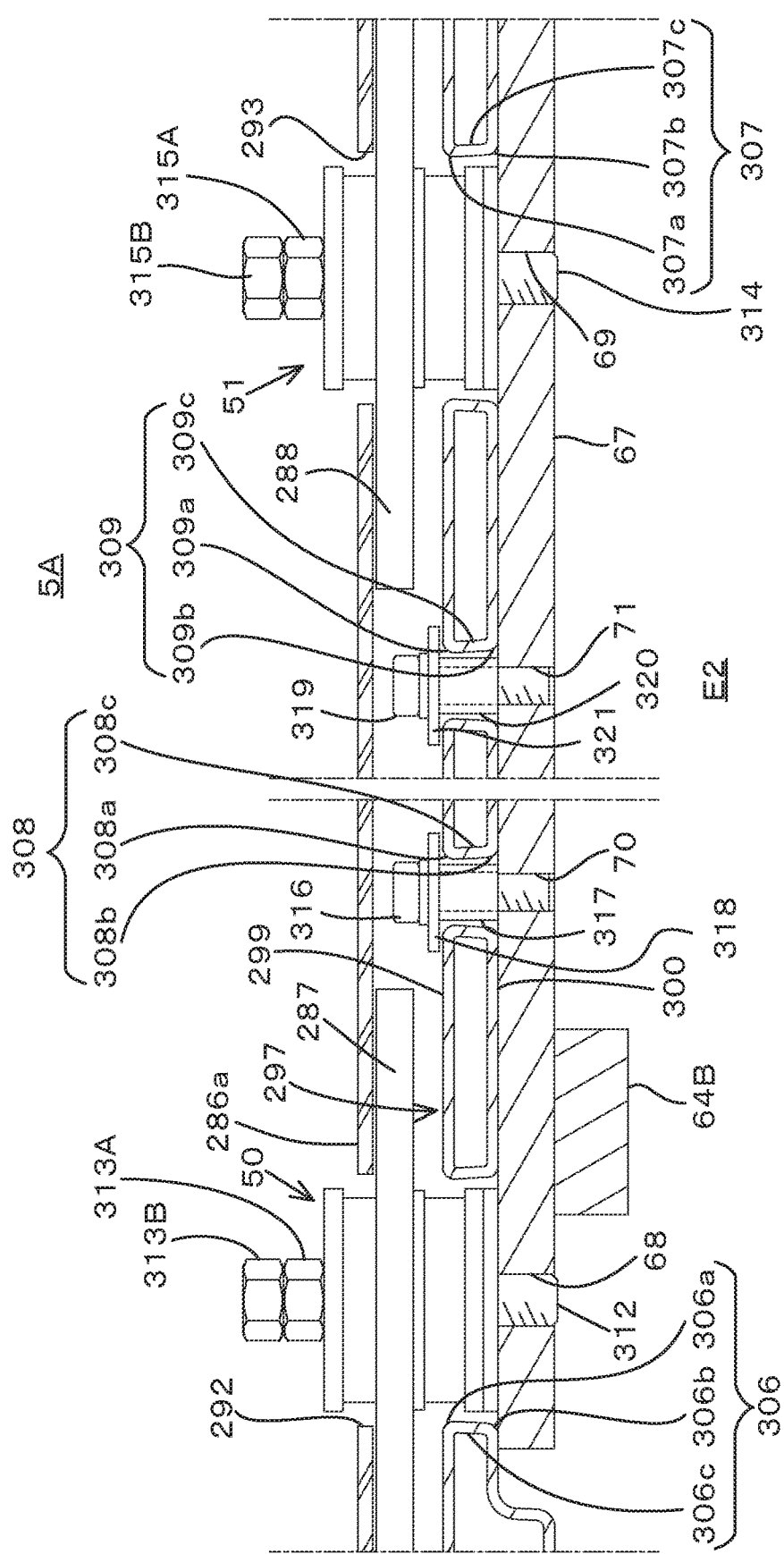
FIG. 43 is an enlarged rear view illustrating the cross section of the placement portion cut at the position of the installing portion and the screw insertion portion.

As shown in FIG. 42 and FIG. 43, the first rear assembling portion 287 is formed of a plate material and is fixed to the lower surface on the left side of the front lower wall 286a. The first rear mount 50 is assembled to the first rear assembling portion 287. An opening 292 through which the first rear mount 50 is inserted is formed in a portion of the front lower wall 286a corresponding to the first rear mount 50. The opening 292 is constituted of an annular edge formed through the front lower wall 286a of the rear cross member 286. The second rear assembling portion 288 is formed of a plate material and is fixed to the lower surface on the right side of the front lower wall 286a. The second rear mount 51 is assembled to the second rear assembling portion 288. An opening 293 through which the second rear mount 51 is inserted is formed in a portion of the front lower wall 286a corresponding to the second rear mount 51. The opening 293 is constituted of an annular edge portion formed through the front lower wall 286a of the rear cross member 286. In the present embodiment, the first rear mount 50 and the second rear mount 51 are assembled to the cabin 5. However, the present invention is not limited to this. For example, the first rear mount 50 and the second rear mount 51 attached to a beam member 67 and the second rear mount 51, as shown in the drawings.

The first seal 289 is provided over the lower surface side of the left end portion of the rear horizontal member 286 and the lower end portion of the first rear pillar portion 79. The second seal 290 is provided over the lower surface side of the right end portion of the rear horizontal member 286 and the lower end of the second rear column portion 80. The third seal 291 is provided over the first seal 289 and the second seal 290. The third seal 291 is provided on the rear side of the rear horizontal member 286 and on the rear side of the first rear mount 50 and the second rear mount 51. Further, in the present embodiment, the third seal 291 is constituted of two members of a front seal member 291A and a rear seal member 291B which is in contact with the rear surface of the front seal member 291A, and is fixed to the rear lower wall 286b (See FIG. 40).

Figure 38:
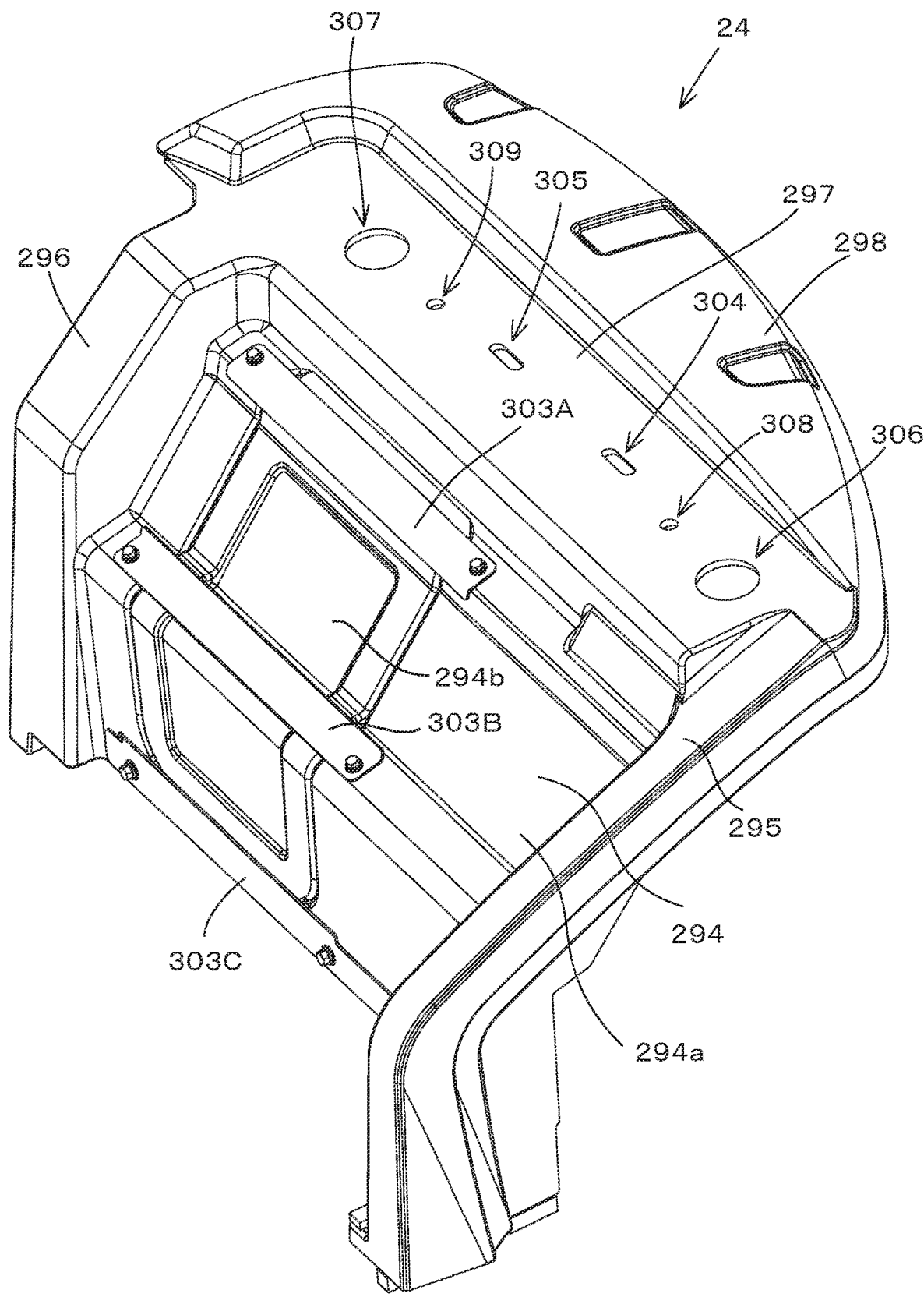
FIG. 38 is a perspective view illustrating a bonnet center.
Figure 39A:
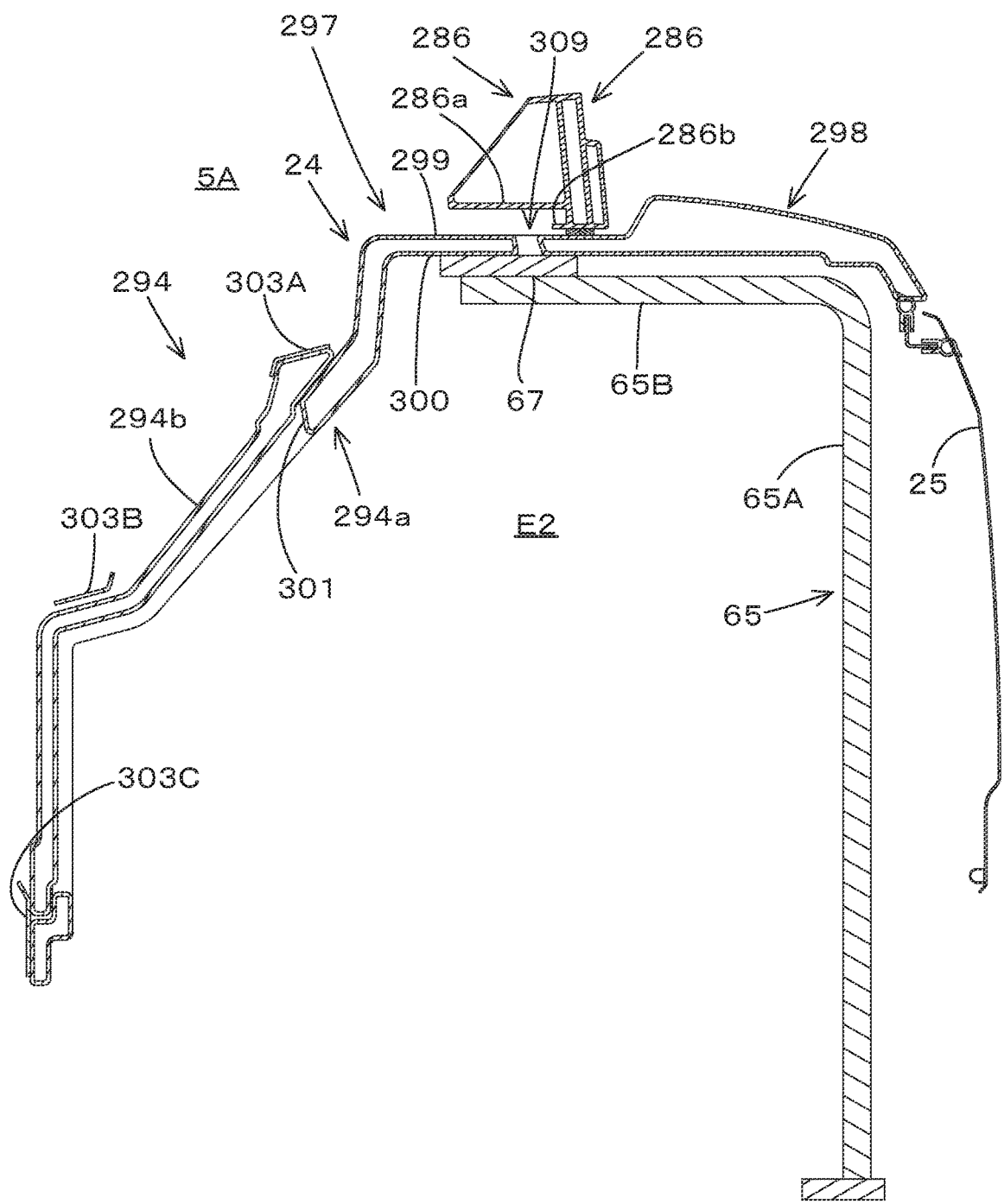
FIG. 39A is a side view illustrating a cross section of the bonnet center cut at a position of a second reinforcing portion.
Figure 39B:
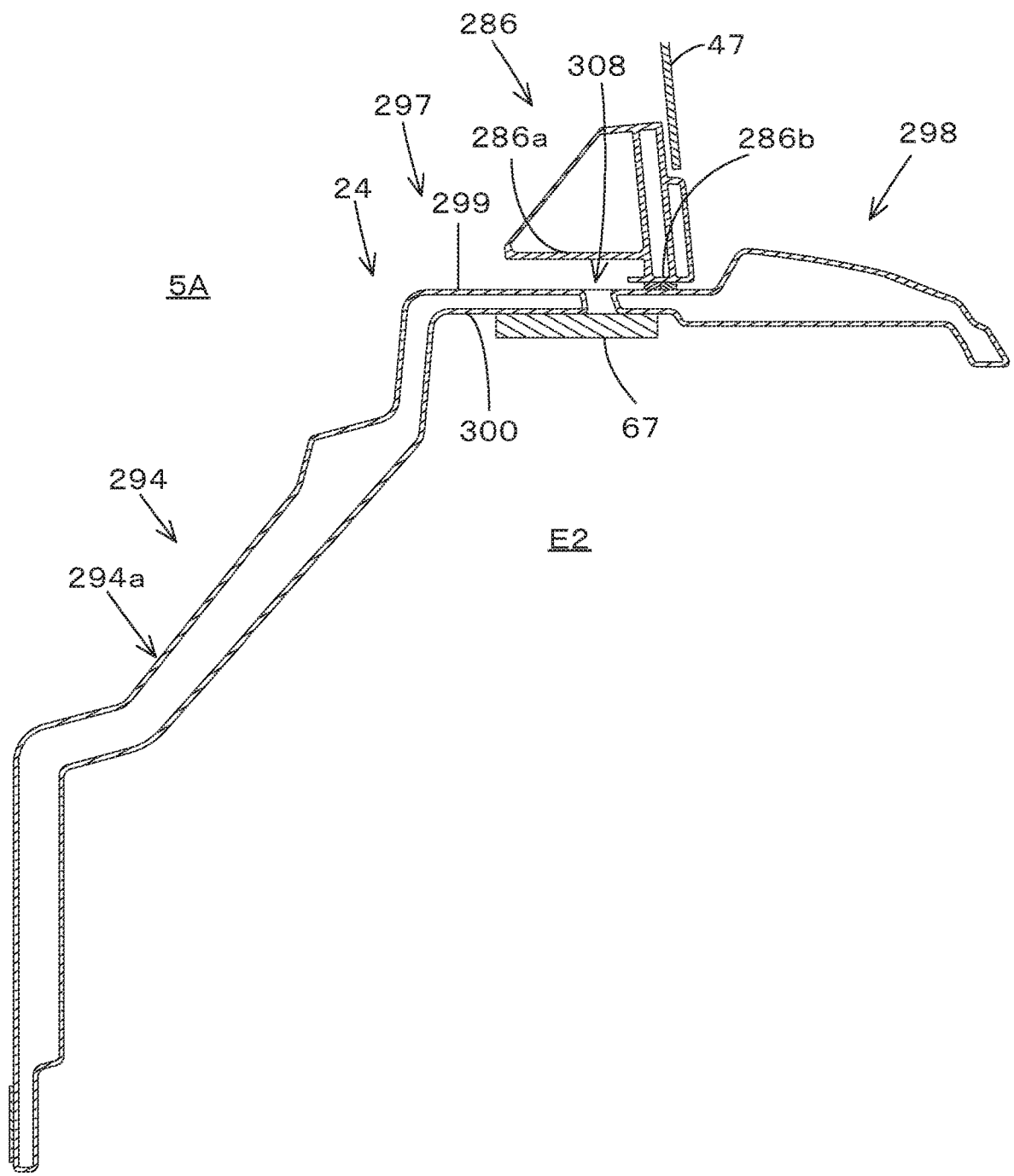
FIG. 39B is a side view illustrating a cross section of the bonnet center cut at a position of a first reinforcing portion.

As shown in FIG. 38, the bonnet center 24 has a front center part 294, a left side part 295, a right side part 296, a placing part 297, and a rear upper part 298. As shown in FIG. 39A, FIG. 39 B, and FIG. 42, the bonnet center 24 has a first wall portion 299 on the interior 5A side of the cabin 5 and a second wall portion 300 on the engine room E2 side, and is formed in a hollow structure having an air layer between the first wall portion 299 and the second wall portion 300. For example, the bonnet center 24 is formed of a synthetic resin product having a hollow structure formed by blow molding or rotational molding.

As shown in FIG. 4, the front center portion 294 is located at a position corresponding to the operator seat 6 (behind the operator seat 6). The left side portion 295 is located on the left side of the front center portion 294 and on the left side of the operator seat 6. The lower surface (see FIG. 6) of the rear portion of the first side surface portion 38 of the cabin 5 comes into contact with the left side portion 295 via the seal material 38a. The right side portion 296 is located on the right side of the front center portion 294 and on the right side of the operator seat 6. The lower surface (see FIG. 6) of the rear portion of the second side surface portion 39 is in contact with the right side portion 296 via the sealing material 39 a. As shown in FIG. 38 and FIG. 39A, the front center portion 294 is immersed than the left side portion 295, the right side portion 296 and the placing portion 297. In the main body portion 294a of the front center portion 294, a check opening 301 is formed. The inspection opening 301 is closed by a lid member 294b having a hollow structure from the front side, and the lid member 294b is pressed by a plurality of holding plates 303A, 303B, and 303C bolted to the main body portion 294a.

As shown in FIG. 38 and FIG. 39A, the mounting portion 297 extends rearward from the upper portion of the front center portion 294. Further, the placing portion 297 is provided between the upper portion of the left side portion 295 and the upper portion of the right side portion 296. The placing portion 297 is a portion constituting the upper surface side of the engine room E2 (covering the upper part of the engine E1), and is placed and supported on the beam member 67 (supporting portion). As shown in FIG. 1, the rear portion of the cabin 5 is placed on the placing portion 297. That is, the rear lower frame 53, the first rear pillar portion 79, and the second rear pillar portion 80 are placed via the first seal 289, the second seal 290 and the third seal 291.

As shown in FIG. 38, the rear upper portion 298 is provided on the right side and the rear side of the placing portion 297. The rear upper portion 298 constitutes the upper surface side of the engine room E2 together with the placement portion 297. The first wall portion 299 in the rear upper portion 298 is formed higher than the placement portion 297 (see FIG. 39B). Conversely, the first wall portion 299 of the placement portion 297 is recessed downward from the rear upper portion 298.

As shown in FIG. 38, the placing portion 297 includes a plurality of reinforcing portions (a first reinforcing portion 304, a second reinforcing portion 305), a plurality of installing portions (a first installing portion 306, a second installing portion 307), and a plurality of screw insertion portions (a first screw insertion portion 308 and a second screw insertion portion 309).

The first reinforcing portion 304 and the second reinforcing portion 305 are provided on the center side of the mounting portion 297 in the machine width direction K2. The first reinforcing portion 304 and the second reinforcing portion 305 are provided so as to be distributed to the left and the right with the center of the placement portion 297 in the body width direction K2 as a boundary. The first reinforcing portion 304 is located on the left side of the second reinforcing portion 305. The first installing portion 306 is provided on the left side of the placing portion 297. The second installation portion 307 is provided on the right side of the placement portion 297. That is, the reinforcing portions (the first reinforcing portion 304 and the second reinforcing portion 305) are provided between the first installation portion 306 and the second installation portion 307.

The first screw insertion portion 308 is provided between the first reinforcing portion 304 and the first installation portion 306. The second screw insertion portion 309 is provided between the second reinforcing portion 305 and the second installation portion 307. In other words, the reinforcing portions (the first reinforcing portion 304 and the second reinforcing portion 305) are provided between the first screw insertion portion 308 and the second screw insertion portion 309. Further, the first screw insertion portion 308 and the second screw insertion portion 309 are provided between the first installation portion 306 and the second installation portion 307. A plurality of reinforcing portions (a first reinforcing portion 304, a second reinforcing portion 305), a plurality of installation portions (a first installation portion 306, a second installation portion 307) and a plurality of screw insertion portions (a first screw insertion portion 308, a screw insertion portion 309) are formed side by side in the machine width direction K2.

Figure 41A:
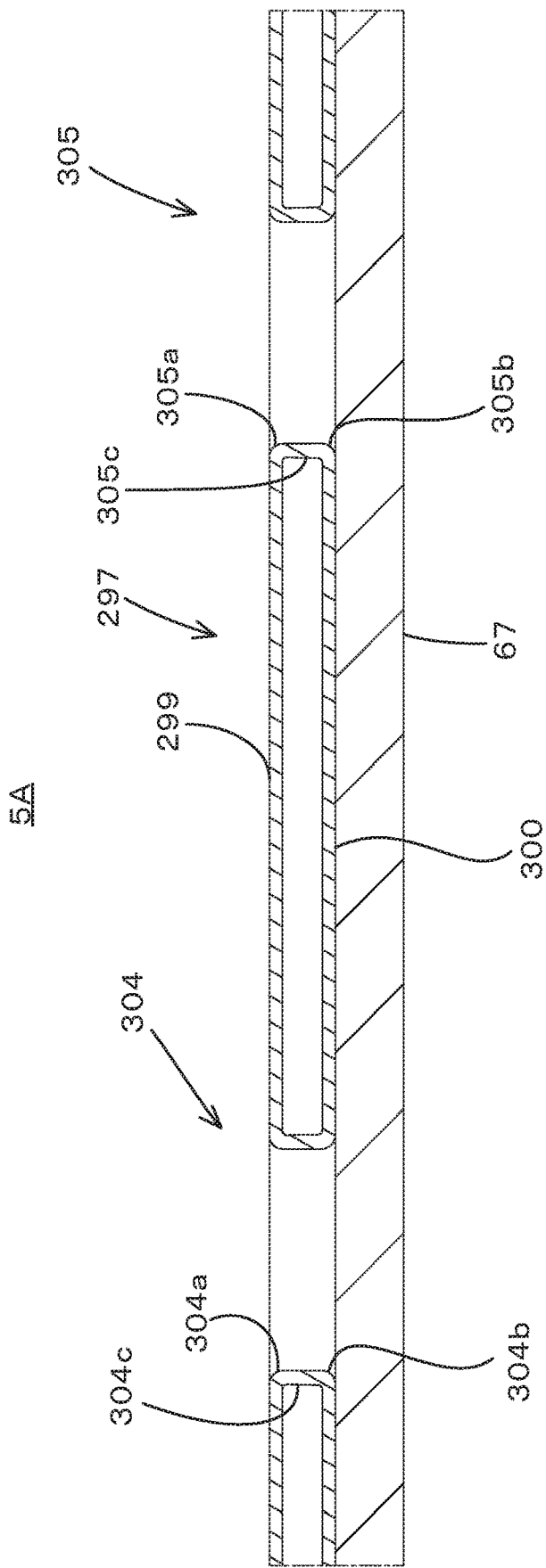
FIG. 41A is a rear view illustrating a cross section of the placement portion cut at a position of the reinforcing portion.

As shown in FIG. 40 and FIG. 41A, a third seal 291 is positioned behind the first reinforcing portion 304 and the second reinforcing portion 305. The third seal 291 abuts on the first wall portion 299 of the placing portion 297. That is, the rear portion of the cabin 5 has a sealing material that abuts against the first wall portion 299 of the placing portion 297. The second wall portion 300 of the placing portion 297 is in contact with the beam member 67 (supporting portion).

As shown in FIG. 40 and FIG. 41A, the first reinforcing portion 304 has a first hole edge portion 304a, a second hole edge portion 304b, and a rib wall 304c.

The first hole edge portion 304a is an annular edge portion formed through the first wall portion 299 of the placement portion 297. The first hole edge portion 304a is formed in a horizontally elongated oval shape (oblong shape) long in the machine width direction K2 in a plan view. The first hole edge portion 304a is located in the interior 5A of the cabin 5 in front of the third seal 291 (sealing material). A front lower wall 286a of the rear horizontal member 286 is positioned above the first hole edge 304a.

The second hole edge portion 304b is an annular edge portion formed through the second wall portion 300 of the placement portion 297. The second hole edge portion 304b is formed below (substantially directly below) the first hole edge portion 304a. The second hole edge portion 304b is formed in an oblong elliptical shape (elliptical shape) long in the machine width direction K2 in a plan view. The second hole edge portion 304 b is formed substantially in the same shape as the first hole edge portion 304a. The second hole edge portion 304 b is closed by the beam member 67 (support portion).

The rib wall 304 c is formed in a horizontally elongated elliptical cylindrical shape (long cylindrical shape) long in the machine width direction K2. The upper end of the rib wall 304c is connected to the circumferential edge of the first hole edge portion 304a. The lower end of the rib wall 304c is connected to the circumferential edge of the second hole edge 304b. Thus, the rib wall 304c connects the entire periphery of the circumferential edge of the first hole edge portion 304a and the entire circumferential edge of the circumferential edge of the second hole edge portion 304b. That is, the reinforcing portion reinforces the hollow structure by connecting the first wall portion 299 and the second wall portion 300.

As shown in FIG. 40 and FIG. 41 A, the second reinforcing portion 305 also has a first hole edge portion 305a, a second hole edge portion 305b, and a rib wall 305c. The first hole edge portion 305a is an annular edge portion formed through the first wall portion 299 of the placement portion 297. The first hole edge portion 305*a* is formed in a horizontally elongated oval shape (elliptical shape) long in the machine width direction K2 in a plan view. The first hole edge portion 305*a* is located in the interior 5A of the cabin 5 in front of the third seal 291 (sealing material). A front lower wall 286*a* of the rear horizontal member 286 is positioned above the first hole edge portion 305*a*.

The second hole edge portion 305*b* is an annular edge portion formed through the second wall portion 300 of the placement portion 297. The second hole edge portion 305*b* is formed below (substantially directly below) the first hole edge portion 305*a*. The second hole edge portion 305*b* is formed in an oblong elliptical shape (elliptical shape) elongated in the machine width direction K2 in a plan view. The second hole edge portion 305*b* is formed to have substantially the same shape as the first hole edge portion 305*a*. The second hole edge portion 305*b* is closed by the beam member 67 (support portion).

The rib wall 305*c* is formed in a horizontally elongated elliptical cylindrical shape (long cylindrical shape) elongated in the machine width direction K2. The upper end of the rib wall 305*c* is connected to the circumferential edge of the first hole edge portion 305*a*. The lower end of the rib wall 305*c* is connected to the circumferential edge of the second hole edge portion 305*b*. Thus, the rib wall 305*c* connects (connects) the entire periphery of the circumferential edge of the first hole edge portion 305*a* and the entire circumferential edge of the circumferential edge of the second hole edge portion 305*b*. That is, the reinforcing portion reinforces the hollow structure by connecting the first wall portion 299 and the second wall portion 300.

Figure 41B:
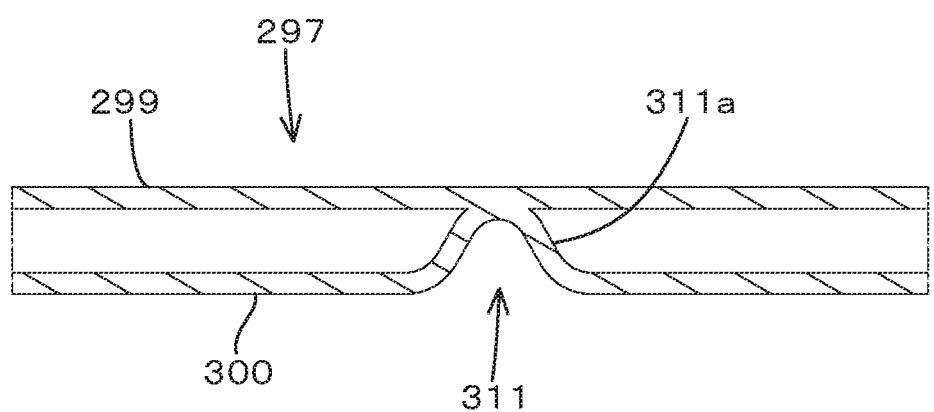
FIG. 41B is a cross-sectional view illustrating another example of the reinforcing portion.

Note that one reinforcing portion may be provided, or three or more reinforcing portions may be provided. At least one may be provided. Further, the reinforcing portion may be circular or polygonal in a plan view. Further, the place to be provided may be anywhere between the first installation portion 306 and the second installation portion 307. As shown in FIG. 41B, the reinforcing portion 311 may have a rib wall 311 *a* formed by recessing the second wall portion 300 of the placing portion 297 and connecting (connecting) to the first wall portion 299. In addition, the reinforcing portion may have a rib wall formed by concaving the first wall portion 299 and connecting (connecting) to the first wall portion 299.

As shown in FIG. 42 and FIG. 43, the first installation portion 306 is a portion in which the first rear mount 50 is provided (inserted). The first installation portion 306 has a third hole edge portion 306*a*, a fourth hole edge portion 306*b*, and a first cylindrical wall 306*c*. The third hole edge portion 306*a* is a circular annular edge portion formed through the first wall portion 299 of the placement portion 297. The third hole edge portion 306*a* is positioned in the interior 5A of the cabin 5 in front of the third seal 291 (sealing material). A front lower wall 286*a* of the rear cross member 286 is positioned above the third hole edge portion 306*a*. The fourth hole edge portion 306*b* is a circular annular edge portion formed through the second wall portion 300 of the placement portion 297. The fourth hole edge portion 306*b* is positioned below the third hole edge portion 306*a*. The first cylindrical wall 306*c* connects the entire periphery of the circumferential edge of the third hole edge portion 306*a* and the entire circumferential edge of the circumferential edge of the fourth hole edge portion 306*b*. The first rear mount 50 is inserted through the first installation portion 306 and placed in contact with the beam member 67 (support portion). In addition, the first rear mount 50 is attached via a bolt (stud bolt) 312 and a plurality of nut members 313A and 313B standing on the beam member 67 by being screwed into the first thread hole 68.

As shown in FIG. 42 and FIG. 43, the second installation portion 307 is a portion in which the second rear mount 51 is provided (inserted). The second installation portion 307 also has a third hole edge portion 307*a*, a fourth hole edge portion 307*b*, and a first cylindrical wall 307*c*. The third hole edge portion 307*a* is a circular annular edge portion formed through the first wall portion 299 of the placement portion 297. The third hole edge portion 307*a* is located in the interior 5A of the cabin 5 in front of the third seal 291 (seal material). A front lower wall 286*a* of the rear horizontal member 286 is positioned above the third hole edge portion 307*a*. The fourth hole edge portion 307*b* is a circular annular edge portion formed through the second wall portion 300 of the placement portion 297. The fourth hole edge portion 307*b* is positioned below the third hole edge portion 307*a*. The first cylindrical wall 307*c* connects the entire periphery of the circumferential edge of the third hole edge portion 307*a* and the entire circumferential edge of the circumferential edge of the fourth hole edge portion 30*b*. The second rear mount 51 is inserted through the second installation portion 307 and placed in contact with the beam member 67 (support portion). Further, the second rear mount 51 is attached via the stud bolt 314 and the plurality of nut members 315A and 315B standing on the beam member 67 by being screwed into the second thread hole 69.

As shown in FIG. 42 and FIG. 43, the first screw insertion portion 308 is a portion through which the first attachment member 316 is inserted. The first attachment member 316 is a member for attaching the placing portion 297 to the beam member 67 (support portion), and is constituted of bolts. The first screw insertion portion 308 has a fifth hole edge portion 308*a*, a sixth hole edge portion 308*b*, and a second cylindrical wall 308*c*. The fifth hole edge portion 308*a* is a circular annular edge portion formed through the first wall portion 299 of the placement portion 297. The fifth hole edge portion 308*a* is located in the interior 5A of the cabin 5 at the front of the third seal 291 (sealing material). A front lower wall 286*a* of the rear horizontal member 286 is positioned above the fifth hole edge portion 308*a*. The sixth hole edge portion 308*b* is a circular annular edge portion formed through the second wall portion 300 of the placement portion 297. The sixth hole edge portion 308*b* is positioned below the fifth hole edge portion 308*a*. The second cylindrical wall 308*c* connects the entire periphery of the circumferential edge of the fifth hole edge portion 308*a* and the entire circumferential edge of the circumferential edge of the sixth hole edge portion 308*b*.

A sleeve 317 is provided in the first screw insertion portion 308. A washer 318 is provided above the sleeve 317. The first mounting member 316 is screwed into the third thread hole 70 by inserting the washer 318 and the sleeve 317 from above.

As shown in FIG. 42 and FIG. 43, the second screw insertion portion 309 is a portion through which the second attachment member 319 is inserted. The second attachment member 319 is a member for attaching the placing portion 297 to the beam member 67 (support portion), and is constituted of bolts. The second screw insertion portion 309 also has a fifth hole edge portion 309*a*, a sixth hole edge portion 309*b*, and a second cylindrical wall 309*c*. The fifth hole edge portion 309*a* is a circular annular edge portion formed through the first wall portion 299 of the placement portion 297. The fifth hole edge portion 309*a* is located in the interior 5A of the cabin 5 in front of the third seal 291 (sealing material). A front lower wall 286*a* of the rear horizontal member 286 is positioned above the fifth hole edge portion 309a. The sixth hole edge portion 309b is a circular annular edge portion formed through the second wall portion 300 of the placement portion 297. The sixth hole edge portion 309b is positioned below the fifth hole edge portion 309a. The second cylindrical wall 309c connects the entire periphery of the circumferential edge of the fifth hole edge portion 309a and the entire circumferential edge of the circumferential edge of the sixth hole edge portion 309b.

A sleeve 320 is provided in the second screw insertion portion 309. A washer 321 is provided above the sleeve 320. The first mounting member 316 is screwed into the fourth thread hole 71 by inserting the washer 321 and the sleeve 320 from above.

The second mounting member 319 is provided at a distance from the first mounting member 316 in the machine width direction K2. The first mounting member 316 and the second mounting member 319 are positioned between the first installation portion 306 and the second installation portion 307, and the reinforcing portions 304 and 305 are disposed between the first mounting member 316 and the second mounting member 319.

Next, the hinge structure 326 supporting the rear bonnet 25 will be described.

As shown in FIG. 44 to FIG. 48, the hinge structure body 326 has a fixed hinge 327, a hinge shaft 328, a movable hinge 329, and a lock lever 330. The hinge structure 326 is disposed inside the left side of the rear bonnet 25.

Figure 44:
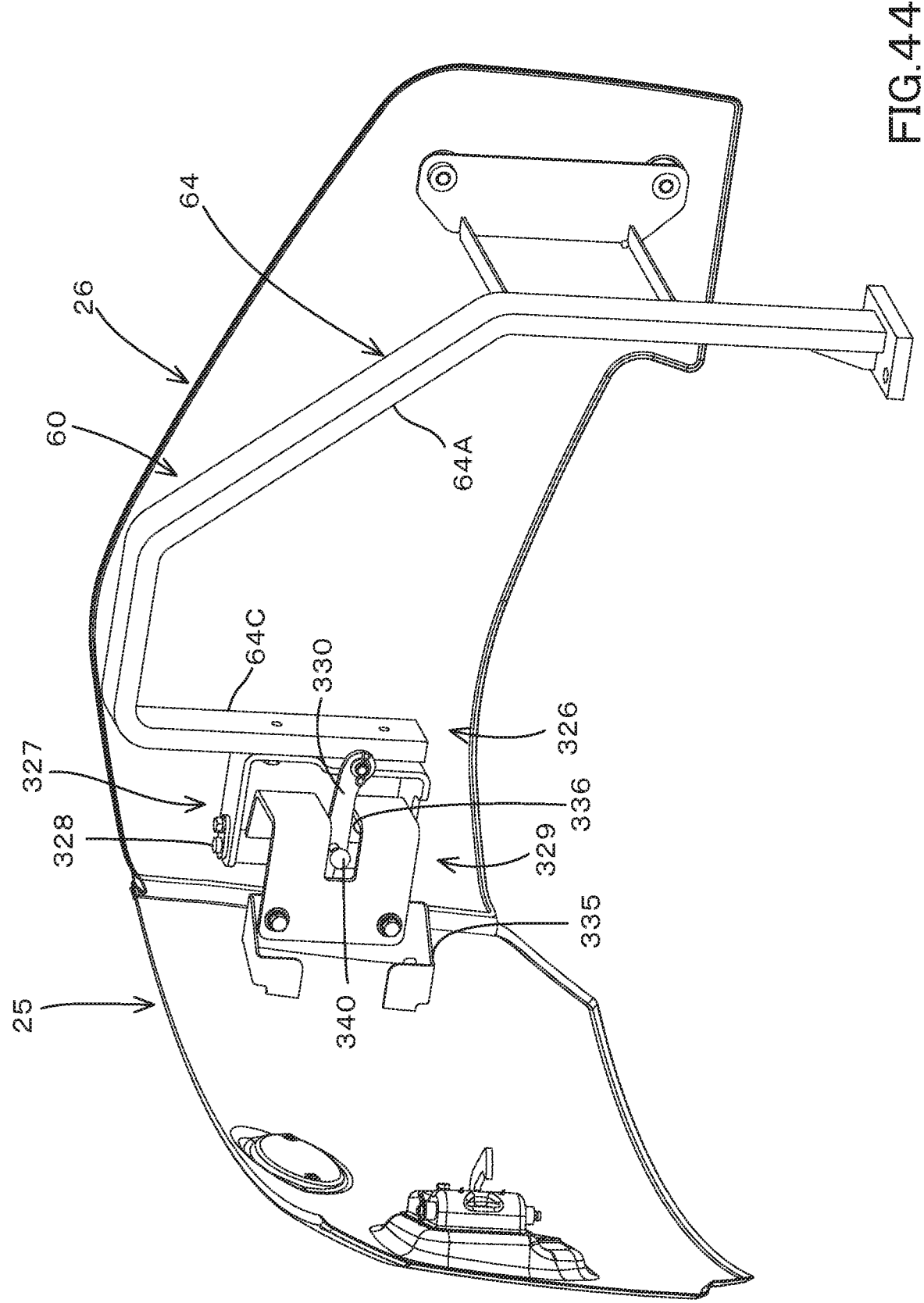
FIG. 44 is a perspective view illustrating a rear bonnet in view from the inside.

As shown in FIG. 44, the fixing hinge 327 is fixed to the support frame 60 (the first leg 64). As shown in FIG. 45 to FIG. 48, the fixed hinge 327 is formed of a plate material and has a vertical wall 327a, an upper wall 327b, and a lower wall 327c. The vertical wall 327a is superimposed on the rear surface of the hanging portion 64C of the first leg 64 and fixed by bolts.

The lower portion of the vertical wall 327a protrudes rightward from the suspended portion 64C, and the lever shaft 331 is fixed to the projecting portion so as to project rightward. The lever shaft 331 has an axis extending in the machine width direction K2. The upper wall 327b extends rearward from the upper portion of the vertical wall 327a. The lower wall 327c extends rearward from the lower portion of the vertical wall 327a. And the lower wall 327c is positioned below the upper wall 327b.

Figure 45:
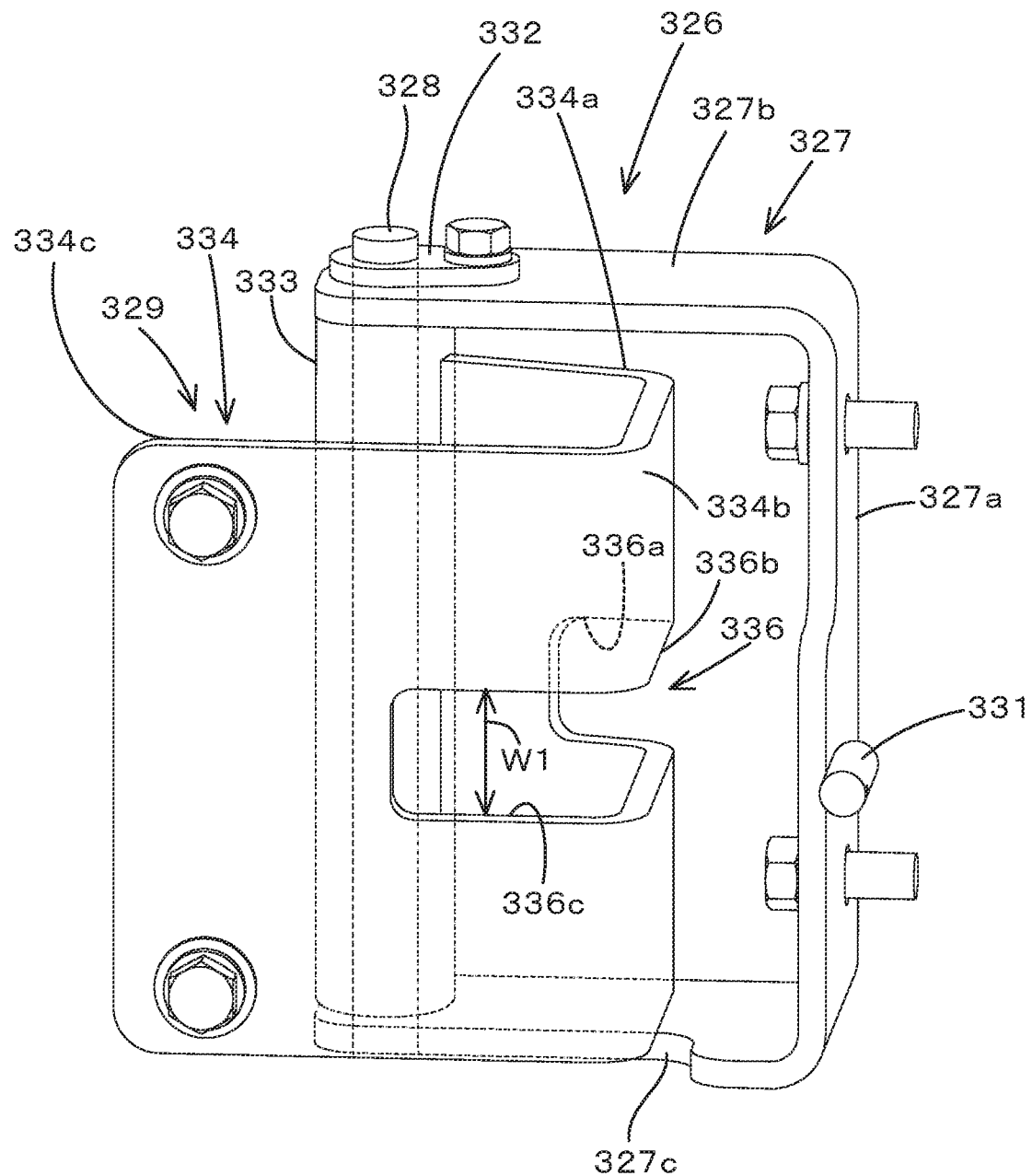
FIG. 45 is a perspective view illustrating a hinge structure.

As shown in FIG. 45, the hinge shaft 328 extends from the upper wall 327b to the lower wall 327c in the upward and downward directions. A fixing plate 332 is fixed to the upper end of the hinge shaft 328. The fixing plate 332 is bolted to the upper wall 327b.

As shown in FIG. 45 to FIG. 48, the movable hinge 329 has a rotating cylinder 333 and a movable piece 334. The rotary cylinder 333 is provided between the upper wall 327b of the fixed hinge 327 and the rear portion of the lower wall 327c. A hinge shaft 328 is inserted through the rotating cylinder 333. The rotating cylinder 333 is freely rotatable about the axis of the hinge shaft 328. The movable piece 334 is formed of a plate material and has a base wall 334a, an extending wall 334b, and a attaching wall 334c. One end of the base wall 334a in a direction along the plate surface and orthogonal to the vertical direction is fixed to the rotating cylinder 333. Thus, the base wall 334a protrudes radially outward from the rotary cylinder 333. The extending wall 334b extends from an end portion of the base wall 334a in the projecting direction in a direction intersecting the projecting direction. The attaching wall 334c extends from an end of the extending wall 334b in the extending direction in a direction opposite to the protruding direction of the base wall 334a. As shown in FIG. 44, an attaching bracket 335 is fixed to the left inner surface of the rear bonnet 25. The extension side of the attaching wall 334c is fixed to the attaching bracket 335. That is, the movable hinge 329 is fixed to the rear bonnet 25. The movable hinge 329 is attached to the fixed hinge 327 so as to be rotatable around the longitudinal axis so as to open and close the rear bonnet 25.

As shown in FIG. 45 to FIG. 48, the movable piece 334 (movable hinge 329) has a locking groove 336. The locking groove 336 is formed in an intermediate portion in the vertical direction of the movable piece 334. In addition, the locking groove 336 is formed continuously over the base wall 334 a, the extending wall 334 b, and the attaching wall 334c. The locking groove 336 is formed by an annular edge formed through the movable piece 334. The locking groove 336 has a first groove portion 336a which is a portion formed on the base portion wall 334a, a second groove portion 336b which is a portion formed on the extension wall 334b, and a third groove portion 336c which is a portion formed on the attachment wall 334c.

Figure 47:
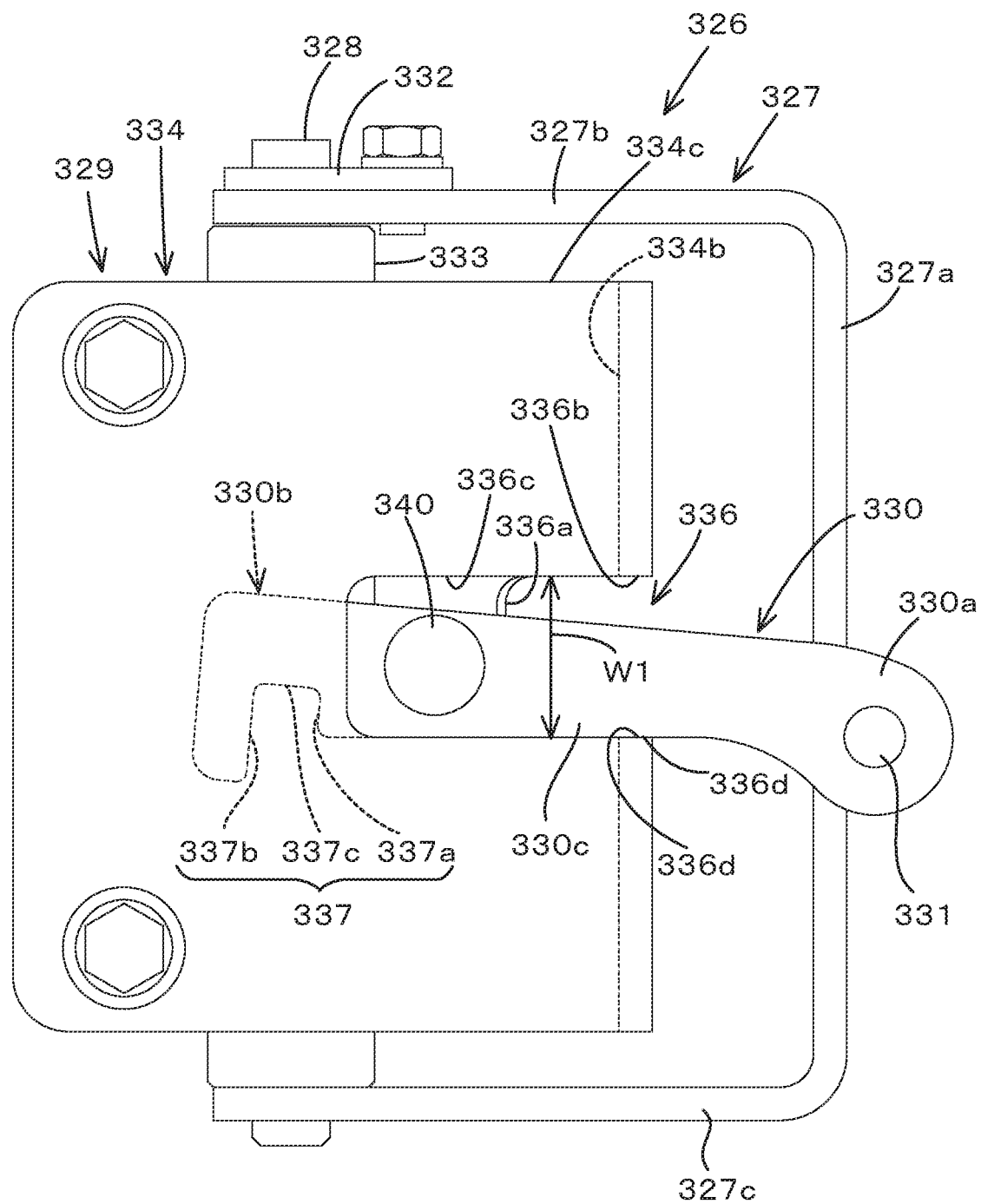
FIG. 47 is a side view illustrating the hinge structure under a state in which the rear bonnet is closed.
Figure 48:
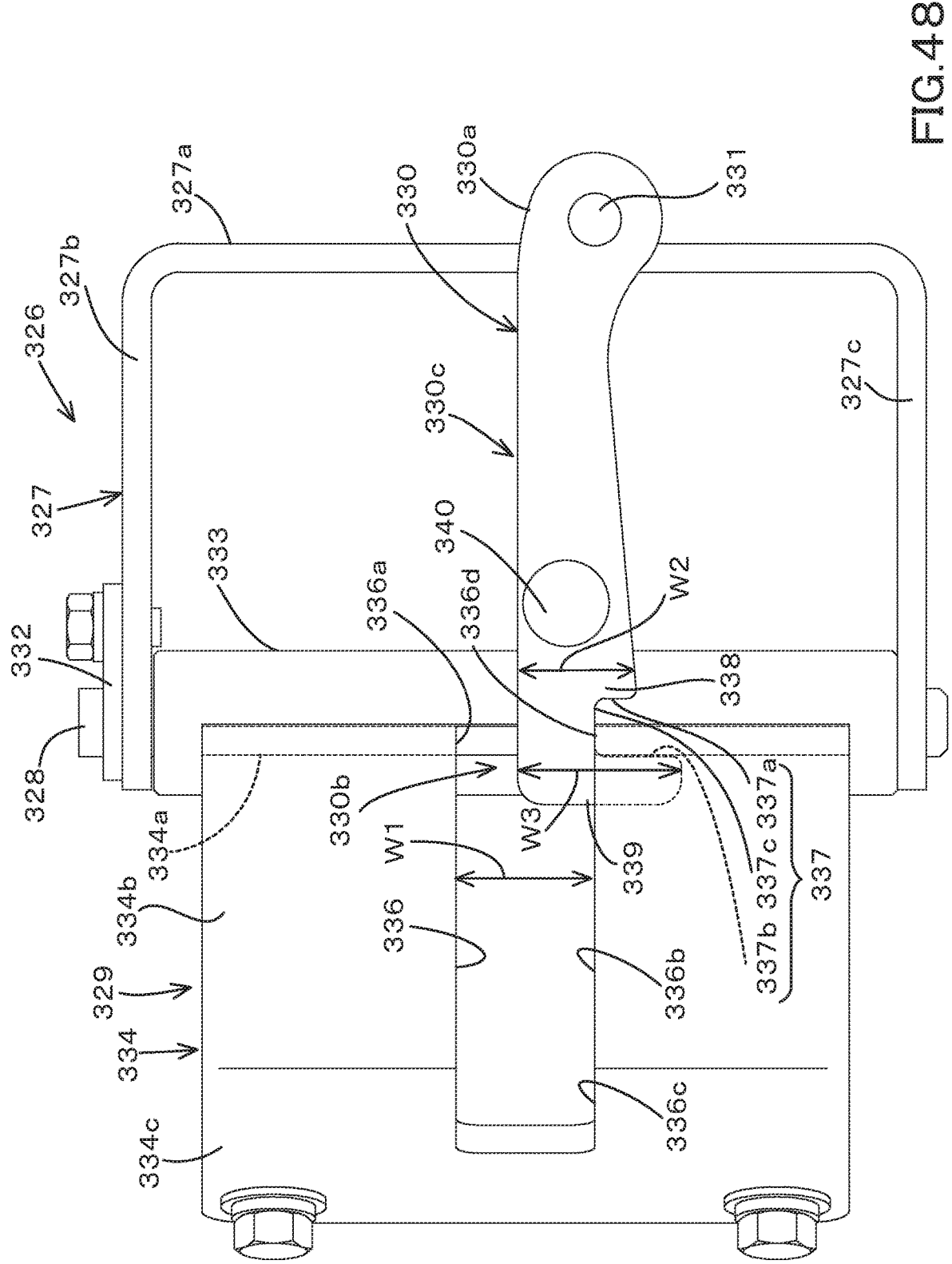
FIG. 48 is a side view illustrating the hinge structure under a state in which the rear bonnet is opened.

As shown in FIG. 45, FIG. 47, and FIG. 48, the width W1 (upper and lower widths) of the locking groove 336 is formed to be the same width over the length direction of the groove.

Figure 46:
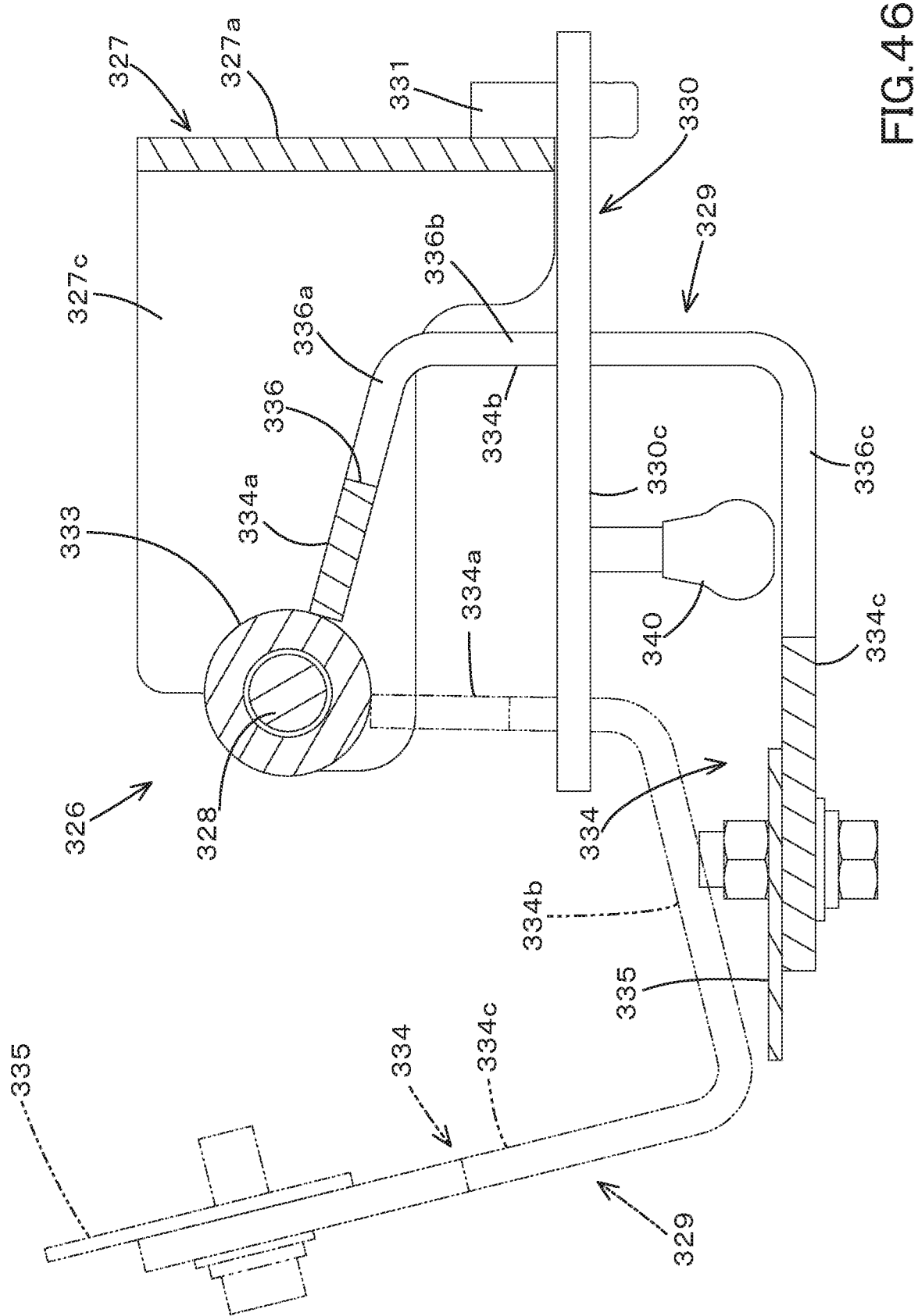
FIG. 46 is a plan view illustrating a cross section of the hinge structure.

As shown in FIG. 46 to FIG. 48, the lock lever 330 is a member that maintains a state in which the rear bonnet 25 is open. The lock lever 330 is formed of a plate material whose plate surface faces the machine width direction K2 and is long in the front-rear direction. The lock lever 330 has a base end portion 330a (front portion) on the proximal end side, a distal end portion 330b (rear portion) on the distal end side, and an intermediate portion 330c between the proximal end portion 330a and the distal end portion 330b. The base end portion 330a is supported on the lever shaft 331 so as to be rotatable around the axis center. As a result, the locking lever 330 is pivotally supported at the base end portion 330a toward the fixed hinge 327 side, and is capable of rocking up and down about the lever shaft 331. In addition, the lock lever 330 protrudes rearward from the vertical wall 327a and passes through the locking groove 336. That is, the movable hinge 329 has a locking groove 336 through which the lock lever 330 is inserted.

The distal end portion 330b is provided with a locking portion 337. The locking portion 337 is constituted of a groove in a downward opened state and is fitted to the lower edge portion (lower edge portion of the first groove portion 336a) of the locking groove 336 in a state where the rear bonnet 25 is opened. As a result, rotation of the movable hinge 329 is restricted in a state where the rear bonnet 25 is opened. That is, the lock lever 330 has a locking portion 337 that restricts the rotation of the movable hinge 329 in a state where the rear bonnet 25 is opened by being fitted to the lower edge portion of the locking groove 336.

The locking portion 337 has a first groove edge portion 337a closer to the base end portion 330a, a second groove edge portion 337b opposed to the first groove edge portion 337a, a first groove edge portion 337a and a second groove edge portion 337b and a third groove edge portion 337c which connects the upper ends of the first groove edge portions 335c. The second groove edge portion 337b is formed to be longer downward than the first groove edge portion 337a.

As shown in FIG. 48, in a state in which the locking portion 337 is fitted to the lower edge portion of the locking groove 336, the relation between the width W1 in the vertical direction of the locking groove 336, the width W2 in the vertical direction of the base end side portion 338 which is the portion closer to the base end side of the lock lever 330 than the engaging portion 337, the width W3 in the vertical direction of the tip end side portion 339 which is the portion closer to the tip end side of the lock lever 330 than the engaging portion 337 is the width W3>width W1>width W2. That is, the width W2 of the base end side portion 338 is shorter than the width of the locking groove 336, and the width W3 of the tip side portion 339 is longer than the width of the locking groove 336 than the locking portion 337.

As shown in FIG. 46, a grasping member 340 is provided in the middle portion 330c of the lock lever 330. The grip member 340 protrudes rightward from the right side surface of the lock lever 330. The grip member 340 may be provided on the base end portion side 330a of the lock lever 330.

As shown in FIG. 47, when the rear bonnet 25 is closed, the lower surface 330d of the middle portion 330c of the lock lever 330 contacts the lower edge portion 336d (the lower edge portion of the second groove portion 336b) of the locking groove 336. The rear bonnet 25 can move in the opening and closing direction by the lower surface 330d of the middle portion 330c of the lock lever 330 sliding on the lower edge portion 336d of the locking groove 336. As shown in FIG. 46, when the rear bonnet 25 is closed, as indicated by the solid line, the grip member 340 is positioned on the left side of the attachment wall 334c.

As shown in FIG. 46, when the rear bonnet 25 is opened from the closed state, the movable hinge 329 moves from the closed position indicated by the solid line to the open position indicated by the imaginary line. As shown in FIG. 48, in a state in which the rear bonnet 25 is opened, the locking portion 337 coincides with the lower edge portion 336d (the lower edge portion of the first groove portion 336a) of the locking groove 336, and the locking portion 337 and fits into the lower edge portion 336d of the stop groove 336. As a result, movement in the opening and closing direction is regulated in a state where the rear bonnet 25 is opened. When the rear bonnet 25 is opened, the movable hinge 329 is positioned behind the gripping member 340 and can grip the gripping member 340.

Figure 49:
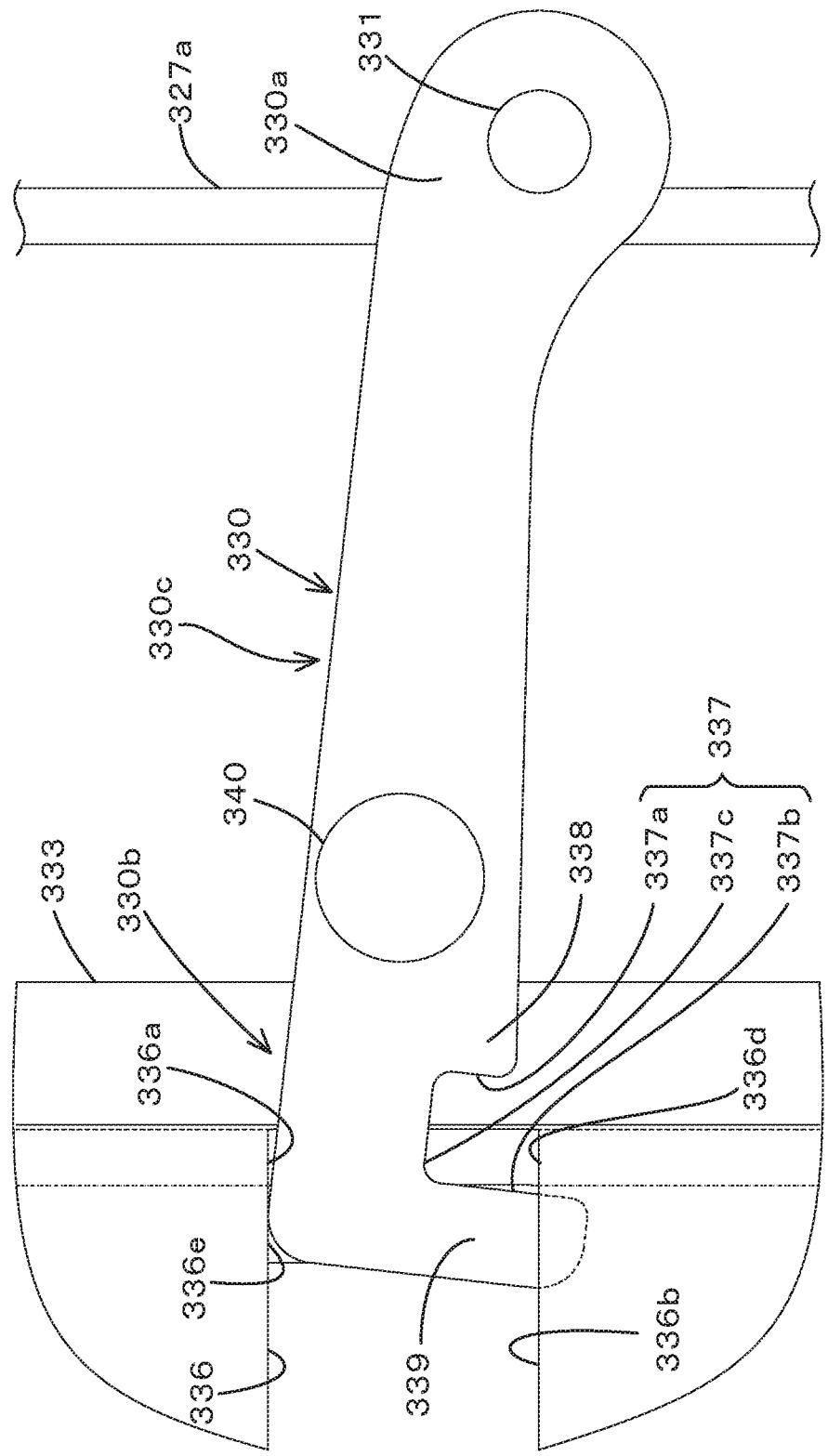
FIG. 49 is a side view illustrating a state in which a lock lever is pulled up with the rear bonnet opened.

To close the rear bonnet 25 from the opened state, hold the grip member 340 and pull up the lock lever 330. As shown in FIG. 49, since the lower end of the base end side portion 338 is located above the lower edge portion 336d (the lower edge portion of the first groove portion 336a) of the locking groove 336, the movable hinge 329 is inserted into the rear hood (in a position indicated by a solid line in FIG. 46) in the closing direction of the upper arm 25 (see FIG. 46). Thereby, the rear bonnet 25 can be closed.

As shown in FIG. 49, in a state in which the rear bonnet 25 is opened, the lock lever 330 is pulled up and the upper end of the front end portion 330b abuts against the upper edge portion 336e (the upper edge portion of the first groove portion 336a) of the locking groove 336. Then, the upward swing of the lock lever 330 is restricted. In this state, the lower end of the distal end side portion 339 is positioned lower than the upper surface of the lower edge portion 336d of the engaging groove 336. As a result, the movement of the movable hinge 329 in the opening direction of the rear bonnet 25 is regulated by the distal end side portion 339. That is, the rear bonnet 25 does not move further in the opening direction from the position where the movement in the opening direction is regulated by the lock lever 330.

In the present embodiment, the working machine 1 includes a machine body 2, a cabin 5 mounted on the machine body 2, an engine E1 disposed on the rear side of the cabin 5, an engine room accommodating the room 5A of the cabin 5 and the engine E1 (the bonnet center 24) for separating the covering member E1 and the covering member E2 from each other. The working machine 1 has a covering member (bonnet center 24) of a hollow structure having a first wall portion 299 disposed on the side of the cabin 5 and a second wall portion 300 arranged on the side of the engine E1, a support part (beam member 67) for supporting the rear part of the cabin 5 arranged on the member, a first rear mount 50 for supporting one of the rear part of the cabin 5 on the support part, a rear part of the cabin 5, and a second rear mount 51 for supporting the other side of the rear portion of the cabin 5 on the supporting portion. The covering member includes a first installation portion 306 on which the first rear mount 50 is disposed, a second installation portion 307 on which the second rear mount 51 is disposed, a space between the first installation portion 306 and the second installation portion 307, and at least one reinforcing portion (first reinforcing portion 304, second reinforcing portion 305, reinforcing portion 311) which reinforces the hollow structure by connecting the first wall portion 299 and the second wall portion 300 to each other.

This reinforces the strength of the covering member (the bonnet center 25) and prevents the covering member from being recessed by the weight of the cabin 5.

The reinforcing portions 304 and 305 are formed by first hole edge portions 304a and 305a which are edge portions of the through hole formed in the first wall portion 299 and edge portions of the through hole formed in the second wall portion 300, second hole edge portions 304b and 305b, and a tubular rib walls 304c and 305c connecting the first hole edge portions 304a and 305a, and the second hole edge portions 304b and 305b. Thereby, the covering member (mounting portion 297) can be firmly reinforced. In addition, molding is easy.

Further, it has a sealing material (third seal 291) for sealing between the rear portion of the cabin 5 and the covering member, and the reinforcing portions 304 and 305 are edge portions of the through hole formed in the first wall portion 299, the first hole edge portions 304a and 305a and the second hole edge portions 304b and 305b which are the edge portions of the through hole formed in the second wall portion 300. The first hole edge portions 304a and 305a are seal members (The third seal 291) of the cabin 5, and the second hole edge portions 304b and 305b are closed by the support portion (the beam member 67). Since the first hole edges 304a and 305a are located in front of the sealant (the third seal 291) and in the interior 5A of the cabin 5, during car washing or the like, the first hole edges 304a and 305a are formed in the reinforcing portion, thus the water can be prevented from entering. Since the second hole edge portions 304b and 305b are closed with the support portion (the beam member 67), the sound on the engine room E2 side propagates toward the cabin 5 side through the reinforcing portions 304 and 305 can be suppressed.

In addition, the reinforcing portions 304 and 305 are elliptical shapes long in the machine width direction K2. By forming the reinforcing portions 304 and 305 in an oval shape long in the machine direction width direction K2, the mounting portion 297 can be effectively reinforced.

Further, it has a plurality of reinforcing portions (a first reinforcing portion 304 and a second reinforcing portion 305) provided at intervals in the machine width direction K2. Thereby, the covering member (placing portion 297) can be effectively reinforced.

Further, the first attachment member 316 for attaching the covering member to the support portion (the beam member 67), the attachment member for attaching the covering member to the support portion (the beam member 67), and the attachment member for attaching the covering member to the first attachment member 316, and a second attachment member 319 provided at an interval from the first attachment member 316. The first attachment member 316 and the second attachment member 319 are positioned between the first placement portion 306 and the second placement portion 307, the portions 304 and 305 are positioned between the first attachment member 316 and the second attachment member 319. Thereby, the covering member (placing portion 297) can be effectively reinforced.

The working machine further includes a rear bonnet 25 covering the rear of the engine E1, a fixed hinge 327 fixed to the support frame 60 (machine body 2), a fixed hinge 327 fixed to the rear bonnet 25 and opening and closing the rear bonnet 25, a movable hinge 329 mounted so as to be rotatable about a vertical axis, and a lock lever 330 for maintaining a state in which the rear bonnet 25 is opened. The movable hinge 329 has a locking groove 336 through which the lock lever 330 is inserted. The locking lever 330 has a base end 330 $a$ pivotally supported on the fixed hinge 327 side so as to be swingable about a lateral axis and is fitted to the lower edge 336 $d$ of the locking groove 336 so that the movable hinge 329 and a locking portion 337 for restricting the rotation of the lever. In a state in which the locking portion 337 is fitted to the lower edge portion 336 $d$ of the locking groove 336, the lock lever 330 has a width W2 in the vertical direction of the base end side portion 338, which is a portion on the base end side from the locking portion 337 is smaller than the width W1 in the vertical direction of the locking groove 336 and the width W3 in the vertical direction of the front end portion 339 which is a portion on the tip side of the locking portion 337 is larger than the vertical width W1 of the locking groove 336.

When the rear bonnet 25 is opened, when the lock lever 330 is pulled up and the upper end abuts against the upper edge of the locking groove 336, the upward swing of the lock lever 330 is restricted. In this state, the lower end of the distal end side portion 339 is positioned lower than the upper surface of the lower edge portion of the engagement groove 336. As a result, the movement of the movable hinge 329 in the opening direction of the rear bonnet 25 is regulated by the distal end side portion 339. That is, the rear bonnet 25 does not move further in the opening direction from the position where the movement in the opening direction is restricted by the lock lever 330, and it is possible to prevent the rear bonnet 25 from being excessively opened.

Next, the supporting structure of the oil cooler O1 will be described.

Figure 50:
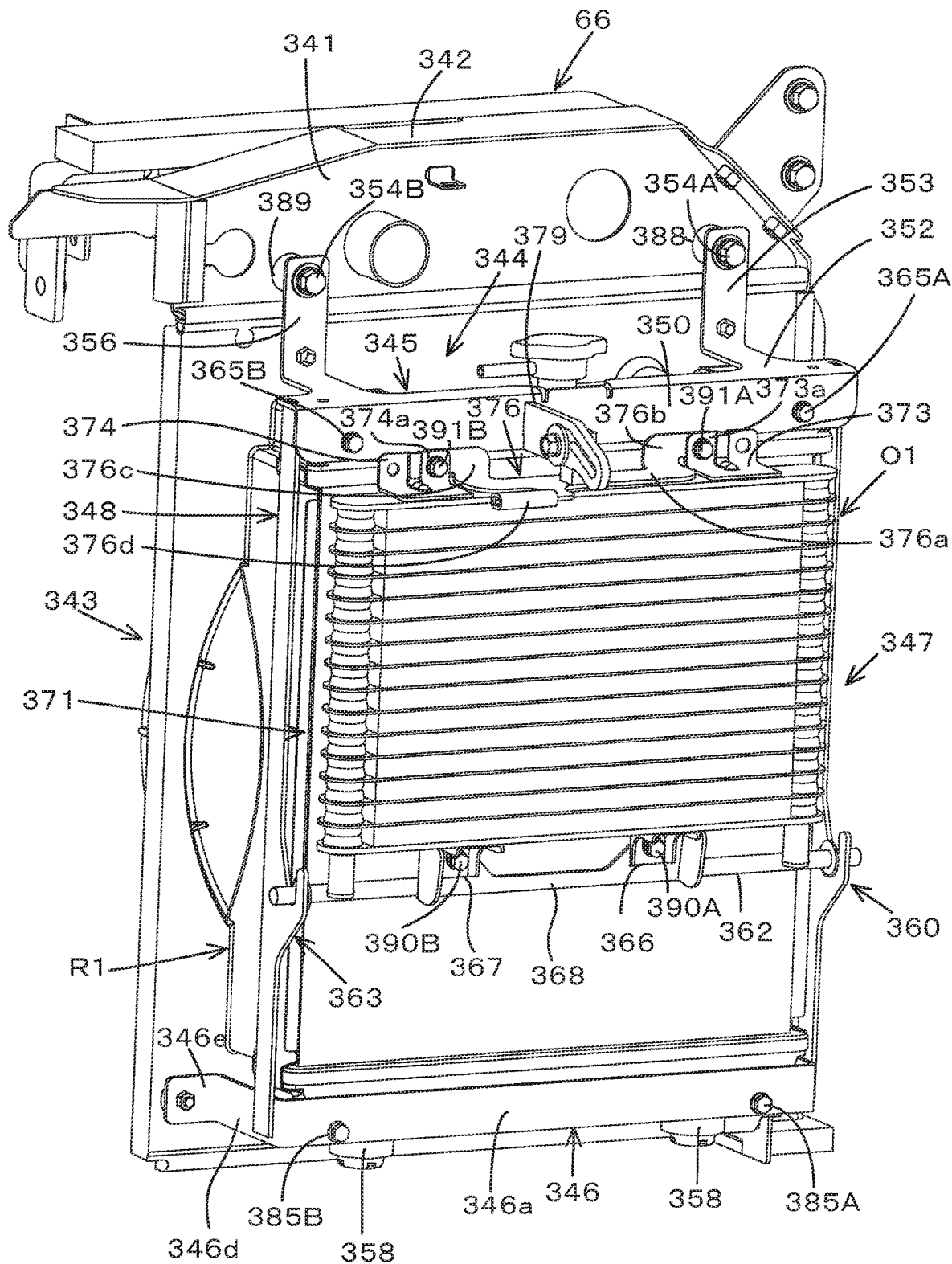
FIG. 50 is a perspective view illustrating a state in which a radiator and an oil cooler are installed.

As shown in FIG. 50, a partition member 341 is provided on the upper portion of the third leg 66 of the support frame 60. The partition member 341 constitutes a part of a partition that partitions the arrangement side of the engine E1 and the arrangement side of the radiator R1 and the oil cooler O1. The partition member 341 is fixed to a fixing plate 342 attached to the third leg 66. A shroud 343 covering the cooling fan is provided below the partition member 341. A radiator R1 is disposed outside (right) the shroud 343. A support frame 344 is attached to the radiator R1.

Figure 51:
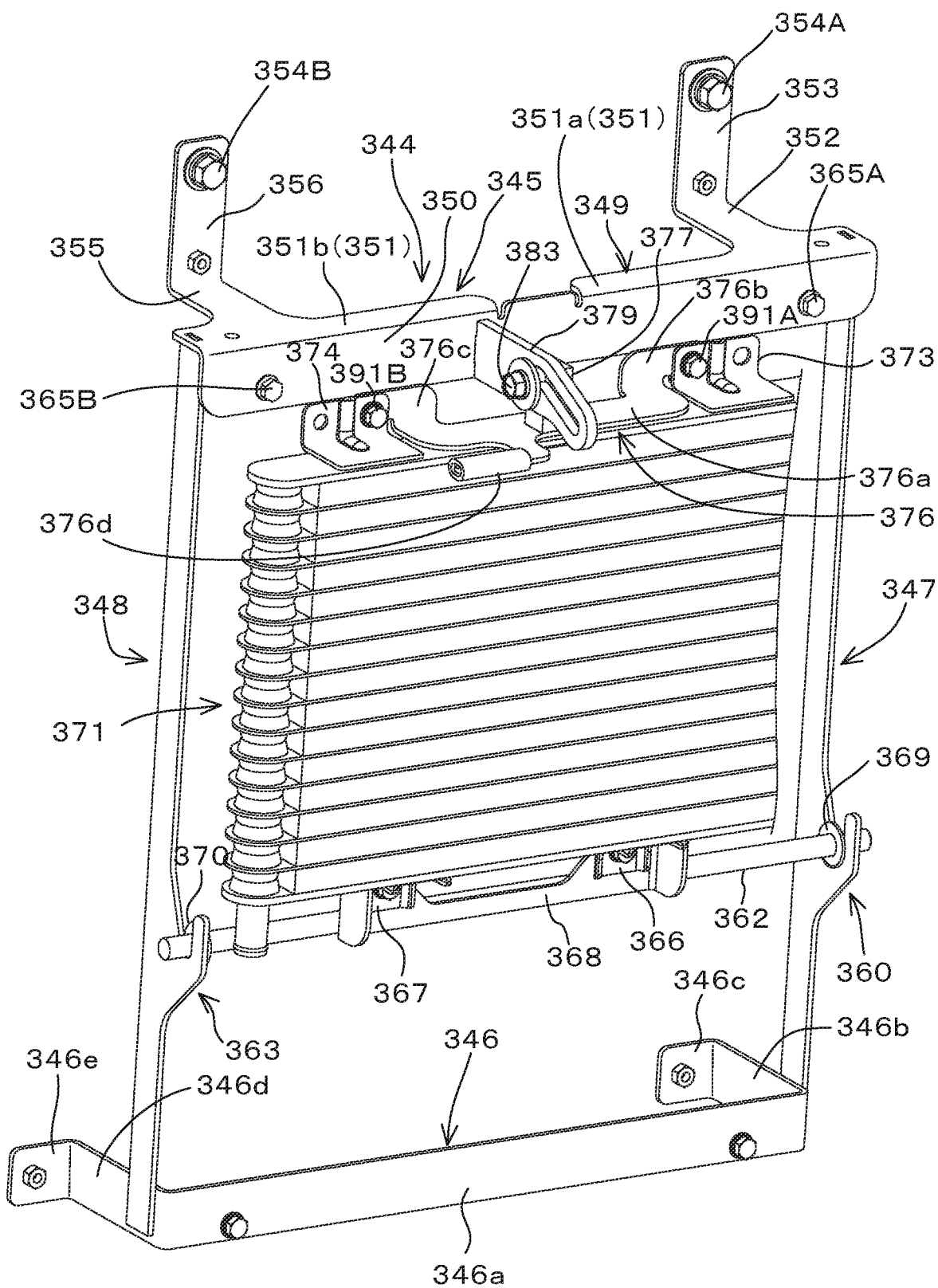
FIG. 51 is a perspective view illustrating a state in which the oil cooler is fixed to a supporting frame.

As shown in FIG. 51, the support frame 344 includes an upper frame 345, a lower frame 346 disposed below the upper frame 345, and a second frame 345 that connects one ends (front end portions) of the upper frame 345 and the lower frame 346, the first vertical frame 347 and a second vertical frame 348 connecting the other ends (rear end portions) of the upper frame 345 and the lower frame 346.

Figure 52:
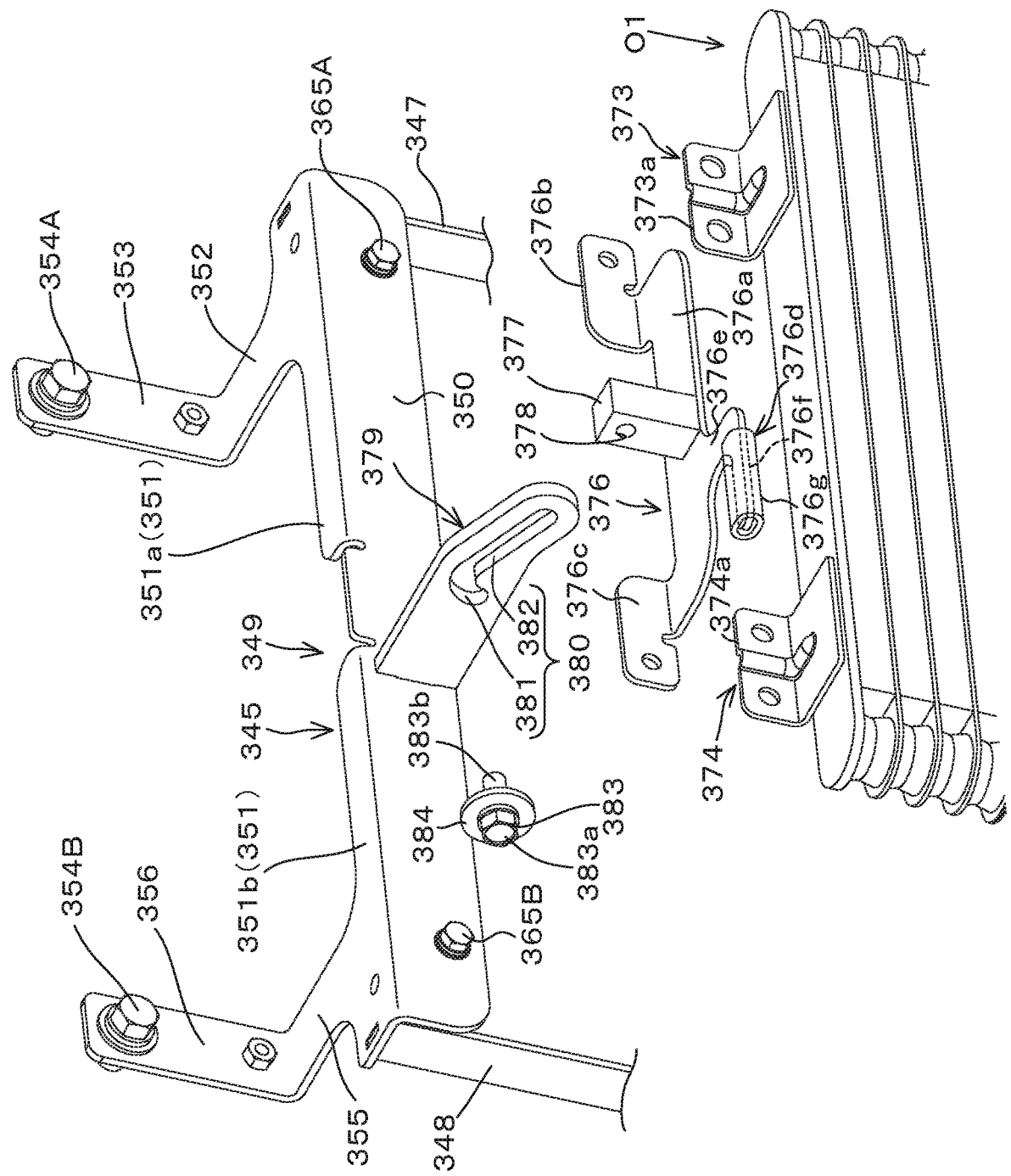
FIG. 52 is an exploded perspective view illustrating an installation portion of an upper portion of the oil cooler.

As shown in FIG. 50, the upper frame 345 is provided on the upper side of the radiator R1. The upper frame 345 has a main frame portion 349 provided along the upper portion of the radiator R1. As shown in FIG. 52, the main frame portion 349 has a side wall 350 and an upper wall 351.

As shown in FIG. 50, the side wall 350 is provided along the right side portion of the upper portion of the radiator R1. The front portion of the side wall 350 is fixed to the radiator R1 by bolts 365A and the rear portion thereof is fixed to the radiator R1 by bolts 365B. That is, the upper part of the radiator R1 is fixed to the upper frame 345.

As shown in FIG. 52, the upper wall 351 has a first portion 351$a$ extending from the front portion of the side wall 350 toward the inside of the body (leftward), a first portion 351 $a$ extending from the rear portion of the side wall 350 toward the inside of the machine (leftward) And a second portion 351$b$ to be formed. The upper wall 351 is located above the radiator R1 (see FIG. 50). At a front portion of the first portion 351$a$, a first extending portion 352 extending inward of the machine body is provided. A first stay portion 353 extends upward from the extending end portion of the first extending portion 352. The first stay portion 353 is fixed to a boss portion 388 provided on the partition member 341 by a bolt 354A.

On the rear portion of the second portion 351$b$, a second extending portion 355 extending inward of the machine body is provided. A second stay portion 356 extends upward from the extending end portion of the second extending portion 355. The second stay portion 356 is fixed to a boss portion 389 provided on the partition member 341 by a bolt 354B. The upper frame 345 is attached to the support frame 60 by the first stay portion 353 and the second stay portion 356.

As shown in FIG. 50, the lower frame 346 is provided on the lower side of the radiator R1. As shown in FIG. 51, the lower frame 346 has a first wall 346$a$, a second wall 346$b$, a third wall 346$c$, a fourth wall 346$d$, and a fifth wall 346$e$. As shown in FIG. 50, the first wall 346$a$ is provided along the right side portion of the lower portion of the radiator R1. The front portion and the rear portion of the first wall 346$a$ are fixed to the radiator R1 by bolts 385A and 385B. As a result, the lower frame 346 is fixed to the lower part of the radiator R1. The lower part of the radiator R1 is supported by a mounting member 359 provided on the turn frame 54 via vibration isolating members 358 (rubber) (see FIGS. 3 and 7). Thereby, the lower frame 346 is supported on the side of the machine body 2 via the radiator R1.

The second wall 346$b$ extends from the front end of the first wall 346$a$ toward the inside of the airframe. The third wall 346$c$ extends rearward from the extended end of the second wall 346$b$. The fourth wall 346$d$ extends toward the inside of the airframe from the rear end of the first wall 346$a$. The fifth wall 346$e$ extends rearward from the extended end of the fourth wall 346$d$.

The upper frame 345 is attached to the support frame 60, and the lower frame 346 is supported on the side of the machine body 2 via the radiator R1, so that the support frame 344 is supported on the machine body 2 side.

As shown in FIG. 51, the first vertical frame 347 is formed in a vertically elongated band plate shape, and its plate surface faces forward and backward. The upper part of the first vertical frame 347 is fixed to the side wall 350 and the upper wall 351 (the first part 351 $a$) of the upper frame 345, and the lower part thereof is fixed to the second wall 346 b of the lower frame 346. A first pivotally supporting portion (pivotally supporting portion) 360 projecting outwardly of the machine body is provided in the lower portion of the first vertical frame 347.

Figure 53:
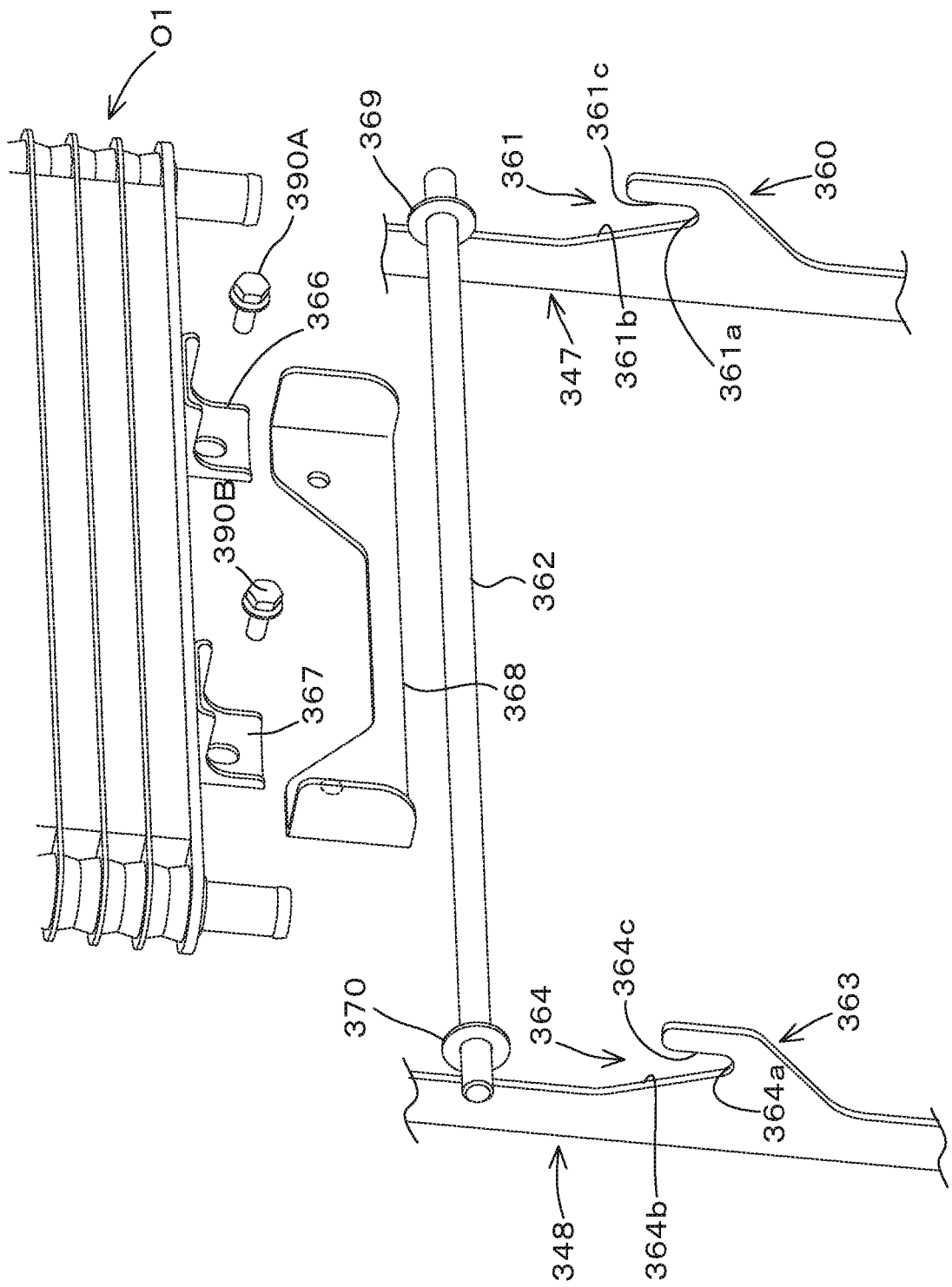
FIG. 53 is an exploded perspective view illustrating an installation portion of a lower portion of the oil cooler.

As shown in FIG. 53, the first pivot support portion 360 is formed in a hook shape that opens upward, and has a first engagement groove (engagement groove) 361 that opens upward. The first engagement groove 361 has a first bottom portion (bottom portion) 361a, a first guide surface (guide surface) 361 b, and a first longitudinal surface (longitudinal surface) 361 c. The first bottom portion 361a is formed in a downwardly concave curved shape. A pivot 362 provided at a lower portion of the oil cooler O1 is supported on the first bottom portion 361a so as to be rotatable about an axis center. The first guide surface 361b is an end portion of the first bottom portion 361a and extends upward from an end portion on the base side of the first pivot support 360 (an end on the inner side of the body). In addition, the first guide surface 36 b is an inclined surface that is inclined so as to move away from the radiator R1 as it goes downward, and the lower portion is an inclined surface continuing to the first bottom portion 361a. The first longitudinal face 361c is an end portion of the first bottom portion 361a and extends upward (substantially in the vertical direction) from the end portion (the end portion on the outer side of the machine body) of the first pivot support portion 360 on the side opposite to the base side thereof.

As shown in FIG. 51, the second vertical frame 348 is formed in a vertically long band plate shape, and the plate surface faces forward and backward. In the second vertical frame 348, the upper part is fixed to the side wall 350 and the upper wall 351 (the second part 351 b) of the upper frame 345, and the lower part is fixed to the fourth wall 346d of the lower frame 346. A second pivotally supporting portion (pivotally supporting portion) 363 projecting outwardly of the machine body is provided under the second vertical frame 348.

As shown in FIG. 53, the second pivot support portion 363 is formed in a hook shape that opens upward, and has a second engagement groove (engagement groove) 364 formed in an open state at the upper side. The second engagement groove 364 has a second bottom portion (bottom portion) 364a, a second guide surface (guide surface) 364b, and a second vertical surface (longitudinal surface) 364c. The second bottom portion 364a is formed in a downwardly concave curved shape. A pivot 362 is also rotatably supported on the second bottom 364a around the axis center. The second guide surface 364b is an end portion of the second bottom portion 364a and extends upward from an end portion on the base side of the second pivot support 363 (an end on the inner side of the body). Further, the second guide surface 364b is an inclined surface that is inclined to move away from the radiator R1 as it goes downward and the lower portion is an inclined surface continuing to the second bottom portion 364a. The second longitudinal face 364c is an end portion of the second bottom portion 364a and extends upward (substantially in a vertical direction) from an end portion on the side opposite to the base portion side of the second pivot support portion 363 (an end portion on the outer side of the machine body).

The pivotal portion pivotally supporting the pivot 362 includes a first pivot portion 360 provided in the first vertical frame 347 and a second pivot portion 363 provided in the second vertical frame 348.

As shown in FIG. 50, the upper portion of the shroud 343 is bolted to the first stay portion 353 and the second stay portion 356. The lower portion of the shroud 343 is bolted to the third wall 346c and the fifth wall 346e. Thus, the support frame 344 supports the shroud 343.

As shown in FIG. 51 and FIG. 53, a first lower bracket 366, a second lower bracket 367, and a third lower bracket 368 are provided on the lower (lower end face) of the oil cooler O1. The first lower bracket 366 is provided near the front portion from the center portion in the front and rear of the oil cooler O1. The second lower bracket 367 is provided closer to the rear part from the center part in the front and rear of the oil cooler O1. The front portion of the third lower bracket 368 is fixed to the first lower bracket 366 by a bolt 390A. The rear portion of the third lower bracket 368 is fixed to the second lower bracket 367 by bolts 390B.

A pivot 362 having an axis extending in the front-rear direction K1 is fixed to the third lower bracket 368. The center of the pivot 362 in the front-rear direction K1 is fixed to the third lower bracket 368 and protrudes frontward and rearward from the third lower bracket 368. The front portion of the pivot 362 is inserted into the first engagement groove 361 of the first pivot support 360 from above. That is, the pivot 362 is rotatably fitted around the axis center on the first bottom portion 361a of the first engagement groove 361. Further, the rear portion of the pivot 362 is inserted into the second engagement groove 364 of the second pivot support 363 from above. That is, the pivot 362 is rotatably fitted around the axis center on the second bottom 364a of the second engagement groove 364. In other words, the pivot 362 is provided in the lower part of the oil cooler O1 (heat exchanger) and is pivotally supported by the first pivot support 360 (the first bottom 361a) and the second pivot support 363 (the second bottom 364a).

As shown in FIG. 53, a first regulating member 369 is provided at the front portion of the pivot 362. The first regulating member 369 is formed in the shape of a ring disk, and is fitted over and fixed to the pivot 362. The first regulating member 369 restricts the forward movement of the pivot 362 (oil cooler O1) by contacting the rear surface of the first pivot support 360. A second regulating member 370 is provided at the rear portion of the pivot 362. The first regulating member 369 is formed in the shape of a ring disk, and is fitted over and fixed to the pivot 362. The second regulating member 370 abuts against the front surface of the second pivot support 363, thereby restricting the rearward movement of the pivot 362 (oil cooler O1).

Figure 54:
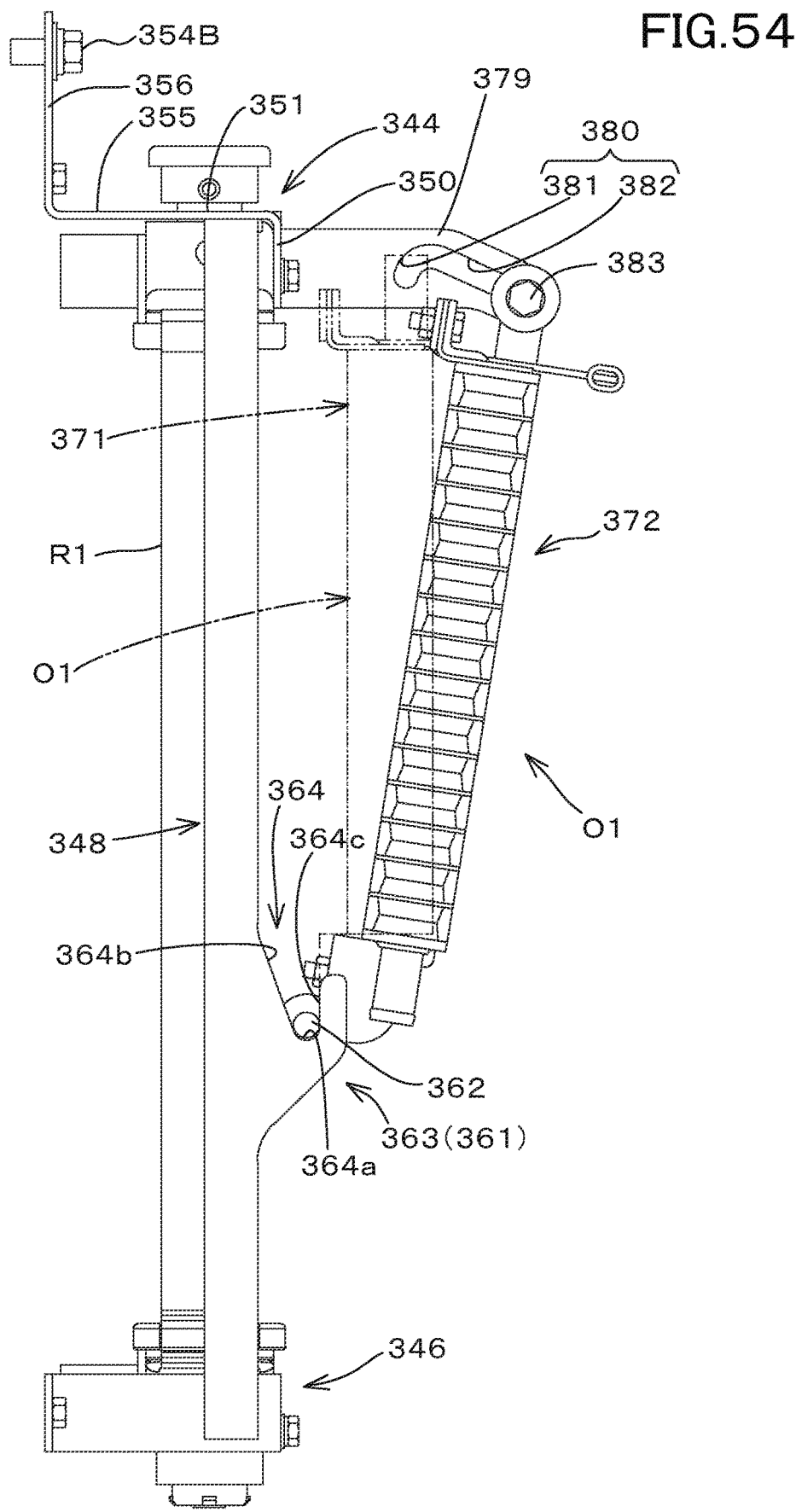
FIG. 54 is a rear view illustrating a state in which the radiator and the oil cooler are installed.

With the above configuration, the lower part of the oil cooler O1 is pivotally supported by the support frame 344 (the first pivot support 360, the second pivot support 363) so that the upper part moves toward and away from the radiator R1. As a result, the oil cooler O1 moves in the opposite position 371 (see the imaginary line in FIG. 54), which is the state facing the radiator R1, and the oil cooler O1 separates from the radiator R1 around the first pivot support 360 and the second pivot support 363 and a tilting posture 372 (see the solid line in FIG. 54) in a state of being tilted in the direction.

As shown in FIGS. 51 and 52, a first upper bracket 373 and a second upper bracket 374 are provided on the upper portion (upper end surface) of the oil cooler O1. The first upper bracket 373 is provided at the front portion of the oil cooler O1. The first upper bracket 373 is provided with a first attachment piece portion 373a. The second upper bracket 374 is provided at the rear portion of the oil cooler O1. The second upper bracket 374 is provided with a second attachment piece portion 374a.

As shown in FIG. 51 and FIG. 52, attachment members 376 made of a plate material are attached to the first attachment piece portion 373a and the second attachment piece portion 374b. That is, the mounting member 376 is attached to the upper part of the oil cooler O1 (heat exchanger).

As shown in FIG. 52, the mounting member 376 has a first wall portion 376a, a second wall portion 376b, and a third wall portion 376c. The first wall portion 376a is disposed laterally with the plate surface facing upward and is disposed between the first attachment piece portion 373 a and the second attachment piece portion 374b. The second wall portion 376b extends upward from the front portion of the first wall portion 376a. The front portion of the second wall portion 376b is superimposed on the first attachment piece portion 373a and fixed to the first attachment piece portion 373a with bolts 391A (see FIG. 50). The third wall portion 376c extends upward from the rear portion of the first wall portion 376a. The rear portion of the third wall portion 376c is superimposed on the second attachment piece portion 374b and fixed to the second attachment piece portion 374b by a bolt 391B (see FIG. 50).

As shown in FIG. 52, the attachment member 376 is provided with a handle 376d. The handle 376d includes a root portion 376e extending outward from the center of an end portion of the first wall portion 376a on the outer side of the machine body and a base portion 376e extending from the extending end of the base portion 376e to a grip portion 376f, and a grip cover 376g covering the grip portion 376f. The first wall portion 376a is located above the upper surface of the oil cooler O1, and the grip portion 376f protrudes to the lateral side of the oil cooler O1 outside the machine body.

A fixing member 377 is fixed to the center of the upper surface of the first wall portion 376a in the front-rear direction of the machine body. The fixing member 377 is located on the front side of the root portion 376e of the handle 376d. The fixing member 377 is formed in a rectangular block shape, and a thread hole 378 is formed on the rear side of the upper portion.

As shown in FIG. 51 and FIG. 52, a guide member 379 made of a plate material is provided on the support frame 344 (upper frame 345). The base end of the guide member 379 is fixed to the main frame portion 349 of the upper frame 345 and protrudes outward from the main frame portion 349. That is, the guide member 379 protrudes from the support frame 344 toward the side where the oil cooler O1 is tilted. The guide member 379 has a guide groove 380. The guide groove 380 is a long groove long in the protruding direction (the machine width direction K2) of the guide member 379. The guide groove 380 is formed closer to the machine outward direction from the center of the guide member 379 in the machine width direction K2. The guide groove 380 is formed by an annular edge portion formed to penetrate the guide member 379 in the front-rear direction.

Figure 55:
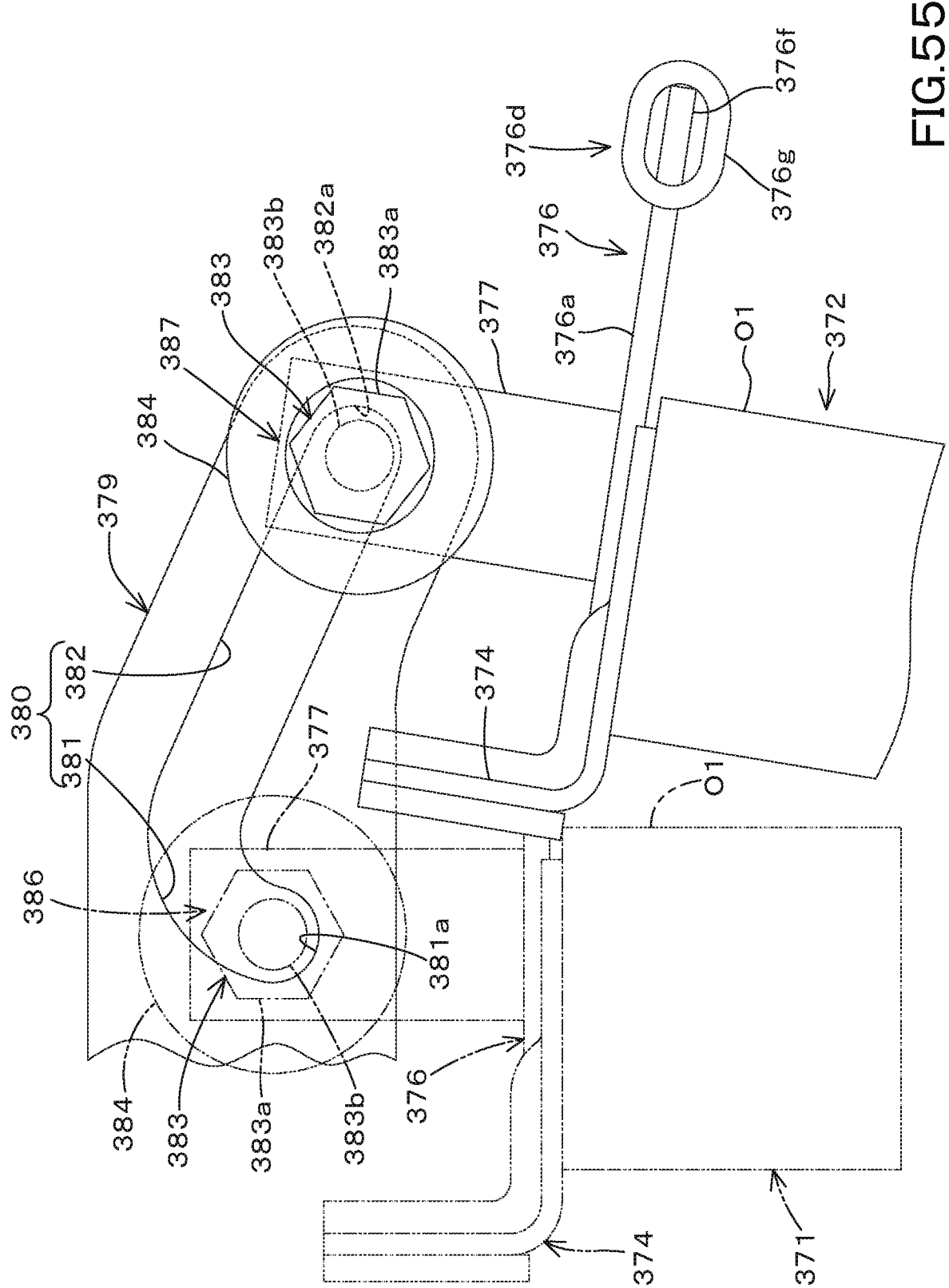
FIG. 55 is a rear view illustrating an upper portion of the installation portion of the oil cooler.

As shown in FIG. 55, the guide groove 380 has a first guide portion 381 on the proximal end side of the guide member 379 and a second guide portion 382 on the distal end side of the guide member 379. The first guide portion 381 is formed to be shorter than the second guide portion 382. The first guide portion 381 and the second guide portion 382 are formed continuously. The first guide portion 381 is formed in an inclined direction which is shifted upward in the projecting direction from the base end in the projecting direction of the guide member 379. The second guide portion 382 is formed in an inclined direction that moves downward as going from the first guide portion 381 to the tip portion in the projecting direction.

As shown in FIGS. 51 and 52, a fixing member 383 for fixing the fixing member 377 to the guide member 379 is provided. The fixture 383 is constituted of one bolt. It is to be noted that a plurality of fixing members 383 and a plurality of guide members 379 may be provided. The fixture 383 has a head portion 383a and a screw shaft portion 383b. The screw shaft portion 383b is inserted through the washer 384. Further, the screw shaft portion 383b passes through the guide groove 380 and is screwed into the thread hole 378 of the fixing member 377. That is, the fixture 383 is threaded to the fixing member 377 by passing through the guide groove 380. The shape of the head portion 383a is not particularly limited, and may be, for example, a hexagonal bolt shape, a thumb screw shape, or the like.

As shown in FIG. 55, the screw shaft portion 383b of the fixture 383 is movable in the guide groove 380 in the longitudinal direction of the groove. The fixing member 377 and the fixing member 383 are disposed at a first position 386 (see imaginary line) where the screw shaft portion 383b is located at the base end of the guide groove 380 and a second position 386b at which the screw shaft portion 383b is positioned at the tip of the guide groove 380 (see the solid line). In a state in which the fixing member 377 and the fixing member 383 are located at the first position 386, the oil cooler O1 is set to the opposing attitude 371 indicated by a virtual line. In a state where the fixing member 377 and the fixing member 383 are positioned at the second position 387, the oil cooler O1 is in the tilting attitude 372 indicated by the solid line. As described above, the guide groove 380 has a first position 386, which is a position where the oil cooler O1 faces the radiator R1 (opposing position 371), a first position 386 in which the oil cooler O1 is tilted in a direction away from the radiator R1 around the pivot support portion And the second position 387 which is the position of the fixing member 377 (the tilting posture 372). The proximal end 381a of the first guide portion 381 holds the fixing member 377 and the fixing member 383 at the first position 386 and the distal end portion 382a of the second guide portion 382 holds the fixing member 377 and the fixing member 383 at the second position.

The length of the first guide portion 381 (the depth from the connection portion on the lower side of the first guide portion 381 and the second guide portion 382 to the bottom portion when the oil cooler O1 is arranged in the opposing posture) is fixed may be longer than the radius of the screw shaft portion 383b of the tool 383. Accordingly, when the oil cooler O1 is disposed in the opposing posture, the position of the center of gravity of the screw shaft portion 383b is lower than the connection portion on the lower side of the first guide portion 381 and the second guide portion 382, so that the fixture 383 can be reliably held in the first position 386.

When the oil cooler O1 is normally used, the oil cooler O1 is set in the opposing posture 371, and the fixture 383 is fastened to the fixing member 377 at the first position 386 to fix the oil cooler O1 in the opposing posture 371.

When checking clogging of the fins of the radiator R1 and cleaning the fins, fixation of the fixture 383 to the fixing member 377 is released (loosened). Thereafter, grasp the handle 376d and pull the oil cooler O1 downward in a direction away from the radiator R1 while pulling up the oil cooler O1. When the screw shaft portion 383b of the fixture 383 gets over the convex portion at the boundary between the first guide portion 381 and the second guide portion 382, the screw shaft portion 383b is guided by the second guide portion 382 on the descending slope, and the second position 387. By holding the fixture 383 in the second position 387, the oil cooler O1 is held in the tilted posture 372. The operation of changing the position of the oil cooler O1 can be performed in a short time by loosening a single bolt (fixture 383), so that the maintenance work of the radiator R1 can be shortened.

In the present embodiment, the working machine 1 includes a machine body 2, a radiator R1 mounted on the machine body 2, a heat exchanger (oil cooler O1) arranged to face the radiator R1, a heat exchanger (oil cooler O1 at least one pivotally supporting portion (a first pivotally supporting portion 360, a second pivotally supporting portion 363) pivotally supporting a lower portion of the support frame 344 in a rotatable manner around a lateral axis, a support frame 344 for supporting the upper portion of the heat exchanger, a guide member 379 having a guide groove 380, a fixing member 377 provided at the upper portion of the heat exchanger (oil cooler O1), a fixing member 370 inserted through the guide groove 380 and screwed to the fixing member 377 and a tool 383. The guide groove 380 has a first position 386 where the heat exchanger (oil cooler O1) faces the radiator R1 and a second position 386 where the upper portion of the heat exchanger (oil cooler O1) is tilted in a direction away from the radiator R1 around the pivot support portion and guides the fixing member 377 between the position 387.

According to this configuration, when the fixing of the fixing member 383 to the fixing member 377 is released at the first position 386 and the heat exchanger is tilted in a direction away from the radiator R1 around the pivot portion, the fixing member 377 (and the fixing member 388) is guided from the first position 386 to the second position 387 by the guide groove 380. In addition, by holding the fixing member 377 (and the fixing member 383) in the second position 387 by the guide groove 380, the heat exchanger is held in a state of being inclined in a direction away from the radiator R1. This makes it easy to hold the state in which the heat exchanger is tilted.

Further, only one fixture 383 is provided, and by switching the state of screwing of one fixing member 377, it is possible to switch between a state of restraining the movement of the fixing member 377 along the guide groove 380 and a state of permitting the movement of the fixing member 377.

According to the above configuration, since the heat exchanger can be tilted simply by loosening the fixture 383 by one, it is possible to easily perform the operation of tilting the heat exchanger.

The guide member 379 protrudes from the support frame 344 toward the side where the heat exchanger (oil cooler O1) tilts, and the guide groove 380 is formed so as to protrude from the support frame 344 in a direction in which the guide member 379 protrudes from the support frame 344, a first guide portion 381 which is formed in an inclined direction which moves upward in the direction of protrusion from the first guide portion 381 and a second guide portion 381 which is formed in an inclined direction which moves downward from the first guide portion 381 toward the tip portion in the projecting direction. The proximal end 381a of the first guide portion 381 holds the fixture 383 at the first position 386 and the distal end portion 382a of the second guide portion 382 holds the fixture 383 at the second position 387.

According to this, since the first guide portion 381 of the guide groove 380 is inclined so as to move upward from the base end in the protruding direction, in the first position 386, the fixing of the fixing member 383 to the fixing member 377 is released, the heat exchanger will not fall accidentally. Further, at the first position 386, it is unnecessary to hold the heat exchanger when releasing the fixing of the fixing member 383 to the fixing member 377. Further, since the second guide portion 382 has an inclined shape that moves downward as it goes from the first guide portion 381 to the tip portion in the projecting direction, the heat exchanger inadvertently moves toward the radiator R1 from the inclined state can be prevented.

Further, the working machine has a pivot shaft 362 which is provided at a lower portion of the heat exchanger (oil cooler O1) and is pivotally supported by the first pivot support portion 360 and the second pivot support portion 363, and includes a first pivot support portion 360, a second pivot portion 360. The pivotally supporting portion 363 is formed in an upwardly opened shape and has a first engaging groove 361 and a second engaging groove 364 into which the pivot 362 is inserted from above. The first engagement groove 361 and the second engagement groove 364 include a first bottom portion 361a and a second bottom portion 364a into which the pivot 362 is rotatably fitted around the axis center and a slope and the lower portion has a first guide surface 361b and a second guide surface 364b continuous with the first bottom portion 361a and the second bottom portion 364a.

According to this, when inserting the pivot 362 from above into the first engaging groove 361 and the second engaging groove 364, the pivot 362 is guided by the first guide surface 361b and the second guide surface 364b and is engaged with the first engagement, it can be easily inserted into the first bottom portion 361a of the groove 361 and the second bottom portion 364a of the second engagement groove 364. Accordingly, it is easy to pivotally support the lower portion of the heat exchanger to the first pivot support portion 360 and the second pivot support portion 363.

The support frame 344 includes an upper frame 345 which is provided on the upper side of the radiator R1 and to which the upper part of the radiator R1 is fixed and which is attached to the support frame 60, a lower frame 346 provided on the lower side of the radiator R1 and fixed to the lower part of the radiator R1, a first vertical frame 347 connecting one end portions of the upper frame 345 and the lower frame 346, and an upper frame 345 and a lower frame and a second vertical frame 348 that connects the other end portions of the first vertical frame 346 and the second vertical frame 346. The guide member 379 is provided on the upper frame 345 and the pivot support portion is provided on the first pivot support 360 and a second pivotally supporting portion 363 provided in the second vertical frame 348.

Thereby, the support frame 344 can be firmly structured.

Further, it includes a mounting member 376 attached to the upper part of the heat exchanger (oil cooler O1) and fixing the fixing member 377, and a handle 376d provided on the mounting member 376. By having the handle 376d, it is easy to change the posture of the heat exchanger. Further, to simplify the structure, the fixing member 377 and the handle 376d are provided on the mounting member 376 attached to the upper part of the heat exchanger, that is, the fixing member 377 and the handle 376d are provided on the same member.

In addition, there are a machine body 2, a radiator R1 mounted on the machine body 2, a heat exchanger (oil cooler O1) arranged to face the radiator R1, a lower portion of the heat exchanger O1 rotatable about a transverse axis at least one pivot support portion (first pivot support portion 360, second pivot support portion 363) that supports the heat exchanger O1, a support frame 344 that supports the upper portion of the heat exchanger O1, a fixture 383 that fixes the heat exchanger O1 to the support frame 344 and has only one fixture 383. The fixture 383 releases the state of fixing the heat exchanger O1 to the support frame 344 and the fixation to the support frame 344 to tilt the heat exchanger O1 tiltable And the state to be switched.

In the present embodiment, the fixing member 377 is provided to the heat exchanger O1, the fixing member 383 is inserted into the guide groove 380 of the guide member 379 fixed to the support frame 344, and screwed to the fixing member 377, whereby heat exchange The structure in which the container O1 is fixed to the support frame 344 has been described, but the present invention is not limited to this. For example, a fixing member 377 is provided on one side of the support frame 344 or the heat exchanger O1, and an insertion portion (for example, a hole portion or a U-groove or the like) for inserting the fixing member 383 is provided on the other, and the fixing member 383 is inserted through the insertion portion and may be attached to the fixing member 377.

Next, the floor mat 32 will be described.

Figure 56:
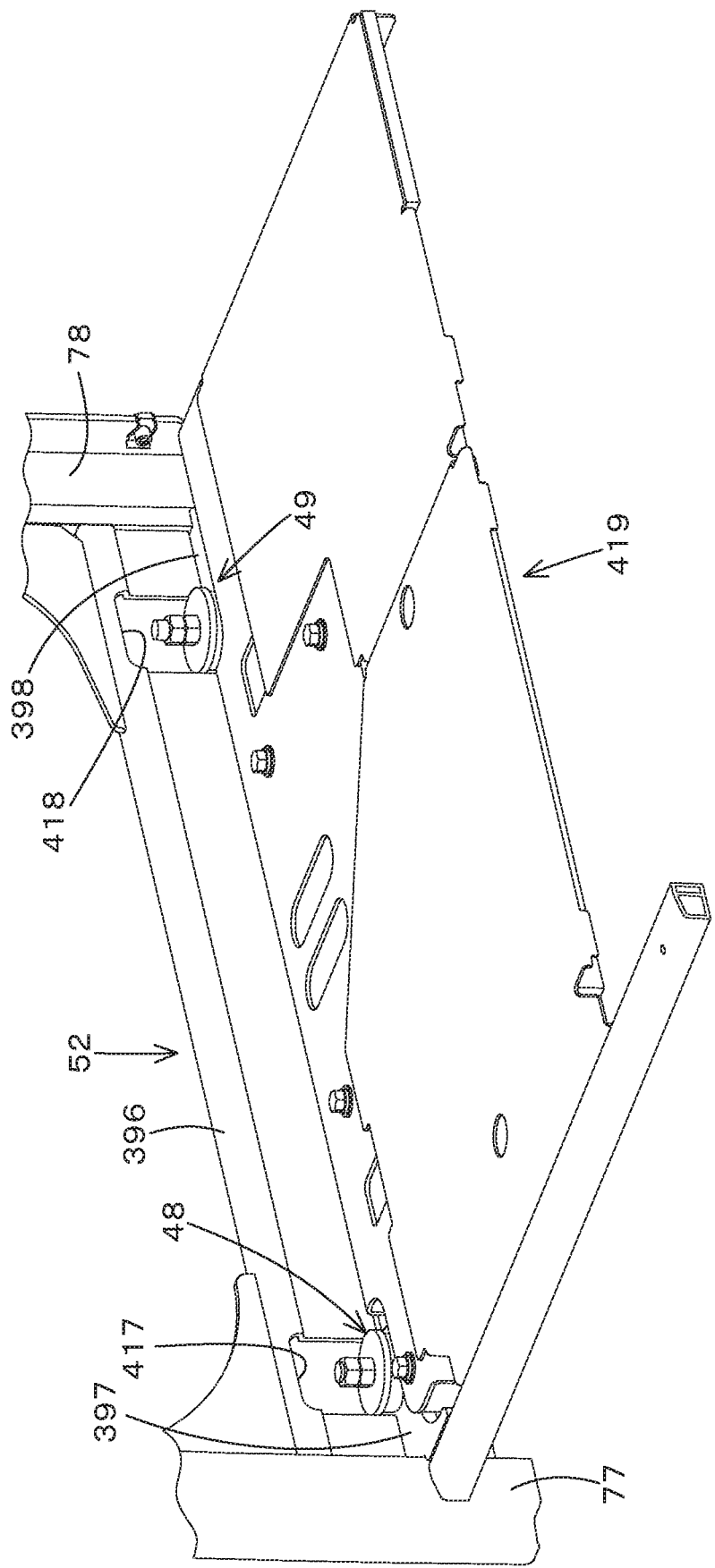
FIG. 56 is a perspective view illustrating a floor portion in view from a room of the cabin.

As shown in FIG. 6 and FIG. 56, the front lower frame 52 of the cabin 5 has a front horizontal member (horizontal member) 396, a first front assembling portion 397, and a second front assembling portion 398. The front cross member 396 is provided between the lower end portions of the first front pillar portion 77 and the second front pillar portion 78. The first front assembling portion 397 is formed of a plate material and is provided on the lower left side of the front transverse member 396. The first front mount 48 is assembled to the first front assembling portion 397. The second front assembling portion 398 is formed of a plate material and is provided at the lower right portion of the front transverse member 396. A second front mount 49 is assembled to the second front assembling portion 398.

Figure 57:
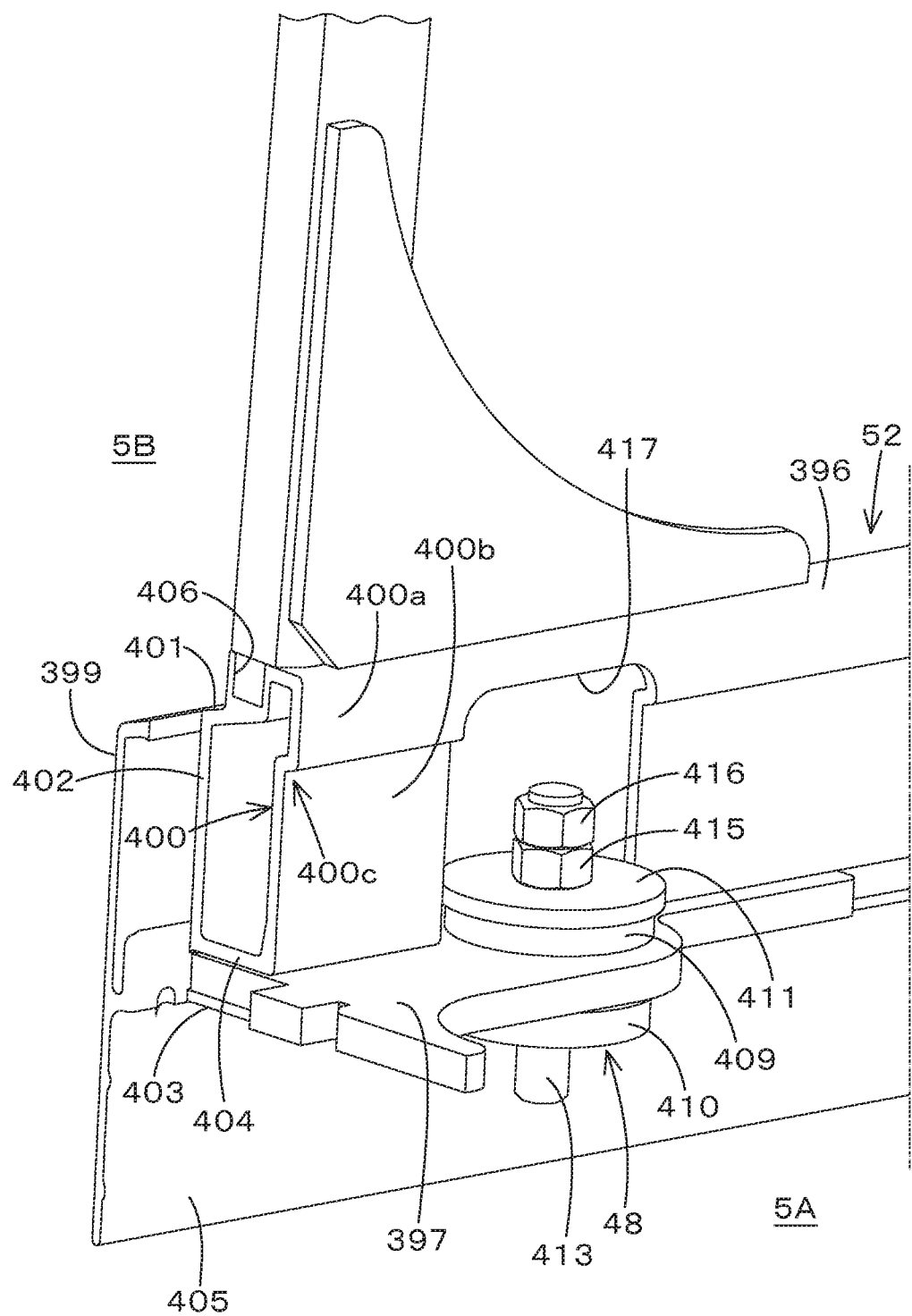
FIG. 57 is a perspective view illustrating a left side of a front lower frame in view from the room of the cabin.
Figure 61:
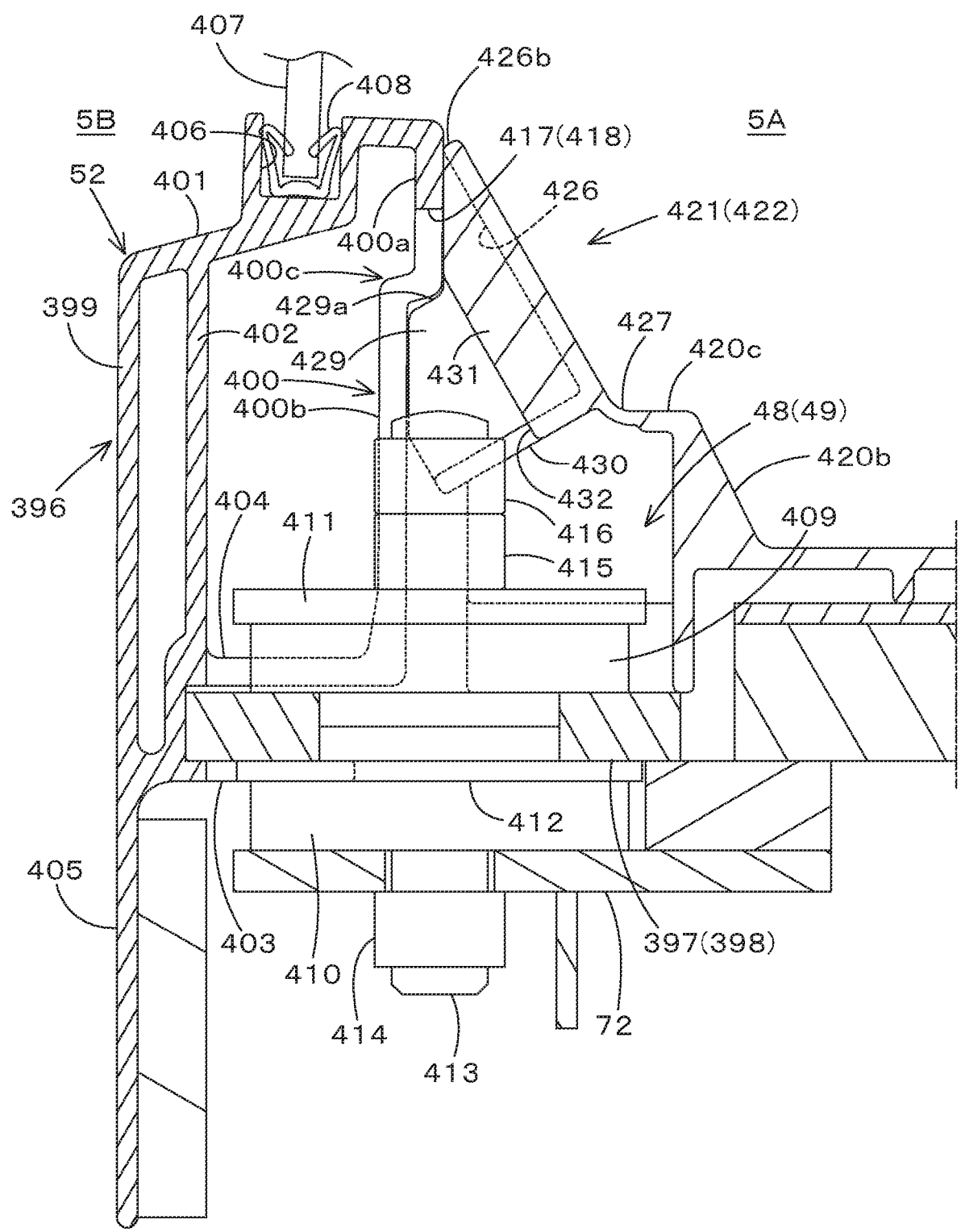
FIG. 61 is a side cross-sectional view illustrating a state in which a first front mount is covered with a first covering portion.

As shown in FIG. 57 and FIG. 61, the front lateral member 396 is formed into an odd-shaped tube body, for example, by extruded steel. The front cross member 396 has a front wall 399, a rear wall 400, an upper wall 401, an intermediate wall 402, a first lower wall 403, a second lower wall 404, and an extension wall 405. The front wall 399 is located in the outdoor 5B of the cabin 5, and the rear wall 400 is located in the room 5A of the cabin 5. The rear wall 400 has an upper portion 400a and a lower portion 400b. The upper and lower widths of the upper portion 400a are narrower than the upper and lower widths of the lower portion 400b. In addition, the rear wall 400 is formed in a stepped shape in which the upper portion 400a is closer to the interior 5A than the lower portion 400b. Accordingly, the rear wall 400 has a step portion 400c between the upper portion 400a and the lower portion 400b. The interior 5A side of the upper portion 400a and the lower portion 400b is formed as a flat surface.

The upper wall 401 connects upper end portions of the front wall 399 and the rear wall 400. An upwardly open groove portion 406 is provided in the middle portion of the upper wall 401. The lower end of the windshield 407 is inserted into the groove 406 together with the sealant 408. The intermediate wall 402 is provided between the front wall 399 and the rear wall 400. Further, the intermediate wall 402 is provided closer to the front wall 399. The first lower wall 403 connects the front wall 399 and the lower end of the intermediate wall 402 and projects rearward from the intermediate wall 402. The second lower wall 404 is positioned above the first lower wall 403 and connects the lower portion of the intermediate wall 402 and the lower end of the rear wall 400. The extension wall 405 extends downward from the lower end of the front wall 399.

As shown in FIG. 57 and FIG. 61, the first front assembling portion 397 is inserted and fixed between the first lower wall 403 and the second lower wall 404. The first front assembling portion 397 protrudes rearward from the lower end of the rear wall 400. The first front mount 48 includes a first vibration isolating member (rubber) 409, a second vibration isolating member (rubber) 410, a holding plate 411, and a backing plate 412. The first damping member 409 is positioned on the upper side of the first front assembling portion 397 and the second damping member 410 is located on the lower side of the first front assembling portion 397. The pressing plate 411 is positioned on the upper surface of the first vibration isolating member 409, and the backing plate 412 is positioned on the lower surface of the first front assembling portion 397. The first front mount 48 is assembled to the first mount attachment portion 72 and the first front attachment portion 397 by a bolt (stud bolt) 413, a first nut 414, a second nut 415, and a third nut 416. The bolt 413 passes through the first front mount 48 and the first mount attachment portion 72 in the up and down direction. The first nut 414 is threadedly engaged with the lower end side of the bolt 413. The second nut 415 and the third nut 416 are screwed to the upper part of the bolt 413.

Similarly to the first front assembling portion 397, the second front assembling portion 398 is inserted and fixed between the first lower wall 403 and the second lower wall 404. Further, since it is configured similarly to the second front mount 49, description thereof is omitted.

As shown in FIG. 57 and FIG. 61, a first cutout portion (opening portion) 417 is formed in the left portion of the front horizontal member 396 and corresponding to the first front mount 48. The first cutout portion 417 is an opening edge portion formed by cutting out the front cross member 396 so that the front lateral member 396 does not interfere with the first front mount 48. That is, the front cross member 396 has an opening (covering-target portion) formed by cutting out a portion corresponding to the first front mount 48 (front mount member). The first cutout portion 417 is formed continuously from the upper portion 400a (a position above the step portion 400c) of the rear wall 400 to the front end of the second lower wall 404. The front portion of the first vibration isolating member 409, the front portion of the holding plate 411, the front portions of the second nut 415 and the third nut 416 are located in the first cutout portion 417.

As shown in FIG. 56, a second cutout (opening) 418 is provided in the right part of the front lateral member 396 and corresponding to the second front mount 49. The second cutout portion 418 is an opening edge portion formed by cutting the front cross member 396 so that the front lateral member 396 does not interfere with the second front mount 49. That is, the front cross member 396 has an opening (covering-target portion) formed by cutting out a portion corresponding to the second front mount 49 (front mount member). The configuration of the second cutout 418 is configured substantially similar to the first cutout edge 417.

Figure 58:
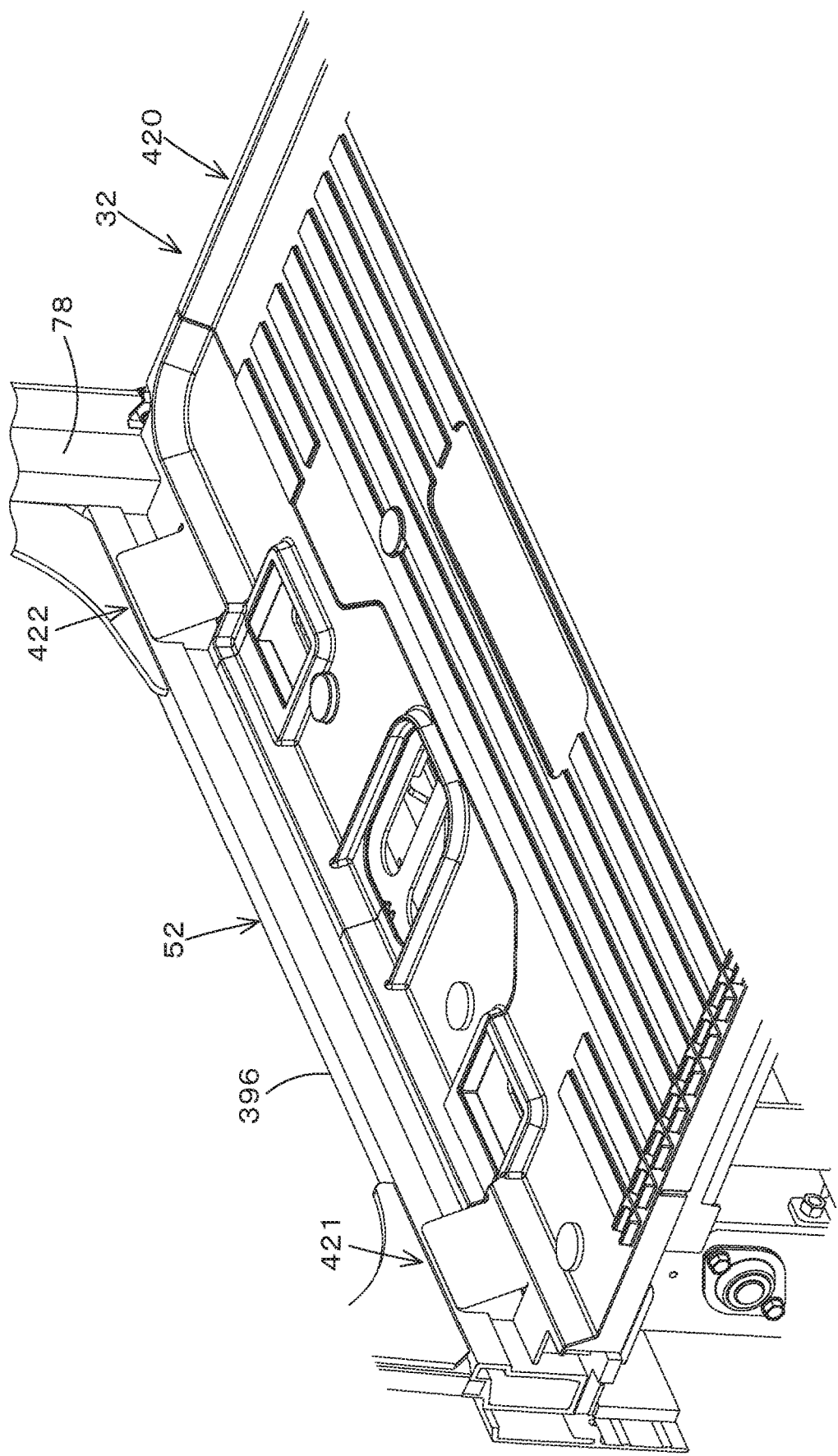
FIG. 58 is a perspective view illustrating a state in which a floor mat is installed.

As shown in FIG. 56, a floor portion 419 is provided behind the front lower frame 52. The floor portion 419 is formed by combining a plurality of plate materials and is attached to the front portion of the turn frame 54 shown in FIG. 7. As shown in FIG. 4, the floor portion 419 is provided between the seat base 31 and the front lower frame 52 of the machine body 2. As shown in FIG. 58, a floor mat 32 is laid on this floor portion 419.

The floor mat 32 is provided between the lower end of the seat base 31 and the lower end of the front lower frame 52 of the machine body 2.

Figure 59:
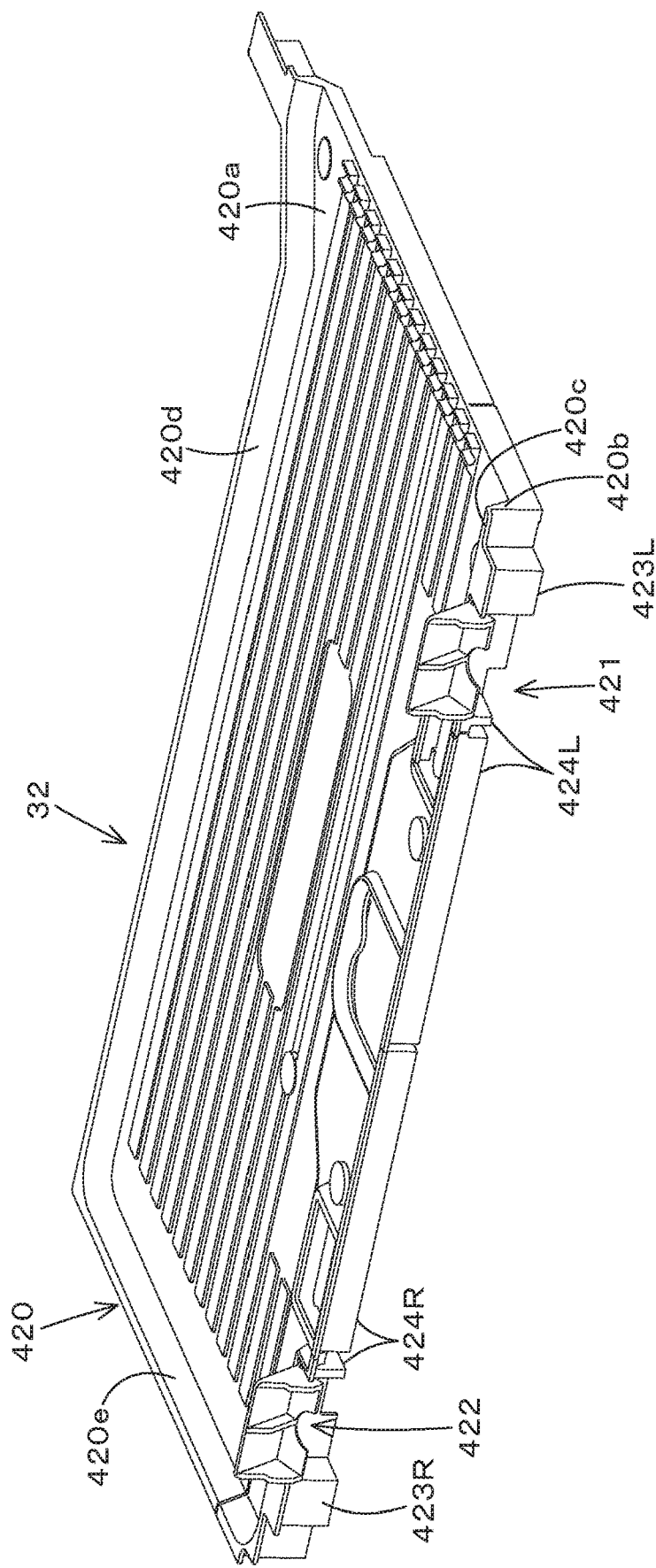
FIG. 59 is a perspective view illustrating the floor mat.
Figure 60:
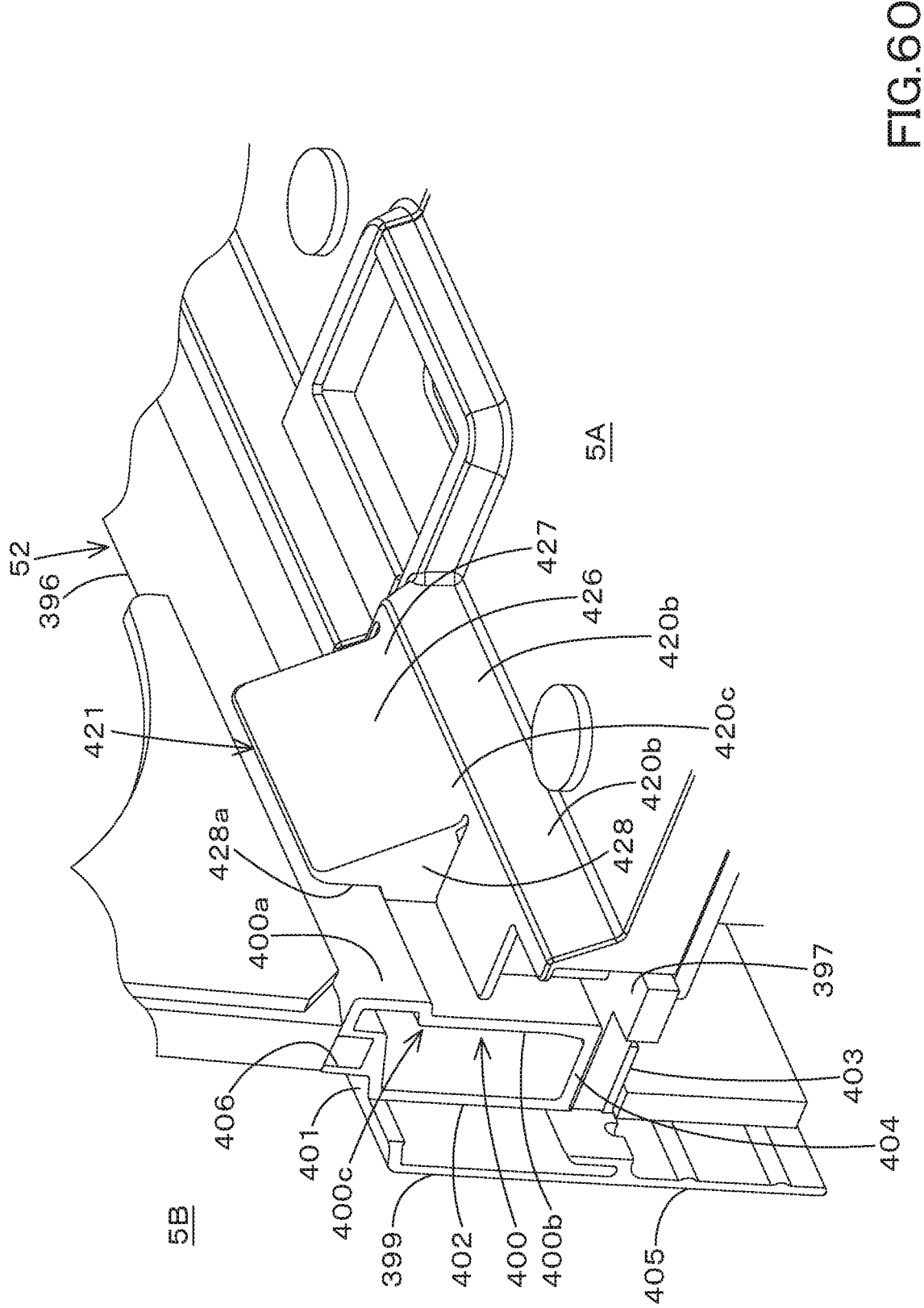
FIG. 60 is a perspective view illustrating the left side of the front lower frame with the floor mat installed in view from the room of the cabin.

As shown in FIG. 58 and FIG. 59, the floor mat 32 has a mat main body 420, a first covering portion 421, and a second covering portion 422. The mat main body 420, the first covering portion 421, and the second covering portion 422 are integrally formed with an elastic member such as rubber. The floor mat 32 is molded by a mold (metal mold). The mat main body 420 is a part laid almost over the entire area of the floor part 419. The first covering portion 421 is provided on the left side of the front portion of the mat main body 420. The first covering portion 421 corresponds to the first cutout portion 417, and is a portion that covers (closes) the first cutout portion 417 from the side of the room 5A. That is, the first cutout portion 417 (cutout portion) is a covering target portion which is covered (blocked) by the first covering portion 421. The second covering portion 422 is provided on the right side of the front portion of the mat main body 420. The second covering portion 422 corresponds to the second cutout portion 418 and is a portion that covers (closes) the second cutout portion 418 from the side of the room 5A. That is, the second cutout portion 418 (cutout portion) is a covering target portion which is covered (blocked) by the second covering portion 422.

Figure 64:
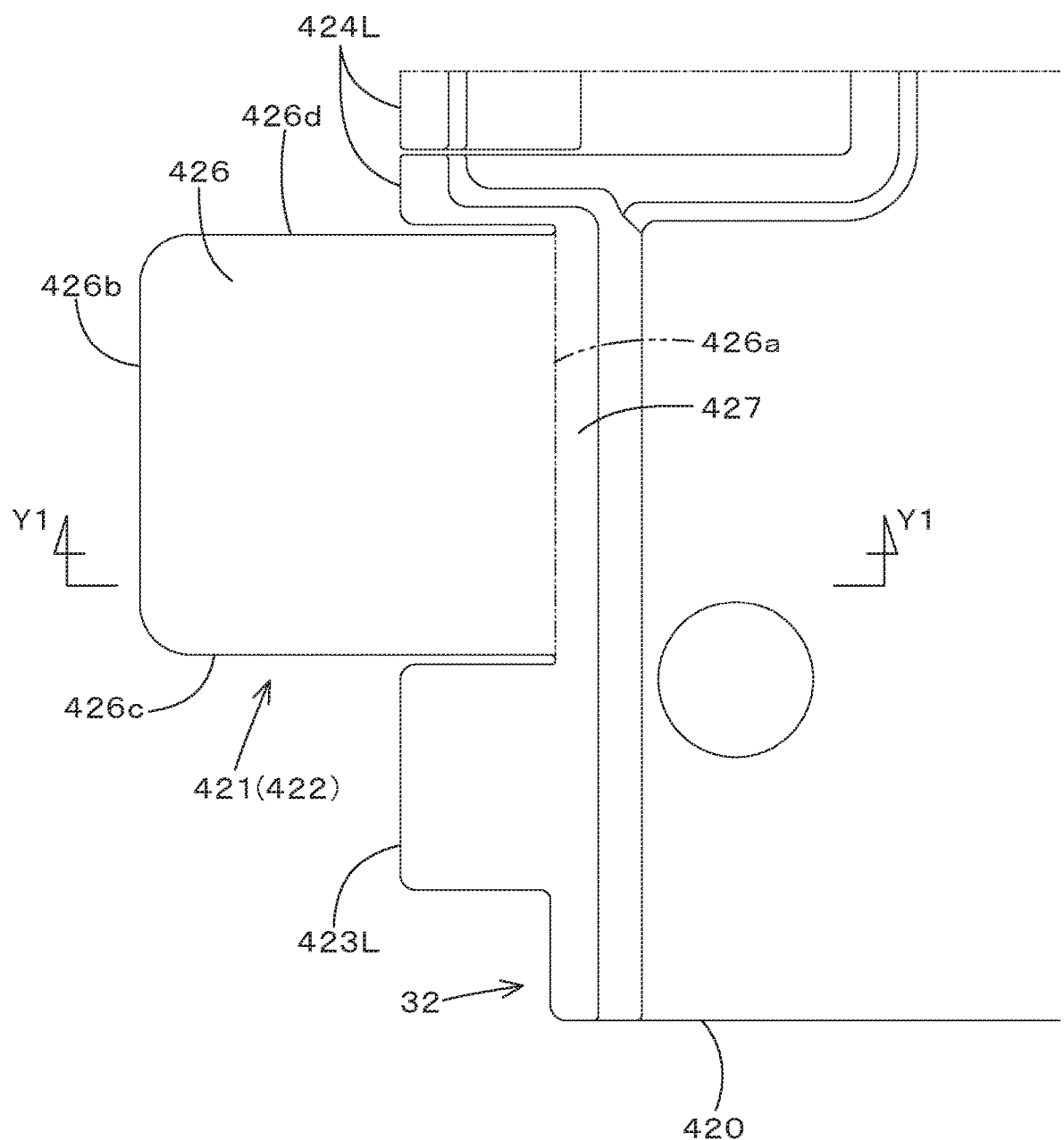
FIG. 64 is a plan view illustrating the first covering portion under a state before the installation of the floor mat.
Figure 65A:
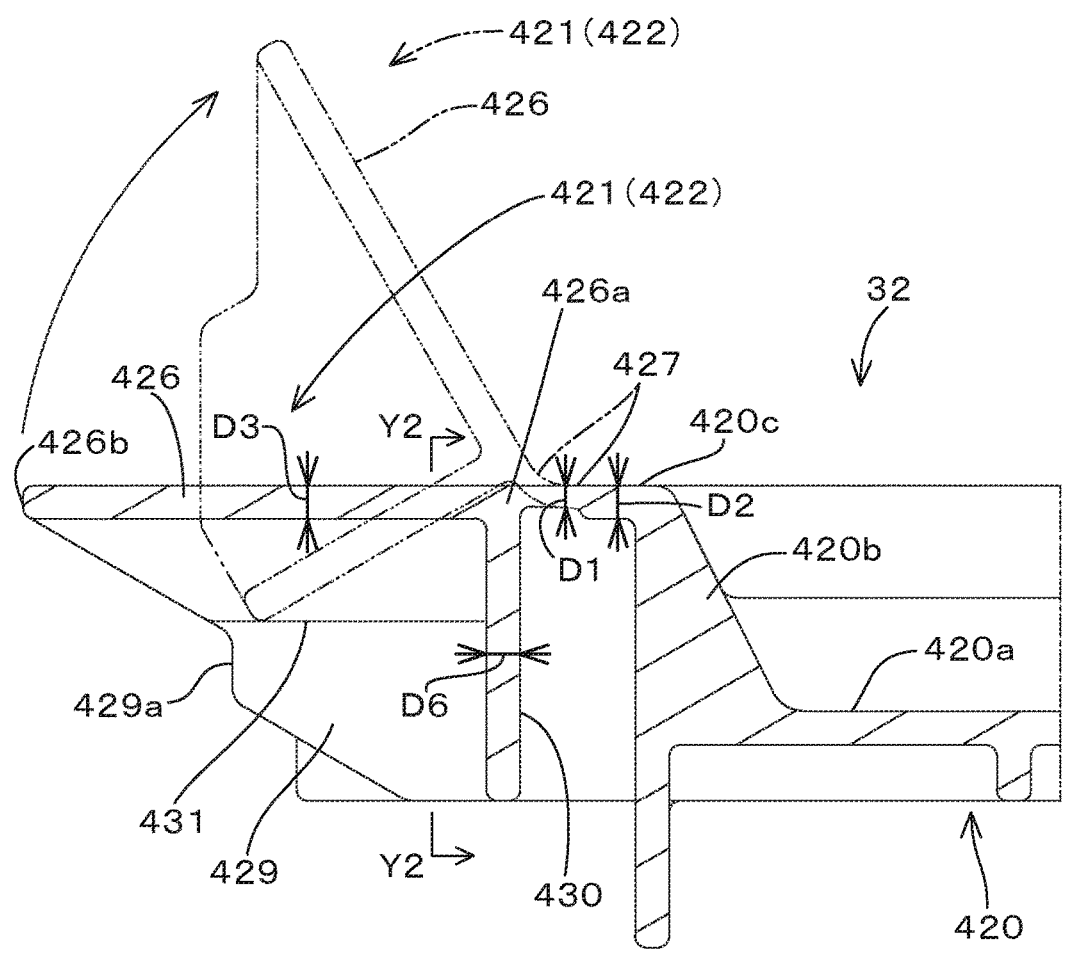
FIG. 65A is a cross-sectional view of FIG. 64 in Y1-Y1 arrowed lines.

The solid lines in FIG. 64 and FIG. 65A show the state of the first covering portion 421 in a state in which the floor mat 32 is not laid on the floor portion 419. In a state where the floor mat 32 is not laid on the floor portion 419, the first covering portion 421 is in a state shown by solid lines in FIG. 64 and FIG. 65A. The first covering portion 421 and the second covering portion 422 are raised upward so that the floor mat 32 is disposed on the floor portion 419, and the floor mat 32 is laid on the floor portion 419.

Figure 62:
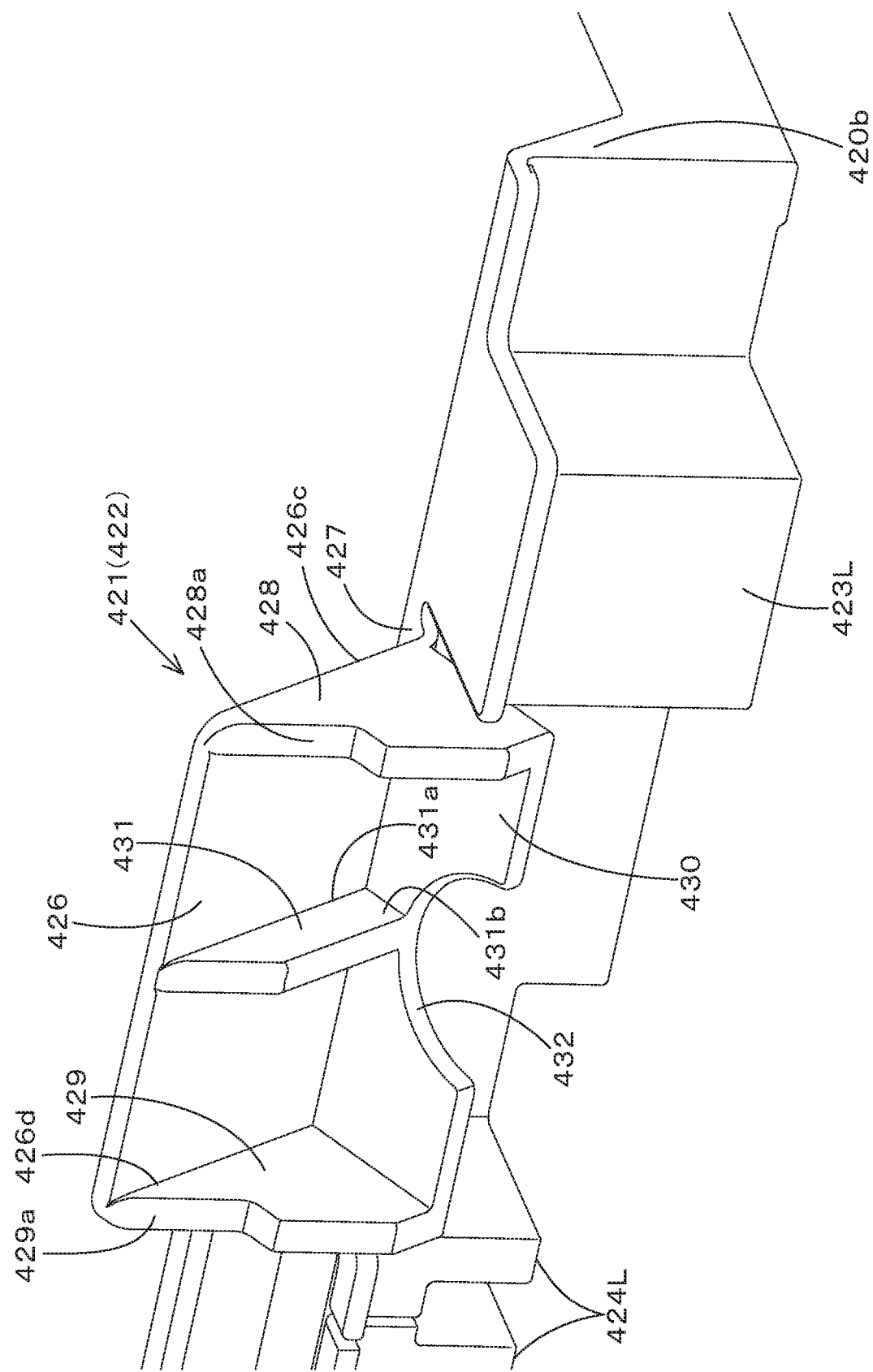
FIG. 62 is a perspective view illustrating a left side of a front portion of the floor mat.

58 and 60, in a state in which the floor mat 32 is laid on the floor portion 419, the first covering portion 421 and the second covering portion 422 are formed by the front cross member 396 (the lower portion of the front surface portion 40 of the cabin 5) and is held in a raised state. Thus, FIG. 59, FIG. 62, and FIG. 63 show a state in which the floor mat 32 is laid on the floor portion 419.

As shown in FIG. 59, a first forward-placing portion 423L is provided on the machine outward direction of the first covering portion 421. A second forward-placing portion 424L is provided on the inner side of the first covering portion 421 in the machine body. The first forward-placing portion 423R is also provided on the outer side of the second covering portion 422 on the machine body. A second forward-placing portion 424R is also provided on the inboard side of the second covering portion 422.

Figure 63:
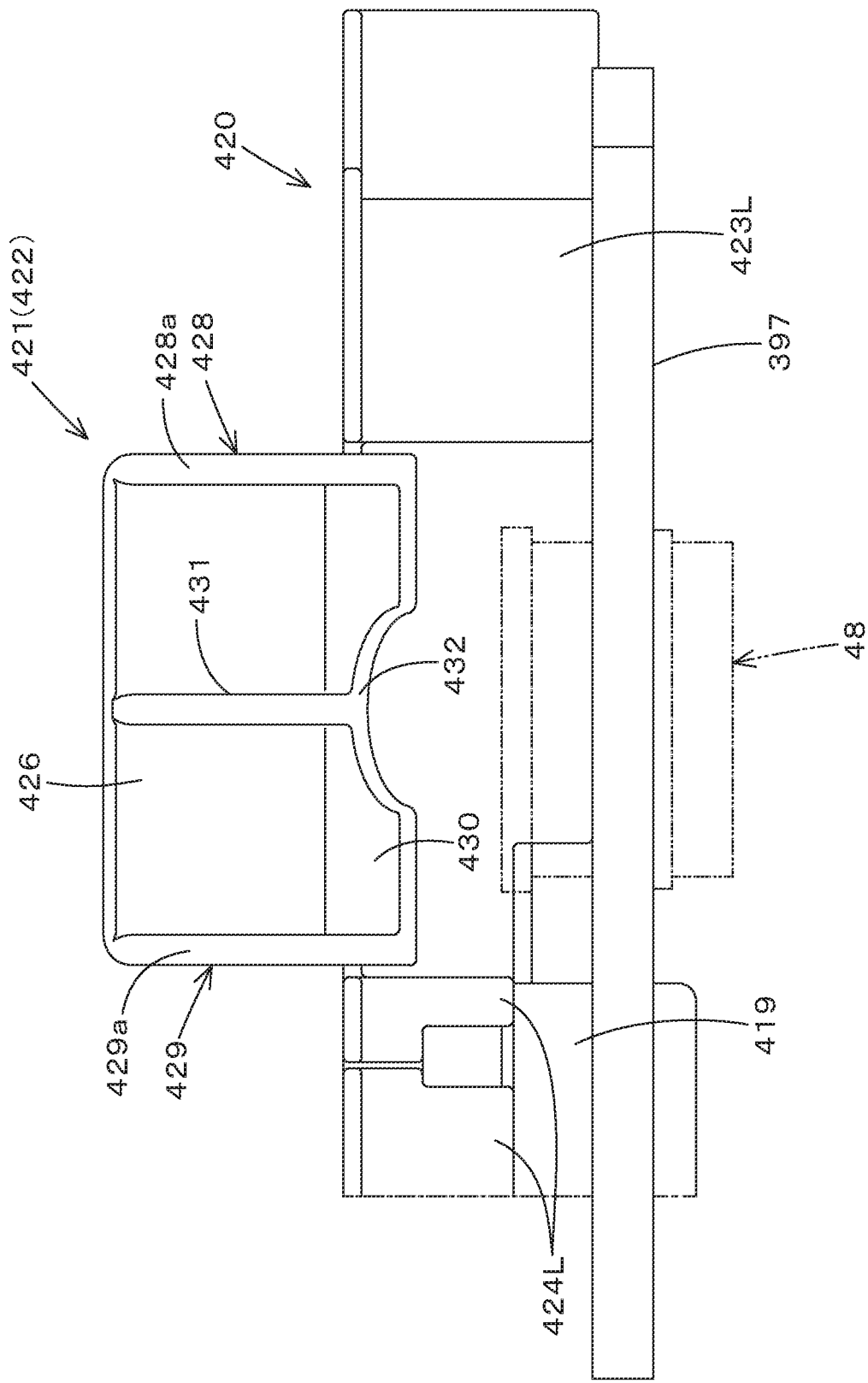
FIG. 63 is a front view illustrating the left side of the front portion of the floor mat.

As shown in FIG. 63, the first forward-placing portion 423L is placed on the first front assembling portion 397. The second forward-placing portion 424L is placed on the floor portion 419. Further, the first forward-placing portion 423R is placed on the second front assembling portion 398. The second forward-placing portion 424R is placed on the floor portion 419.

Since the configuration of the second covering portion 422 is the same as that of the first covering portion 421, in the following description, the first covering portion 421 will be described and the description of the second covering portion 422 will be omitted.

FIG. 62 to FIG. 65B, the first covering portion 421 includes a first cover wall portion 426, a hinge portion 427, a second cover wall portion 428, a third cover wall portion 429, a connecting wall portion 430, and a reinforcing rib wall 431.

As shown in FIG. 64, the first cover wall portion 426 is formed in a rectangular plate shape. The first cover wall portion 426 has a side portion (a rear edge portion) 426a connected to the mat main body 420, another side portion 426b opposed to the one side portion 426a, and a second cover wall portion 426b extending in a direction along the one side portion 426a and two opposed side portions (a first opposing side portion 426c and a second opposing side portion 426 d) opposed to each other with a space therebetween. One of these two opposed side portions (the outer side of the machine body body) is referred to as a first opposing side portion 426c, and the other (the inner side of the machine body) is referred to as a second opposing side portion 426d.

As shown in FIG. 65A, one side portion 426a is connected to the mat main body 420 via a hinge portion (connecting portion) 427. The mat main body 420 is provided with a rising wall 420b rising from the front portion of the bottom wall 420a. At the upper end of the rising wall 420b, an extending wall 420c extending forward is provided. The hinge portion 427 connects the extension wall 420c and one side portion 426a of the first cover wall portion 426. The upper surface of the hinge portion 427 and the upper surface of the first cover wall portion 426 are flush with the upper surface of the extending wall 420c (the same height).

As shown in FIG. 59, the height of the extending wall 420c is the same as the height of the first forward-placing portion 423L and 423R, the second forward-placing portion 424L and 424R, the rear rising from the trailing edge of the bottom wall 420a of the mat main body 420 and the height of the side rising portion 420e rising from the right side edge of the bottom wall 420a of the mat main body 420. Thus, at the time of molding the floor mat 32, the heights of the first covering portion 421 and the second covering portion 422 are the same as the height of the mat main body 420. That is, even if the first covering portion 421 and the second covering portion 422 are provided, the total thickness (overall dimension in the vertical direction) of the floor mat 32 is not changed.

As shown in FIG. 65A, the thickness D1 of the hinge portion 427 is thinner than the thickness D2 of the extending wall 420c, and is thinner than the thickness D3 of the first cover wall portion 426. That is, the hinge portion 427 has a structure that is easily elastically deformed at the hinge portion 427. In this manner, the first covering portion 421 is bent at the intended portion (the hinge portion 427).

In addition, as shown in FIG. 64, the first opposing side portion 426c is separated apart from the first forward-placing portion 423L, the second opposing side portion 426d is separated from the second forward-placing portion 424L. Thus, when the first cover wall portion 426 is lifted up, the hinge portion 427 elastically bends as shown by an imaginary line in FIG. 65A, and the first cover wall portion 426 is swung upward. That is, the hinge portion 427 is elastically bendable so as to swing the first cover wall portion 426 upward.

Figure 65B:
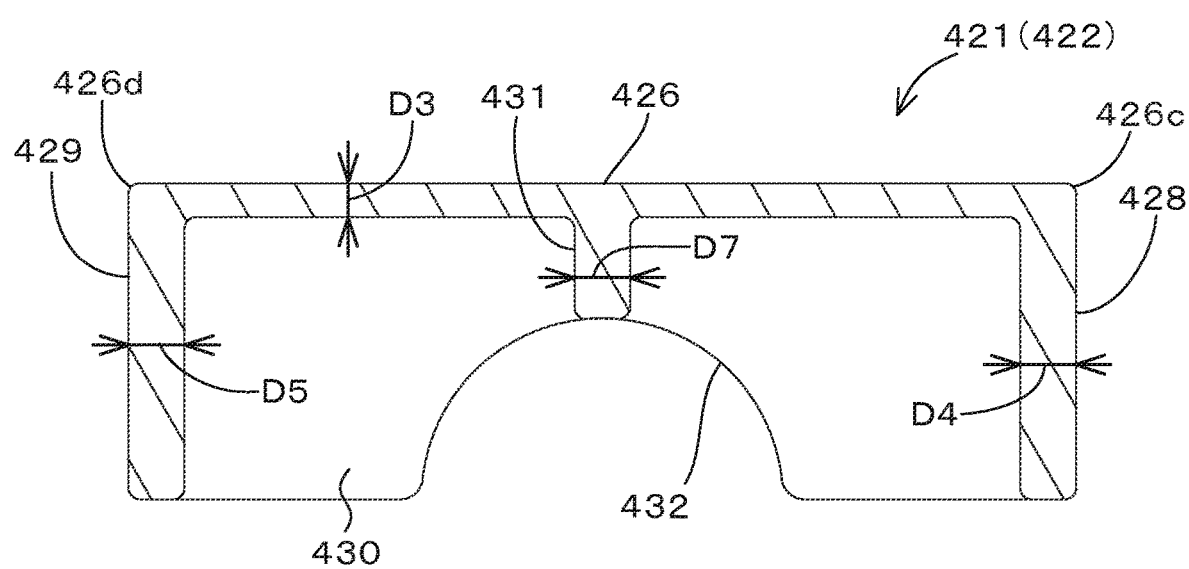
FIG. 65B is a cross-sectional view of FIG. 65A in Y2-Y2 arrowed lines.

As shown in FIG. 62, FIG. 63, FIG. 65 A, and FIG. 65 B, the second cover wall portion 428 extends downward from the first opposing side portion 426c. The shape of the projecting end portion 428a which is an end portion of projecting side of the second cover wall portion 428 is formed to have a shape being approximately same with the shape of the upper portion of the rear wall 400 of the front lateral member 396. The thickness D4 of the second cover wall portion 428 is formed to be thicker than the thickness D3 of the first cover wall portion 426 (refer to FIG. 65B).

As shown in FIG. 62, FIG. 63, FIG. 65A, and FIG. 65B, the third cover wall portion 429 extends downward from the second opposing side portion 426d. The shape of the projecting end portion 429a which is an end portion of projecting side of the third cover wall portion 429 is also formed to have a shape being approximately same with the shape of the upper portion of the rear wall 400 of the front lateral member 396. The thickness D5 of the third cover wall portion 429 is formed to be thicker than the thickness D3 of the first cover wall portion 426 (refer to FIG. 65B).

As shown in FIG. 62, FIG. 63, FIG. 65A, and FIG. 65B, the connecting wall portion 430 extends downward from one side portion 426a of the first cover wall portion 426, and connects the second cover wall portion 428 and the third cover wall portion 429 to each other. The connecting wall portion 430 extends in a direction substantially orthogonal to the first cover wall portion 426. An arcuate cutout portion 432 is formed in a central portion between the second cover wall portion 428 and the third cover wall portion 429 in the connecting wall portion 430. The thickness D6 of the connecting wall portion 430 is formed to be the same thickness as the thickness D3 of the first cover wall portion 426 (refer to FIG. 65A).

As shown in FIG. 62, FIG. 63, FIG. 65A, and FIG. 65B, the reinforcing rib wall 431 is provided between the second cover wall portion 428 and the third cover wall portion 429. In the present embodiment, the reinforcing rib wall 431 is provided at the center portion between the second cover wall portion 428 and the third cover wall portion 429. As shown in FIG. 62, the reinforcing rib wall 431 has a first connecting edge 431a connected to the first cover wall portion 426 and a second connecting edge 431b connected to the connecting wall portion 430. As shown in FIG. 65B, the thickness D7 of the reinforcing rib wall 431 is formed thicker than the thickness D3 of the first cover wall portion 426. In addition, the wall thickness D7 of the reinforcing rib wall 431 is formed to have the same thickness as the thickness D4 of the second cover wall portion 428 and the wall thickness D5 of the third cover wall portion 429.

As shown in FIG. 61, under the state where the floor mat 32 is laid, the other side portion 426b of the first cover wall portion 426 is located at the upper end side of the rear wall 400, and contact to a position higher than the upper end of the first cutout portion 417. In addition, in the second cover wall portion 428, the projecting end portion 428a contacts to the rear wall 400 at the machine outward side of the first cutout portion 417. Also, in the third cover wall portion 429, the protruding end portion 429a is in contact with the rear wall 400 at a the machine inward side of the first cutout portion 417. In reinforcing rib wall 431, the end portion of the side of the other side portion 426b contacts to the upper portion 400a of the rear wall 400. The first cover wall portion 426, the second cover wall portion 428, and the third cover wall portion 429 are brought into contact with the front lower frame 52, so that the first covering portion 421 is held and the upper portion of the first cutout portion 417 is covered (closed) with the first covering portion 421. That is, the first cover wall portion 426, the second cover wall portion 428, and the third cover wall portion 429 are held by contacting to a side of the cover target portion (the first cutout portion 417 and the second cutout portion 418) and close (cover) the covering target portion under the state where the hinge portion 427 elastically bends and the first cover wall portion 426 is swung upward.

In the present embodiment, the second cover wall portion 428 and the third cover wall portion 429 are mainly in contact with a portion contacting to the upper portion 400a of the rear wall 400 so as to press the upper portion 400a, and are in contact with the lower portion 400b and the stepped portion 400c in a shape fitting to the shapes thereof.

As shown in FIG. 61, the upper portion of the bolt 413 and the third nut 416 are inserted into the cutout portion 432 of the connecting wall portion 430 under the state where the first covering portion 421 closes the first cutout portion 417, and thereby preventing interference with them.

Meanwhile, the second covering portion 422 also has a first cover wall portion, a hinge portion, a second cover wall portion, a third cover wall portion, a connecting wall portion, and a reinforcing rib wall similar to those of the first covering portion 421.

As can be known from FIG. 61 and FIG. 62, the lower portion of the first cutout portion 417 is covered (closed) with the first forward-placing portion 423L, the second forward-placing portion 424L, and a portion (a mat main body 420) extending from the first forward-placing portion 423L to the second forward-placing portion 424L. In addition, the lower portion of the second cutout portion 418 is covered (closed) with the first forward-placing portion 423R, the second forward-placing portion 424R, and a portion (the mat main body 420) extending from the first forward-placing portion 423R to the second forward-placing portion 424R.

In the present embodiment, the floor mat 32 includes a floor portion 419 and a wall portion (a front lateral member 396) disposed at the floor portion 419 and a circumferential edge portion of the floor portion 419, the mat main body 420 laid on the floor portion 419, that is, the mat main body 420 laid on the working machine 1 having an opening portion (the first cutout portion 417, the second cutout portion 418) at a part of portion connecting to the floor portion 419 of the wall portion, a covering portion (the first covering portion 421, the second covering portion 422) for closing the opening portion, and a connecting portion (the hinge portion 427) for bendably connecting the covering portion to the circumferential portion (the extended portion 420c) of the mat main body 420. The covering portion includes the first cover wall portion 426 having the side portion 426a attached to the attachment portion 427, and a first opposite side portion 426c and a second opposite side portion 426d each extending from end portions of the side portion 426a and being opposite to each other, a second cover wall portion 428 extending downward from the first opposite side portion 426c, and the third cover wall portion 429 extending downward from the second opposite side portion 426d. A length of the second cover wall portion 428 from a portion connecting to the first opposite side portion 426c to a lower end portion of the second cover wall portion 428 is equal to or less than a thickness of the mat main body 420, and a length of the third cover wall portion 429 from a portion connecting to the second opposite side portion (426d) to a lower end portion of the third cover wall portion 429 is equal to or less than the thickness of the mat main body 420.

According to the above configuration, by bending the covering portion with respect to the mat main body 420 at the connecting portion, the opening portion can be closed. In addition, the height of the second cover wall portion 428 in the non-bent state (the length from the portion connecting to the first opposing side portion 426c to the lower end portion) and the height of the third cover wall portion 429 (the length from the portion connecting to the second opposing side portion 426d to the lower end portion) is equal to or less than the thickness of the mat main body 420, so that the covering portion for closing the opening portion (the covering target portion) can be formed on the mat main body 420 without increasing a total thickness of the floor mat 32.

Further, the connecting portion is thinner than the thickness of the circumferential edge portion of the mat main body 420 and the thickness of the first cover wall portion 426.

In this manner, the covering portion can be easily bent with respect to the mat main body 420.

In addition, the connecting wall portion 430 extends downward from one side portion 426a of the first cover wall portion 426 and connects the second cover wall portion 428 and the third cover wall portion 429 on one side 426a.

In this manner, it is possible to improve the strength of the covering portion (the first covering portion 421, the second covering portion 422).

Provided with the reinforcing rib wall 431 having the first connecting edge 431a arranged between the second cover wall portion 428 and the third cover wall portion 429 and connected to the first cover wall portion 426, and the second connecting edge 431b connected to the connecting wall portion 430.

In this manner, the strength of the covering portion (the first covering portion 421, the second covering portion 422) can be further improved.

The thickness D4 of the second cover wall portion 428 and the thickness D5 of the third cover wall portion 429 are thicker than the thickness D3 of the first cover wall portion 426.

According to the above configuration, the strength of the covering portions (the first covering portion 421 and the second covering portion 422) can be further improved. In this manner, for example, even in the case where the operator steps on the first cover wall portion 426 with the foot, the second cover wall portion 428 and the third cover wall portion 429 can firmly support the first cover wall portion 426.

In addition, the working machine 1 according to the present embodiment is provided with the floor mat 32 described above, and the covering member is bent upward at the connecting portion with respect to the mat main body, and thereby closing the opening portion.

According to the above configuration, the covering portion for closing the opening portion can be provided in the mat main body 420 without increasing the total thickness of the floor mat 32.

In addition, the working machine includes the cabin 5 having the floor portion 419 and the wall portion (the front lateral member 396), and front mount members 48 and 49 for supporting a front portion of the cabin 5. The cabin 5 has the first front pillar portion 77 and a second front pillar portion 78 provided at a distance from the first front pillar portion 77 in the machine width direction K2. The wall portion includes the opening portion (the first cutout portion 417, the second cutout portion 418) provided between the lower end portions of the first front pillar portion 77 and the second front pillar portion 78 and cutout at portions corresponding to the front mount members 48 and 49.

In this manner, the noise can be prevented from propagating to the interior 5A of the cabin 5 through the opening portion.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A working machine, comprising:
a traveling frame provided with a top plate having an opening;
a swivel base arranged on the traveling frame and configured to be turned about center of the opening as a turn axis; and
a swivel joint arranged at the center of the opening,
wherein the top plate includes:
a first joint support portion protruding toward the center of the opening and supporting the swivel joint; and
a second joint support portion protruding toward the center of the opening from a position opposite to, across the center, the first joint support portion and supporting the swivel joint,
wherein the first joint support portion has a first opening portion penetrating from an upper surface to a lower surface of the first joint support portion,
wherein the second joint support portion has a second opening portion penetrating from an upper surface to a lower surface of the second joint support portion,
wherein the swivel joint includes a first fixing portion and a second fixing portion, the first fixing portion protruding in one horizontal direction, the second fixing portion protruding in an opposite horizontal direction that is opposite to the one horizontal direction,
wherein the first joint support portion includes a first base portion and a first attachment portion which has the first fixing portion placed and attached thereon, the first base portion extending from a circumferential edge of the opening to a midway portion of the first joint support portion in a direction in which the first joint support portion protrudes the first attachment portion extending from the first base portion to a distal end portion of the first joint support portion in the direction in which the first joint support portion protrudes,
wherein the second joint support portion includes a second base portion and a second attachment portion which has the second fixing portion placed and attached thereon, the second base portion extending from the circumferential edge of the opening to a midway portion of the second joint support portion in a direction in which the second joint support portion protrudes, the second attachment portion extending from the second base portion to a distal end portion of the second joint support portion in the direction in which the second joint support portion protrudes,
wherein the first opening portion is in the first base portion,
and wherein the second opening portion is in the second base portion.

2. The working machine according to claim 1, further comprising
a turning motor attached to the swivel base;
a swing bearing having
an outer ring attached to the swivel base, and
an inner ring provided on an inner peripheral side of the outer ring so as to be rotatable around the turn axis, the inner ring having an inner peripheral gear portion formed on an inner peripheral side thereof; and
a pinion meshing with the inner peripheral gear portion and moving along the inner peripheral gear portion by being driven to rotate by the turning motor,
wherein the traveling frame has an inner ring attachment portion shaped annularly to which the inner ring is attached, wherein the first joint support portion and the second joint support portion protrude from the inner ring attaching portion toward the center of the opening, and wherein the first opening portion and the second opening portion are provided below a movement locus of the pinion.

3. The working machine according to claim 1, further comprising:
   a swing bracket having a rotation support portion rotatably supported on the swivel base so as to be rotatable about a vertical axis;
   a hydraulic hose disposed through the swing bracket;
   a hose retainer for retaining the hydraulic hose;
   a holder bracket attached to the swing bracket; and
   a fastener for attaching the hose retainer to the holder bracket, the fastener having fastening operation portions that face the rotation support portion in a state where the fastener is attached to the holder bracket.

4. The working machine according to claim 3, wherein the holder bracket has an attachment stay portion attached to the rotation support portion from above.

5. A working machine, comprising:
   a traveling frame provided with a top plate having an opening;
   a swivel base arranged on the traveling frame and configured to be turned about center of the opening as a turn axis; and
   a swivel joint arranged at the center of the opening,
   wherein the top plate includes:
      a first joint support portion protruding toward the center of the opening and supporting the swivel joint; and
      a second joint support portion protruding toward the center of the opening from a position opposite to, across the center, the first joint support portion and supporting the swivel joint,
   wherein the first joint support portion has a first opening portion penetrating from an upper surface to a lower surface of the first joint support portion,
   wherein the second joint support portion has a second opening portion penetrating from an upper surface to a lower surface of the second joint support portion,
   wherein the swivel joint has a first fixing portion projecting in one direction in a horizontal direction and a second fixing portion projecting in another horizontal direction opposite to the one direction,
   wherein the first joint support portion has:
      a first attachment portion on which the first fixing portion is mounted; and
      a first base portion gradually widening in a direction away from the first attachment portion,
   the second joint support portion has:
      a second attachment portion on which the second fixing portion is mounted; and
      a second base portion gradually widening in a direction away from the second attachment portion,
   wherein the first opening portion is provided on the first base portion and gradually widened in the direction away from the first attachment portion, and
   wherein the second opening portion is provided in the second base portion and gradually widely formed in the direction away from the second attachment portion.

* * * * *